(12) United States Patent
Johnson et al.

(10) Patent No.: US 7,697,268 B2
(45) Date of Patent: Apr. 13, 2010

(54) MODULAR ELECTRICAL DISTRIBUTION SYSTEM FOR A BUILDING

(75) Inventors: Ross Johnson, Jenison, MI (US); Harold Wilson, Hudsonville, MI (US)

(73) Assignee: Haworth, Inc., Holland, MI (US)

( * ) Notice: Subject to any disclaimer, the term of this patent is extended or adjusted under 35 U.S.C. 154(b) by 35 days.

(21) Appl. No.: 12/228,266

(22) Filed: Aug. 11, 2008

(65) Prior Publication Data
US 2009/0052122 A1  Feb. 26, 2009

Related U.S. Application Data

(60) Provisional application No. 60/964,198, filed on Aug. 9, 2007.

(51) Int. Cl.
    *H01R 13/73* (2006.01)
(52) U.S. Cl. .................. 361/643; 361/600; 361/601; 361/622; 361/641; 439/215; 439/535; 174/53; 174/59; 174/60
(58) Field of Classification Search ......... 361/600–605, 361/621–627, 640–647; 174/53, 57–60, 174/66, 84 R, 484, 491, 84 C, 480, 481; 439/120, 106, 115, 119–121, 215, 216, 535, 439/552, 653, 357, 470, 488, 655, 533, 687; 307/11, 82, 126, 147, 23, 39, 154, 157; 370/463, 370/465, 485; D13/171, 137.1, 151, 160, D13/177
See application file for complete search history.

(56) References Cited

U.S. PATENT DOCUMENTS

| | | | |
|---|---|---|---|
| 350,293 A | 10/1886 | Cox | |
| 2,406,895 A | 9/1946 | Olson | |
| 2,565,075 A | 8/1951 | Harcharek | |
| 2,920,303 A | 1/1960 | Johnson | |
| 3,023,394 A | 2/1962 | Hubbell | |
| 3,120,985 A | 2/1964 | Hubbell | |
| 3,231,767 A | 1/1966 | Powell | |
| 3,411,127 A | 11/1968 | Adams | |
| 3,491,330 A | 1/1970 | Barnhart et al. | |
| 3,683,100 A | 8/1972 | Deal et al. | |
| 3,714,617 A | 1/1973 | Bright et al. | |
| 3,879,101 A | 4/1975 | McKissic | |
| 3,922,478 A | 11/1975 | Perkey | |
| 3,993,385 A | 11/1976 | Seger | |
| 4,001,571 A | 1/1977 | Martin | |
| 4,032,213 A | 6/1977 | Snyder et al. | |
| 4,134,045 A | 1/1979 | Quin | |
| 4,146,287 A | 3/1979 | Jonsson | |
| 4,165,443 A | 8/1979 | Figart et al. | |
| 4,272,689 A | 6/1981 | Crosby et al. | |

(Continued)

*Primary Examiner*—Michael V Datskovskiy
(74) *Attorney, Agent, or Firm*—Flynn, Thiel, Boutell & Tanis, P.C.

(57) ABSTRACT

A universal power distribution system is provided for routing electrical circuits within a building structure to comprehensively provide electrical power to the building in ceiling configurations, wall-mounted configurations, raised floor configurations and in office furniture configurations. The system components for all of these configurations have common plug connectors that are engagable with each other so as to be readily usable in a wide variety of applications. The system is readily adaptable to form virtually any conventional circuit configuration found within conventional hard-wired systems yet is formed simply through the routing of the cables through the building cavities and interconnection is accomplished merely by plugging components together rather than through labor-intensive manual wiring.

21 Claims, 104 Drawing Sheets

U.S. PATENT DOCUMENTS

| | | | |
|---|---|---|---|
| 4,277,126 A | 7/1981 | Lincoln | |
| 4,295,697 A * | 10/1981 | Grime | 439/215 |
| 4,336,418 A | 6/1982 | Hoag | |
| 4,367,370 A | 1/1983 | Wilson et al. | |
| 4,367,417 A | 1/1983 | Casasanta | |
| 4,377,724 A | 3/1983 | Wilson | |
| 4,386,333 A | 5/1983 | Dillan | |
| 4,386,820 A | 6/1983 | Dola et al. | |
| 4,399,371 A | 8/1983 | Ziff et al. | |
| 4,500,796 A | 2/1985 | Quin | |
| 4,502,744 A | 3/1985 | Garnett et al. | |
| 4,666,223 A | 5/1987 | Tillmann | |
| 4,756,695 A | 7/1988 | Lane et al. | |
| 4,775,802 A | 10/1988 | Dods | |
| 4,778,411 A | 10/1988 | Rudy, Jr. et al. | |
| 4,781,609 A | 11/1988 | Wilson et al. | |
| 4,820,197 A | 4/1989 | Stumpff et al. | |
| 4,822,305 A | 4/1989 | Waters | |
| 4,842,551 A | 6/1989 | Heimann | |
| 4,904,194 A | 2/1990 | Kilsdonk et al. | |
| 4,924,032 A | 5/1990 | Akins | |
| 4,958,048 A | 9/1990 | Bell | |
| 4,990,099 A | 2/1991 | Marin et al. | |
| 5,013,252 A | 5/1991 | Nienhuis et al. | |
| 5,057,647 A | 10/1991 | Bogden et al. | |
| 5,092,786 A | 3/1992 | Juhlin et al. | |
| 5,096,431 A | 3/1992 | Byrne | |
| 5,096,433 A * | 3/1992 | Boundy | 439/215 |
| 5,112,240 A | 5/1992 | Nienhuis et al. | |
| 5,158,472 A | 10/1992 | Juhlin | |
| 5,164,544 A * | 11/1992 | Snodgrass et al. | 174/495 |
| 5,171,159 A | 12/1992 | Byrne | |
| 5,178,855 A | 1/1993 | Bonnem | |
| 5,236,370 A | 8/1993 | King et al. | |
| 5,252,086 A | 10/1993 | Russell et al. | |
| 5,254,019 A | 10/1993 | Noschese | |
| 5,277,608 A * | 1/1994 | Oda | 439/188 |
| 5,277,609 A | 1/1994 | Ondrejka | |
| 5,306,165 A * | 4/1994 | Nadeau | 439/115 |
| 5,399,806 A | 3/1995 | Olson | |
| 5,503,565 A | 4/1996 | McCoy | |
| 5,562,469 A | 10/1996 | Nienhuis et al. | |
| 5,575,685 A | 11/1996 | Ittah et al. | |
| 5,584,714 A | 12/1996 | Karst et al. | |
| 5,588,859 A | 12/1996 | Maurice | |
| 5,595,495 A | 1/1997 | Johnson et al. | |
| 5,607,317 A | 3/1997 | King et al. | |
| 5,675,194 A * | 10/1997 | Domigan | 307/147 |
| 5,679,016 A | 10/1997 | Marder et al. | |
| 5,679,023 A | 10/1997 | Anderson, Jr. et al. | |
| 5,819,405 A | 10/1998 | Marder et al. | |
| 5,941,720 A | 8/1999 | Byrne | |
| 5,964,610 A * | 10/1999 | McCoy | 439/218 |
| 6,035,517 A | 3/2000 | Moore et al. | |
| 6,036,516 A | 3/2000 | Byrne | |
| 6,040,646 A | 3/2000 | Peters | |
| 6,083,053 A | 7/2000 | Anderson, Jr. et al. | |
| 6,102,733 A | 8/2000 | Anderson, Jr. et al. | |
| 6,113,435 A | 9/2000 | Anderson, Jr. et al. | |
| 6,123,562 A | 9/2000 | King et al. | |
| 6,126,490 A | 10/2000 | Anderson, Jr. et al. | |
| 6,186,825 B1 | 2/2001 | Bogiel et al. | |
| 6,259,023 B1 | 7/2001 | Reiker | |
| 6,376,770 B1 * | 4/2002 | Hyde | 174/58 |
| 6,422,884 B1 | 7/2002 | Babasick et al. | |
| 6,540,549 B2 | 4/2003 | Rupert | |
| 6,558,185 B1 | 5/2003 | Stockel et al. | |
| 6,617,511 B2 | 9/2003 | Schultz et al. | |
| 6,652,288 B2 | 11/2003 | Laukhuf et al. | |
| 6,663,435 B2 | 12/2003 | Lincoln, III et al. | |
| 6,663,438 B1 | 12/2003 | Guilmette | |
| 6,730,844 B2 | 5/2004 | Reiker | |
| 6,777,611 B2 | 8/2004 | Ewald et al. | |
| 6,857,903 B2 * | 2/2005 | Hyde | 439/598 |
| 6,863,561 B2 | 3/2005 | Gorman | |
| 6,870,099 B1 | 3/2005 | Schultz et al. | |
| 6,902,415 B2 | 6/2005 | Ramsey et al. | |
| 6,939,153 B1 | 9/2005 | Kondas et al. | |
| 6,939,179 B1 | 9/2005 | Kieffer, Jr. et al. | |
| 6,948,972 B2 | 9/2005 | Laukhuf | |
| 6,991,485 B2 | 1/2006 | Plattner et al. | |
| 6,994,585 B2 * | 2/2006 | Benoit et al. | 439/535 |
| 7,021,961 B1 | 4/2006 | Soderholm | |
| 7,056,149 B1 | 6/2006 | Lanni | |
| 7,104,836 B1 | 9/2006 | Gorman | |
| 7,114,972 B1 | 10/2006 | Riner | |
| 7,131,541 B2 | 11/2006 | Riner | |
| 7,144,264 B2 | 12/2006 | Kochanski | |
| 7,160,147 B1 * | 1/2007 | Stephan | 439/535 |
| 7,192,289 B2 * | 3/2007 | Kowalski | 439/106 |
| 7,279,635 B2 * | 10/2007 | Hyde | 174/58 |
| 2006/0084309 A1 | 4/2006 | Kondas | |
| 2006/0084310 A1 | 4/2006 | Kondas et al. | |
| 2006/0105619 A1 | 5/2006 | Lanni | |
| 2006/0292909 A1 | 12/2006 | Gosling et al. | |

* cited by examiner

POWER DISTRIBUTION ASSEMBLY
-Furniture

FLEXIBLE CONNECTOR
-Furniture

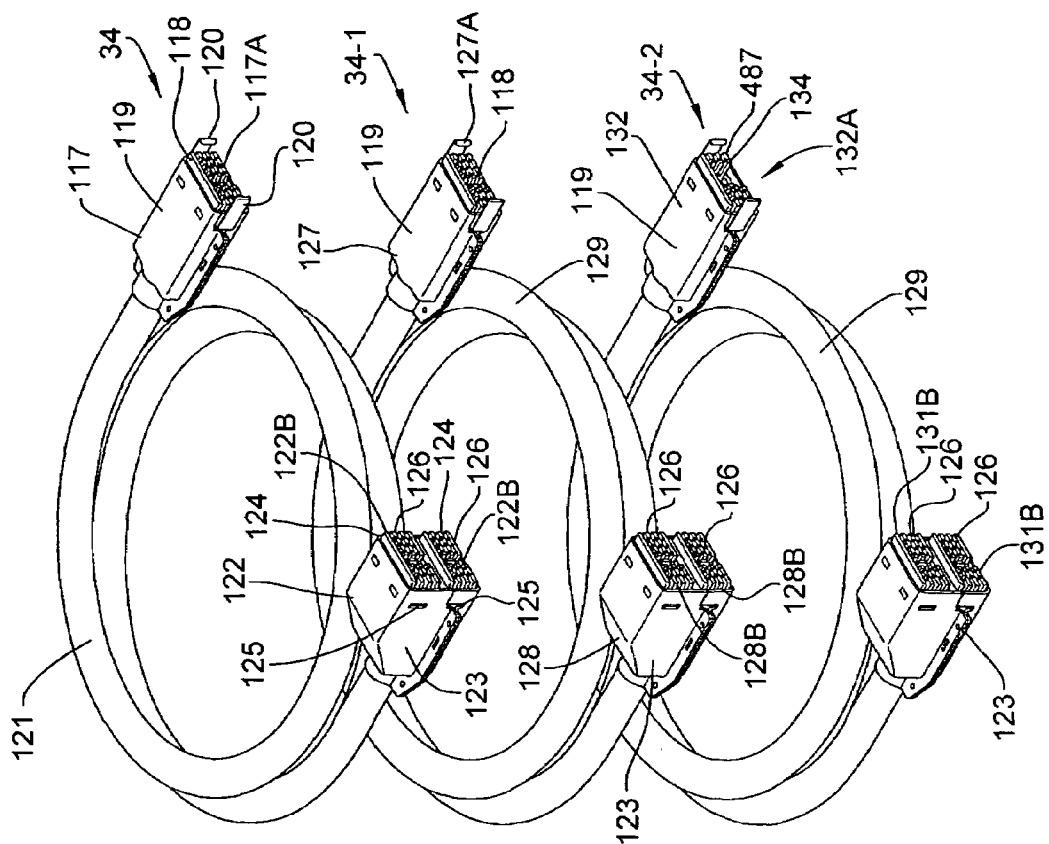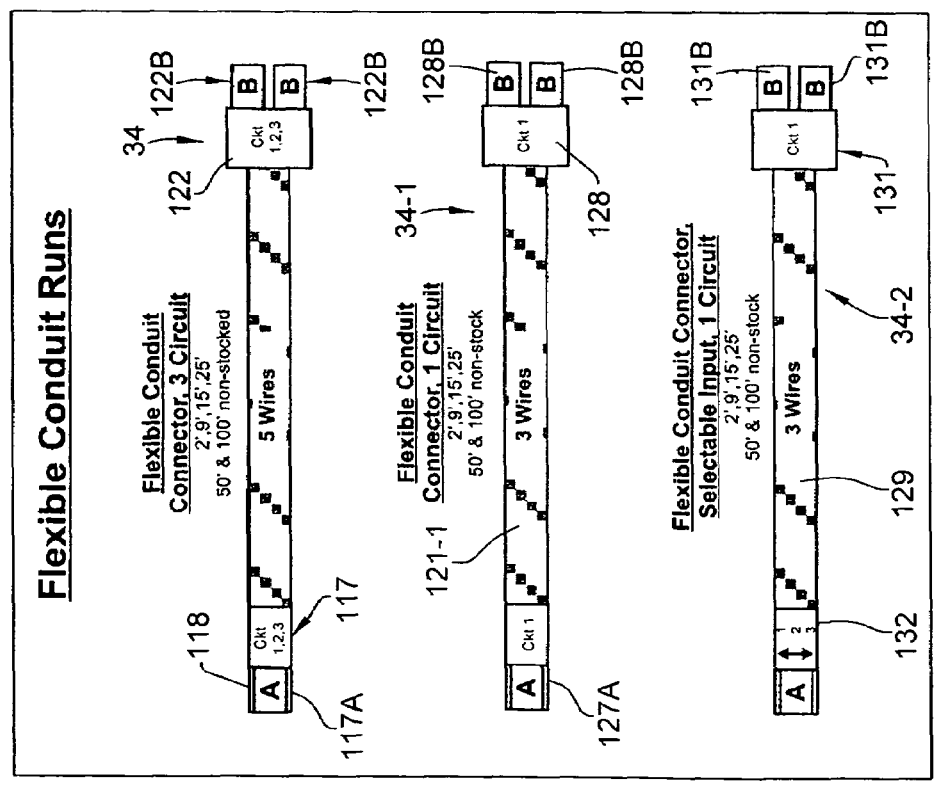
FIG. 8

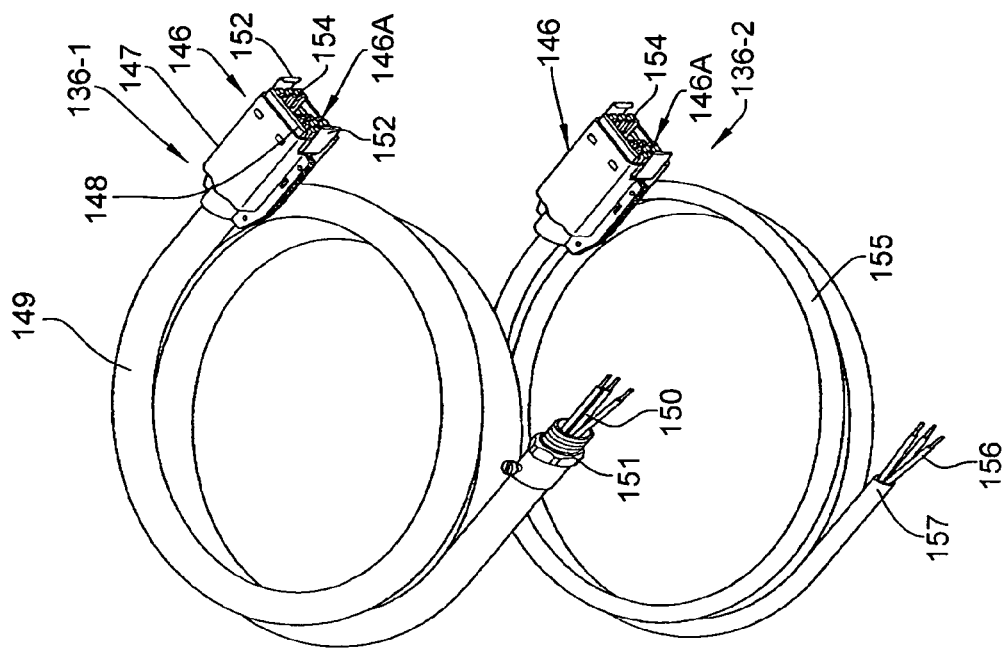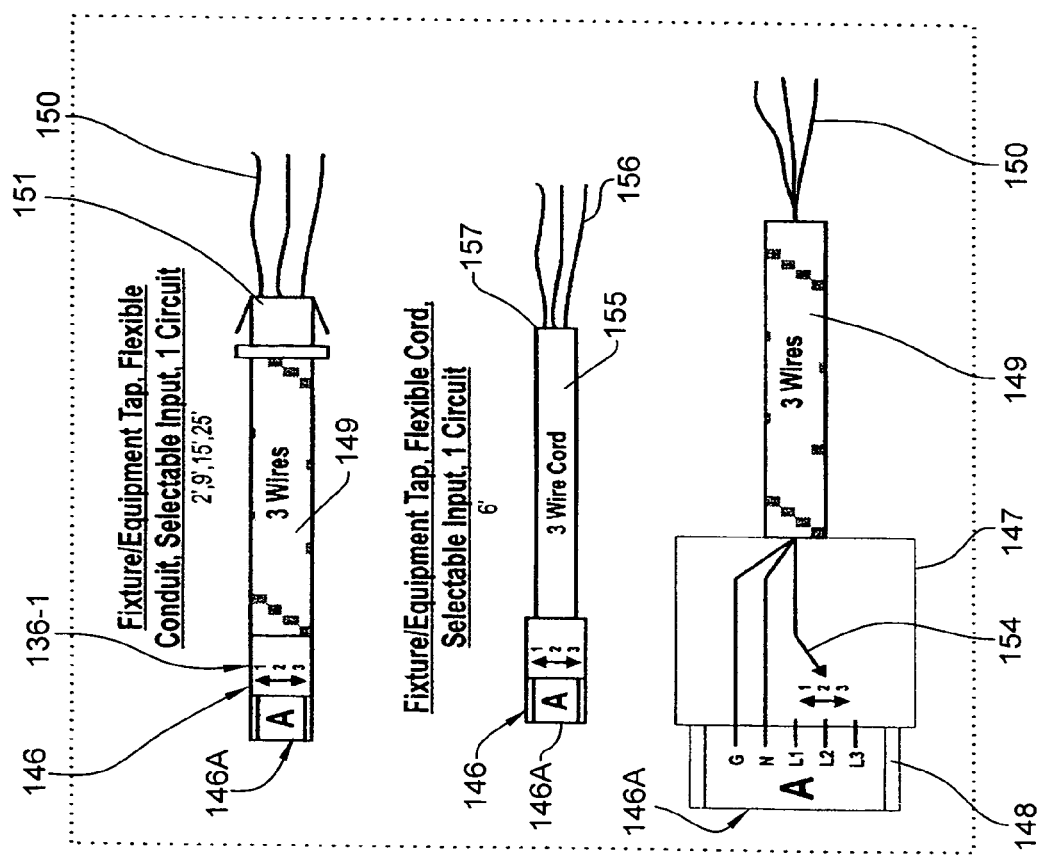
FIG. 10

RECEPTACLES

- Furniture/Building/Floors
- 20 Amp

3-WAY SWITCH CONNECTOR
- Lighting/Building/Floors

3/4-WAY SWITCH CONNECTOR
- Lighting/Building/Floors

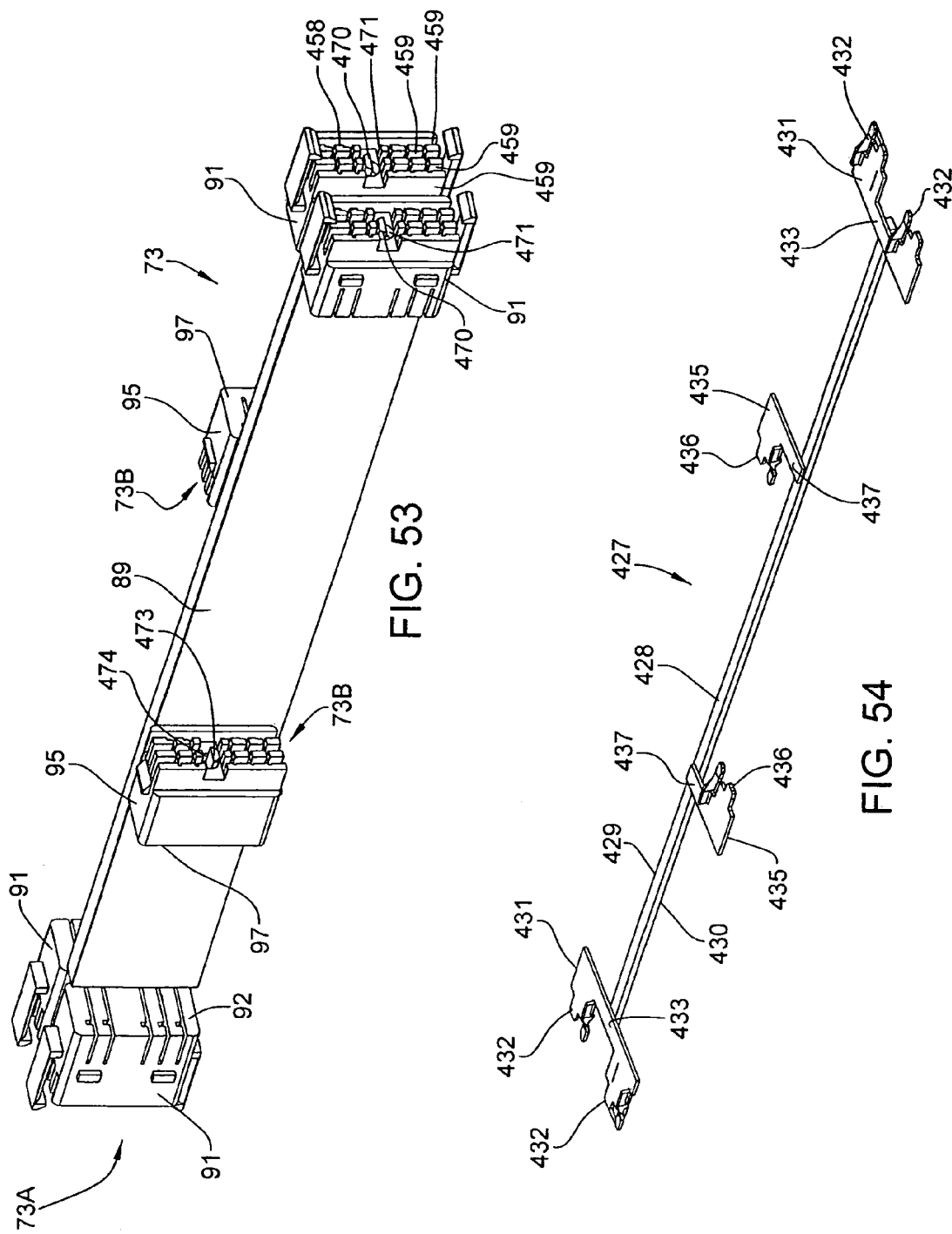

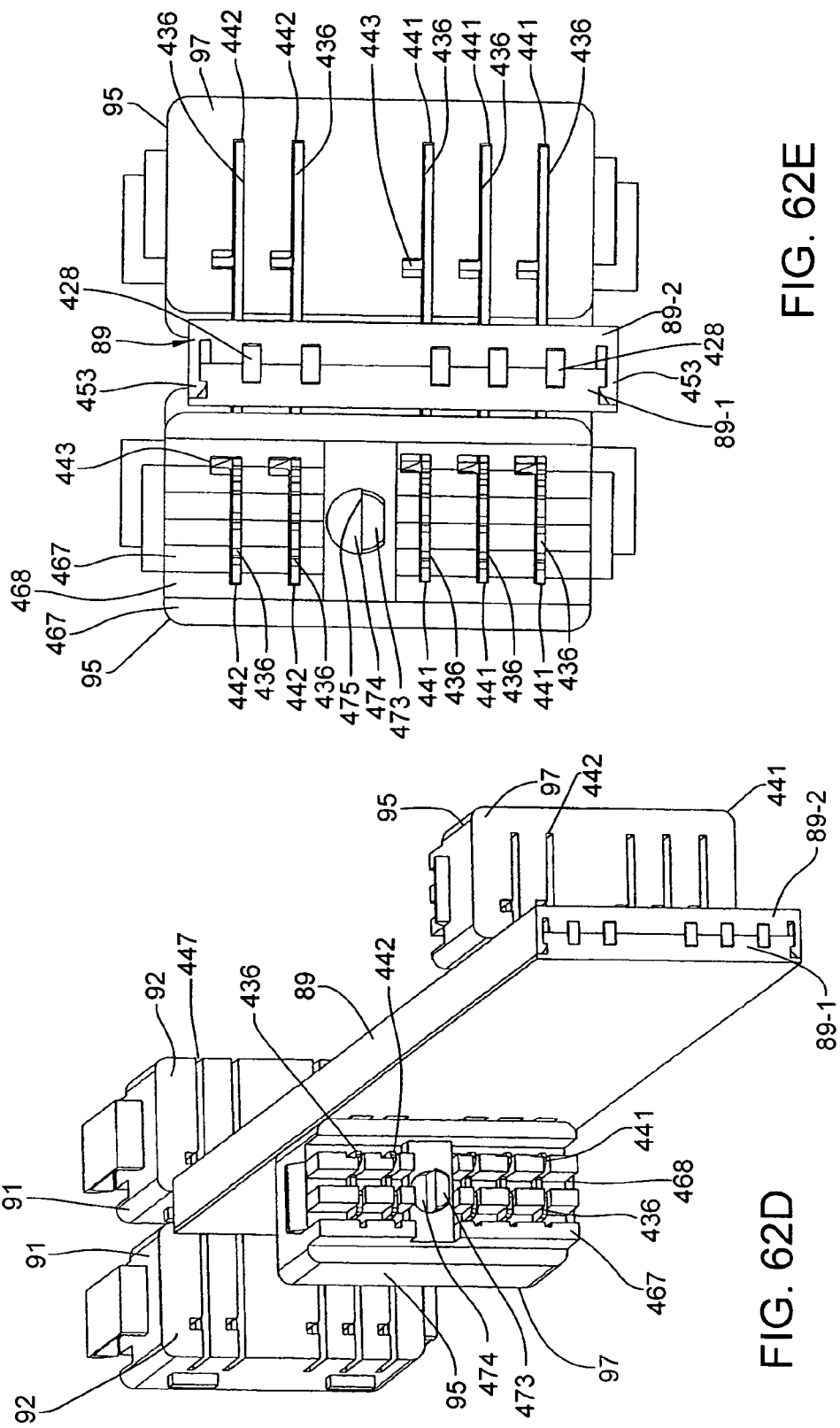

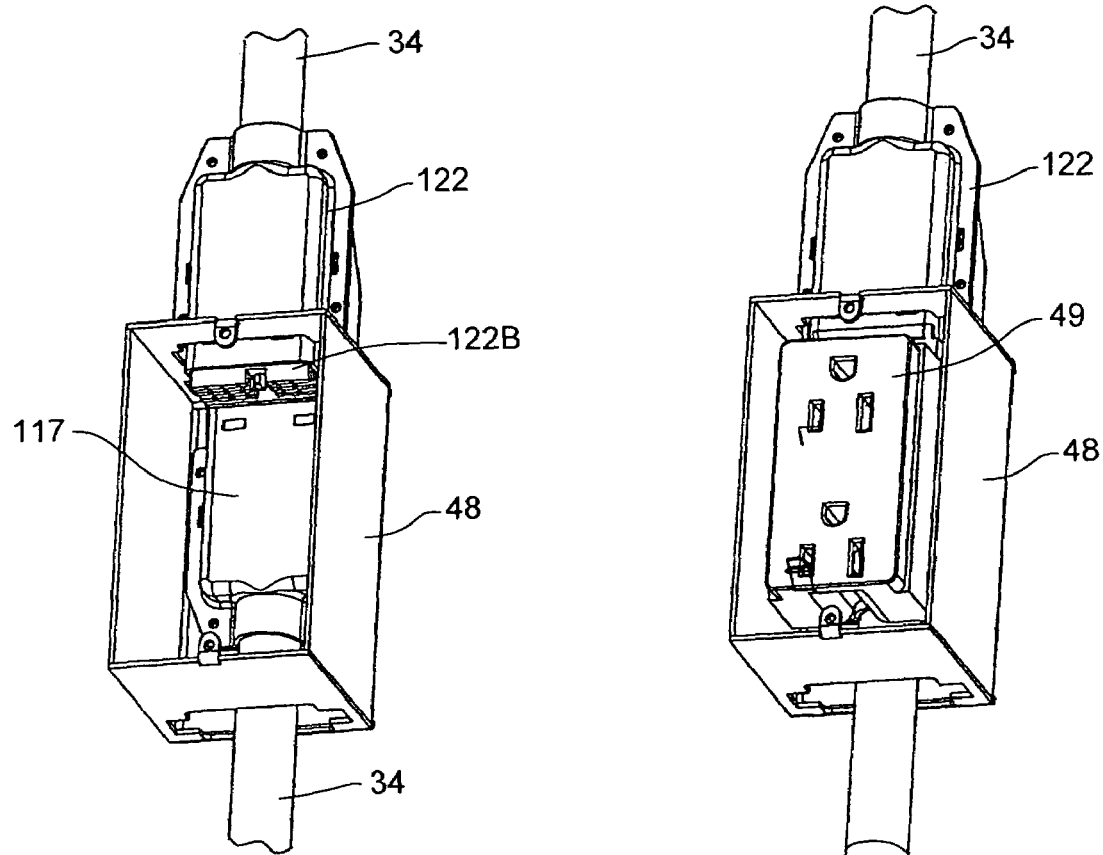
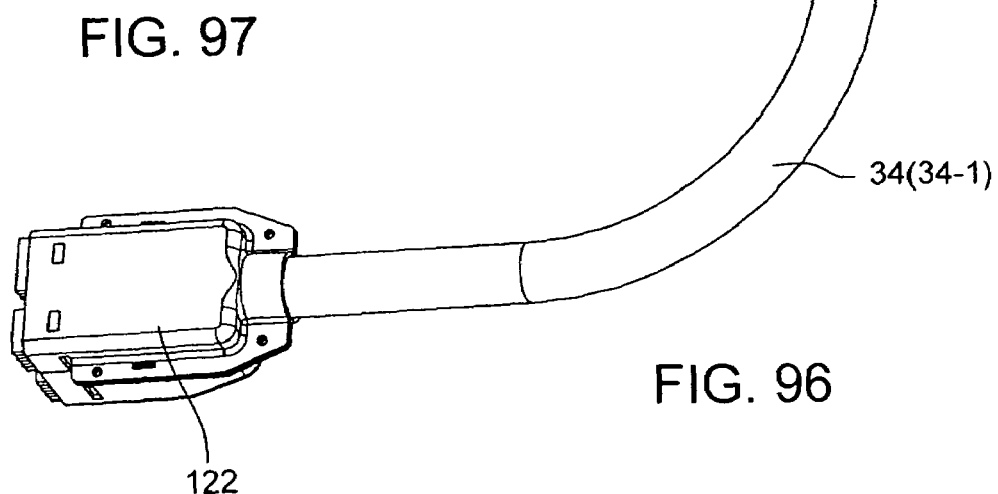
FIG. 97
FIG. 96

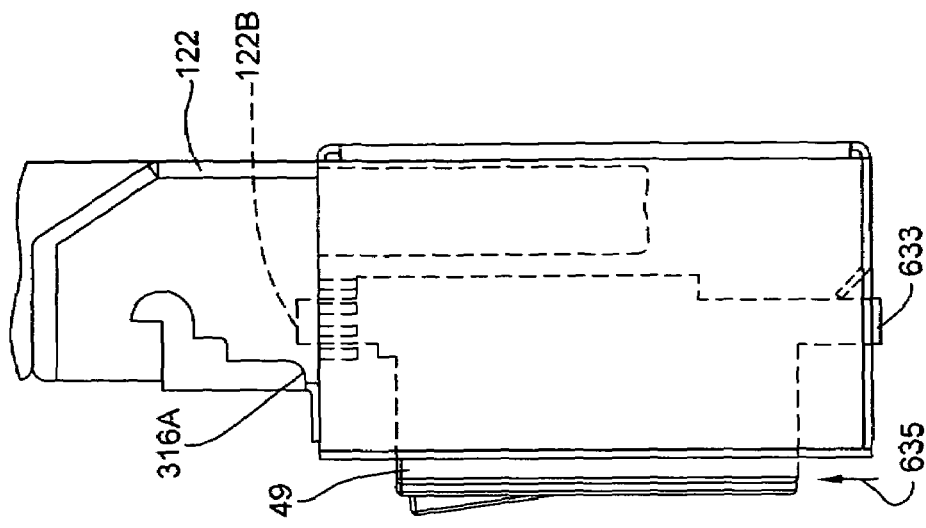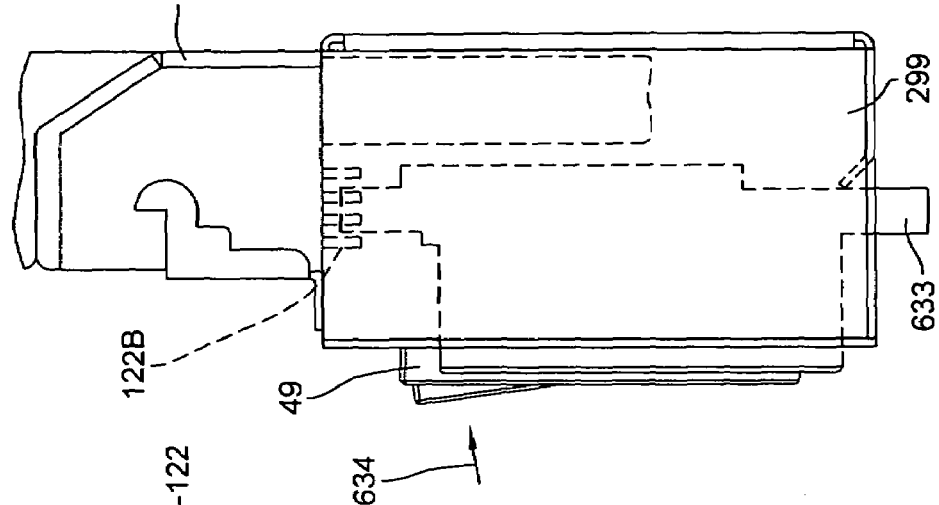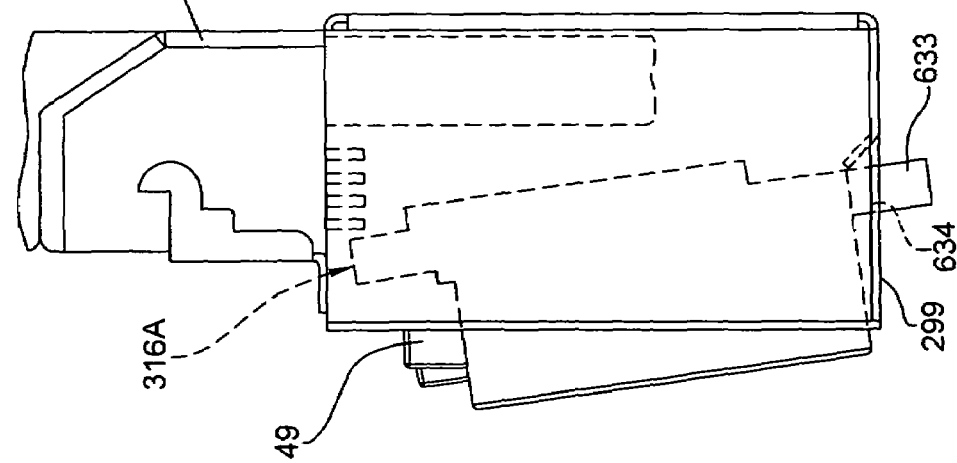

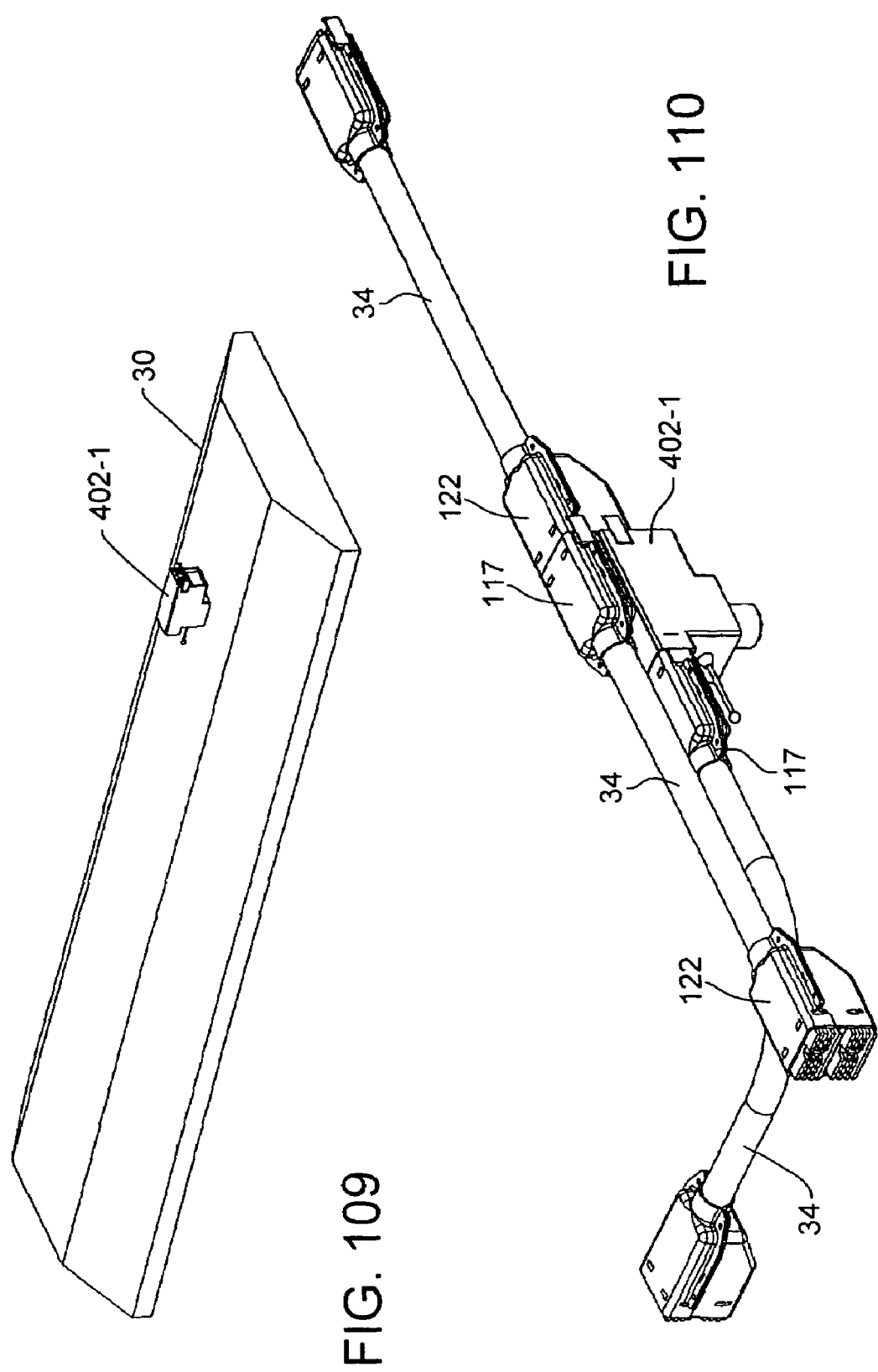

FIG. 116
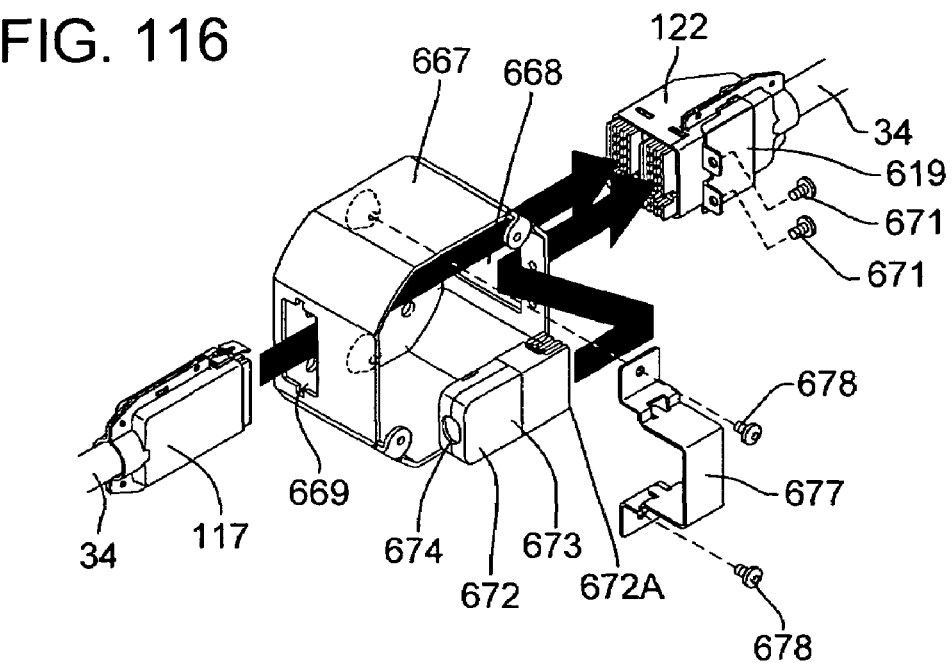
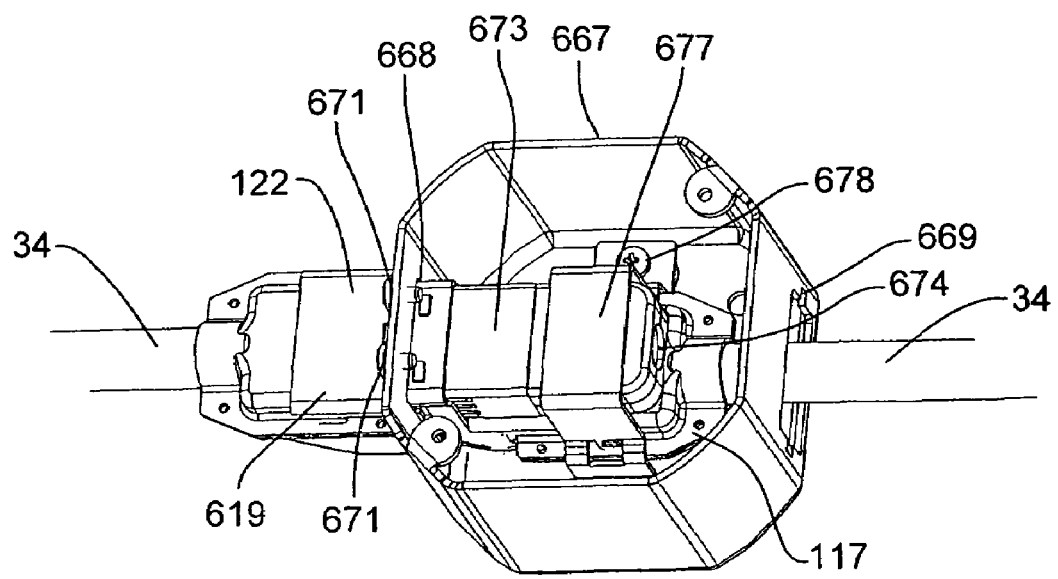
FIG. 117

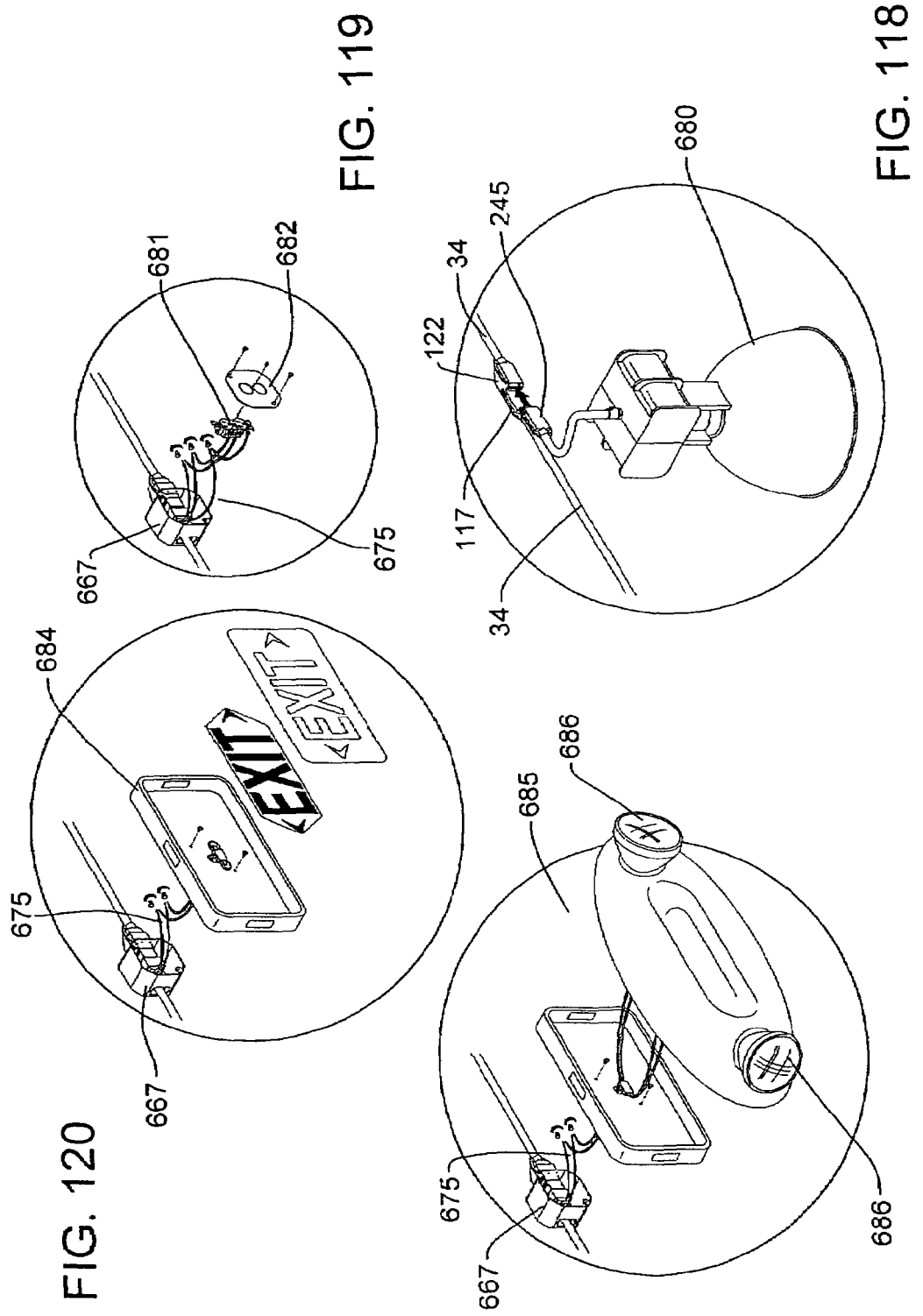

MODULAR ELECTRICAL DISTRIBUTION SYSTEM FOR A BUILDING

CROSS-REFERENCE TO RELATED APPLICATION

This application claims the benefit of U.S. Provisional Application Ser. No. 60/964,198, filed Aug. 9, 2007, which is incorporated herein by reference in its entirety.

FIELD OF THE INVENTION

The invention relates to a universal modular electrical distribution system for a building and, more particularly, to a system having modular components that are inner-connectable to supply power to lighting and power receptacles.

BACKGROUND OF THE INVENTION

In non-residential buildings, such buildings have various sizes dedicated to various uses such as for offices, retail and manufacturing. These buildings typically define relatively large open spaces within the interior thereof that are then outfitted with various interior structures. For office buildings, such interior structures may be space-dividing wall panels that subdivide the open office areas into smaller rooms or work stations. For retail spaces, the open interior building spaces may be outfitted or subdivided with various sales fixtures, equipment and display fixtures. Generally for non-residential buildings, the open interior spaces are outfitted with a configuration of lighting as well as an additional power supply system which provides receptacles in appropriate locations within the interior space, and with additional power supply connections for various pieces of equipment used within such spaces.

Large non-residential buildings typically are connected to an outside power source providing three-phase power wherein transformers reduce this higher voltage to selected lower voltages suitable for the electrical power distribution systems provided within the space. For example, ceiling lighting fixtures often use 277 volts or 347 volt circuits as their power supply to increase the number of fixtures on a single circuit, while most other items, such as wall-mounted receptacles, are powered by 120 volt service.

For this building wiring, THHN wire is used almost exclusively in non-residential buildings and is a nylon-jacketed wire type. This wire is installed within conventional conduits and metal enclosures and connected to various electrical devices to assemble the power distribution system to power lighting and other building equipment.

The conventional "hard wiring" installation method first involves installing various protective components for these wires in the form of floor/wall channels or steel tube conduit. After the passages are installed, the THHN wires are inserted into the passages by bundling the wires into groups with each wire being supplied from a separate spool, and then pulling the wiring bundles through the passages from one end to the other, after which the wires are cut from the spools. At the upstream terminal end of the system, the wires are usually connected with a main power supply such as the circuit breaker box that typically is located near the exterior power source for the building. The wire bundles may be terminated at selected locations, such as in receptacle or junction boxes, wherein the free wire ends along each wiring run typically are enclosed within the various wiring boxes and are often connected to some wiring device such as wall receptacles, switches, lighting fixtures or other fixtures/equipment. Most of the wire ends are individually connected to a system component, such as a receptacle, through manual hard wiring by an electrician.

Typically, each run of passages or conduits is sized for the number of fixtures and devices being connected thereto, and accommodates multiple circuits that are defined by the bundle of wires wherein typically three circuits are defined in a wire bundle. As such, the conduits and passages will often have five wires, one wire serving as a hot wire for each of three separate circuits for a total of three hot wires, one neutral or common return serving each of the three circuits, and one safety grounding wire, also serving the plurality of circuits. Some conduits may only have a single circuit extending therethrough comprising only three wires, namely one circuit or hot wire, a common return or neutral wire, and a ground wire. For conventional wall-mounted receptacles, the three-wire circuit may carry 120 volts. Lighting fixtures, however, are often installed on a single circuit of 277 volts or 347 volts wherein this higher voltage, single circuit can power a greater number of fixtures so as to reduce the total number of circuits being routed through a building structure.

As described above, the wiring practices for a non-residential building are currently labor-intensive wherein it is desirable to reduce the complexity of this wiring process. Attempts have been made to introduce power distribution systems comprising components wherein some of the system connections are already formed in the components in the manufacturing stage which therefore serves to transfer the labor from a job site and instead to a factory environment where automation and/or more efficient assembly processes can be applied in producing the system components. As a result of these efforts, some modular wiring systems and pre-bundled cables or conduits, namely MC cables, have been introduced and used which does reduce some of the on-site labor required to assemble the power distribution system.

In one example, pre-bundling or MC cable manufacturing involves automatic wrapping of a bundle of wires, usually three or five THHN wires, with a rolled metal strip that wraps circumferentially about the wire bundle and adjacent wraps interlock together along their edges to form a flexible metal jacket or flexible conduit. These MC cables are still formed in a long length wound onto large 1,000 foot spools, which spools are then shipped to local distributors and then cut to length as needed at the job site.

At the job site, these flexible cables hence are pulled directly from point to point through building cavities to define the various electrical circuits within such buildings. After pulling of the flexible, jacketed cables to selected locations, the cables are then cut near the spool to a desired length with the metal shield being stripped off from a portion of each opposite end of the cable length for subsequent connection to the desired electrical components being joined thereto, such as a lighting fixture, receptacle, switch or other equivalent component. In this regard, the individual wire ends are stripped and connected to the system components by hand in substantially the same manner as the conventional hard-wiring process described above. This alternate process provides for faster installation of the wiring bundles with more efficient routing directly between cable terminations, although the laying of the cables and the individual fastening of the cables to the system components is still labor-intensive.

In a further effort to improve the wiring process, modular wiring has evolved into categories of uses, namely manufactured cable systems with end connectors, and office furniture power systems which are used in space-dividing wall panels and other furniture components. These two systems have some similarities but are currently developed as separate systems for different applications within the same building environment.

As to manufactured cable systems, current manufacturers usually make two versions of such cable systems wherein one is provided for the powering and switching of lighting circuits and lighting fixtures, and another system is provided for powering receptacles. It is believed that these current systems are not compatible with each other wherein one system is provided to develop the lighting circuits and the other system is used to develop power supply receptacles throughout the interior building spaces. Further, the lighting systems are known to have three different types which are each factory keyed for one of the three common voltages mentioned above wherein voltage keying prevents interconnection of circuits and components of different voltages even when the plug style used in such systems is identical between the three system types.

More particularly, each of these manufactured cable systems includes several standard cable lengths having connector plugs at opposite ends thereof, and the systems further include pre-wired termination boxes for switch cable connections and Y connections. Wiring devices such as switches and receptacles are still connected by hand in standard wall boxes for these systems. Further, lighting fixtures are often provided with an extension cable designed for its appropriate voltage that attaches to the next fixture in a circuit in a daisy-chain configuration.

In addition to the manufactured cable system, office furniture power systems also are used to supply the individual power circuits within the space-dividing furniture used within an interior space. These office furniture power systems usually embody proprietary designs developed by major furniture system manufacturers and as such, these competing systems are not designed to be easily interconnected with each other. These power systems are more complex than manufactured cable systems in that the only hard wire connection typically is at the point where the system connection is made to the building wiring such as at the power panel. The other connections within the furniture components are simple modular plug connections.

These office furniture systems typically are only 120 volt systems and have multiple circuits, such as three or four circuits, running parallel through the entire chain or series of interconnected wiring modules. Where necessary receptacles are attached by simple plug attachment to the wiring modules wherein the receptacles also can have circuit selection switches that are manipulated before installation so that the receptacle can be connected to a selected one of the plurality of circuits defined in the wiring modules. Because of the need for reconfiguration of the office furniture systems over time, these office furniture power systems are highly desirable in that they can be disconnected and reconfigured in conformance with the repositioning of the office furniture components.

The above modular systems provide advantages over the most basic hard wiring process, but also do have disadvantages associated therewith which limits the scope of application within a single building structure.

In this regard, the manufactured cable systems described above have a lower installed cost than hard wiring and are easier to reconfigure, but typically are not stocked by local electrical supply distributors so that the manufactured cable systems must be designed during the building planning stage to ensure that nearly exact quantities of each electrical component are obtained. If the order amounts are inadequate, later reorders can take several weeks to obtain which may unacceptably delay building construction.

It is not practical for a distributor to stock even a full range of products for a single brand of such systems because of the different types of systems, i.e. lighting versus power receptacles, and the numerous parts required for each of the three different voltage versions.

Office power furniture systems are considered to be lower cost than those systems described above and are made in higher volumes due to their extensive use in the office furniture industry. However, such products also are proprietary products, or the result of proprietary development such that any single power distribution system typically is not open-sourced but instead is developed and manufactured by or for a specific manufacturer. Further, the various system designs do not typically anticipate usage of such power systems outside of a furniture or office environment such that the power systems typically are limited to 120 volt applications.

Based upon the foregoing, it is found to be desirable to develop a universal building power system that overcomes disadvantages associated with existing systems and is universally adaptable for use to not only supply power to lighting circuits and building wall receptacle circuits, but also to supply power to modular space-dividing office furniture and other office furniture components. In this regard, it is an object that such a system be capable of being stocked at local electrical supply distributors and serve virtually all applications, such as lighting, wall receptacles and switches, floor raceways and floor-mounted electrical components and also be routable into modular office furniture components and systems. Further, it is desirable that the single power distribution system also be capable for use in all three of the voltage levels and be able to be voltage keyed to restrict uses of the components to the selected voltage level once such has been selected during the installation phase.

Further, the inventive system should be plug-connected throughout, starting at the breaker box, through the building, and into the furniture system and finally be able to accommodate installation of all lighting fixtures, receptacles, switches and other fixtures/equipment with a minimum of hard wiring.

As to receptacles, it is desirable that such receptacles have the circuit selection feature and be able to be connected to both a wall outlet box and an office furniture wiring module and be pre-keyed for 120 volts only. As such, the 120 volt receptacles could be readily stocked locally at a distributor and be the same receptacle as those supplied by an individual furniture supplier which therefore provides multiple supply options.

The system also desirably will be interconnectable with an open-sourced furniture power system wherein the furniture system would be available to all furniture manufacturers as an alternative furniture power system that could be installed in the manufacturer's office furniture in place of the proprietary systems currently in use. The office furniture system of the invention includes compatible power distribution assemblies (PDA's) for direct mounting in the raceway of a wall panel, receptacles and flex-connectors for interconnecting serially-adjacent PDA's together.

The invention therefore relates to a universal power distribution system for routing electrical circuits within a building structure to comprehensively provide electrical power to the building in ceiling configurations, wall-mounted configurations, raised floor configurations and in office furniture configurations. The system components for all of these configurations have common plug connectors that are interengagable with each other so as to be readily usable in a wide variety of applications.

The system generally comprises power distribution assemblies (PDA's) adapted for mounting within the modular raceways of building components, variable lengths of flexible conduit units for long conduit runs which have connector plugs at the opposite end thereof, and then individual circuit components such as receptacles, switches, fixture adapters, and junction boxes.

The system of the invention would most cost-effectively be formed as a three-circuit, five-wire system for use with both the wall-mounted and floor-mounted building applications at 120 volts, and for the office furniture configurations at the same voltage level. The system components would have five wires wherein three of the wires would be dedicated as hot wires corresponding respectively to each of the three circuits, with fourth and fifth wires respectively serving as a common neutral and common ground for the three circuits. The various components, such as the receptacles, could also have circuit selectors thereon so that the receptacle could be selectively engaged with one of the three circuits. However, the wire wires could be used to define two circuits (two hots, two neutrals, one ground) or the system components also may include more or less wires, such as three wires to define a single circuit or four wires.

For the high-voltage lighting power applications, similar components could also be used, such as a flexible conduit unit which would have the same appearance and plug connectors as the five-wire components. However, these alternate system components could be formed as three-wire, single-circuit components which carry a single circuit therethrough yet are still engagable with a five-wire component when voltage keyed alike so that one of the three wires in the three-wire component would be engagable with a selected one of the three circuits carried by the five-wire components. The three-wire components could have circuit selectors in the plugs so that only one circuit is accessed by the circuit selector and the plug connector located at the upstream or tapping end of the conduit unit.

Where the three-wire, single circuit components carry higher voltages, the voltage keying feature on the plugs would be set to correspond to the high voltage level such that these components would only be connectable with components keyed alike for such voltage level. Preferably, the voltage keys may only be set once by an electrician during installation which would prevent later unauthorized mixing of circuit components dedicated for different voltage levels. Also, for components designed solely for 120 volt circuits such as the PDA's and flex connectors used for office furniture, the voltage keying may be fixed in its position.

Further, the flexible conduit units are also engagable with wall-mounted outlet boxes so as to supply power thereto wherein either a switch or receptacle could be plugged into the plug connector that is accessible through the box depending upon the plug connector entering the box and the compatibility of such connector with the compatibility of the connector on the switch or receptacle.

All of the components use a common plug construction comprising a slotted contact block for supporting electrical contacts, and flat electrical contact which reduces space requirements for the plugs. The contacts are formed essentially in a plane and are deformable in the plane so that two interconnected contacts are coplanar and define a low-profile contact. Hence, a stack of vertically spaced contacts in each plug only requires a minimal height, and is efficient to manufacture and assemble in a contact-receiving contact block.

As described further herein, the overall inventive system is readily adaptable to form virtually any conventional circuit configuration found within conventional hard-wired systems yet is formed simply through the routing of the cables through the building cavities and interconnection is accomplished merely by plugging components together rather than through labor-intensive manual wiring. Some manual wiring of components may still be desirable and is possible through the use of system components having a plug and a pigtail configuration of individual wires projecting freely from the plug which pigtail wires may then be hard wired to off-the-shelf wiring components.

The inventive system thereby relates to a comprehensive system of compatible components which are designed to satisfy virtually all of the requirements of the power systems currently in use for building wiring.

Other objects and purposes of the invention, and variations thereof, will be apparent upon reading the following specification and inspecting the accompanying drawings.

DESCRIPTION OF THE DRAWINGS

FIG. 8 diagrammatically illustrates several embodiments of flexible conduit units or units for flexible conduit runs through building cavities.

FIG. 10 diagrammatically illustrates additional configurations of fixture/equipment taps.

FIG. 53 illustrates the power distribution assembly from an alternate angle.

FIG. 54 illustrates a conductor assembly removed from the PDA.

FIG. 62D is a partial isometric view of the PDA with the contact blocks and contacts of one end of the PDA removed for illustrative purposes.

FIG. 62E illustrates an end view of the contact blocks for a receptacle on the PDA.

FIG. 93 illustrates a locking bracket for the box.

FIG. 94 illustrates the box assembly of FIG. 92 with the receptacle and switches removed therefrom.

FIG. 95 illustrates a box configuration having three receptacles.

FIG. 96 illustrates a single-gang box assembly with a bypass or pass through configuration.

FIG. 97 illustrates the box assembly of FIG. 96 with the receptacle removed therefrom.

FIG. 98 illustrates a plug-in electrical receptacle in one embodiment.

FIG. 99 is an end view of the receptacle with a circuit selector in a first position.

Figure 100:
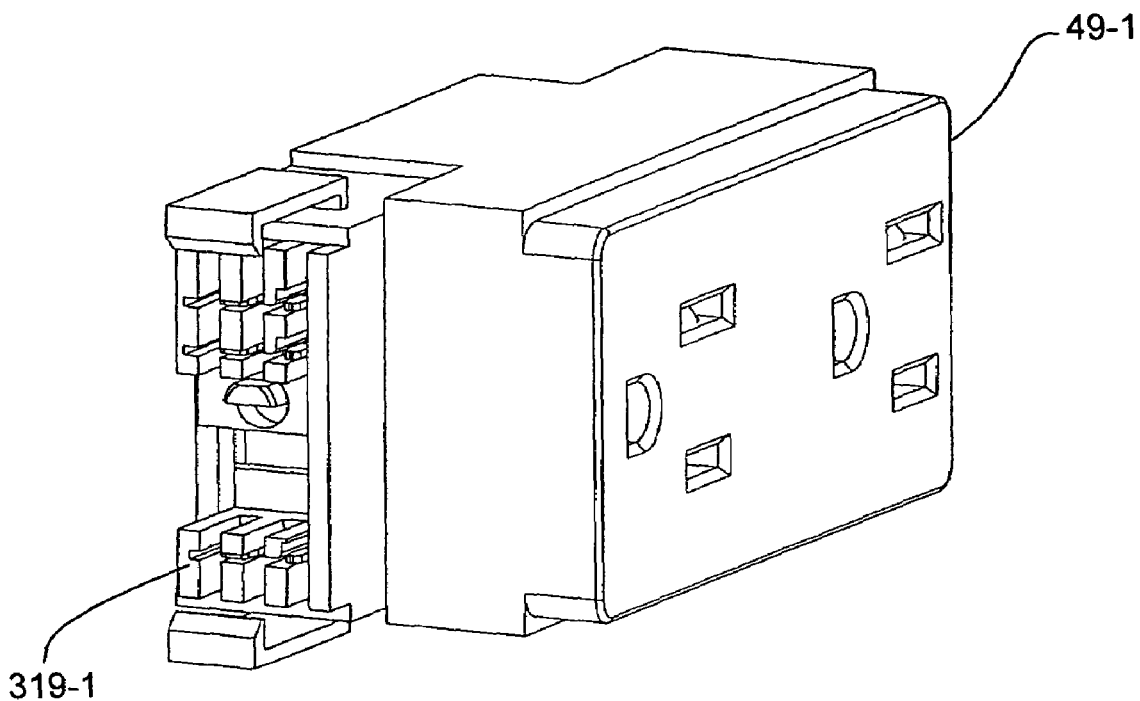
Figure 101:
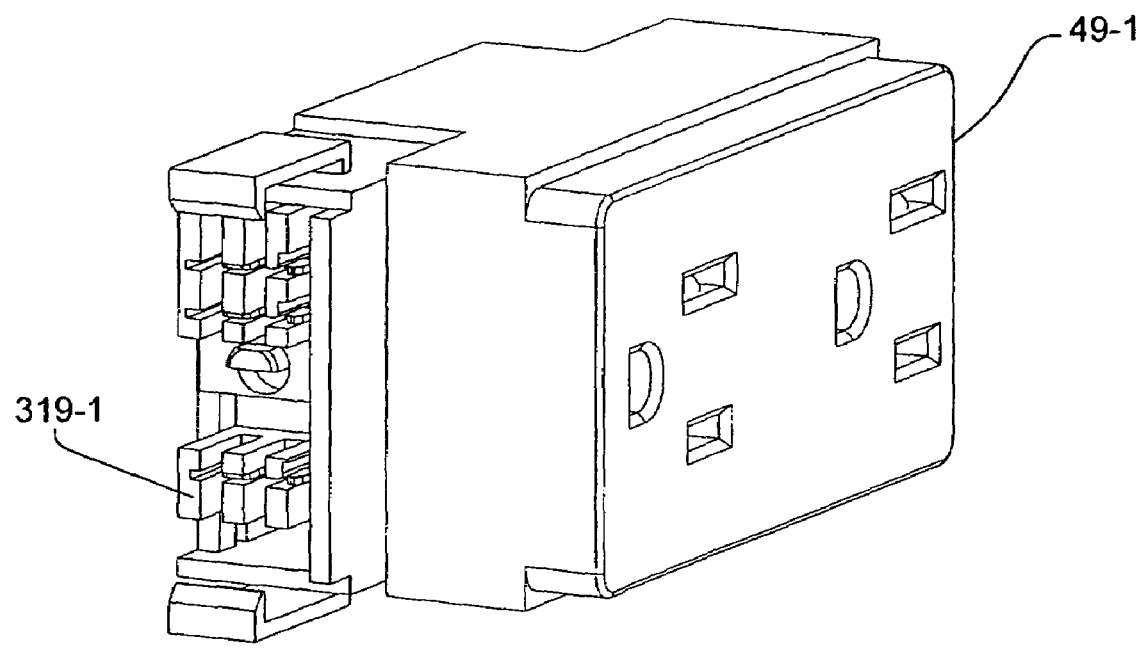

FIGS. 100 and 101 respectively illustrate the circuit selector in alternate second and third positions.

Figure 102:
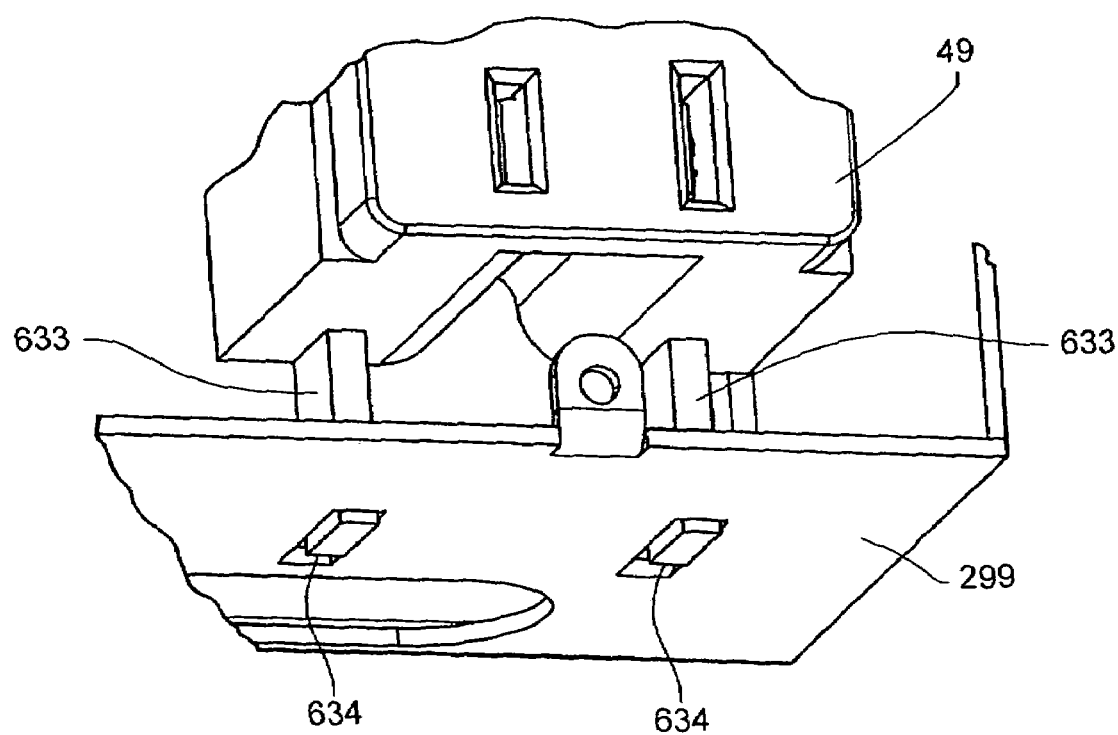

FIG. 102 is an enlarged view illustrating engagement of locator arms on a receptacle with a wall box.

FIGS. 103-105 illustrate the mounting process for mounting an exemplary receptacle to a wall box.

Figure 106:
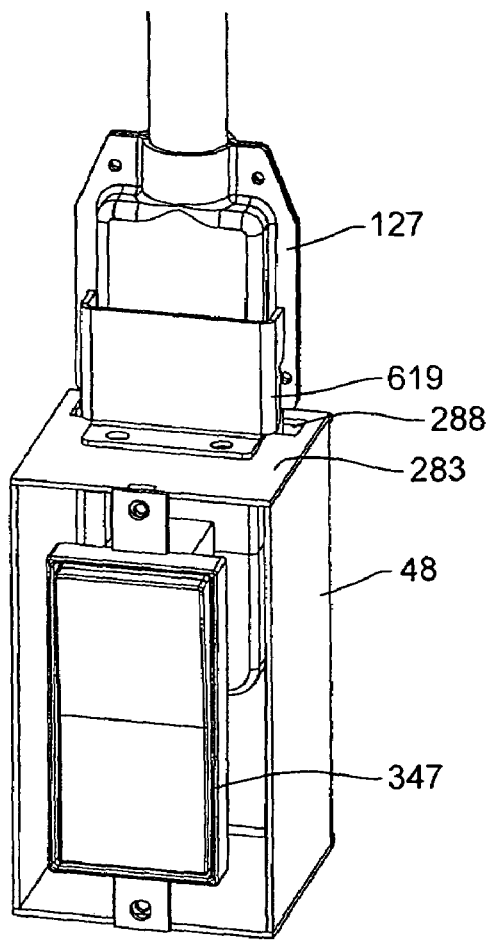

FIG. 106 illustrates a single-gang wall box with a pigtail switch assembly mounted thereto.

Figure 107:
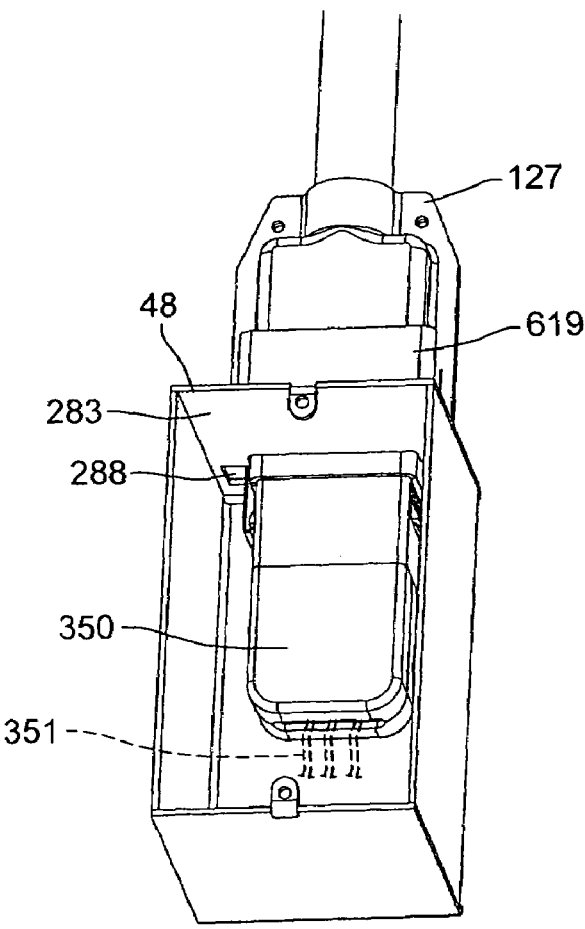

FIG. 107 illustrates the pigtail switch assembly with the receptacle removed therefrom.

Figure 108:
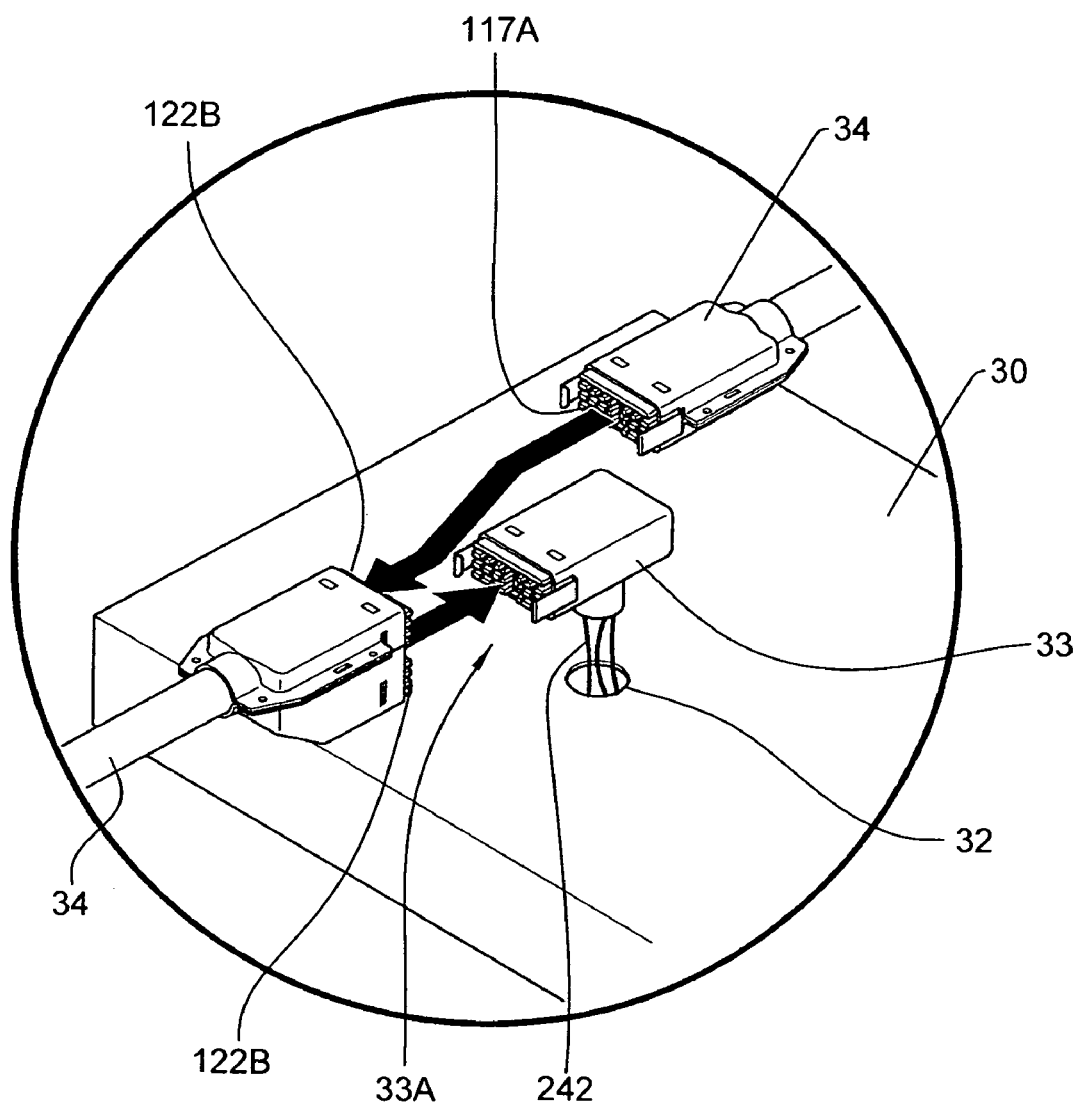

FIG. 108 diagrammatically illustrates the assembly process for connecting a fixture such as a light to the power distribution system.

FIG. 109 illustrates a light fixture with a wireless-switch junction mounted thereon.

FIG. 110 illustrates a wiring configuration for wiring the wireless switch junction to a light fixture.

Figure 111:
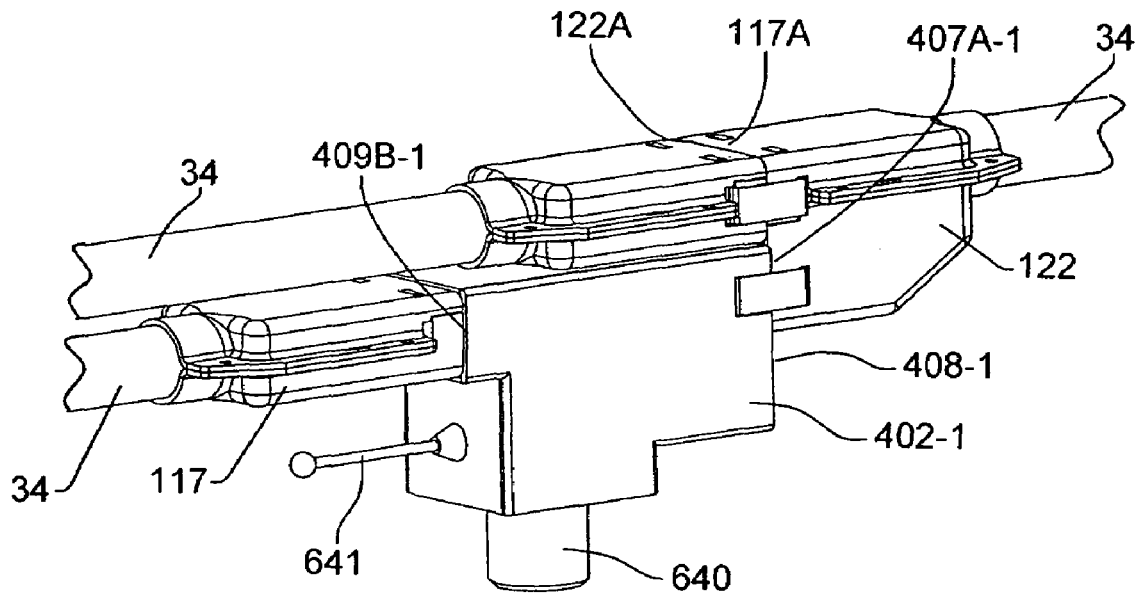

FIG. 111 is an enlarged view of a first wiring configuration for the switch junction with a bypass configuration also attached to a feed conduit connector.

Figure 112:
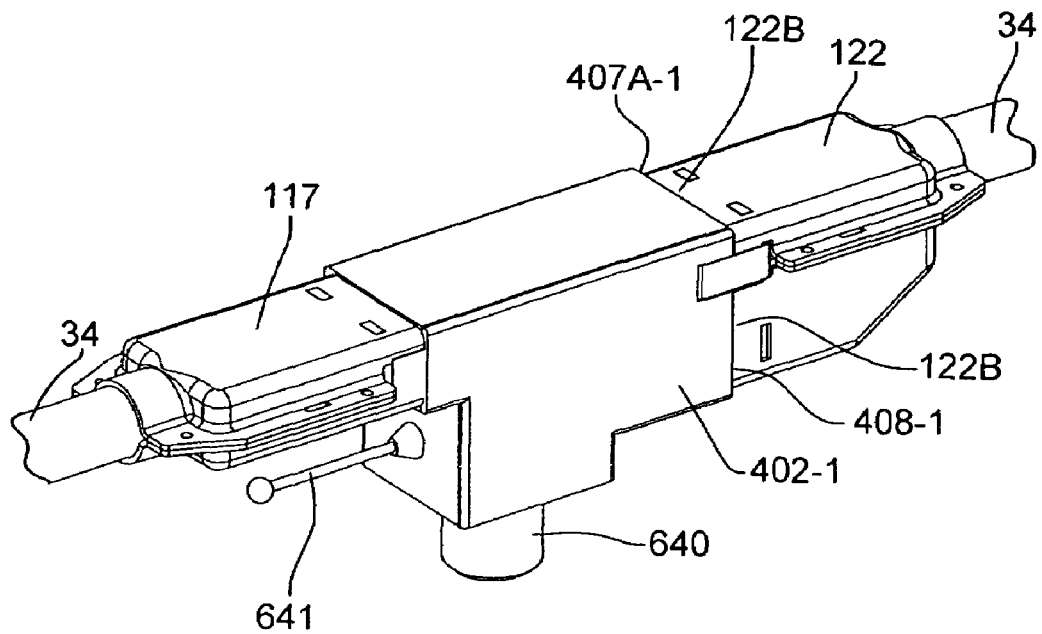

FIG. 112 illustrates an alternate switch configuration.

Figure 113:
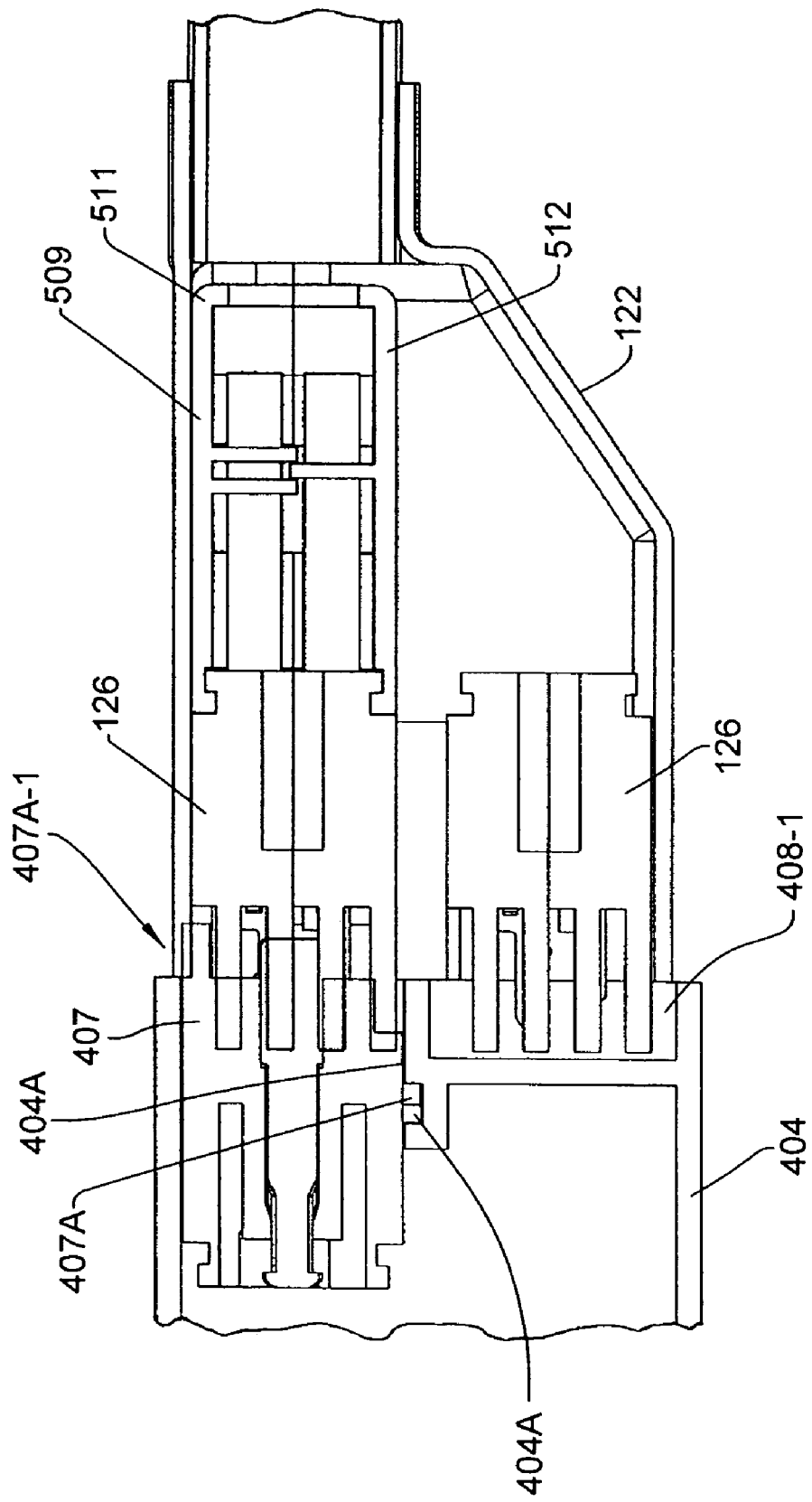

FIG. 113 is a top cross-sectional view of the switch junction.

Figure 114:
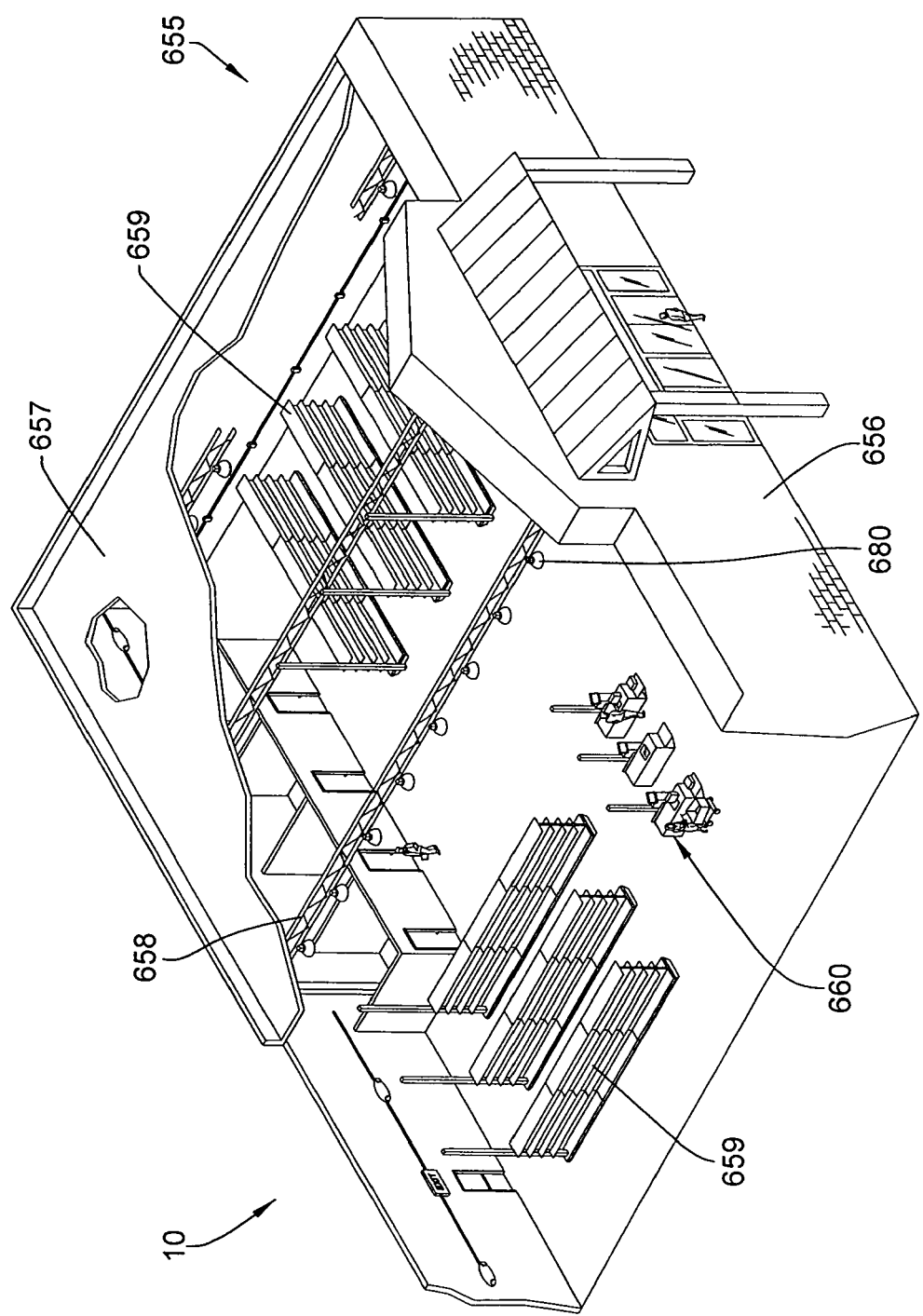

FIG. 114 is a pictorial view of a big-box store application using the inventive power distribution system.

Figure 115:
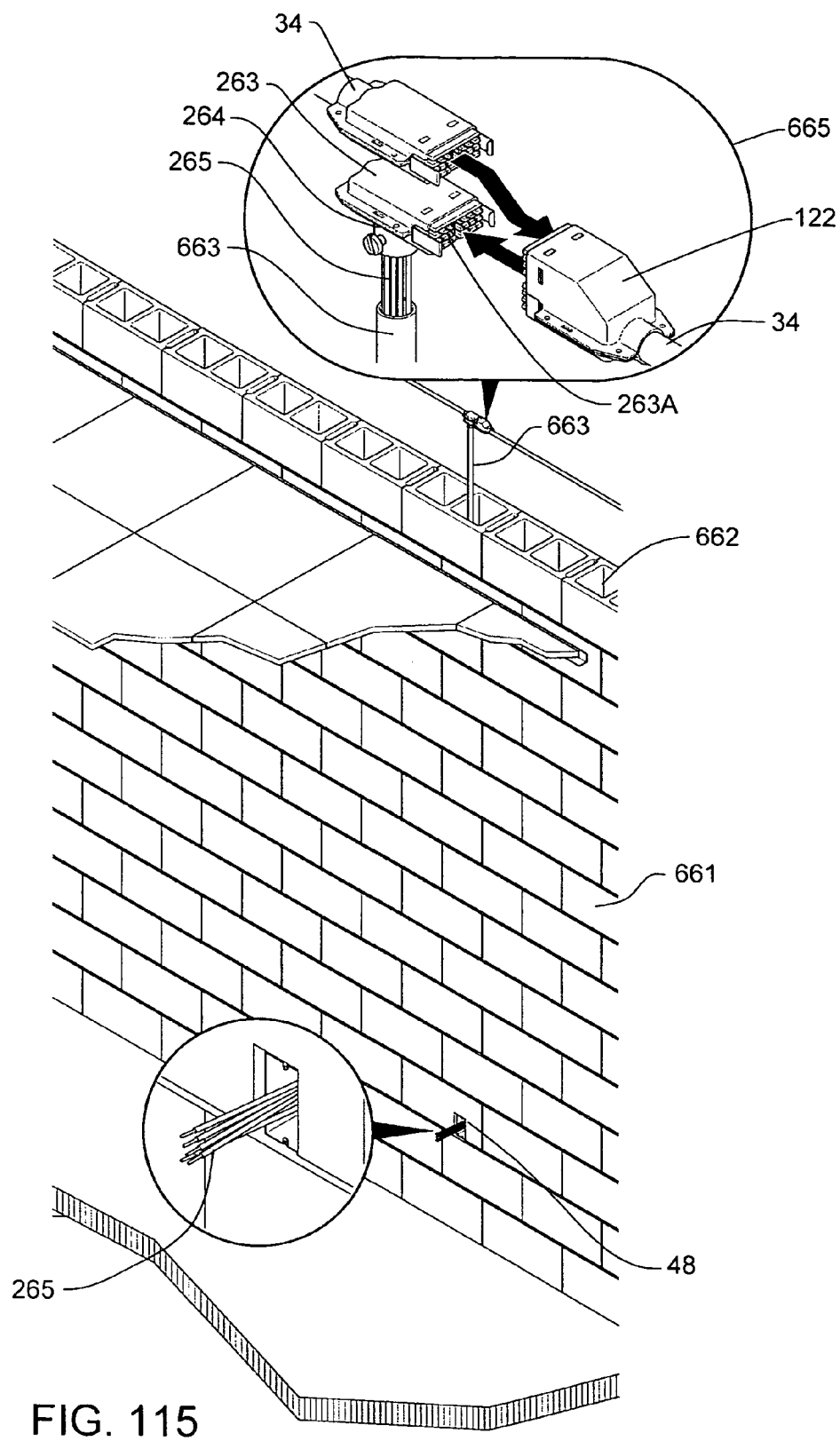

FIG. 115 illustrates installation of system components in a concrete block wall.

FIG. 116 illustrates a junction box for the system.

FIG. 117 illustrates the junction box connected with conduit connectors.

FIG. 118 illustrates a lighting connection.

FIG. 119 illustrates the junction box supporting a convention receptacle.

FIG. 120 illustrates an exit light supported by the junction box.

FIG. 121 illustrates a wall-mounted light unit supported by the junction box.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

The invention relates to a universal modular electrical distribution system 10 as illustrated in various configurations in FIGS. 1A-1B and 2-4. The power distribution system 10 has various components and is readily adaptable to multiple applications in non-residential buildings and other similar structures as previously described above. While primarily developed for non-residential applications, the system also could be used in its present form or adapted, if necessary, for residential applications as the need warrants.

I. Overview

The universal power distribution system 10 of the invention overcomes disadvantages associated with the existing systems described above and is intended to be "universally"

adaptable for use to not only supply power to lighting circuits, but also to building-wall receptacle circuits, modular space-dividing office furniture, raised flooring and other building structures.

Generally as to non-residential buildings, such buildings can be any configuration and thus, the distribution system 10 is readily adaptable to various building configurations and applications.

Figure 1A:
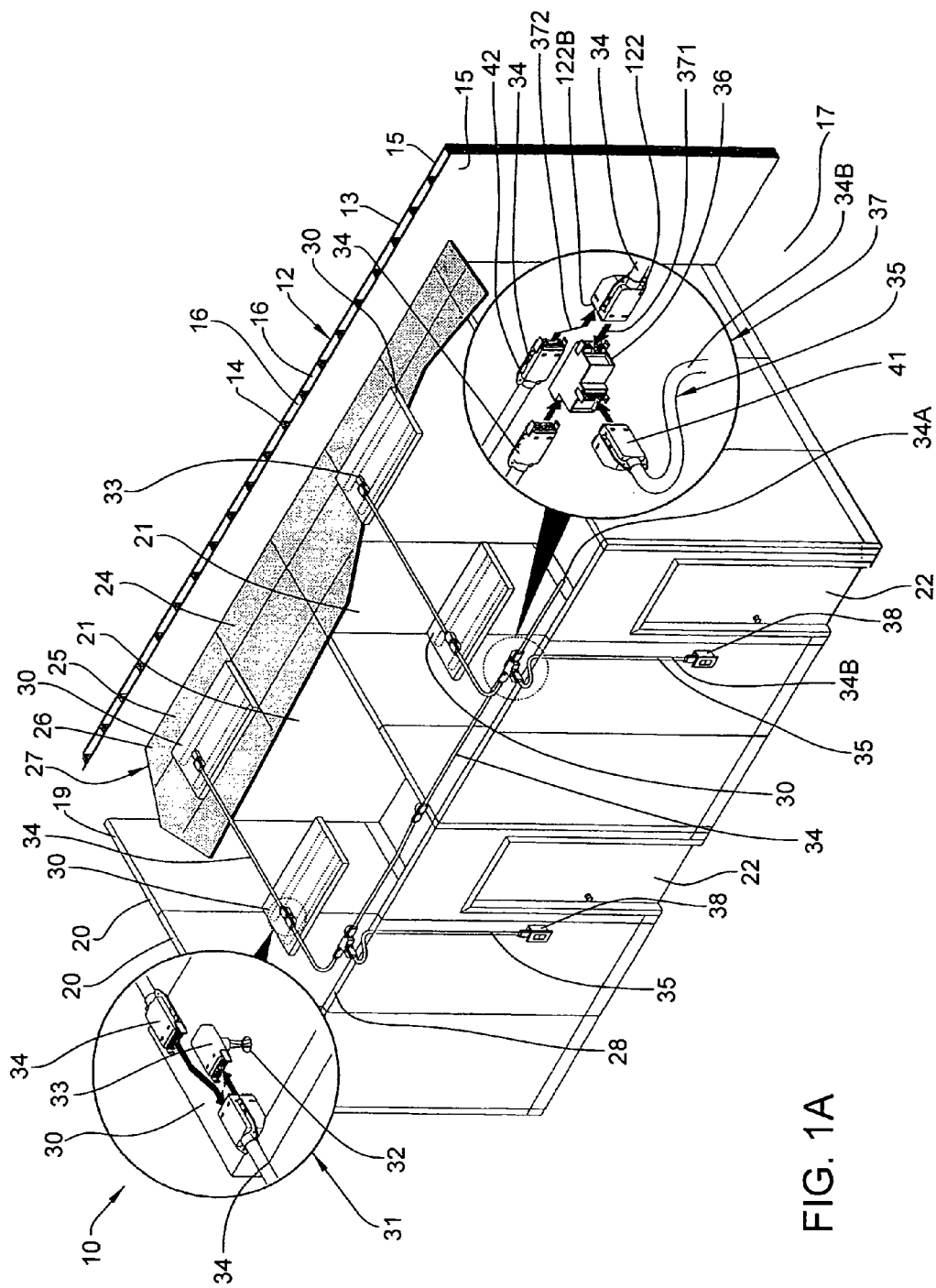
FIG. 1A is a pictorial view of a building structure having a modular power distribution system of the invention, installed therein to define a lighting configuration.

For example, FIG. 1A illustrates an exemplary building structure 12 which comprises a static wall 13 having a stick-built construction comprising vertical studs 14 and wall sheeting 15 which defines interior wall cavities 16 between the wall studs 14. This wall 13 extends upwardly from a base floor surface 17. In addition to the wall 13, additional interior walls 19 are provided which could have a stick-built configuration but in the illustrated embodiment are comprised of vertical space-dividing wall panels 20 which are serially joined together to define individual rooms 21. The wall panels 20 may be any commercially available system currently available on the market and in the illustrated embodiment use floor-to-ceiling height wall panels 20, some of which include access doors 22. Above the wall panels 20, a ceiling 24 is provided that is defined as a conventional drop ceiling 25 defined by individual ceiling panels 26 that are grid-suspended.

It is noted that ceiling cavities 27 are defined vertically above the ceiling panel 26, and the wall panels 20 also include interior wall cavities 28 defined vertically therein. These cavities 27 and 28 as well as the stud cavities 16 define passages for routing of wiring using conventional wiring practices.

In many existing building structures, the electrical needs of the building are satisfied by various wiring systems described above to supply power to wall-mounted receptacles and lighting circuits. However, the power distribution system 10 of the invention provides a universal solution to the electrical distribution needs both for lighting and for wall-mounted receptacles as well as other wiring requirements.

For example, as illustrated in FIG. 1A, the components of the power distribution system 10 are arranged in a lighting configuration to supply power to a plurality of ceiling-mounted light fixtures 30. As seen in the FIG. 1A illustration designated by reference numeral 31, the light fixture 30 includes a knock-out port 32 through which is connected a fixture tap 33. This fixture tap 33 in turn plugs into an elongate flexible conduit connector or conduit unit 34 that serves as primary wiring unit and supplies power thereto, which conduit unit 34 in turn connects to an additional downstream conduit unit 34 that supplies power to an additional light fixture 30. A plurality of the conduit units 34 are engagable one with the other and are routed throughout the building cavities to supply power from a first upstream conduit unit identified as 34A which connects upstream to a power supply. The electrical power is distributed through the building cavities to the lighting fixtures 30.

To allow for switching, the system 10 further includes various junction boxes including the switch junction 36 as seen in illustration 37 of FIG. 1A. This switch junction 36 in turn connects to a conduit unit 34B that serves as a switch leg 35 that in turn connects to a wall-mounted switch assembly 38 for manual switching of the lights on and off.

The various components of the power distribution system 10 will be described in further detail hereinafter with the illustrations of FIGS. 1A-5 being provided to show sample wiring configurations constructed from the variety of options available in wiring an office as a result of the different system components. The system 10 provides a comprehensive wiring solution and the components would be configured using conventional wiring practices and standards to construct any desired wiring circuit and layout.

Figure 1B:
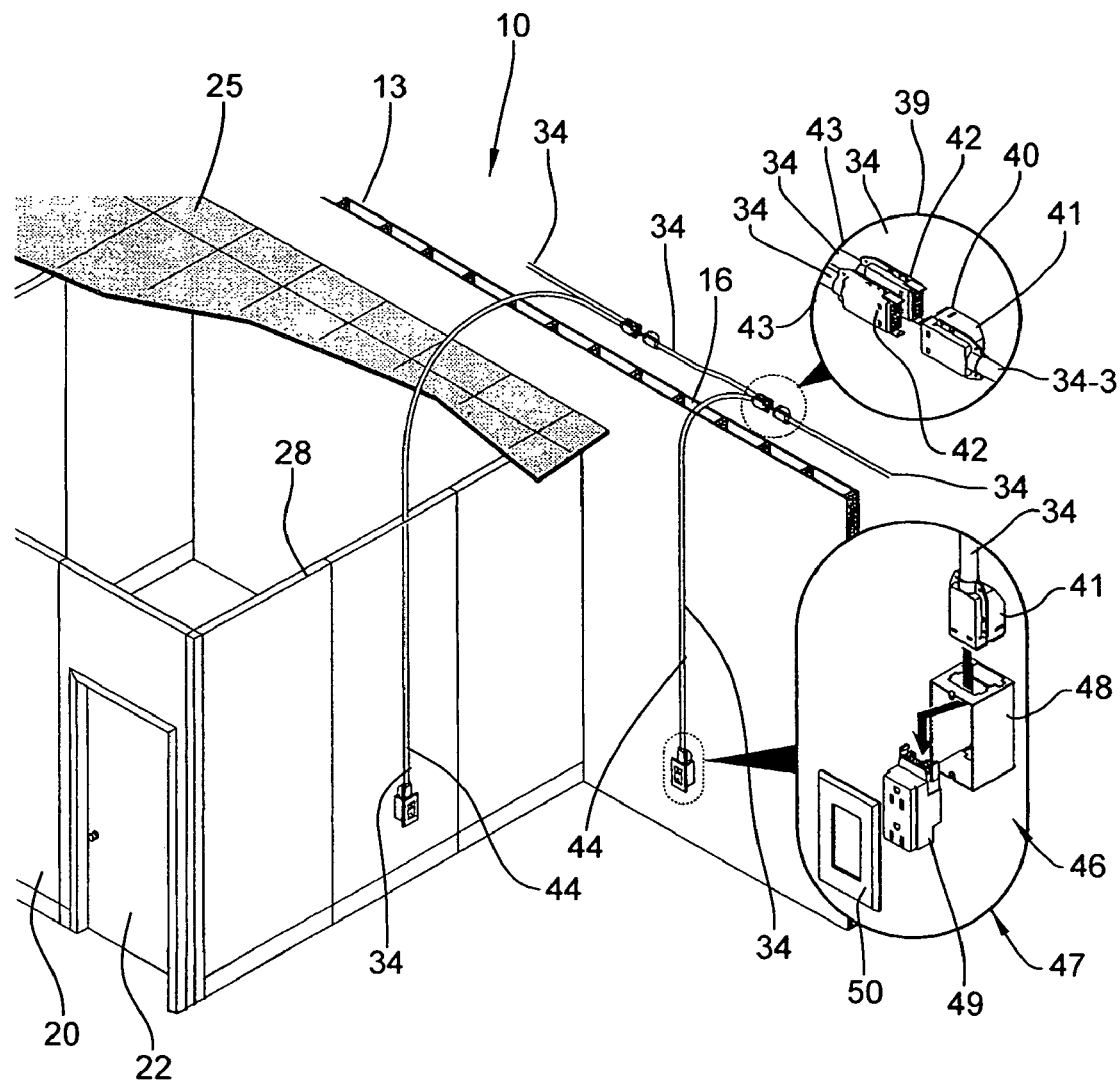
FIG. 1B is a pictorial view of the power distribution system in a wall-mounted receptacle configuration.

In another example, FIG. 1B illustrates the building configuration of FIG. 1A except for the illustration of a portion of a receptacle circuit formed in the building cavities. In this system configuration, a plurality of the above-described conduit units 34 are interconnected together. As seen in illustration 39 of FIG. 1B, the downstream end 40 has a double plug or end connector 41 that connects to the single plugs or end connectors 42 found at the upstream ends 43 of two additional conduit units 34. This allows for a bypass connection wherein the electrical circuit continues to extend linearly through the building cavities while also having a branch receptacle leg 44 defined by an additional conduit unit 34 that extends downwardly through the wall cavities 16 or the wall panel cavities 28 to supply power to a receptacle assembly 46 mounted to the wall structure. This receptacle assembly 46 is shown in exploded form in illustration 47 of FIG. 1B. Notably, the double plug 41 of the conduit unit 34 plugs into a wall-mounted electrical box 48 which in turn mounts therein a receptacle 49 and a covering face plate 50. In this manner, a plurality of the receptacles 49 may be installed at various locations within the building structure for ready access by building occupants.

Figure 2:
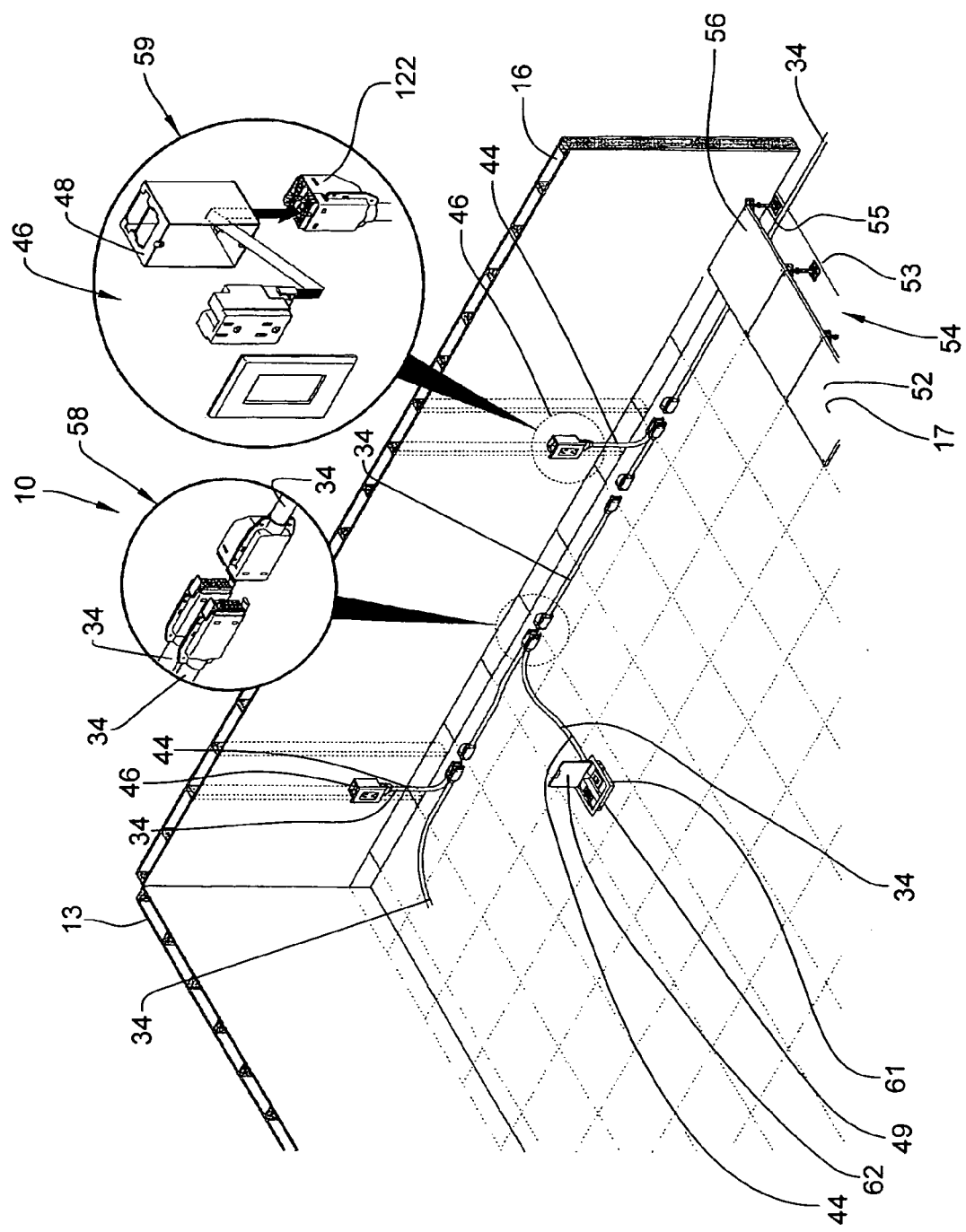
FIG. 2 is a pictorial view of a building stud wall and raised flooring having the power distribution system in an alternate receptacle configuration fed through the flooring cavities.

FIG. 2 illustrates the static walls 13 as having a raised floor system 52 positioned on the main building floor surface 53. The raised floor system 52 in this configuration defines the floor surface 17 as being raised up above the static floor surface 53 to define a floor cavity 54 therebetween. The raised floor system 52 may be any conventional raised flooring system which typically includes upstanding vertical support posts 55 and rectangular, removable floor tiles 56 supported thereon in a floor-defining grid.

In this illustrated configuration, the distribution system 10 is configured with a plurality of the conduit wiring units 34 joined serially together and at selected locations, receptacle legs 44 are defined by the addition of flexible branching conduit units 34 as depicted in illustration 58. These receptacle legs extend upwardly and supply power to the receptacle box assemblies 46 illustrated in greater detail in illustration 59. Additionally, one of the receptacle legs 44 also extends to a floor box 61 (see also FIG. 20) formed with an internal compartment and a hinged door 62. This floor box 61 further has a receptacle 49 connected to the conduit unit 34 at the downstream double plug 41 that connects to the floor box 61 and is accessible within the interior compartment thereof.

Figure 3:
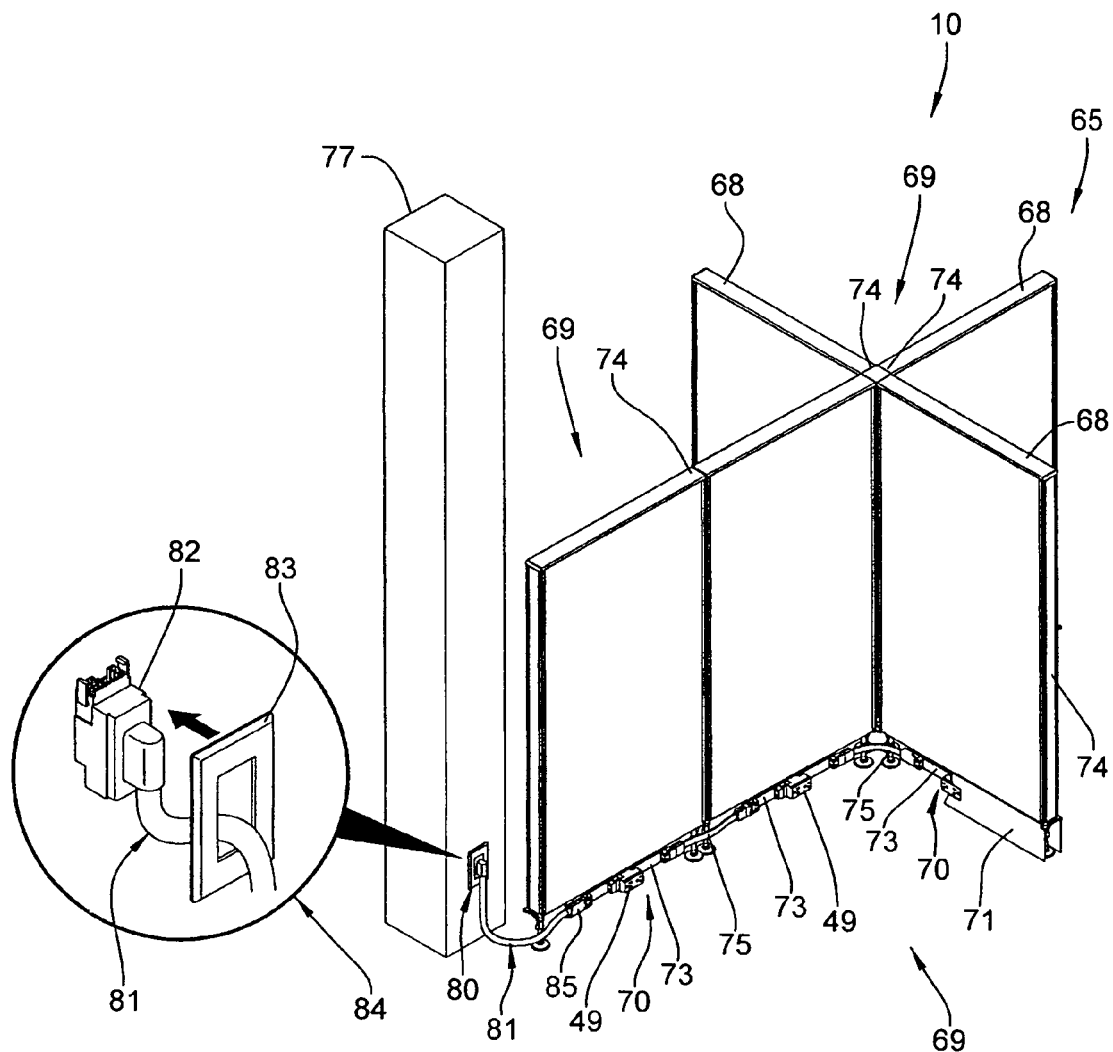
FIG. 3 illustrates a wall panel system in an alternate configuration.
Figure 4:
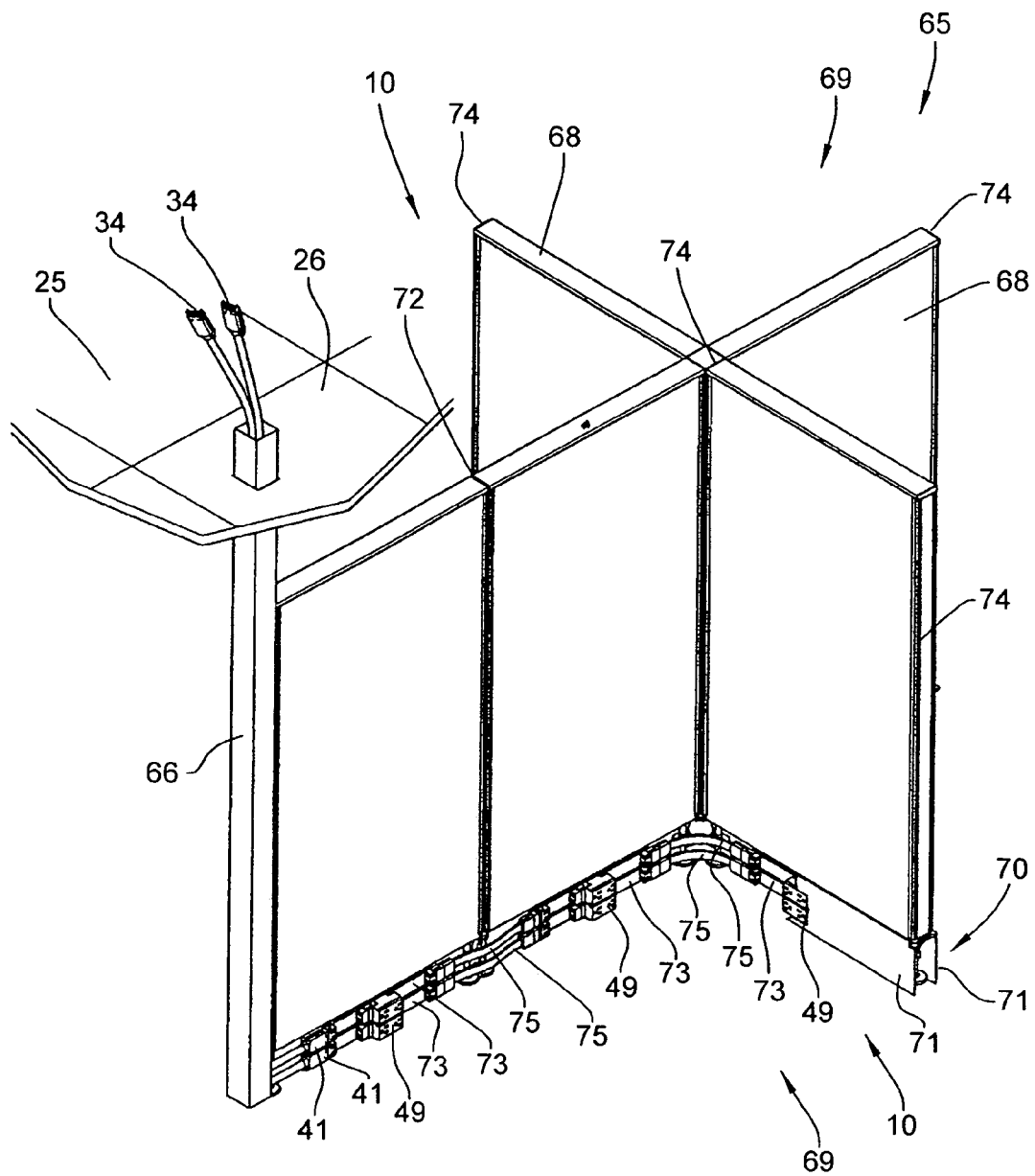
FIG. 4 is a pictorial view of a space-dividing wall panel system having the power distribution system therein configured to supply power to work stations.

Instead of the floor-to-ceiling wall panels 20, it also is known to provide conventional space-dividing wall panel systems such as wall panel systems 65 illustrated in FIGS. 3 and 4.

More particularly as to FIG. 3, the panel system 65 is defined by a plurality of conventional wall panels 68 which are oriented in an upright orientation to define a plurality of work stations 69 sidewardly adjacent thereto. These wall panels 68 and the wall panels 65 are illustrated in a representative configuration but it will be understood by the skilled artisan that any commercially available wall panel system may be used and outfitted with power through the use of the various components of the power distribution system 10.

In this regard, each of the wall panels 68 is formed with a base raceway 70 at the bottom edge thereof that is enclosed on opposite sides by raceway covers 71. The cavities defined by the raceways 70 open serially one into the other to define continuous passages through which appropriate cabling may be installed.

In the illustrated embodiment, a plurality of modular power distribution assemblies (PDA's) 73 are illustrated in a serially connected configuration. The PDA's 73 have a modular length which generally corresponds to the modular length of the individual wall panels 68 and as such, the opposite ends of the PDA's terminate proximate the opposite side edges 74 of the wall panels 68. To interconnect the PDA's 73 and span the joint between adjacent wall panels 68, additional flex connectors 75 are connected at their opposite ends to a serially adjacent pair of PDA's so that power extends continuously through the PDA's 73 and flex connectors 75. At selected locations along the length of the interconnected PDA's 73, additional receptacles 49 can be plugged into the PDA's 73 or removed therefrom as desired.

Referring to FIG. 3, the building configuration as illustrated has an enlarged column 77 that has power supplying cabling therein comprising a box in-feed assembly 80. The assembly 80 includes a wall feed connector unit 81 which comprises a main in-feed connector 82 configured to connect to a conduit unit 34 similar to the above-described receptacle 49. In-feed connector 82 is then covered by a conventional face plate 83 as seen in illustration 84 of FIG. 4. The wall feed connector unit 81 has a double connector plug 85 at the downstream end thereof formed similar to the double plug 41 referenced above. This double plug 85 connects to a PDA 73 which in turn connects to additional PDA's 73 by intermediate flex connectors 75.

Additionally, the receptacles 49 connect to the PDA's 73 so as to be accessible from the wall panel raceways 70 through the raceway covers 71. While the receptacles 49 are illustrated on one side of the wall panel 68, identical receptacles 49 also are connectable on the opposite sides of the PDA 73 so as to be accessible from the opposite side of the wall panel 68. As to FIG. 4, power may be supplied to the interior space through the provision of a tubular rectangular power in-feed column 66 which projects through a ceiling tile 26 and has a pair of the flexible conduit or wiring units 34 extending downwardly therethrough and projecting outwardly from the bottom of the column 66. The power is supplied initially to the upstream PDA 73 by connection of the double plugs 41 of the flexible conduit units 34 that extend through the column 66. The double plugs 41 therefore extend into the wall panel system 65 and supply power to vertically stacked PDA's 73.

It will be understood from the following discussion that the power distribution system 10 comprises a variety of different system components including both those illustrated herein and additional components which may be developed using the principles embodied within the specific components disclosed herein. The representative illustrations of FIGS. 1A, 1B and 2-4 are provided for illustrative purposes, and the skilled artisan will also readily understand that the system 10 is readily configurable in a wide variety of configurations and usable for both wall receptacles, lighting and other hard-wired fixtures and equipment depending upon the assembly of the various components and the arrangements of the various building cavities found during the installation process.

II. System Components

The various system components are illustrated in greater detail in FIGS. 5-37. It will be understood that the system components are individually selected depending upon the specific circuit design being developed. As such, the various system components are all designed to have common connectors that are compatible with each other so as to be readily usable in a wide variety of applications.

Figure 5:
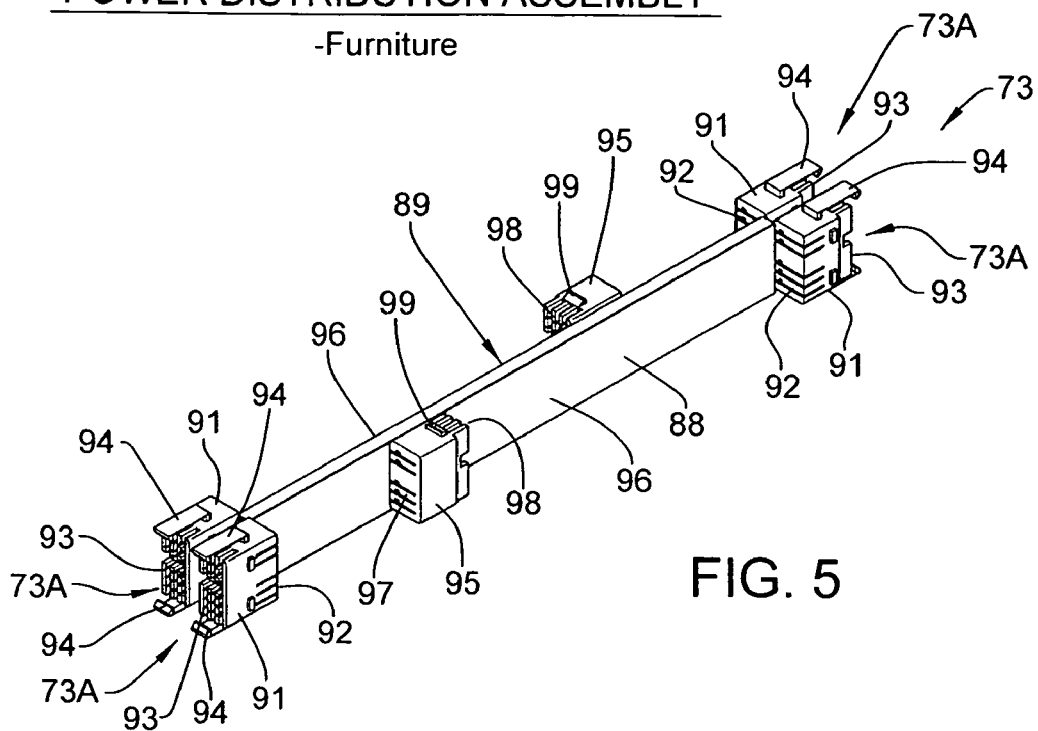
FIG. 5 is an isometric view illustrating a power distribution assembly (PDA) for mounting in a wall panel raceway.

Referring to FIG. 5, the power distribution assembly 73 is illustrated which has a relatively rigid and a fixed length so that it is suitably adapted for mounting in the raceway 70 such as of a wall panel 68 or other office furniture or similar component. While wall panels 68 are one type of office furniture component, the institutional and office furniture industry broadly supplies other components such as desking for outfitting office and work areas and which include internal raceways therein which are suitable for receiving a PDA 73. As such, the PDA 73 may be formed of a variety of modular lengths that generally correspond to the modular sizes of available wall panels 68 or other office components.

The PDA 73 generally comprises a main body 88 which is formed as an elongate, hollow casing 89 that has a plurality of electrical conductors extending longitudinally therethrough between the opposite ends as will be described in further detail hereinafter. The opposite ends of the casing 89 each include a pair of contact blocks 91 which are positioned in side-by-side relation so that a pair of contact blocks 91 are provided at each of the opposite casing ends. The contact blocks 91 have a contact-receiving slotted end 92 and a plug-end 93 wherein the plug ends 93 are hermaphroditic so that each plug end 93 of a contact block 91 may be readily plugged into and inter-engaged with a compatible contact block on another system component such as the flex connector 75. Preferably, the various end connectors of the system components are oppositely keyed to either have an A configuration or B configuration as will be discussed.

Notwithstanding the foregoing, the contact blocks 91 are still made to be "handed" by primarily by the below-described keying feature but also secondarily by the addition of resiliently flexible locking fingers 94 which project longitudinally outwardly in cantilevered relation to provide locking engagement with a serially-adjacent system component including the flex connector 75 or the in-feed connector 82 described above. The provision of the locking fingers 94 thereby are only provided on each contact block 91 configured as an A connector 73A which A configuration is primarily defined by the keying feature that prevents incorrect engagement of incompatible components.

Additionally, the casing 89 is provided with a receptacle contact block 95 mounted to each of the opposite casing faces 96. These receptacle contact blocks 95 have a contact-receiving slotted end 97 that allows for connection of the contact block 95 with the interior conductors within the casing 89. Further, the receptacle contact blocks 95 also have a hermaphroditic plug end 98 formed similar to the plug ends 93 described above. These plug ends 98 are adapted for plugging engagement with a standard receptacle 49. While the receptacle contact block 95 is functionally and structurally similar to the end plug sections 93, the receptacle contact block 95 is also handed similar to the end contact blocks 91. In the case of the receptacle contact block 95, this component does not include the above-described locking fingers 94 but instead include outwardly projecting catches 99 on the top and bottom thereof that are each configured to engage a locking finger of a receptacle 41 as will be described hereinafter. As such, the contact block 95 defines a B connector 73A that is pluggable with a corresponding A connector but not to another B connector. This feature will be described greater detail herein.

Figure 6:
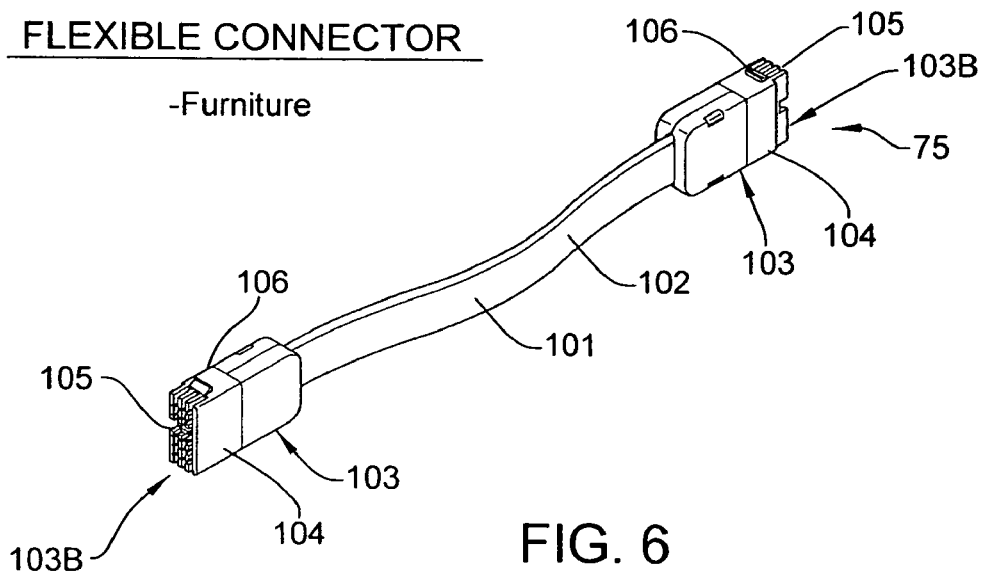
FIG. 6 is an isometric view illustrating a flexible connector for joining serially-adjacent power distribution assemblies (PDA's) together.

Next as to FIG. 6, a flexible furniture connector or flex connector 75 is illustrated which comprises a main body 101 which extends longitudinally and is defined by a flexible casing 102 having a plurality of internal conductors extending longitudinally therethrough. The opposite ends of the casing 102 have end connectors 103 thereon which are formed identical to each other. The end connectors 103 include a contact block 104 which is electrically connected to the internal conductors of the casing 102 and has an end plug section 105 that is hermaphroditic and readily connectable to other hermaphroditic plug sections provided in the other system components.

While the end plug section 105 is hermaphroditic, the contact block 104 is made to be handed by the provision primarily of the below-described keying feature and also secondarily by the provision of catches 106 on the top and bottom surfaces thereof which thereby are only provided on a B connector 75B adapted for engagement with the locking fingers 94, for example, of the PDA 73 (FIG. 5) on an A connector. As such, the end plug sections 105 of the flex connector 75 can be plugged into any of the end plug sections 93 of the end contact blocks 91 so as to electrically connect the flex connector 75 with the PDA 73. In other words, the B connector 75B can connect with the A connector 73A. Upon such engagement, the locking fingers 94 of the respective end contact block 91 engage the catches 106 on the flex connector contact block 104 so as to mechanically engage same together and prevent inadvertent disengagement.

As will be described further herein, the various end plug sections 93 and 105 as well as the other plug connectors of the system components also preferably include a keying feature which will restrict usage of the various system components to a desired voltage level which typically would be any conventional voltage levels found in non-residential building construction, such as 120 volt, 208 volt, 277 volt, 347 volt service, 480 volt, or 600 volt. The system also is usable with conventional residential service such as 120 volt and 240 volt service. It will be understood that the system is readily adaptable to any of these electrical voltages. The keying feature is defined to be usable with a selected three voltages although the actual voltage levels associated with the keying feature may be varied, and the keying feature may be modified to accommodate more than three selected voltages or even less.

Figure 7:
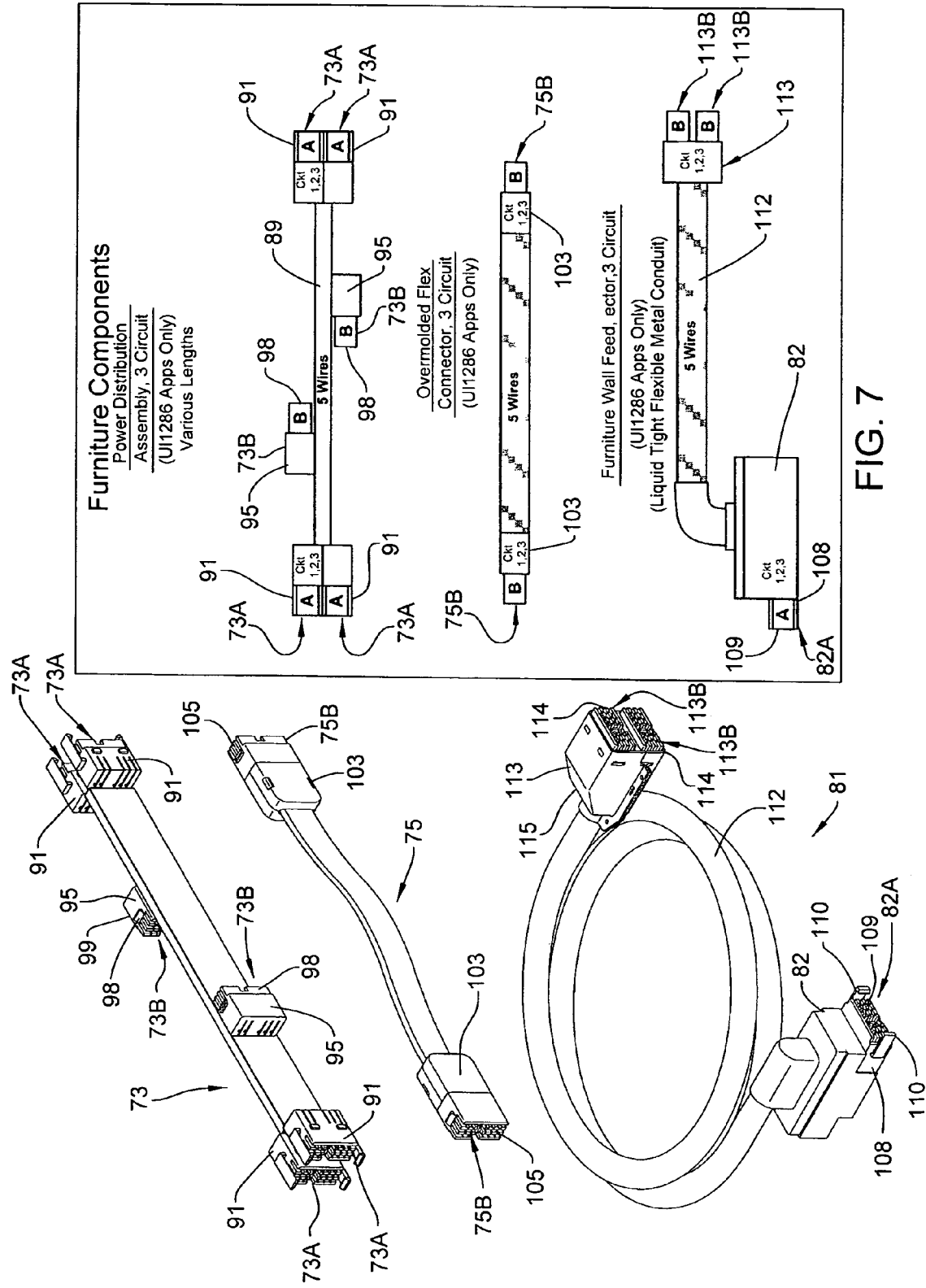
FIG. 7 diagrammatically illustrates power distribution components for furniture units.

Referring to FIG. 7, FIG. 7 diagrammatically illustrates the PDA 73, flex connector 75 and the above-described wall feed connector 81 and the internal wiring arrangements thereof. First as to the illustrated structures of these components, the above-described PDA 73 has the end contact blocks 91 and the receptacle contact blocks 95. While the plug sections of these contact blocks 91 and 95 are hermaphroditic, the mechanical structure thereof also includes the keying feature and secondarily, the respective locking fingers 94 and catches 99 which thereby differentiates these end contact blocks one from the other. For reference purposes, the contact blocks 91 with the locking fingers 95 are described and diagrammatically illustrated in FIG. 7 as each being used with the aforementioned A configuration which is generally differentiated from the receptacle contact blocks 95 which are designated as having the B configuration due to the structure of the keying feature and also the provision of the catches 99 on the upper and lower surfaces thereof. As such, two opposed connectors having different configurations are connectable together, for example, A and B connectors may be connected together, but two opposed connectors having the same configuration, such as an A and A configuration or B and B configuration, are not connectable.

As to the PDA 73, the illustrated embodiment is labeled as a three-circuit PDA wherein five conductor wires extend through the casing 89 and define circuits 1, 2 and 3 which circuits are electrically accessible through each of the A connectors 73A and the B connectors 73B. In this regard, the five wires define the three circuits wherein three of the conductor wires each define a respective hot conductor of a respective circuit, while a fourth one of the five wires defines a common neutral use by all three circuits, and the fifth wire defines the safety ground for these circuits. It will be understood that various components typically are formed in a five-wire, three-circuit configuration but some of the components also have a three-wire, single circuit configuration either in a dedicated single circuit configuration or a circuit selectable, three-wire configuration which allows for selection and tapping off of one of the three circuits defined in a five-wire, three-circuit component. Also, while five wires and three circuits has been selected as a system convention, the system is readily adaptable by resizing and reconfiguring the components so as to have additional wires to define additional circuits or possibly provide a respective neutral for each of the three hot wires.

Also, the five wires could be used in a two-circuit configuration defining two circuits each with a hot and neutral using four of the five wires, with the fifth wire serving as the ground wire. This also is true for the other five wire components.

As to the flex connector 75 of FIG. 7, this flex connector 75 has the casing 102 and the end connectors 103 that comprise the end plug sections 105. As diagrammatically illustrated on the right side of FIG. 7, the casing 102 preferably is a plastic casing that is over molded onto internal conductor wires wherein the illustrated design has five wires defining the three circuits like the PDA 73 described above. These five wires and the three electrical circuits defined thereby are electrically accessible through the end plug sections 105 of the end connectors 103. It is noted that these end connectors 103 have a B configuration and hence are labeled as connectors 75B for descriptive purposes. These connectors 75B thereby carry the same three circuits as that defined above for the PDA 73 such that when the flex connectors 75 and PDA 73 are connected together, the three circuits are carried serially through the interconnected components. It is noted that the B connector 75B may be interconnected with either one of the pair of A connectors 73A of the PDA 73 which are wired together. Since the internal wires of the PDA 73 and the electrical contacts disposed in the A connector 73A are all interconnected together, the connection of connectors 75B to a single one of the A connectors 73A results in an electrical circuit being completed and all three of the circuits being accessible through any of the remaining A connectors 73A.

As seen in FIG. 4, the flex connectors 73 are typically located downstream of the wall feed connector 81 which supplies the power to the first PDA 73. As such, when the PDA 73 and flex connector 75 are connected together, the leftward end of the illustrated flex connector 75 typically is the upstream end receiving power from an upstream PDA 73, while the right end of the flex connector 75 is a downstream end that supplies electrical power to a downstream one of the PDA's 73. For such PDA's 73, however, the infeed may be at the opposite rightward end, or even in the middle of a run of PDA's 73. For example, in FIG. 38, the infeed may be supplied to any of free ends of the PDA's 73 such as those located in the upper right or lower right corners of this figure. Still further, one of the B connectors 122B of the infeed conduit connector 34 may be connected to any open one of the A connectors 73A of the various PDA's 73 which are open and available for use.

As to the wall feed connector 81 (FIG. 7), this wall feed connector unit 81 includes the upstream in-feed connector 82 that is formed with an in-feed contact block 108 and has an in-feed end plug section 109 that is adapted to receive three electrical circuits therein in a five-wire configuration as diagrammatically illustrated on the right side of FIG. 7. This in-feed contact block 108 is formed substantially similar to the contact block 91 and includes resilient locking fingers 110 projecting therefrom for locking engagement with an upstream contact block. Accordingly, the in-feed contact block 108 essentially is configured with an A configuration so that the in-feed connector 82 is referenced herein as A connector 82A.

The wall feed connector unit 81 further includes a liquid tight flexible metal conduit or cable 112 which carries five wires defining three circuits like that described above. The downstream end of the conduit 112 includes a double connector 113. This double connector 113 comprises a pair of contact blocks 114 supported in an outer connector housing 115. Each of these contact blocks 114 provide access to the three electrical circuits carried therethrough and have a B configuration so as to each be labeled as a B connector 113B for descriptive purposes. As such, these double B connectors 113B supply electrical circuits that interconnect to a pair of downstream PDA connectors 73A to supply power to the three circuits defined therethrough. This interconnection is illustrated further in FIG. 4.

With the foregoing components, the three circuits can be routed through a continuous string of raceways formed in the wall panels 68 or other office furniture components.

Referring to FIG. 8, three variations of the flexible conduit or wiring unit 34 are illustrated and designated as 34, 34-1 and 34-2. The conduit unit 34 is provided with an upstream single end connector 117 which comprises a contact block 118 supported within an outer housing 119. The outer housing 119 and contact block 118 further support a pair of cantilevered locking fingers 120 so that the end connector 117 has an A configuration and is designated as A connector 117A.

The conduit unit 34 further includes a flexible metal conduit 121 which is provided with various lengths, such as 2, 9, 15, 25, 50 and 100 feet. These variable lengths allow for selection of appropriate lengths when designing the electrical system in which the conduit unit 34 is to be used. The downstream end of the conduit 121 includes a double end connector 122 which has an outer housing 123 that supports a pair of contact blocks 126 therein.

The contact blocks 126 are formed substantially the same as the above-described contact blocks 91 and 114 and as such, the discussion of such contact blocks 126 that is found hereinafter in significant detail also is applicable to other similar contact blocks. Also, all of the contact blocks used in the system components are substantially similar such that a detailed discussion is not required of each component.

As to the double end connector 122, this end connector 122 notably is included with slots 123 on opposite sides of the housing 119 that essentially define catches for engagement with appropriate locking fingers 120 or even the locking fingers 94 and 110 described above. As such, the contact blocks 118 define end plug sections 123 with the end connector 117 essentially defining an A configuration 117A while the contact blocks 126 define B connectors 122B.

As seen on the left side of FIG. 8, the conduit 121 carries five wires in a three-circuit configuration wherein circuits 1, 2 and 3 are accessible through each of the connectors 117A and 122B.

As to the conduit or wiring unit 34-1, this conduit unit 34-1 is formed substantially the same as conduit unit 34 except that it is provided in a three wire, one circuit configuration. In particular, the same component parts are provided, namely housings 119 and 123, and the contact blocks 118 and 126 which define connectors 127A and 128B. The contact blocks 118 and 126 are the same as those previously used except that only three of five available contact slots are used within such blocks 118 and 126 to accommodate the three wires that are factory-selected so as to connect to one of circuits 1, 2 or 3 depending upon the position of a hot wire within the contact blocks 118 and 126. Since only three wires are provided through the conduit, the conduit is referenced herein as conduit 129.

Next as to conduit 34-2, this uses the same conduit 129 having three wires, defining a single circuit. The downstream end of conduit unit 34-2 also has a downstream end connector 131 in a double configuration having contact blocks 126 therein with the hot wire disposed in a circuit 1 position. This is a preference but it is possible to have the hot wire located in the other circuit 2 or circuit 3 positions. As such, the contact blocks 118 define B connectors 131B which have five contact slots therein but only one of which is assigned or supplied with electricity in the circuit 1 position with the neutral and ground positions also being in use.

As to the upstream end, a single end connector 132 is provided which has a circuit selectable feature built therein. This upstream end connector 132 uses a circuit-selectable contact block assembly 134 that is engagable with any one of the contact blocks except that the circuit selection feature is built therein for the hot wire so as to select any one of circuits 1, 2 or 3 that is being supplied by an upstream system component such as the conduit unit 34. This circuit selection feature is described further herein.

Figure 9:
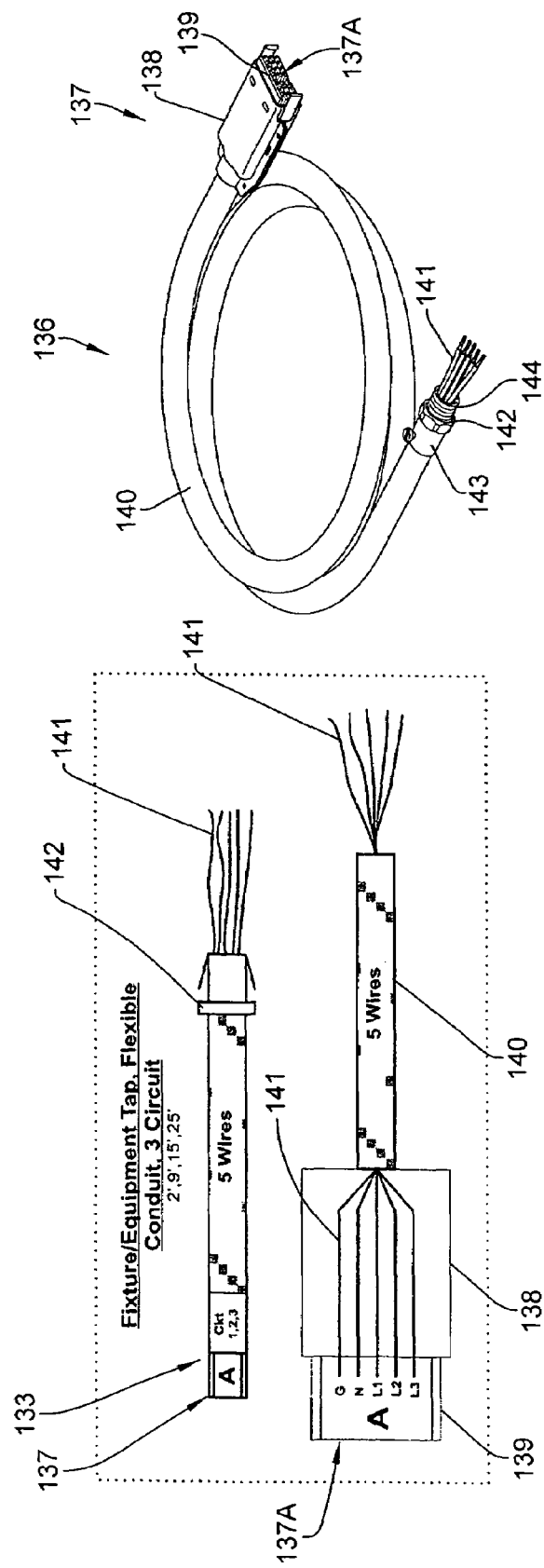
FIG. 9 diagrammatically illustrates a fixture/equipment tap.

Referring to FIG. 9, a five-wire fixture tap 136 is provided to tap off power from upstream system components for hard wiring to a fixture or piece of equipment. The fixture tap 136 is illustrated having a single end connector 137 that essentially is formed the same as the end connector 117 and includes a housing 138 and contact block 139 in an A configuration designated as 137A. The end connector 137 connects to a five-wire conduit 140 which carries five electrical wires 141 therethrough.

The bundle of wires 141 extends through the flexible conduit 140 and has free ends projecting outwardly of a conduit box connector 142 having a clamp 143 on one end for clamping onto the conduit 140, and a threaded engagement section 144 that may be clamped onto other electrical components such as a knock-out hole formed in a metal box or fixture housing wherein the engagement section 143 would then be clamped or fastened to the knockout by a conventional threaded nut as such is used with conduit box connectors of this type.

As illustrated on the left side of FIG. 9, the conduit 140 has the five wires 141 therein in a typical three-circuit arrangement. In the contact block 139, the wires connect to appropriate contacts in a vertically stacked configuration with the topmost wire being assigned as the ground conductor G, the next wire being the neutral conductor N, and the next successive wires serving as lines 1 through 3 L1, L2 and L3. The internal wires 141 preferably have appropriate color coding using normal industry convention.

Referring to FIG. 10, two additional fixture taps 136-1 and 136-2 are illustrated. As to fixture tap 136-1, this is formed substantially the same as that described above with an end connector 146 in a similar manner having a housing 147 and then having a circuit selectable contact block assembly 148 therein which functions the same as contact block assembly 134 described above. Contact block assembly 148 connects to three wires 150 that extend internally of the flexible conduit 149 which wires 150 project outwardly of a conduit box connector 151.

The end connector 146 has locking fingers 152 such that connector 147A is formed in an A configuration. In the contact block assembly 148, a slidable contact shroud 154 is provided that houses an electrical contact and is repositionable in one of three positions associated with line 1 L1, line 2 L2, or line 3 L3, so that the fixture tap 136-1 may be used for electrical connection to one of the three circuits being supplied from an upstream system component such as conduit unit 34. Thus, the wires 150 projecting outwardly from the conduit unit 149 are dedicated to a single circuit for any downstream connection such as to a lighting fixture or other equipment being served by the electrical system.

The fixture tap 136-2 is formed substantially the same as that described above in that it includes the same end connector 146 defining an A connector 146A. However, in place of the armored conduit 149, a more conventional flexible cord 155 is provided having the wires 156 extending therethrough and projecting outwardly from a free end 157 thereof. This cord 155 could be clamped to a knockout hole using a conventional box wire clamp with the wires 156 hardwired to a fixture/equipment.

Again, a movable circuit selection contact shroud 154 is provided so that the fixture tap 36-2 is connectable to tap off any one of the three circuits carried from an upstream system component if such were present. It is possible that the upstream component only supplies a single circuit wherein the circuit selecting shroud 154 would need to be positioned only in the live circuit position of the upstream component.

Figure 11:
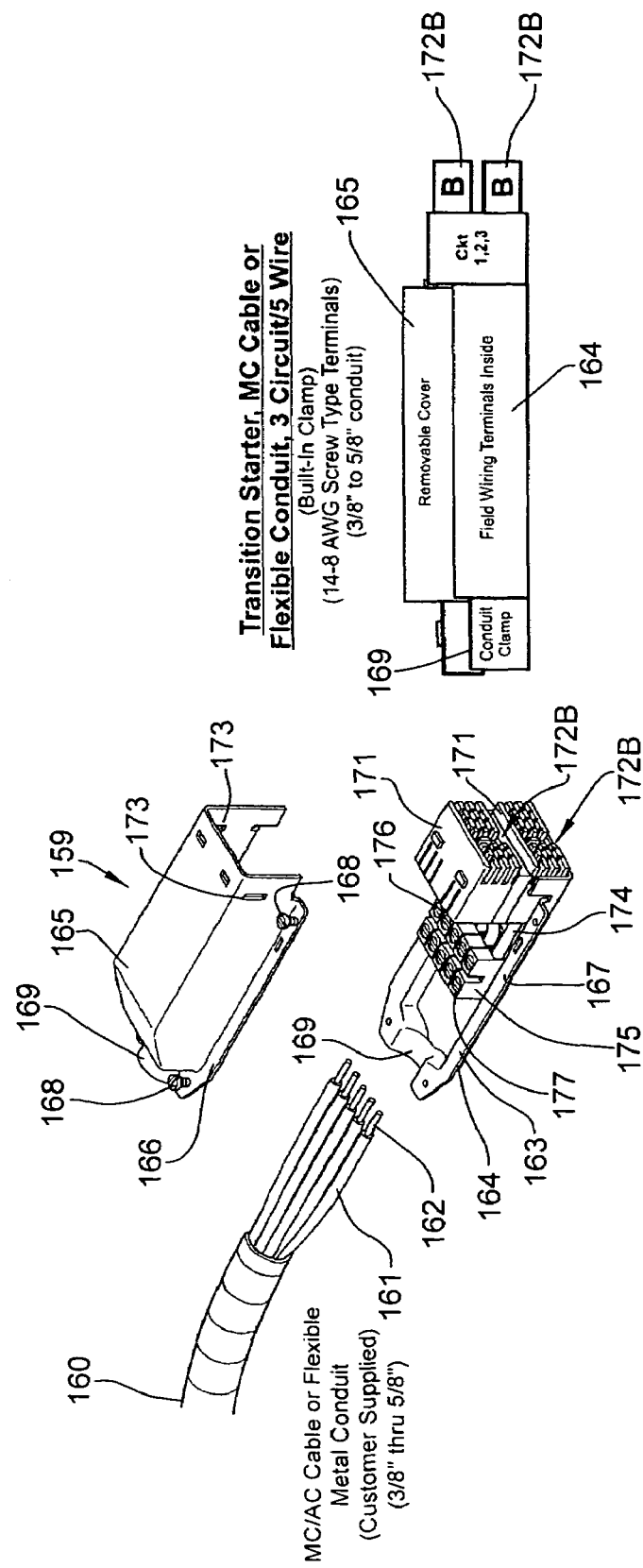
FIG. 11 diagrammatically illustrates a field-wirable transition starter fed from an MC Cable.

Referring to FIG. 11, the system 10 further includes a transition starter 159 which is field connectible to an MC cable or flexible metal conduit 160 which would be supplied on a job site by a customer. This upstream cable or conduit 160 includes internal wires 161 therein having exposed free ends 162 wherein insulation has been stripped in a conventional manner by an installer. The transition starter 159 has an outer housing 163 comprising a base plate 164 and an upper cover 165 that are fastened together along peripheral flanges 166 and 167 by appropriate screws 168. As such, conduit clamp recesses 169 at the end of the housing 163 clampingly engage the outer sheathing or metal conduit of the cable or conduit 160 for a rigid connection therebetween.

Within the housing 163, a pair of end contact blocks 171 are provided in vertically stacked relation so as to define a pair of connectors 172B having a B configuration due to the provision of slots 173 formed in the housing sidewalls. These slots 173 serve as catches for the engagement of the resilient locking fingers provided on the various compatible system components being supplied with power from the transition starter 159.

Electrical contacts are provided within the contact block 171, which are connected by intermediate wires 174 to a terminal block 175. The terminal block 175 includes a first row of clamping screws 176 that clamp to the free ends of the intermediate wires 174. Further the terminal block 175 includes an additional row of clamping screws 177 that receive and clampingly engage the stripped wire ends 162 of the cable or conduit 160. As such, the customer supplied cable 160 may be manually secured to the housing 163 by an electrician with the stripped wire ends 162 engaged to the terminal blocks 175. Typically, the cable or conduit 160 would supply power to the transition starter 159 and hence would supply power to circuits 1, 2 and 3 through the B connectors 172B.

Figure 12:
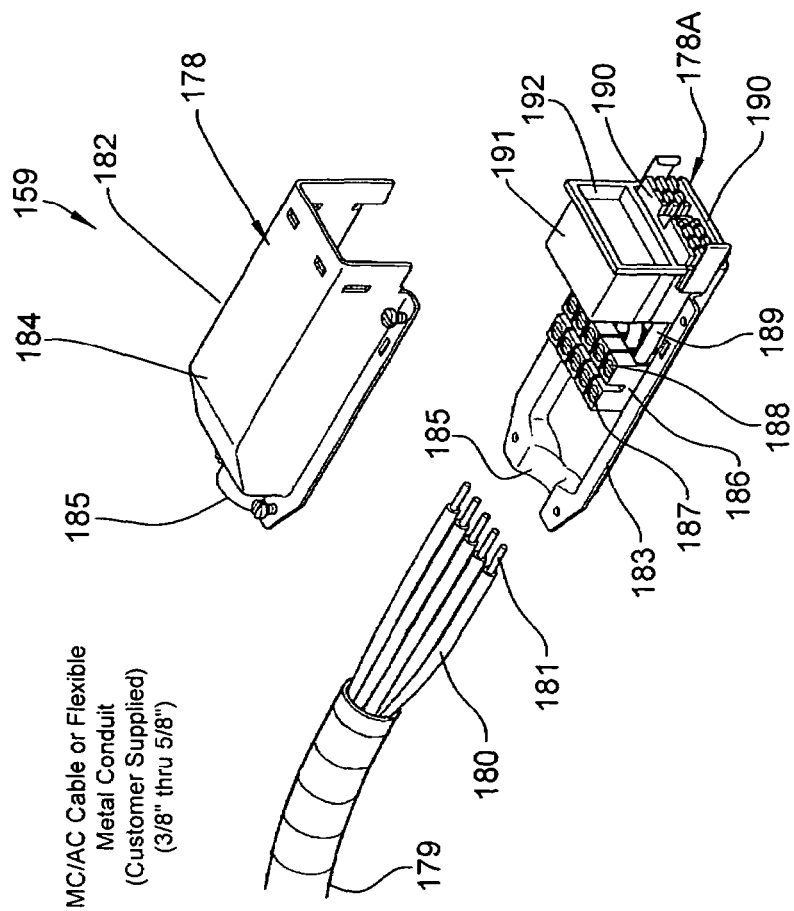
FIG. 12 diagrammatically illustrates a field-wirable transition tap for supplying an MC Cable.

Referring to FIG. 12, a similar component is the transition tap 178 that connects to a downstream MC cable or flexible metal conduit 179 in a manner similar to the transition starter 159 to provide power to the MC Cable or conduit 179. In particular, the cable/conduit 179 includes internal wires 180 having stripped free ends 181. The transition tap 178 has the housing 182 provided with a base plate 183 and cover 184 that are screwed together so that recessed clamp sections 185 essentially define a conduit clamp securely engaging the cable/conduit 179. Within the housing 182, a similar terminal block 186 is provided with rows of clamping screws 187 and 188 for field connection of the cable 179 thereto.

This terminal block 186 in turn connects to intermediate wires 189 which in turn connect to the internal contacts of a contact block 190, which terminal block 190 is supported within an insert 191. The insert 191 defines a rectangular cavity that defines a cap 192 that is adapted to receive an end plug section of any of the terminal blocks of a double plug configuration but is formed of insulative material so as not to effect any electrical connection therein. This cap 192 thereby serves to cap off the end plug section of a conventional B configuration connector while allowing an adjacent B connector to be plugged into the A connector 178A. In other words, when the transition tap 178 is connected to a double plug having a B configuration such as the B connectors 122B of the conduit unit 34, one of the B connectors 122B would engage with the A connector 178A defined by the terminal block 190 while the other B connector 122B is enclosed in the cap 192. Thus, the 3 circuits defined by 5 wires would be passed downstream from an upstream flexible conduit 34 to the downstream transition tap 178 wherein the cable 179 could then be continued downstream for any suitable wiring connections associated with the use of such cables or conduits 179.

Figure 13:
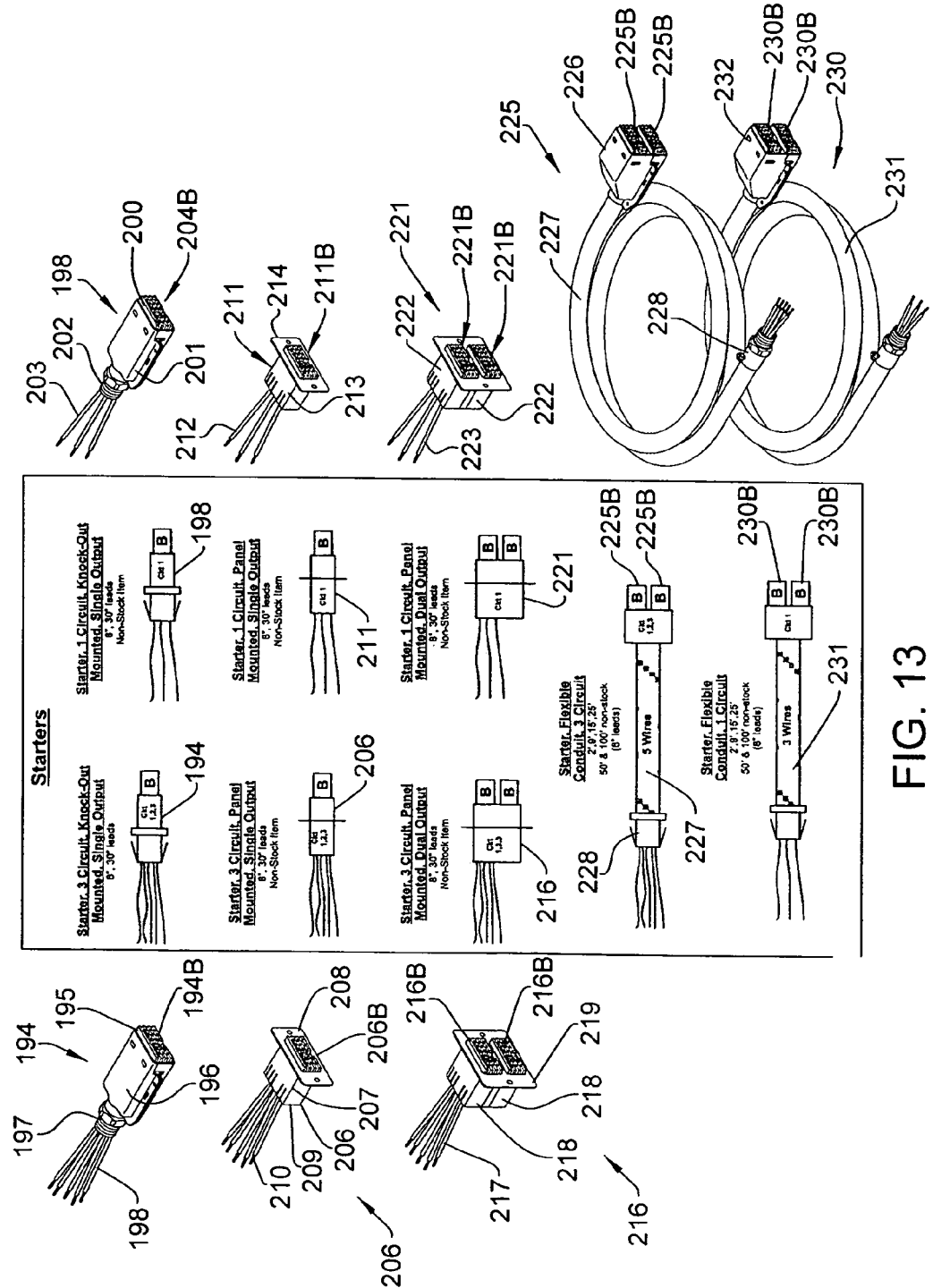
FIG. 13 diagrammatically illustrates various starter components.

Referring to FIG. 13, additional system components are illustrated therein as a comparison of the starter components used to start an individual run of electrical circuits. It is noted that all of these starters are considered to have a B configuration and may be used in a number of different configurations and locations. Notably, these starter components typically include a contact block formed substantially the same as those described above except that additional mounting structures are provided depending on the location to which such components are mounted.

Beginning at the top left of FIG. 13, a three-circuit starter 194 is depicted that has a B connector 194B defined by a contact block 195 secured between two fastened halves of a housing 196. The end of the housing 196 includes an electrical box connector 197 similar to a conventional conduit box connector such as that described above that would be mounted to a conventional metal enclosure such as an electrical box, junction box, or power panel. Since this component defines three circuits therein, five wires 197 project outwardly therefrom for hard-wire connection to the power supply with the B connector 194B being accessible.

In the upper right of FIG. 13, a single circuit starter 199 is provided having a similar configuration to starter 194 in that starter 199 is defined by the contact block 200, housing 201, and conduit box connector 202 which is adapted to mount to an electrical box. As such, the starter 199 is configured to be mounted to a conventional knock-out of a conventional electrical box. The single circuit defined in this starter 199 only requires three electrical wires 203 projecting therefrom for electrical connection to the power supply within the box to which the starter is connected. As a result, the starter 199 has a single output defined by the B connector 204B.

Next down on the left of FIG. 13, a three-circuit, panel-mounted starter 206 is illustrated which comprises a contact block 207 having a rectangular mounting plate 208 thereon that has screw holes for screwing of the starter 206 to an electrical panel. The slotted end section 209 of the contact block 207 has a plurality and preferably five wires 210 projecting rearwardly for hard wiring within the electrical panel. A single output is defined by the B connector 206B.

Next down on the right, the starter 211 is illustrated that only has three wires 212 projecting outwardly therefrom to define a single circuit that is hard wired into the electrical panel. The starter 211 has the contact block 213 supported in the electrical panel by the mounting plate 214 and essentially defines the single output 211B formed as a B connector.

Next down on the left, the starter 216 again has five wires 217 connected within an electrical panel. These wires connect to the contacts of a pair of vertically stacked contact blocks 218 that are wired in parallel so that dual outputs are defined by the B connectors 216B. The starter is supported in the electrical panel by the dual mounting plate 219. The single circuit, three-wire starter 221 is also illustrated on the right wherein the contact blocks 222 are supplied by three wires 223 to define two B connectors 221B.

Next down on the right, a flexible conduit starter 225 is illustrated which is formed with a dual plug 226 at one downstream end that defines two B connectors 225B that in turn connect upstream to a flexible five-wire three-circuit conduit 227, which terminates at a box connector 228 for mechanical connection to the knock-out of an electrical box, fixture or panel.

Lastly, at the bottom right of FIG. 13, the starter 230 has its conduit 231 provided with three wires joining to the dual plug 232 to define a pair of B connectors 230B. Since the conduit 231 only has three wires therein defining a single circuit, the contacts of the B connectors 230B only supply power, preferably for circuit 1.

Figure 14:
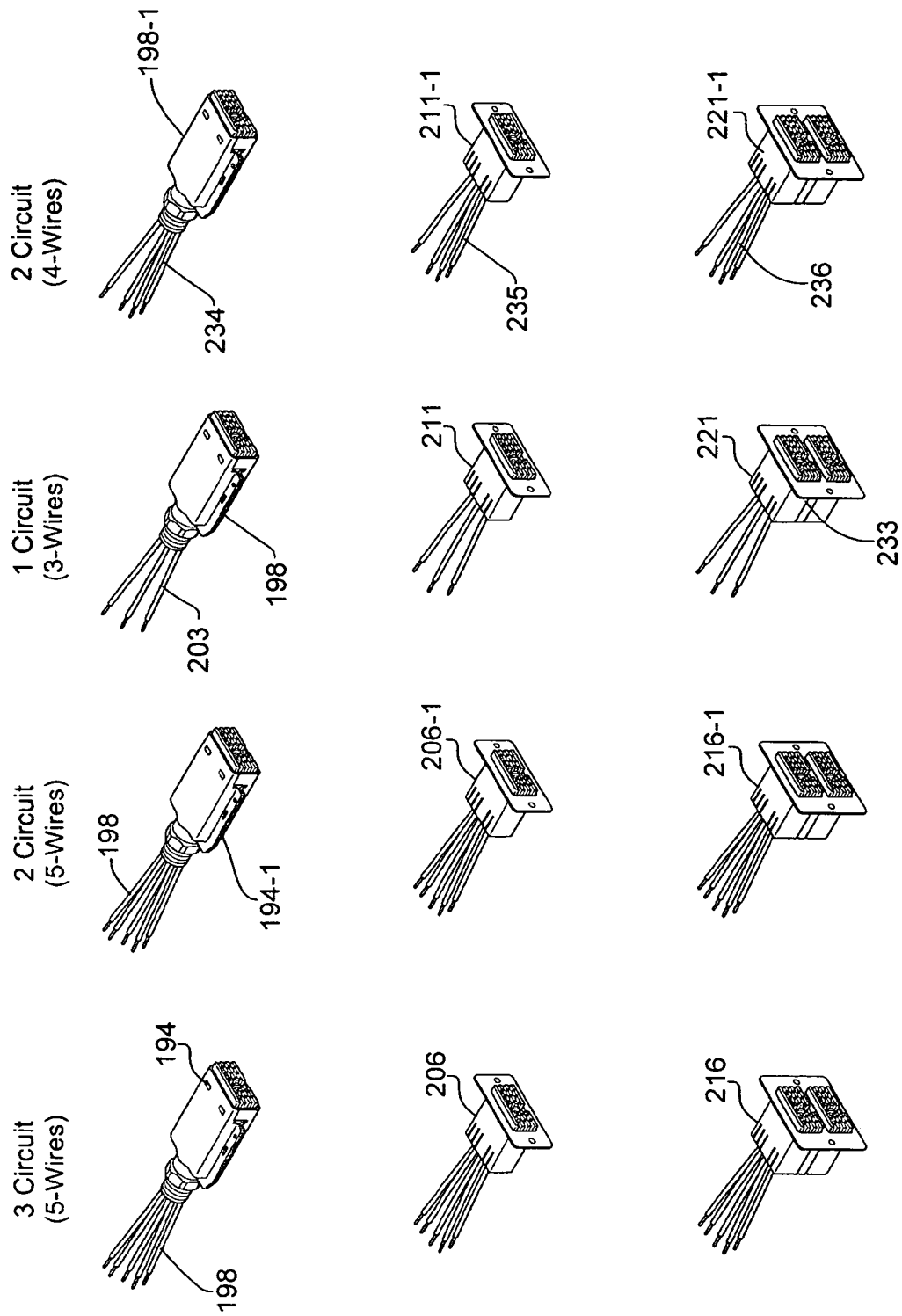
FIG. 14 illustrates multiple variations of starter components in multi-circuit configurations.
Figure 15:
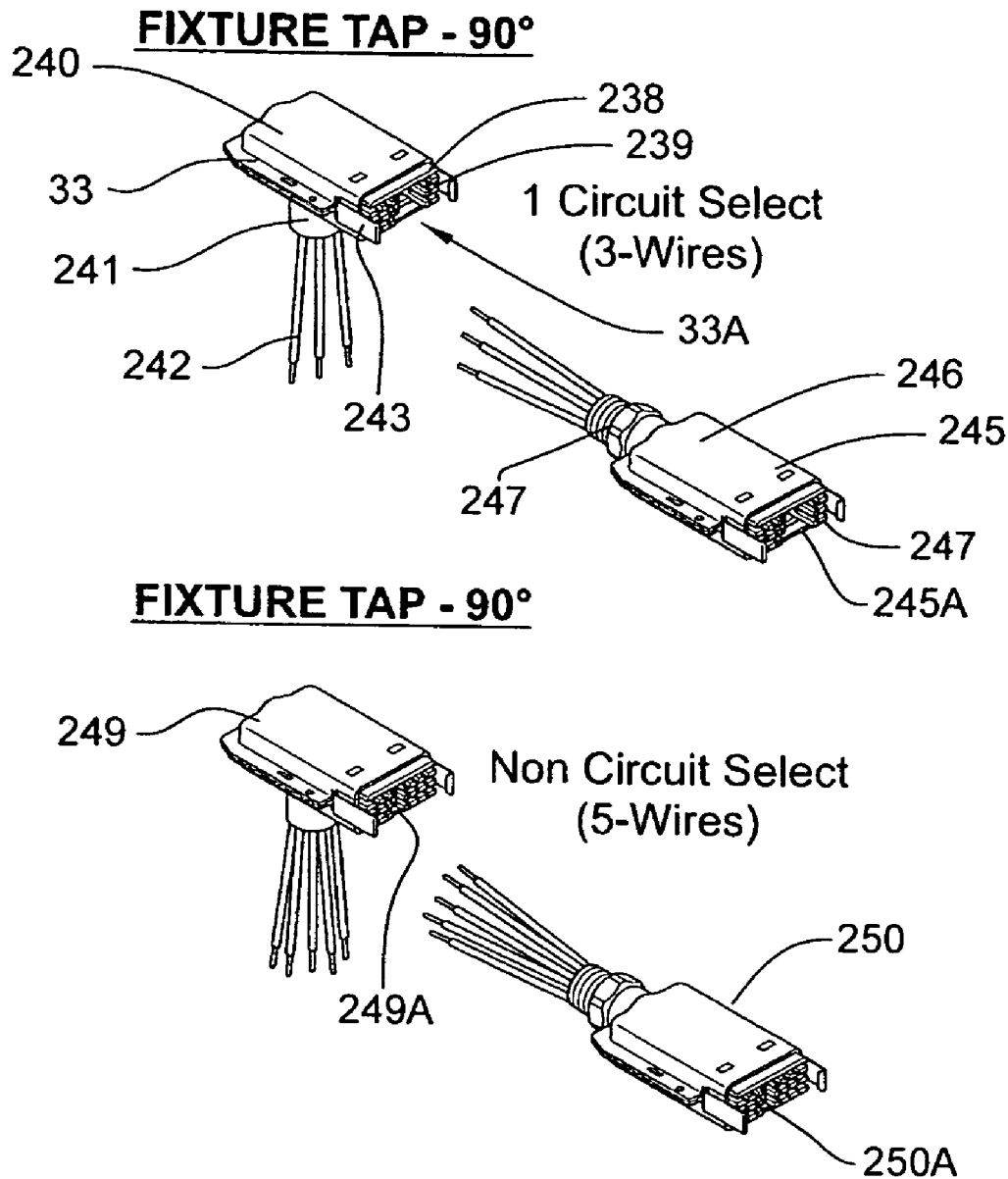
FIG. 15 illustrates 90° fixture taps in various in-line and 90° configurations.

Referring to FIG. 14, an array of different starters are shown to illustrate how the above-described starters of FIG. 13 may be modified into different circuit configurations without varying the number of wires provided therein. For example in the top row, the starter 194 has five wires 198 which would be dedicated to a three-circuit configuration with three line wires, one neutral and one ground. The modified starter 194-1 is provided also with five wires 198 but could be dedicated to a two-circuit configuration wherein the five wires would be dedicated to two line wires, two neutral wires, and a single ground. All of these starters preferably use a common contact block with some also making use of a spacer 233 to join a plurality of such contact blocks together.

The circuit assignment of five wires similarly could be applied to the three-circuit starter 206 and the two-circuit starter 206-1, and the three-circuit starter 216 and the two-circuit starter 216-1.

Additionally, the three-wire, single circuit starters 198, 211 and 221 are illustrated.

It will be understood that the same component parts may still be used but an alternative number of wires, such as four wires 234, 235 and 236 could be provided to define modified starters 198-1, 211-1 and 221-1 having essentially the same configuration. With four wires, two circuits could be defined in such starters 198-1, 211-1 and 221-1 wherein the four wires would comprise two line wires, one neutral and one ground. It will be understood that using four wires in this manner is also possible in the other system components.

Figure 16:
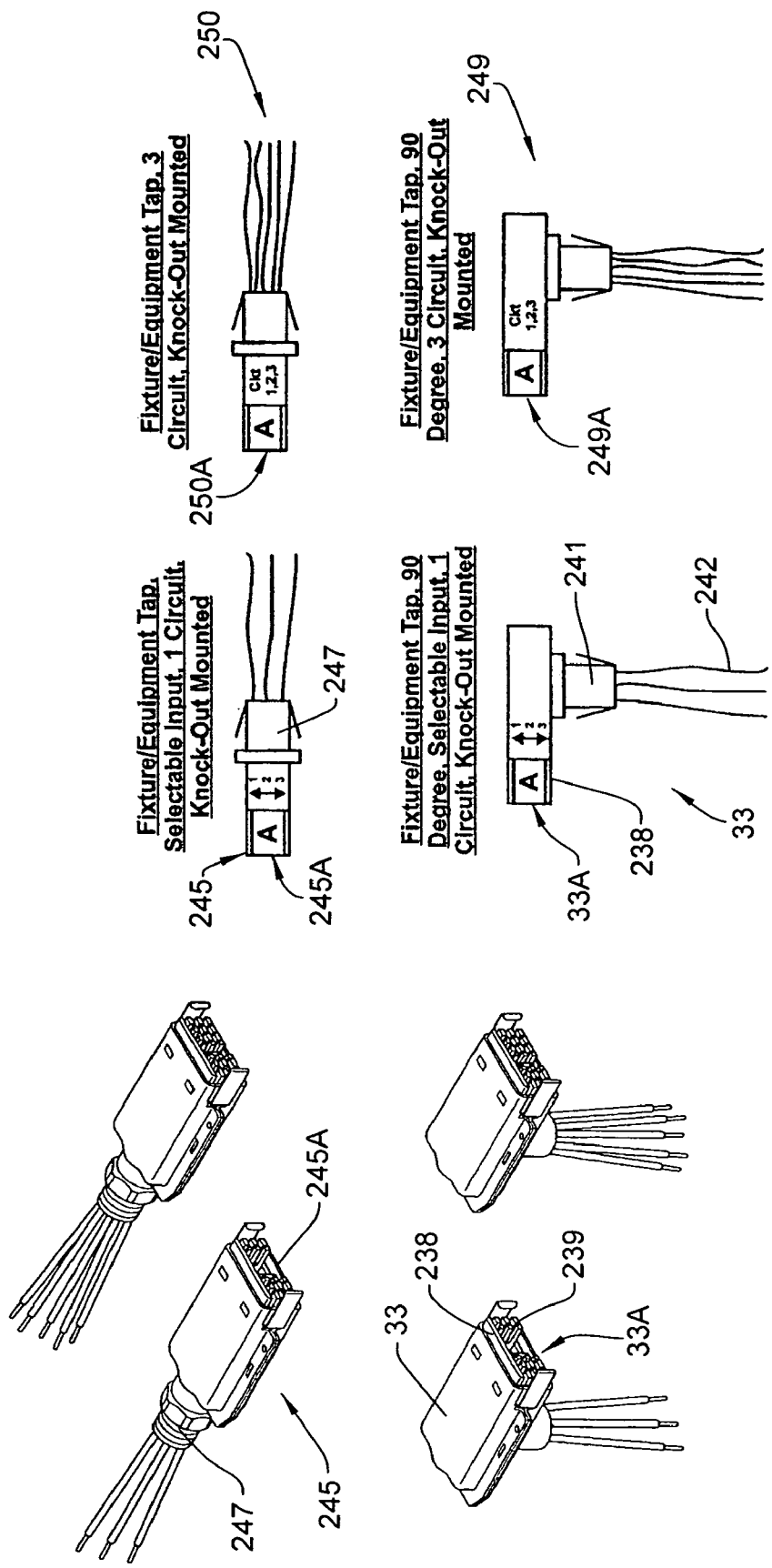
FIG. 16 diagrammatically illustrates in-line and 90° fixture/equipment taps in the various configurations.

Referring to FIGS. 15 and 16, using the same arrangement of contact blocks and housings as those described above, the fixture taps of FIG. 15 may be provided that are mounted using conventional conduit hardware to the housings of fixtures such as lighting fixtures. For example, a single circuit selectable fixture tap 33 is illustrated which was previously referenced in FIG. 1A. This fixture tap 33 has a contact block assembly 238 with a circuit selectable contact shroud 239 that is movable between the line 1, line 2 and line 3 positions. The contact block 238 is supported in the housing 240, which housing 240 has a fixture engagable collar 241 projecting downwardly at a right angle to the contact block assembly 238 wherein three wires 242 project therefrom for hard wiring to a fixture. The contact block assembly 238 thereby defines an A connector 33A since resilient locking fingers 243 are provided. Thus, the A connector 33A can be connected to an upstream B connector such as the B connector 122B of the conduit unit 34 as seen in FIG. 1A.

By selecting a circuit, one of circuits 1, 2 and 3 may be selected for supply to the lighting fixture 30. While the fixture tap 33 is a 90° fixture tap, an in-line fixture tap 245 can be provided with the same component parts except that the housing 246 has a box connector 247 projecting rearwardly in line with the A connector 245 defined at the front of the fixture tap 245. Here again a circuit selectable contact shroud 247 is provided for selection of one of circuits 1, 2 or 3.

While the circuit selection feature is provided in the fixture taps 33 and 245, circuit selection need not be provided wherein five wires are used in a fixed arrangement. For example, in FIGS. 15 and 16, a 90° fixture tap 249 is illustrated with an A connector 249A, while an in-line fixture tap 250 is provided with an A connector 250A.

Figure 17:
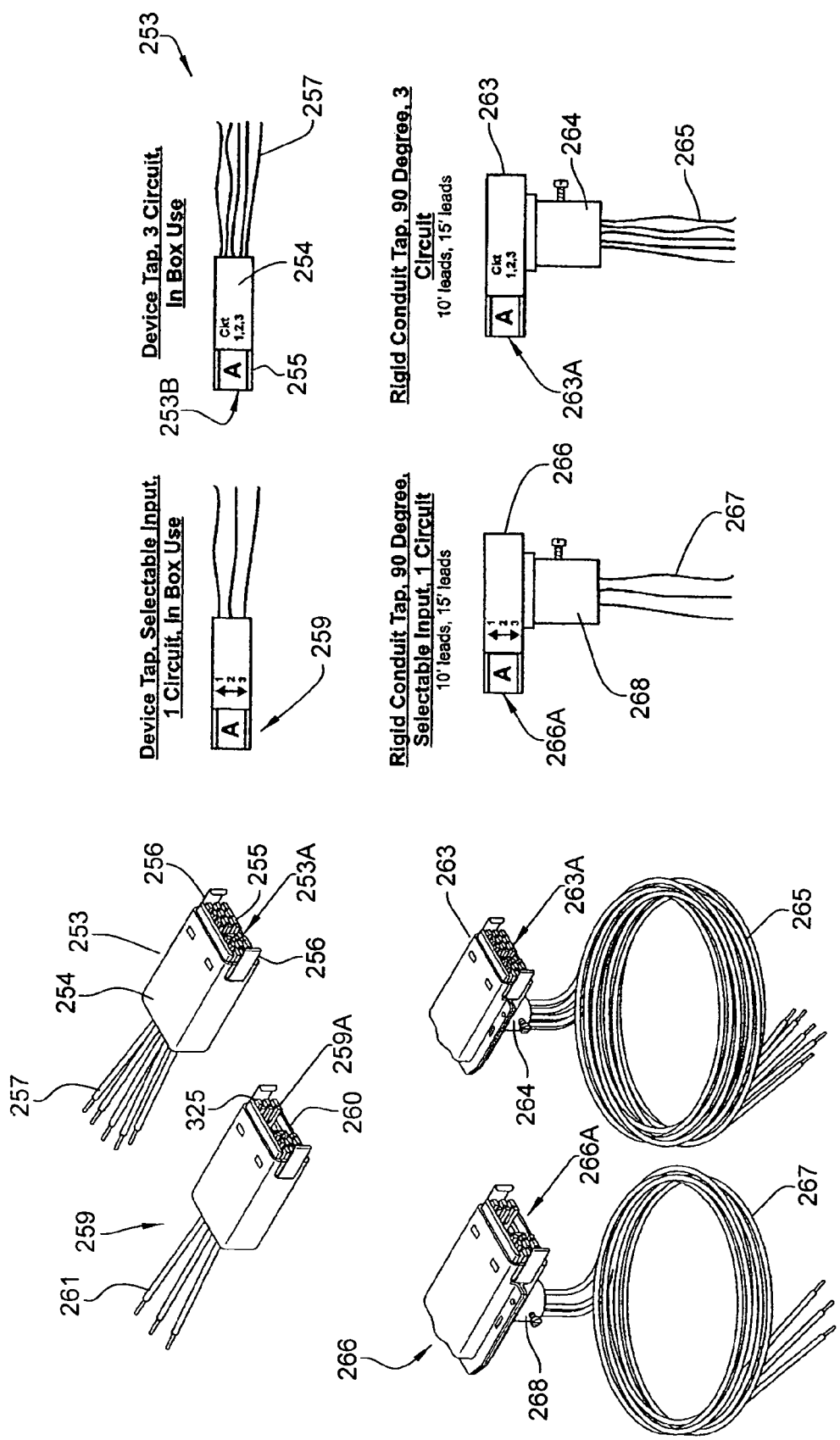
FIG. 17 diagrammatically illustrates device taps and rigid conduit taps in various configurations.

Referring to FIG. 17, similar construction techniques are used to develop device taps with a B configuration for tapping off circuits and having free wires projecting there from for hardwiring to various devices. In this regard, a 3 circuit, 5 wire device tap 253 is provided with a housing 254 and interior contact block 255 and fingers 256 that essentially define a B connector 253B. Wires 256 extend rearwardly for hardwired connection to various circuit components such as an off-the-shelf receptacle. In device tap 253, 3 circuits pass therethrough due to the five wires 257. This device tap 253 is adapted for connection to components within an electrical box as will be described in further detail hereinafter.

A similar device tape 259 is also illustrated in a 3 wire single circuit configuration having a selectable input defined by a circuit selectable contact block assembly 260 which defines the circuit selectable A connector 259A. The wires 261 that project from the device tap 259 may then be hardwired to suitable off the shelf devices such as switches and receptacles.

Also, a rigid 90° conduit tap 263 is provided which defines an A connector 263A and has a box connector 264 from which long lengths of five wires 265 project for downstream wiring. Also, a rigid conduit tap 266 is provided if a circuit selection feature is necessary for the A connector 266A. Here, only 3 wires 267 exit the box connector 268.

Figure 18A:
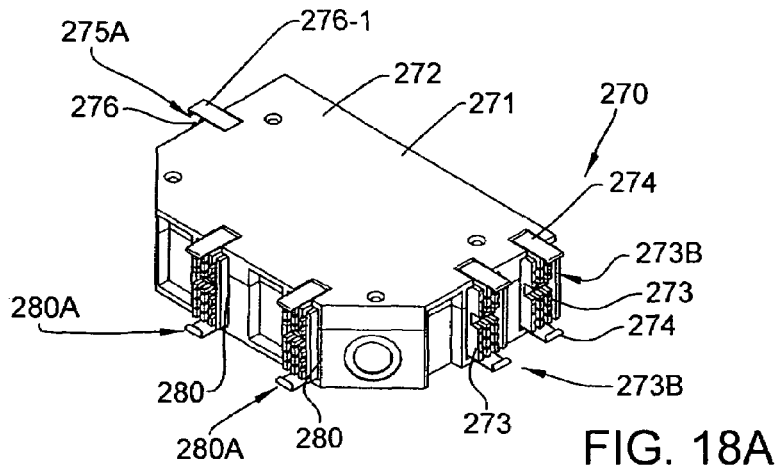
FIGS. 18A-18B diagrammatically illustrate a field wiring junction box.
Figure 18B:
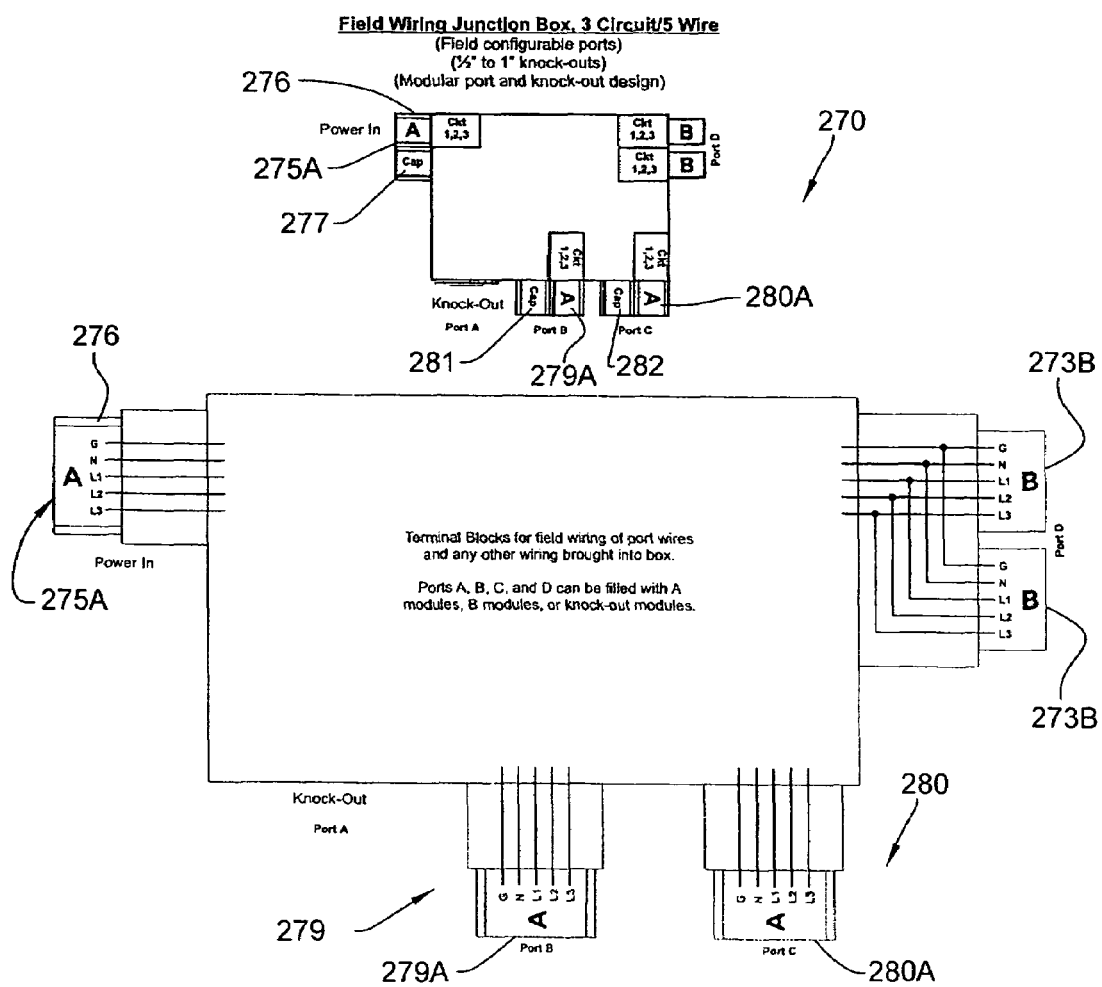

As to FIGS. 18A and 18B, it also may be desirable to provide for field-wiring junction boxes such as the junction box 270 of FIGS. 18a and 18B. The junction box 270 has an openable, hollow housing 271 with a cover 272 that is removable to provide access to the box interior. The sidewalls of the housing 271 are formed so as to support a pair of contact blocks 273 adjacent locking fingers 274 to define B connectors 273A.

The B connectors 273B are downstream connectors that allow for connection to various A connectors of the other system components. These B connectors 273B are electrically connected within the box housing 271 to an upstream A connector 275A defined by another similar contact block 276 adjacent fingers 276-1. The A connector 275 may receive power from any of the B connectors described above, while a rectangular cap 277 is provided adjacent to the A connector 275. As seen at the bottom of FIG. 18, the five conductor wires in the A connector 275 have the same vertical orientation of ground, neutral, line 1, line 2 and line 3 which carries over and similarly is provided in the B connectors 273B. Notably, these B connectors 273B are connected in parallel. As such, the A connector 278 defines a power in port, while the B connectors 273B define power out port.

Additional ports 279 and 280 are defined which are connected internally of the housing 271 so as to allow for passage of power out through A connectors 279A and 280A. By providing a cap 281 and 282 adjacent to the A connectors 279A and 280A, it is possible to use a conduit unit 34 with the B connectors 122B connected to the A connectors 279A or 280A. This would then allow electrical current to be routed downstream to the A connector 117A which in turn could be connected to an electrical box if desired.

Alternatively, the ports could be made field configurable by removing the housing cover 272 and rewiring the interior of the box 270 so that ports 279 and 280 are made to have a B configuration as seen in FIG. 18A. A junction box 270 of FIG. 18 thereby can be used to generate various wiring configurations simply by plugging of components together and while minimizing hard wiring of the circuits defined thereby.

Figure 19:
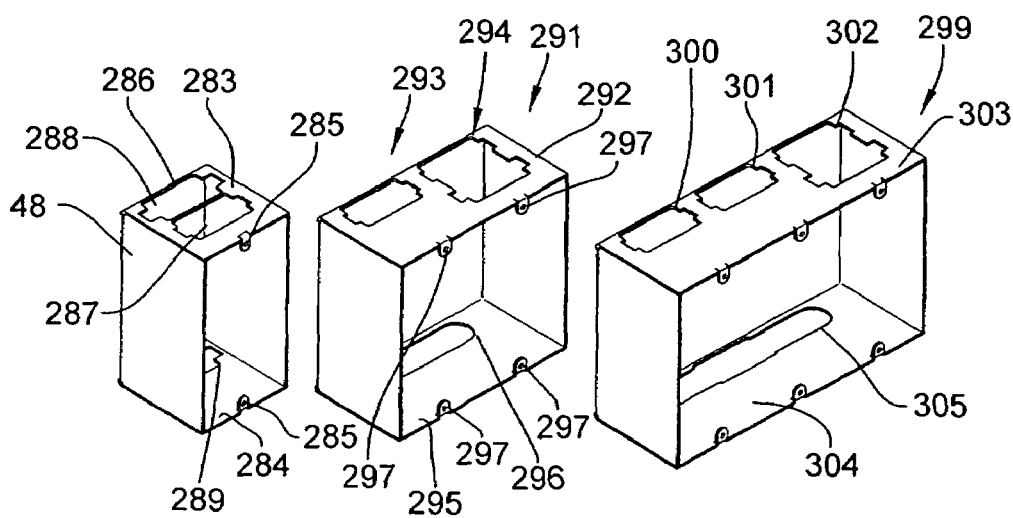
FIG. 19 illustrates multiple wall boxes in several configurations

In FIG. 19, a wall-mounted single-gang electrical box 48 is illustrated which is affixed within the building cavities in appropriate locations so as to accommodate system devices such as switches and receptacles. The single-gang box 48 has a generally conventional construction with top and bottom walls 283 and 284 that have vertically depending screw tabs 285 that allow for use of conventional off-the-shelf receptacles and switches.

The box 48 further is uniquely configured so as to accommodate the single and double plug connectors as described in further detail herein. In this regard, the top box wall 283 has knock-outs which are normally closed but are illustrated as being open in FIG. 19. The top wall 283 includes a top knock-out 286 having front and rear knockout sections 287 and 288, while the bottom wall 284 includes a single elongate bottom knock-out 289. It is noted that the knock-outs 286 and 289 allow for entry of the single and double plugs of the conduit units 34 into the box, and then rigid connection of these plug connectors to the top or bottom box wall 283 or 284 as will be described further herein.

Further as to FIG. 19, a double-gang box 291 is also illustrated that has a top wall 292 with two knock-outs 293 and 294 which may be punched out either to define a single opening like in knock-out 293, or a double opening like in knock-out 294. This is selectively formed during installation by an installer. The bottom wall 295 is different in that such includes an elongate generally oval knock-out 296 that allows for the passage of conduit units 34 out of the box.

The forward edges of the walls 292 and 295 each include upstanding tabs 297 to define two side-by-side mounting locations for conventional receptacles or switches.

FIG. 19 also illustrates the triple-gang box 299 having three mounting slots with three knock-outs 300, 301 and 302 in the top wall 303. The bottom wall 304 includes an elongate oval knock-out 305.

These boxes 48, 294 and 299 are wall-mountable and may be used in a similar manner to conventional wall boxes when constructing a building. Preferably, the boxes 48, 294 and 299 define mounting locations therein for switches and receptacles wherein the spacing for each mounting location is the same as conventional electrical boxes, for example, so that conventional face plates and off the shelf components may be used.

Figure 20:
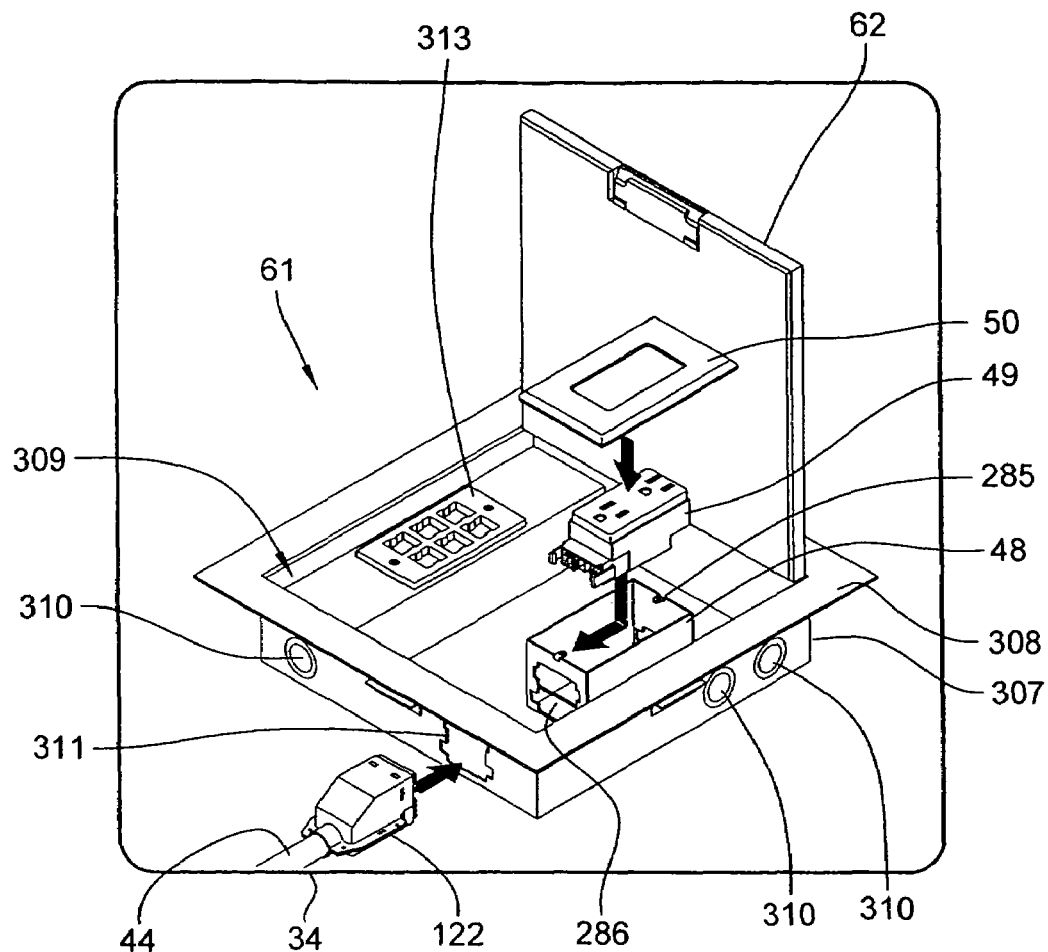
FIG. 20 is an isometric view of a floor box assembly.

Referring to FIG. 20, a floor box 61 is illustrated in more detail, which box has a housing 307 with an upper flange 308 that is supported on the floor surface. Additionally, the housing 307 supports the hinged door 62 thereon and closes off the interior box compartment 309.

The housing 307 has the side walls formed with a selection of conventional circular knock-outs 310 as well as a knock-out 311 corresponding to that used in the above-described wall mount boxes such as box 48. This knock-out 311 fixedly receives the double end connector 122 of the conduit unit 34 therein. Additionally, the knock-out 311 aligns with the corresponding knock-out 286 of the single-gang box 48 used herein. This box 48 is then joined to the floor box wall 307 wherein an additional receptacle 49 is then plugged into the end connector 122. Thereafter, a face plate 50 is then screwed to the appropriate fastener tabs 285. In this manner, the receptacle 49 is secured within an appropriate box 48 and electrically connected thereto merely by plugging of the components together and then installation of the face plate 50. This greatly simplifies the assembly and wiring process on site during the installation phase. It is noted that the electrical box 61 also may be provided with suitable data connectors 313 where desired.

Figure 21:
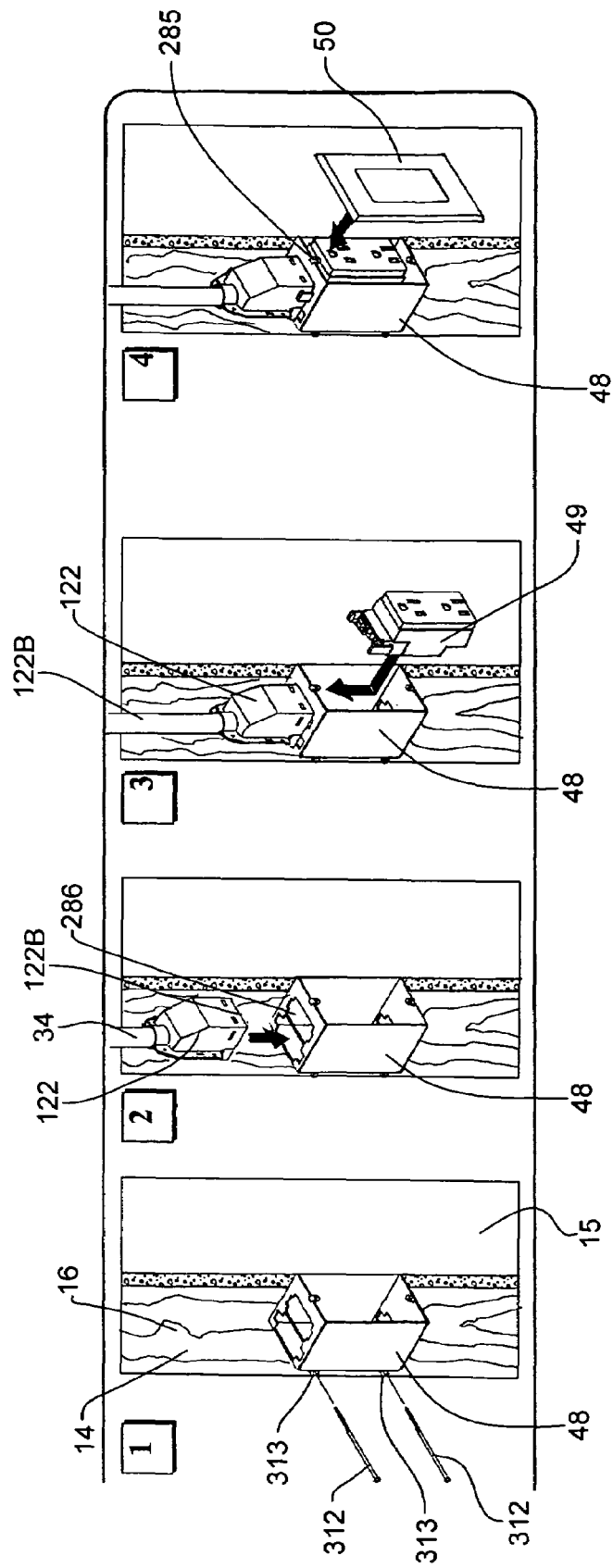
FIG. 21 illustrates the assembly process for a wall-mounted electrical receptacle.

Referring to FIG. 21, this figure illustrates the mounting process for installing a receptacle in a wall cavity 16. In this embodiment, a single-gang box 48 is mounted to a wall stud 14 by appropriate fasteners 312 which may be screws or nails that engage through mounts 313 on the box 48. In the second step, the double plug 122 on a conduit unit 34 is plugged downwardly into the upper knock-out 286 on the box 48 wherein the B connectors 122B on the conduit unit 34 are accessible from the interior of the box 48. In step 3, a receptacle 49 is inserted inwardly into the box 48 and then shifted upwardly so as to be plugged into one of the B connectors 122B and in particular, the frontmost B connector 122B. In the fully installed position that can be seen in step 4, the receptacle 49 projects a small distance from the front of the box 48 wherein a conventional face plate 50 is screwed onto the box tabs 285. Hence, the connection steps merely involve plugging engagement of the components together which greatly simplifies the installation process.

Figure 22:
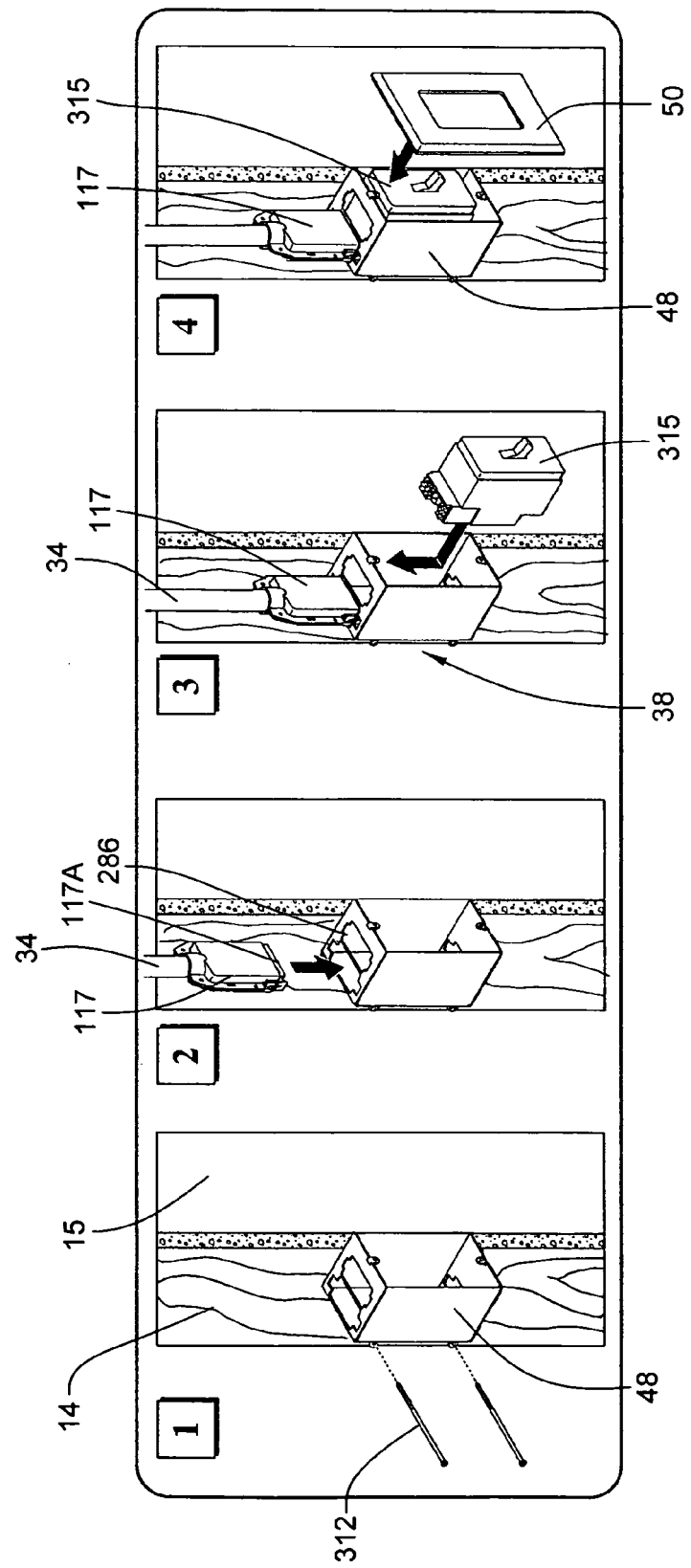
FIG. 22 illustrates the assembly process for a wall-mounted switch.

In FIG. 22, the same process also may be used to connect a switch 315 of a switch assembly 38. In particular, in steps 1 and 2, the electrical box 48 again is fastened to a wall stud by fasteners 312, after which in the second step, the A end of the conduit unit 34 is engaged in the knock-out 286. In step 3, the switch 315 may be inserted into the box interior and then shifted upwardly into plugging engagement with the forwardmost A connector 117A of end connector 117. Thereafter, a face plate 50 may be screwed to the box 48 in the fourth and last step so as to be accessible through the wall sheeting 15.

Figure 23:
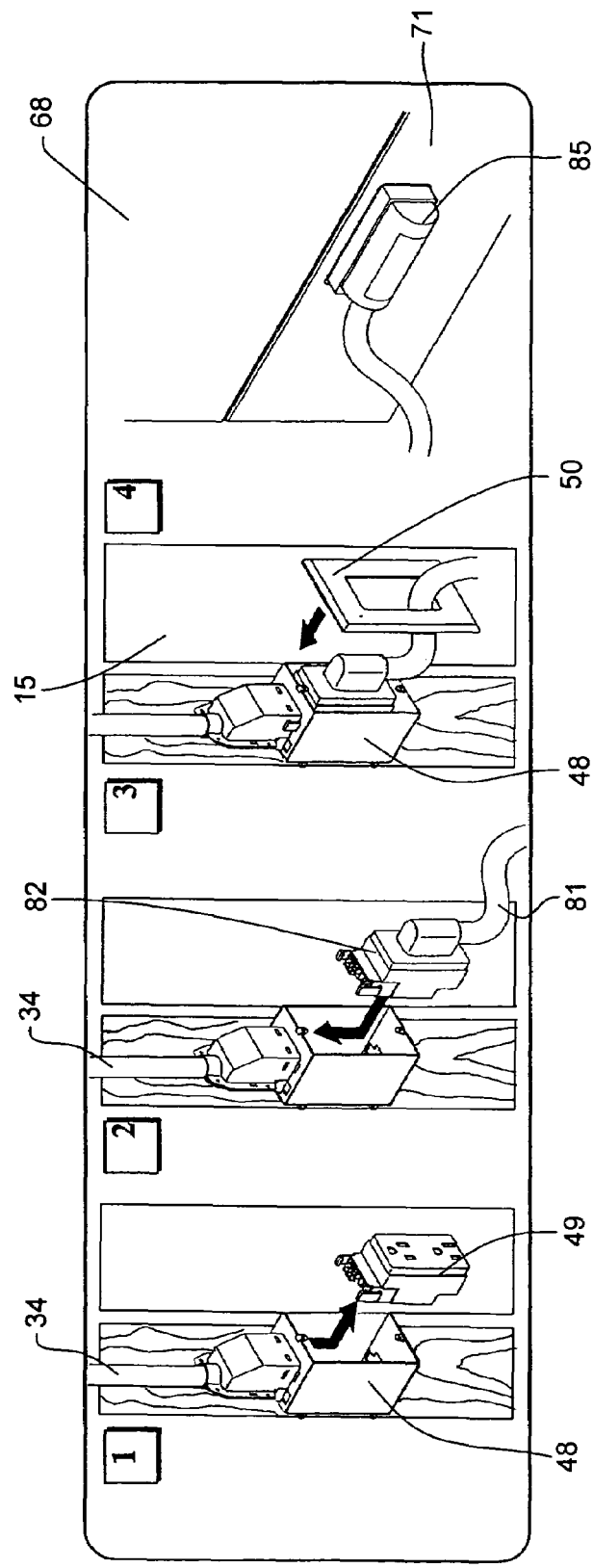
FIG. 23 illustrates the assembly process for changing out a receptacle with a wall panel feed unit.

FIG. 23 illustrates how the receptacle assembly of FIG. 21 may be readily modified so as to replace the receptacle with the wall feed connector unit 81 in the event that a wall panel system is to be installed adjacent an existing receptacle location. In particular, in step 1, the receptacle is removed by shifting the receptacle 49 downwardly and then outwardly out of the box 48, and then inserting the in-feed connector 82 into the box 48 and plugging same upwardly into engagement with the conduit unit 34. An appropriate face plate 50 is then added to close off the electrical box 48.

In step 4, the downstream plug 85 is then connected to the PDA's 73 disposed in the raceway of a wall panel 68 and particularly, by passing through the raceway cover 71. Hence, the receptacle location now becomes a supply location for supplying power to an arrangement of wall panels 68. This is accomplished by simple unplugging of one system component and plugging of an alternate component which is simple and quick and greatly simplifies the re-arrangement of office furniture which typically occurs in normal use.

Figure 24:
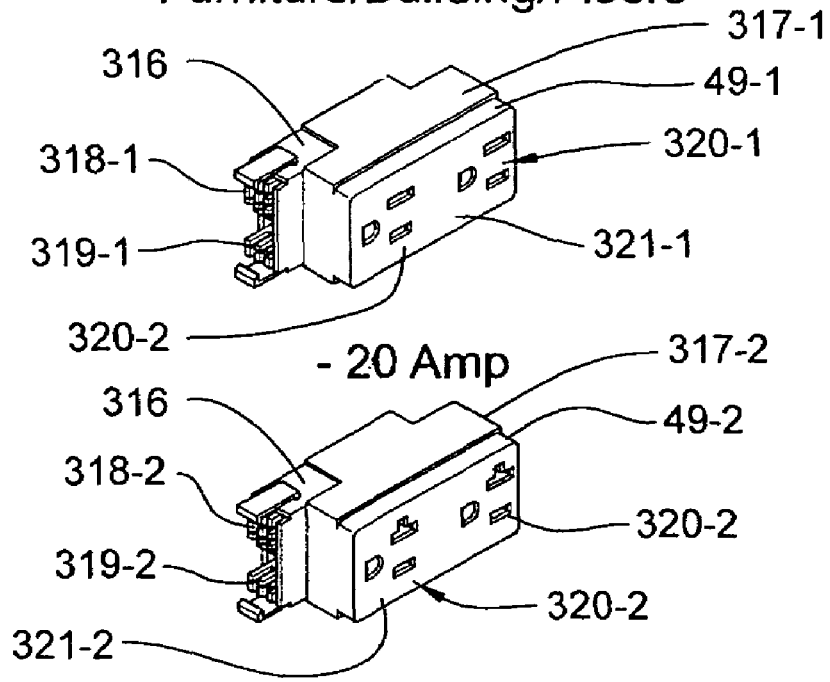
FIG. 24 illustrates two configurations of pre-wired receptacles.

Referring to FIG. 24, two alternative receptacles are illustrated. In particular, receptacle 49-1 is a 15 amp duplex outlet while receptacle 49-2 is a 20 amp duplex outlet. Each of these receptacles 49-1 and 49-2 have a circuit selectable contact block 316 therein which is supported in the receptacle housings 317-1 and 317-2. These contact blocks 316 include a fixed contact portion 318-1 and 318-2 which accommodate neutral and ground wires and also include a movable contact shroud 319-1 and 319-2 which are shiftable vertically between line 1, line 2 and line 3 positions. As such, each of these receptacles 49-1 and 49-2 taps off a single circuit and allows for plugging connection of equipment thereto by the conventional sets of prong openings 320-1 and 320-2 which may be plugged into the receptacle faces 321-1 and 321-2 in a generally conventional manner. In this manner, electrical equipment, such as computers, which are plugged into the plug openings 320-1 and 320-2 would be supplied with power, and would serve as a load on only that specific one of the three circuits that is being tapped off by the movable contact shroud 319-1 and 319-2.

These receptacles 49-1 and 49-2 would be factory manufactured. However, it is also possible to form a receptacle assembly 323 (FIG. 25) which uses an off-the-shelf duplex receptacle 324 that is available through any electrical supply house. This receptacle 324 is wired to the above-described circuit selectable device tap 259 (FIG. 17). In particular, this device tap 259 is a movable contact shroud 325 that allows for selection of a single one of the multiple circuits being carried through the power distribution circuit. The receptacle 324 is hard-wired to the tap wires 261 through connection of the hot, neutral and ground wires. Any suitable, commercially available receptacle 324 or other wiring device could also be connected to this device tap 259 for installation into the system. As such, if a device tap 259 is available, an installer could obtain a system device from a wiring supply house in the event that a unique need arises during the installation process or if a device is required that is not part of the established product offering comprising the distribution system 10.

Figure 26:
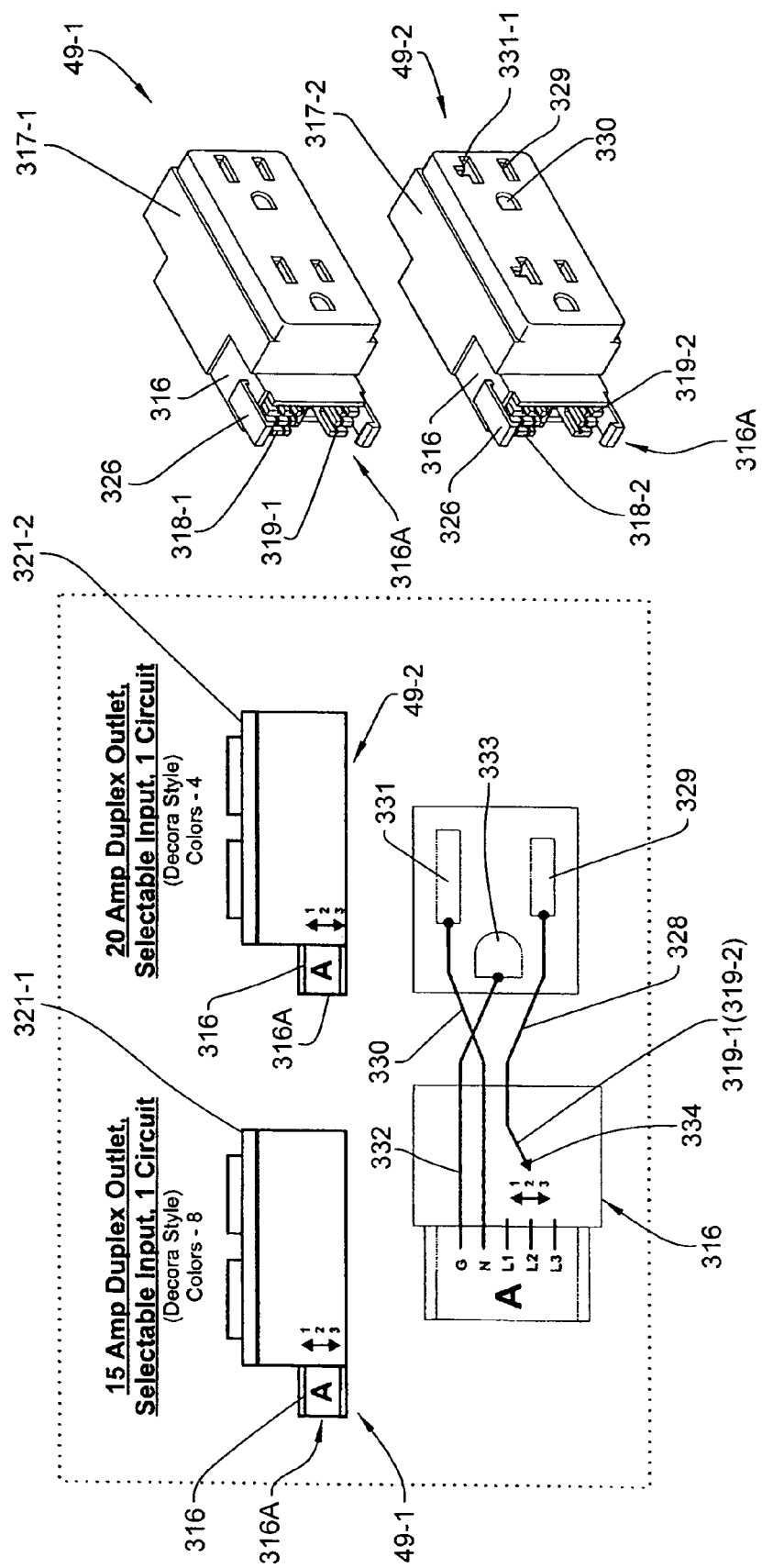
FIG. 26 diagrammatically illustrates the pre-wired receptacle configurations.

Referring to FIG. 26, the receptacles 49-1 and 49-2 are further illustrated with the wiring thereof diagrammatically illustrated. In particular, the contact block assembly 316 also has resilient locking fingers 326 so as to define A configuration connectors 316A in each of the receptacles 49-1 and 49-2.

As seen in the wiring diagram of FIG. 26, the contact block assembly 316 has the movable contact shroud 319-1 (319-2) movable vertically between the Line 1 and Line 3 positions for selection of one of these three circuits. Internally of each of the receptacles 49-1 and 49-2, a hot conductor 328 is provided which is accessible through a prong slot 329. Also, a neutral conductor 330 is accessible through an associated prong slot 331 while a ground conductor 332 is accessible through a ground aperture 333. The illustrated shape of the openings 329, 331 and 333 generally corresponds conventionally to a 15 amp receptacle 49-1, although this wiring arrangement is equally applicable to the 20 amp receptacle 49-2 wherein the prong slot 331 would have the alternate shape illustrated by slot 331-1 shown in the isometric view of the receptacle 49-2 in FIG. 26.

Typically, the receptacles 49-1 and 49-2 would have the conductors 328, 330 and 332 defined by a combination of flexible wires and conductive contact strips which frequently are found in other known receptacle configurations. One example of a known receptacle construction is disclosed in U.S. Pat. No. 7,114,971, owned by the assignee of the present invention, the disclosure of which is incorporated herein by reference in its entirety. This patent discloses a receptacle having a circuit selection feature with a sliding block.

As to FIG. 26, while the neutral and ground conductors 330 and 332 are in a relatively stationary position within the respective receptacle housing 317-1 or 317-2, the hot conductor 328 at least has a flexible portion 334 connected to the movable contact shroud 319-1 (319-2) so as to move in unison with the shroud during circuit selection. This feature is discussed in further detail herein.

Figure 27:
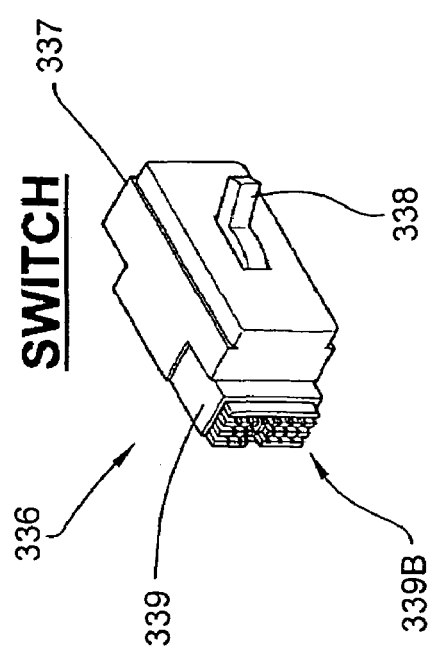
FIG. 27 is an isometric view of a plug-in switch.

Referring to the switch components, FIG. 27 shows a switch 336 which is illustrated as having a switch housing 337 which supports a switch toggle 338. The housing 337 further supports a contact block 339 that defines a B connector 339B.

Figure 29:
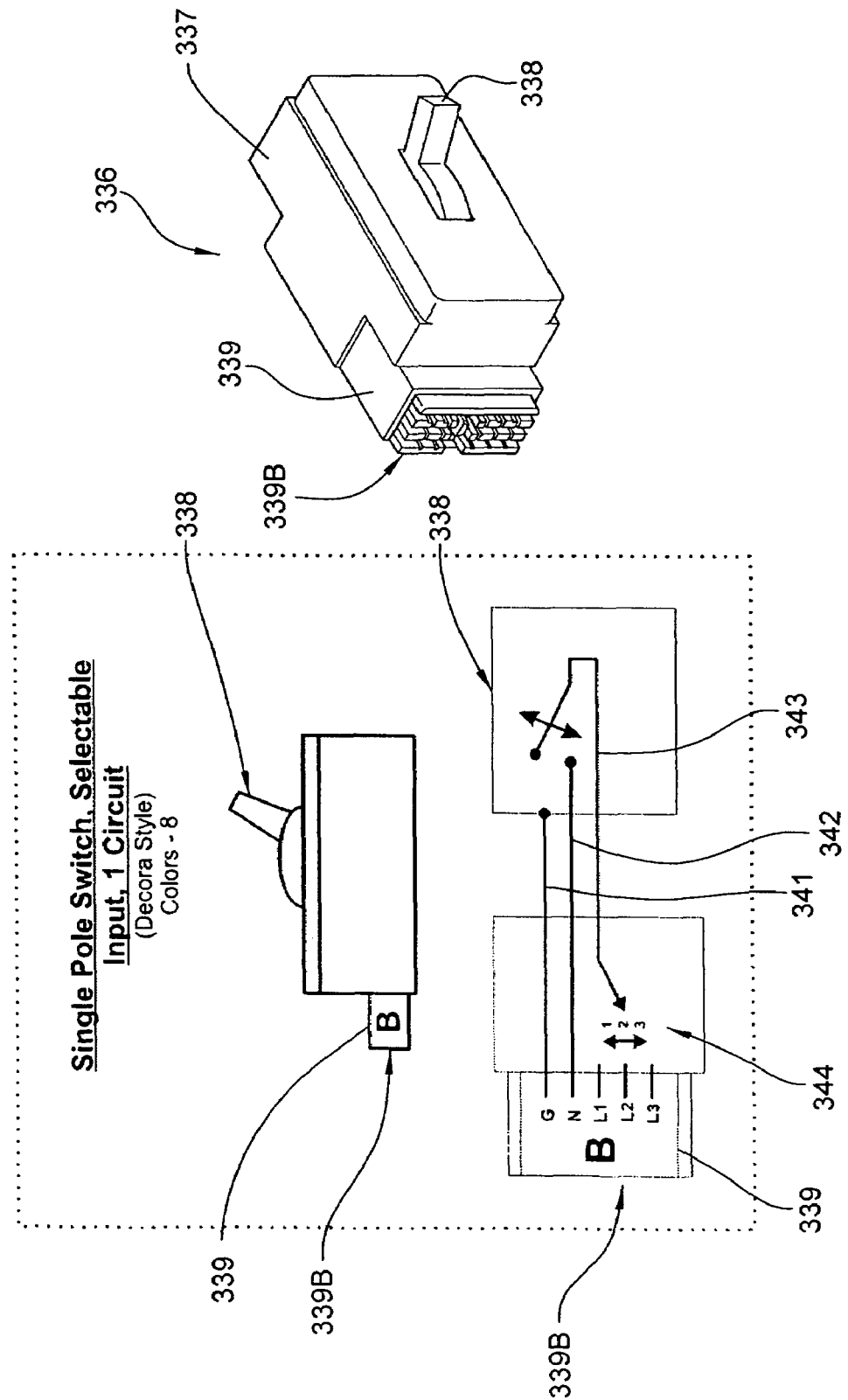
FIG. 29 diagrammatically illustrates the switch of FIG. 27.

FIG. 29 illustrates the internal circuitry hereof wherein the contacts in the contact block 339 are connected to internal ground, neutral and hot conductors 341, 342 and 343 wherein the switch toggle 338 would control opening and closing of the single circuit controlled by the toggle 338. The contact block 339 could be made so that it is pre-wired for connection to only a single one of the Line 1, Line 2 or Line 3 circuits in the fixed configuration of FIG. 27, or also could have a circuit selectable, movable contact shroud 344 as illustrated in the circuit diagram of FIG. 29.

Figure 28:
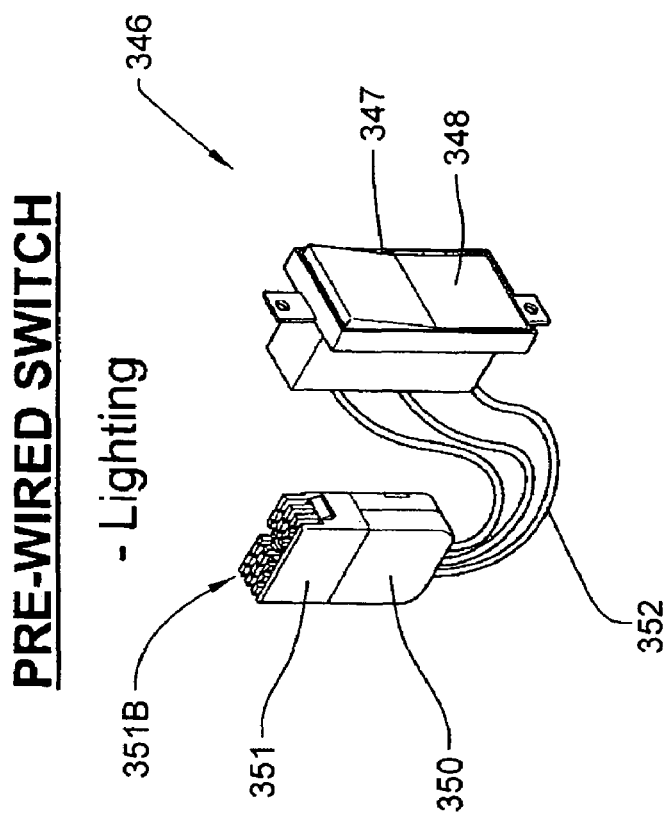
FIG. 28 is an isometric view of a pre-wired switch assembly.

Referring to FIG. 28, an alternate switch assembly 346 may be provided using a conventional off-the-shelf switch 347 available from electrical supply houses. The switch 347 has a decorative switch toggle 348 as part thereof. The switch 347 in turn is connected to a switch device pigtail 350 having a contact block 351 defining a B connector 351B. The switch pigtail 350 has three pigtail wires 352 hanging therefrom which are manually wired to the off-the-shelf switch 347 to define the switch assembly 346.

Figure 25:
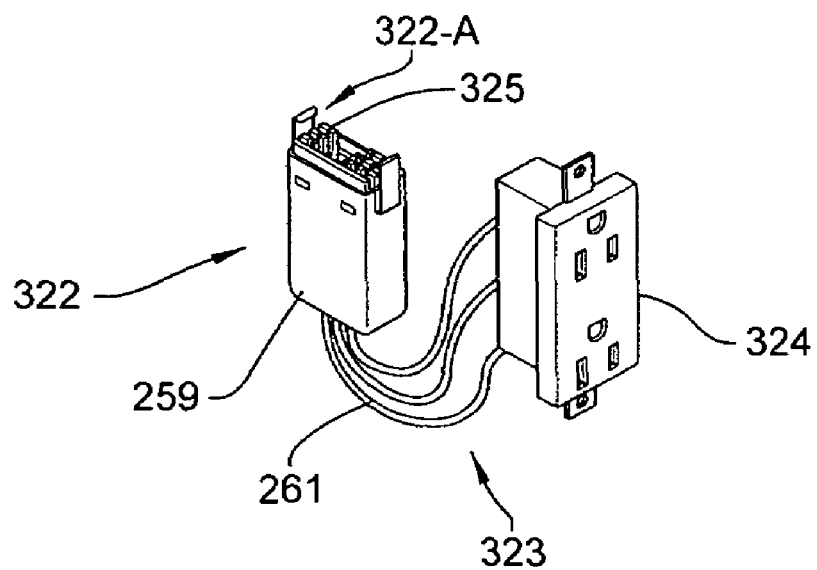
FIG. 25 illustrates an alternate receptacle assembly which is field wirable or factory wirable.
Figure 30:
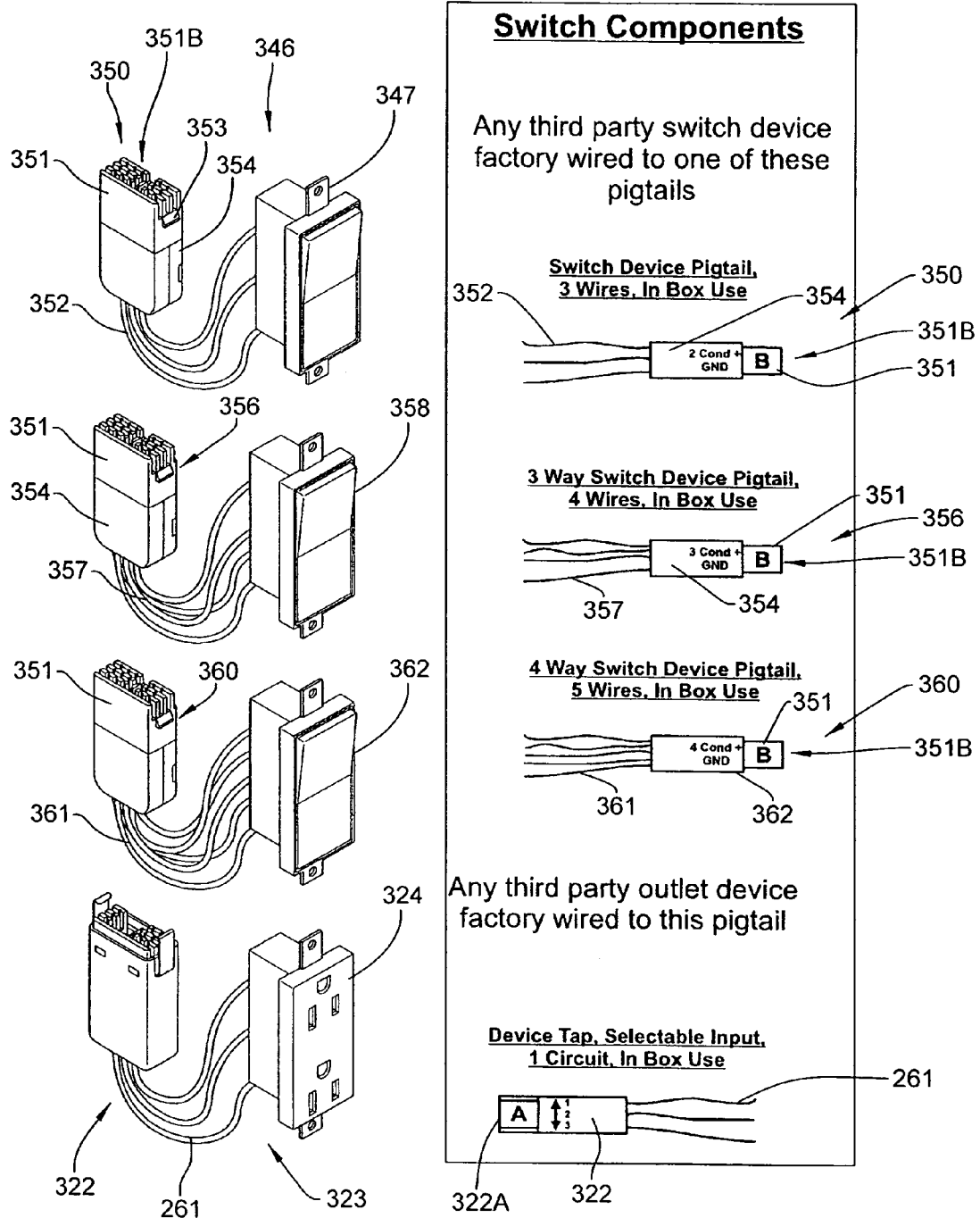
FIG. 30 diagrammatically illustrates various switch assemblies and a receptacle assembly in pigtail switch configurations using switch device pigtails that are field or factory wirable.

Referring to FIG. 30, a variety of switch components are illustrated and compared to the switch assembly of FIG. 25. In particular at the top of the diagram, the switch assembly 346 is illustrated being connected to the single pull switch 347. The switch pigtail 350 has the contact block 351 provided with catches 353 on the sides thereof and defines the B connector 351B for connection to other A connector devices defining the switch leg 35 being controlled by the switch assembly 346. The contact block 351 is electrically connected to the pigtail wires 352 wherein the connections thereof are closed by a housing 354. Hence, in the switch pigtail 350, the wires 352 define the hot and neutral conductors as well as the ground wire.

Alternatively, a four-wire switch pigtail 356 may be provided wherein the contact block 351 interconnects to four pigtail wires 357 that are connected to a three-way switch 358. As such, the pigtail wires 357 define three conductors and a ground wire that are wired in a conventional three-way switch configuration.

Additionally, a five-wire switch pigtail 360 is illustrated having five pigtail wires 361 connected to the contact block 351 and in turn are connected to a four-way switch 362. Here again, the five-wire 361 is defined for circuit conductors and a ground wire. These switch assemblies as defined by the respective switches and device pigtails are designed for use within a wall-mounted electrical box wherein the B connector 351B is plugged to an appropriate A connector in the electrical box such as box 48, with the appropriate switch being fastened to the box and enclosed by a cover plate.

In comparison, the bottom of FIG. 30 illustrates the receptacle assembly 323 having the receptacle pigtail 322 connected to an off-the-shelf receptacle 324. This receptacle pigtail 322 is circuit selectable and defines an A connector 322A.

Figure 31:
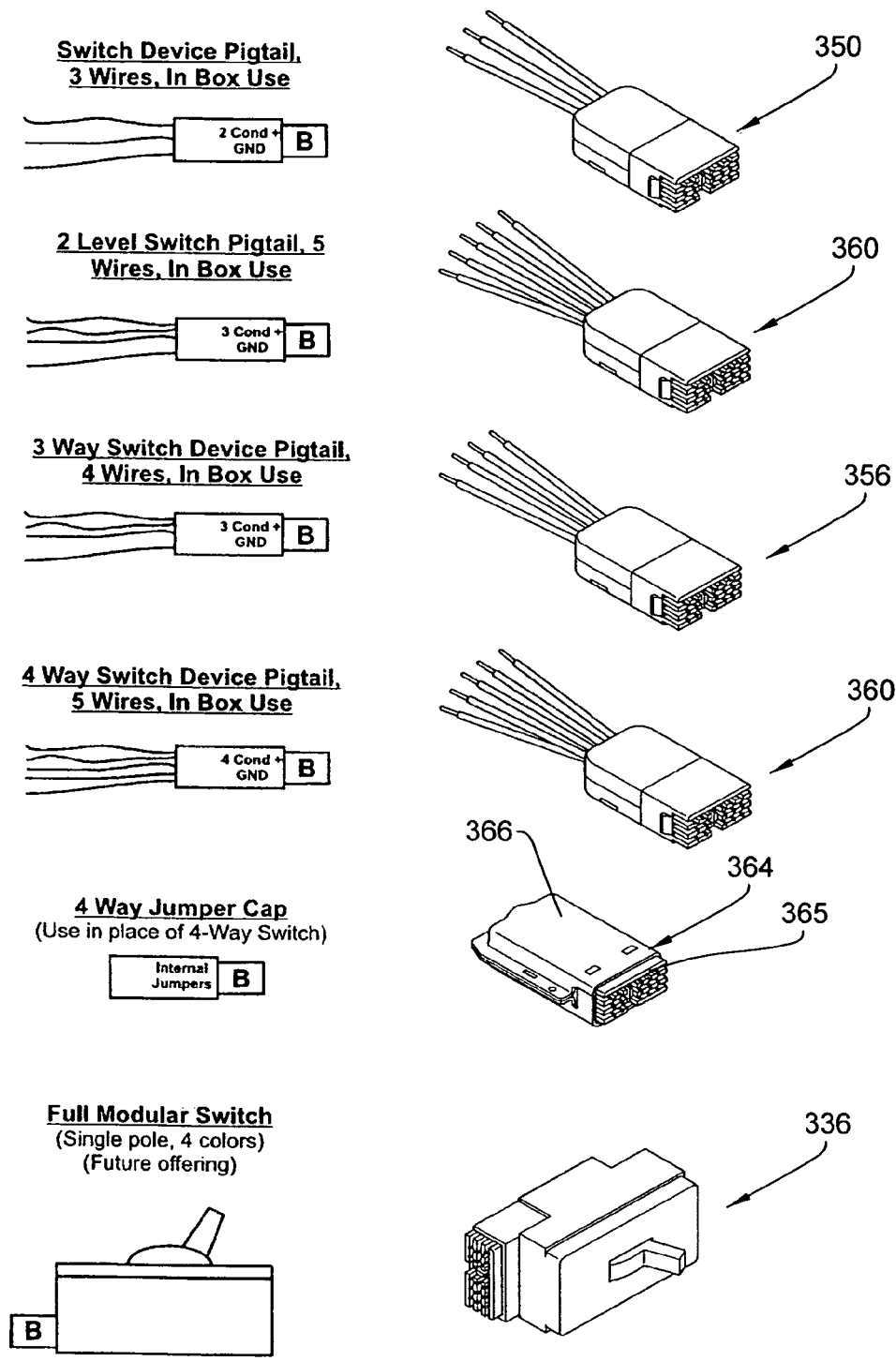
FIG. 31 illustrates various switch device pigtails.
Figure 36:
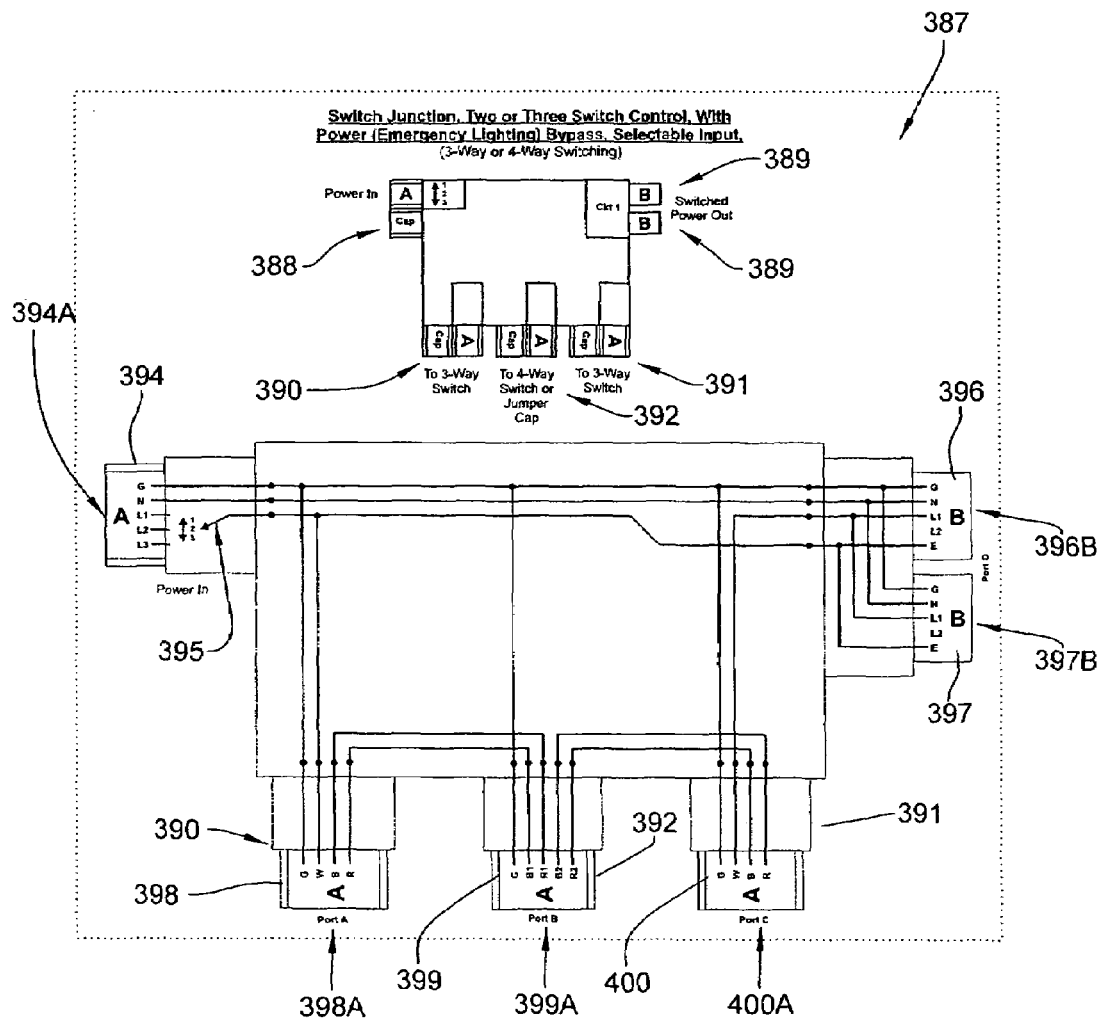
FIG. 36 diagrammatically illustrates an alternate switch junction three and four way switch configurations.

As seen in the comparison in FIG. 31, the three-wire switch pigtail 350, the four-wire, three-way switch pigtail 356 and the four-way, five-wire switch pigtail 360 are usable as described above. Further, the five-wire switch pigtail 360 may be used for wiring of a two-level switch. Further, a four-way jumper cap 364 may be provided in place of a four-way switch. This jumper cap 364 has a contact block 365, a metal housing 366 and internal jumpers within the housing 366 wired appropriately to replace the four-way switch in the switch junction 387 (FIG. 36). As previously described above, the various pigtail assemblies also may be more easily replaced with pre-wired, factory-manufactured switches such as the switch 336.

The foregoing switch components are described and would be provided at the end of a switch leg 35 to control system devices, and most commonly, lighting fixtures by using conventional wiring principles.

In addition to the individual switch components, the system 10 further includes various switch connectors that allow for construction of switch circuits, as well as the additional components for connecting lighting fixtures to this system.

Figure 32:
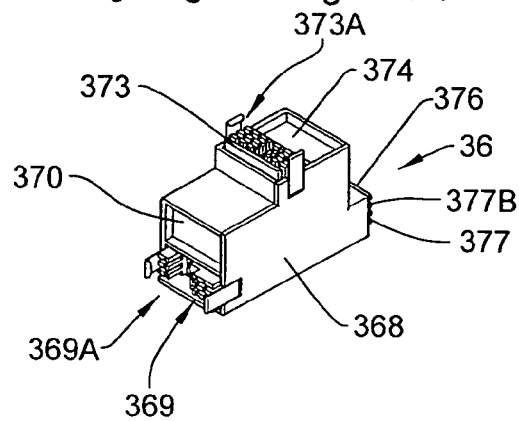
FIG. 32 illustrates a three-way switch connector junction.
Figure 35:
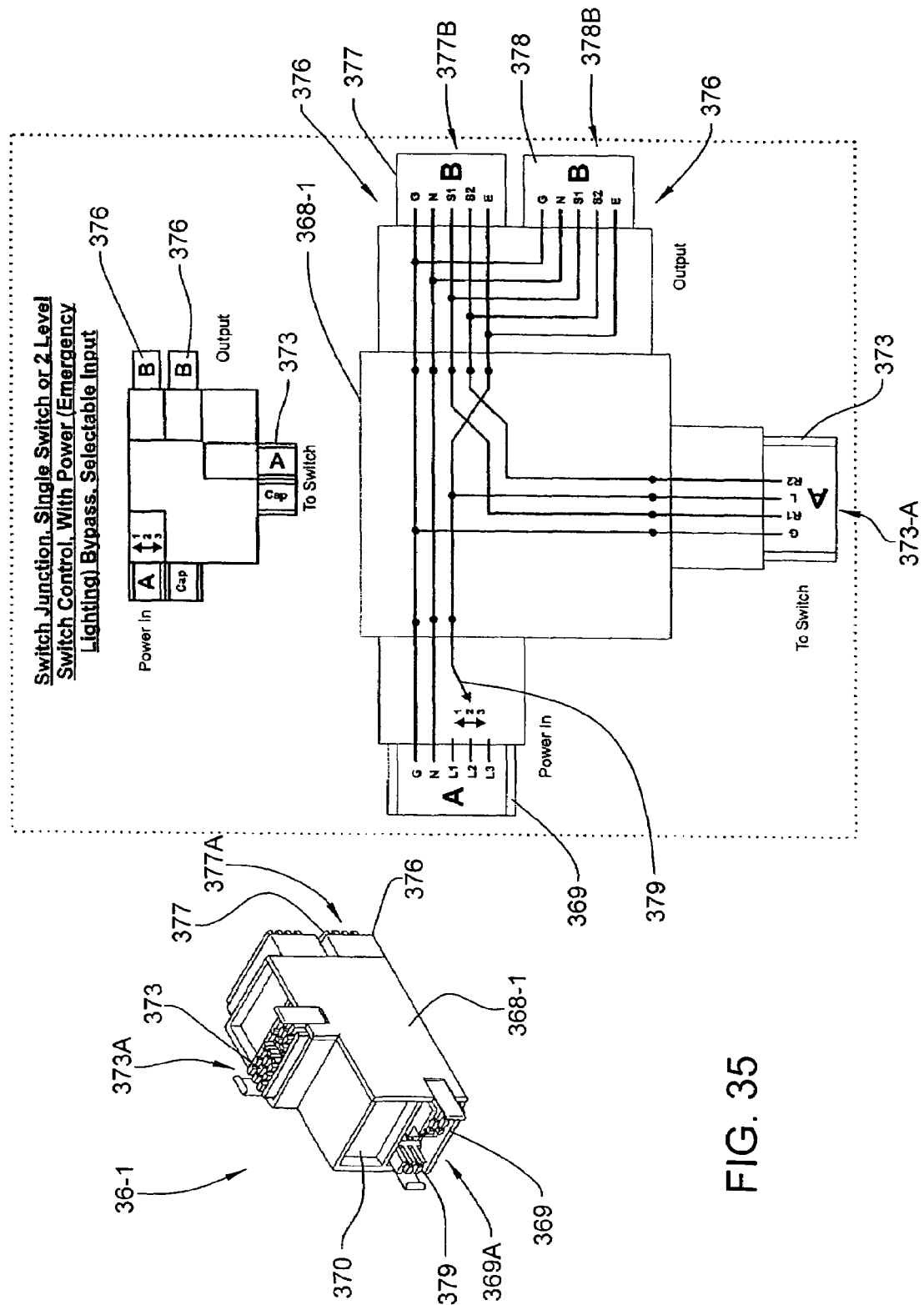
FIG. 35 diagrammatically illustrates a switch junction.

In this regard, FIGS. 32 and 35 illustrate the switch connector 36 which was previously illustrated in FIG. 1A. This switch connector 36 includes a housing 368 and has a circuit selectable contact block assembly 369 defining an A connector 369A for connection to the downstream B connectors 122B of a flexible conduit unit 34. This contact block is located next to a recessed cap 370 wherein the contact block 369 would connect to one of the B connectors 122B with the other B connector 122B being enclosed within the cap 370 as generally indicated by arrow 371 in FIG. 1A. Alternatively, the end connector 122 may be shifted as indicated by arrow 372 so that only one of the end connectors 122B is connected to the contact block 369 while the other end connector 122B is exposed as seen in FIG. 1A for connection to an additional downstream conduit unit 34 supplied with power to all of its circuits.

Referring to FIGS. 32 and 35, the switch junction 36 also has an additional contact block 373 defining an A connector 373A adjacent to a cap 374. This contact block 373 in turn is connected to an additional conduit unit 34 which would define a switch leg 35 that connects to a junction box 48 and switch therein as previously described above. Thus, this would selectively control an additional output port 376 defined by contact block 377 formed as a B connector 377B. Hence, the A connector 369A defines an input port, the connector 373A defines a switch port, and the connector 377B defines an output port which would be used in the configuration illustrated in FIG. 1A. This switch junction 36 is wired similar to that described below with respect to FIG. 35.

As to FIG. 35, an alternate switch junction 36-1 is illustrated having a housing 368-1 which supports the circuit selectable contact block 369 adjacent the cap 370. The additional contact block 373 is provided defining the A connector 373A and a first outlet port 376 is provided and defined by the contact block 377. In this illustrated embodiment a second output port 376 is defined by another contact block 378 which defines a B connector 378B.

As to the internal wiring illustrated in FIG. 35, the switch junction 36-1 has the ground and neutral wires stationarily positioned in the contact block 369 and connected to corresponding stationary positions in the contact blocks 377 and 378 wherein the ground and neutral contacts in the blocks 377 and 378 are wired in parallel.

Additionally, the contact block assembly 369 includes the movable contact shroud 379 that is movable for circuit selection of any of Line 1, Line 2 or Line 3 carried by an upstream system component. The internal conductor connected to the contact shroud 379 thereby extends and connects to the respective contacts E and the contact blocks 377 and 378 which thereby is continuously powered and is usable for an emergency lighting system wherein the emergency lights remain off when power is being supplied thereto and automatically turn on in the absence of electrical power received through the E contacts. Also, the contact blocks 377 and 378 provide access to the ground and neutral contacts.

As to the contact block 373, this contact block has a contact hard-wired to the ground contacts of blocks 369, 377 and 378. As the contact L is connected to a downstream system component such as the conduit unit 34, the appropriate switch is connected to line L and then selectively provides power to contacts R1 and R2 in contact block 373. These return wires labeled as R1 and R2 in turn connect respectively to the S1 and S2 contacts in contact blocks 377 and 378. Only one of these, such as R1, may be connected to the switch light for a single switch situation wherein additional downstream conduit units 34 may be selectively connected to each of the B connectors 378B and 377B. It is possible, however, to use the R1 and R2 contacts to provide for two-level switch control of two-level lighting, namely dim and bright, which would be controlled through the switch leg.

Figure 33:
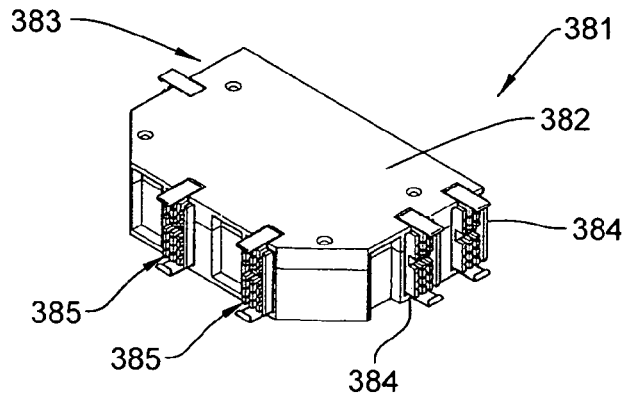
FIG. 33 illustrates a three/four-way switch connector junction.

Referring to FIG. 33, a switch connector 381 is illustrated as being developed for three/four way switch connections. The switch connector 381 has a housing 382 which supports various contact blocks therein to define an input port 383, a pair of output ports 384 and a pair of switch ports 385. The switch connector 381 is wired to develop three and four-way switch connections.

In more detail, a further switch connector 387 is illustrated in FIG. 36 for use with two or three switch control with power bypass, such as for emergency lighting, and having a selectable input. The switch junction 387 essentially has an input port 388, a pair of output ports 389, a pair of switch ports 390 and 391 configured for three-way switching and another switch port 392 which is usable for a four-way switch configuration or is capped when the switch junction 389 is used only for three-way switching. The various ports 388-392 are configured using contact blocks arranged in A or B configurations using the above-described construction principles and thus, significant detail is not provided herein as to the specifics of such structure.

More generally, the input port 388 is defined by a contact block 394 which defines the A connector 394A. This contact block 394 is circuit selectable and has a movable contact shroud 395 for selecting one of Lines 1, 2 or 3. The outlet ports 389 have their own respective contact blocks 396 and 397 which define B connectors 396B and 397B for downstream connection to lighting fixtures which are controlled by the switches connected to the various switch ports 390-392. Additional contact blocks 398, 399 and 400 are provided to define ports 390-392 and thereby define A connectors 398A, 399A and 400A. Internal wiring within the switch junction 387 is connected as follows, wherein the ground contact in the A connector 394A is interconnected internally with all of the ground contacts of the contact blocks 396-400. The line contact selected in block 394 also is interconnected to the emergency contacts E of contact blocks 396 and 397 as well as the line contact W in block 398. For both three and four-way switching, a switch leg 35 is interconnected to the switch port 390. Additionally, the switch leg provides return power through black and red wires to the contacts B and R which are labeled using standard electrical convention.

These contacts B and R of contact block 398 then connect to the first black and red designated contacts B1 and R1 in contact block 391 which are located adjacent to second black and red contacts B2 and R2 in this same contact block. In a four-way switch configuration, an additional four way switch leg would control these contacts B1, B2, R1 and R2 using electrical conventions.

The third switch port 391 has the white contact W connected to the line contacts L1 and L1 of the two contact blocks 396 and 397 to provide a completed circuit thereto. The black and red contacts B and R in block 400 are interconnected to the B2 and R2 contacts of block 399 and are controlled by an additional switch leg which interconnects these contacts B and R with the contact W through three and four-way switch conventions. To define a three-way switch, a switch leg would be provided to the switch ports 390 and 391 with the switch port 392 being connected to the above-described four-way jumper cap 364 which would be used in place of a four-way switch leg. This jumper cap would interconnect the B1 and B2 contacts with each other and the R1 and R2 contacts with each other for downstream connection to the B and R contacts in contact block 400. For a four-way switch configuration, the port 392 would instead be connected to a switch leg which would be switched in accordance with four-way switch convention. In this manner, the switch junction 387 may be used to define either three or four-way switch configurations.

Figure 34:
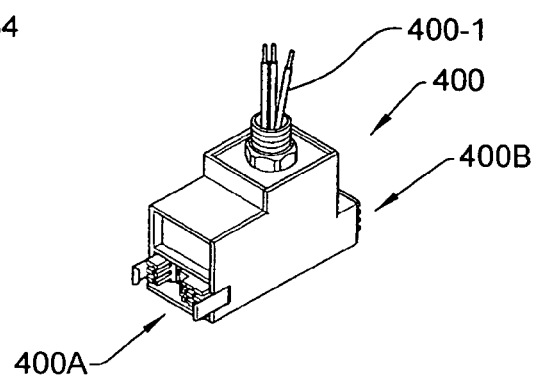
FIG. 34 illustrates a fixture connector.

As to FIG. 34, a switch controller 400 has an input A connector 400A receiving selected power in, an output B connector 400b which is direct connected to the A connector 400A and supplies switched power out to a downstream light fixture governed by the switched power in, and a fixture supplying pigtail 400-1 which is connected to a light fixture 30 to also route the switched power in to the light fixture.

Figure 37:
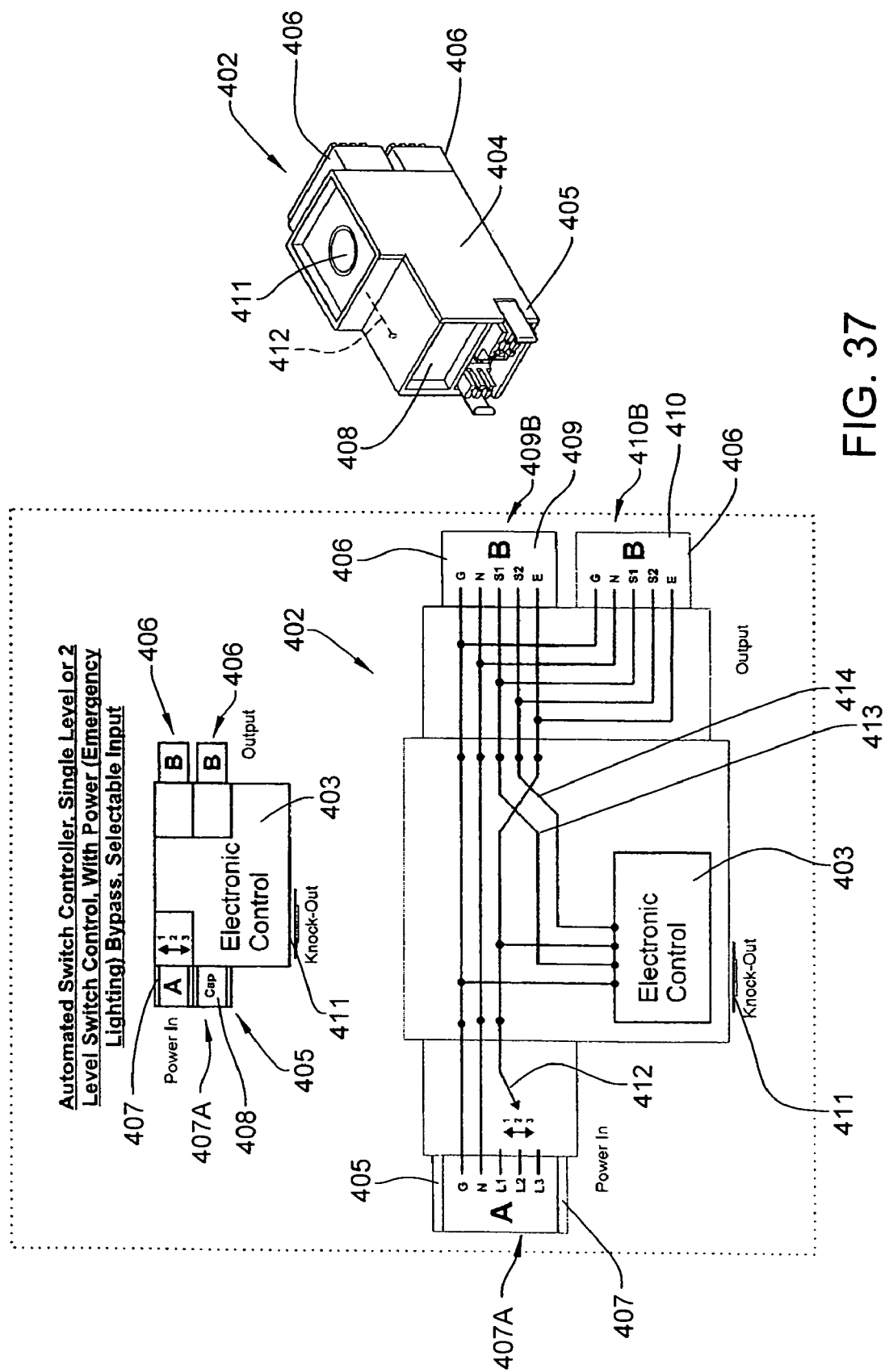
FIG. 37 diagrammatically illustrates an automated switch controller.

Referring to FIG. 37, an additional automated switch controller 402 is provided and has an automated electronic control 403 which may be a wireless controller. This switch controller 402 has a housing 404 in which is defined an input port 405 in an A configuration and two output ports 406 in a B configuration. More particularly, the input port 405 has a contact block 407 that is configured as an A connector 407A disposed adjacent a cap 408. The output ports 406 are defined by two sidewardly adjacent contact blocks 409 and 410 which define B connectors 409B and 410B. Internally of the housing 404, the electronic control 403 is provided which as previously indicated serves as an electronic switch and may be operated wirelessly in a conventional manner. The housing includes a knock-out 411 through which a low voltage control circuit may be connected. Additionally, an additional antenna 412 may be provided when the control 403 is operated wirelessly.

As to the internal wiring, the ground contact of contact block 405 is connected to the ground contacts of the electronic control 403 as well as of the contact blocks 409 and 410. The neutral contact N of contact block 405 in turn is connected to the neutral contacts N of the blocks 409 and 410. As to the line contacts, the contact block 405 has a movable contact shroud 412 so that the input port is circuit selectable between Lines 1, 2 or 3 (L1, L2, L3) which contact shroud 412 also connects to the emergency contacts E of blocks 409 and 410 which thereby provides for power bypass such as for emergency lighting as previously described above.

Additionally, the contact shroud 412 also supplies power to the electronic control 411 which selectively switches same between conductors 413 and 414 that in turn connect to switch contacts S1 and S2 of blocks 409 and 410. This allows for either control of a single lighting circuit through contacts S1 or for two-level lighting fixtures having low and high lighting levels.

With the foregoing switch components and any other needed switch components that might be designed using the above principles, the system 10 provides a universal solution to virtually all of the electrical wiring needs in a non-residential building, including lighting, receptacles and other equipment power needs. While primarily developed for non-residential power distribution, this system also could be adapted to residential and non-commercial applications.

As will be described hereinafter, the various components also are designed to accommodate different voltage designs for the circuits through a keying feature provided in the various components. The keying feature is disclosed herein in some components as being fixed and non-adjustable, while in other components being adjustable for setting either at the factory for a selected voltage level or in the field during wiring of the individual components. The keying feature may be settable only once or may be rekeyable in accord with the following discussion. Also, all components may have a fixed key, preset key, or adjustable key, or the components may have different variations of different key types. The overall keying system is highly flexible and readily usable with different voltage levels for which the overall system is being designed.

III. Exemplary Circuit Design

Figure 38:
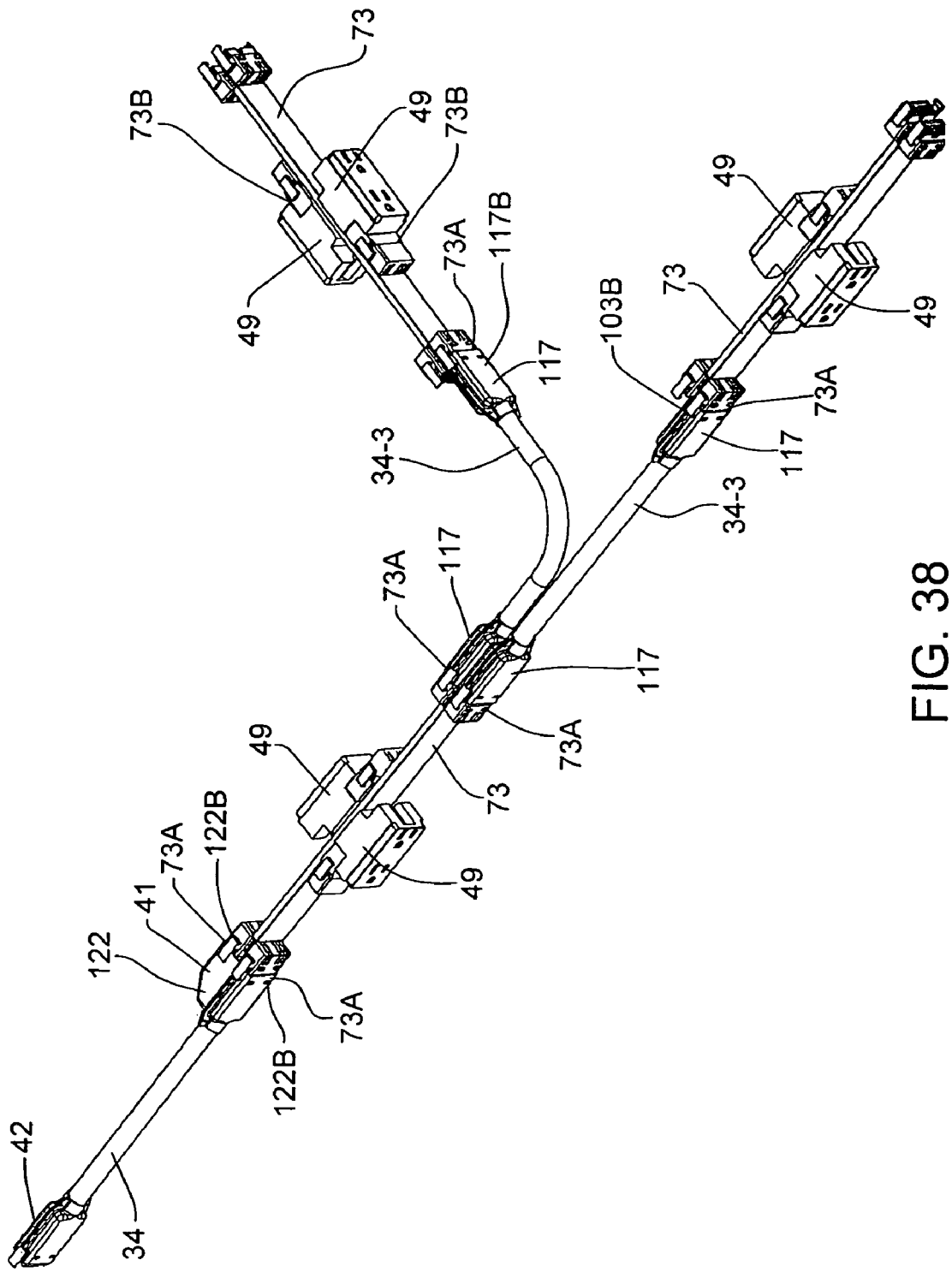
FIG. 38 is an isometric view of a first exemplary assembly of system components for use in a wall panel.
Figure 66:
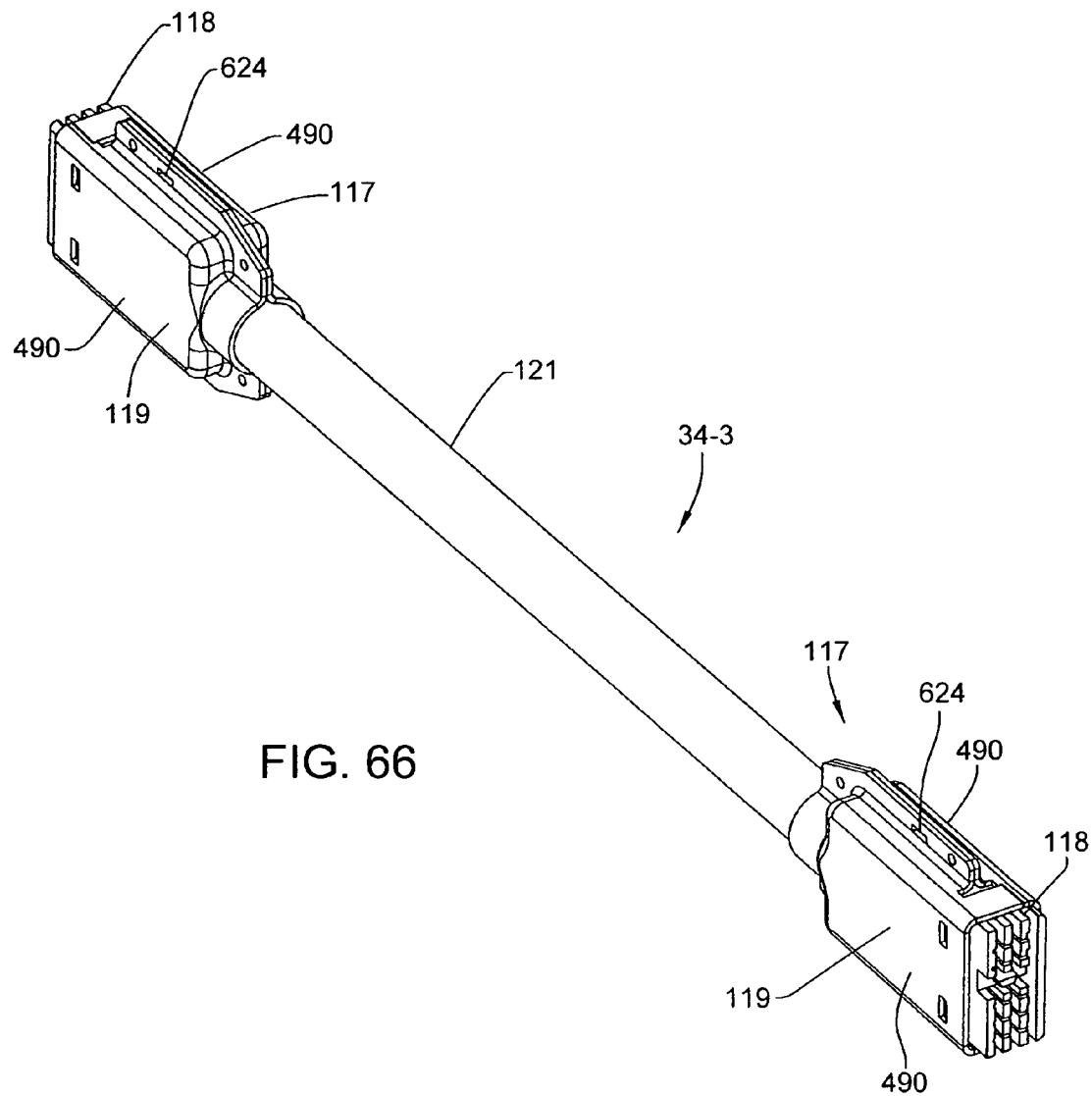
FIG. 66 illustrates a flexible conductor with two single ends on the opposite ends thereof.
Figure 67A:
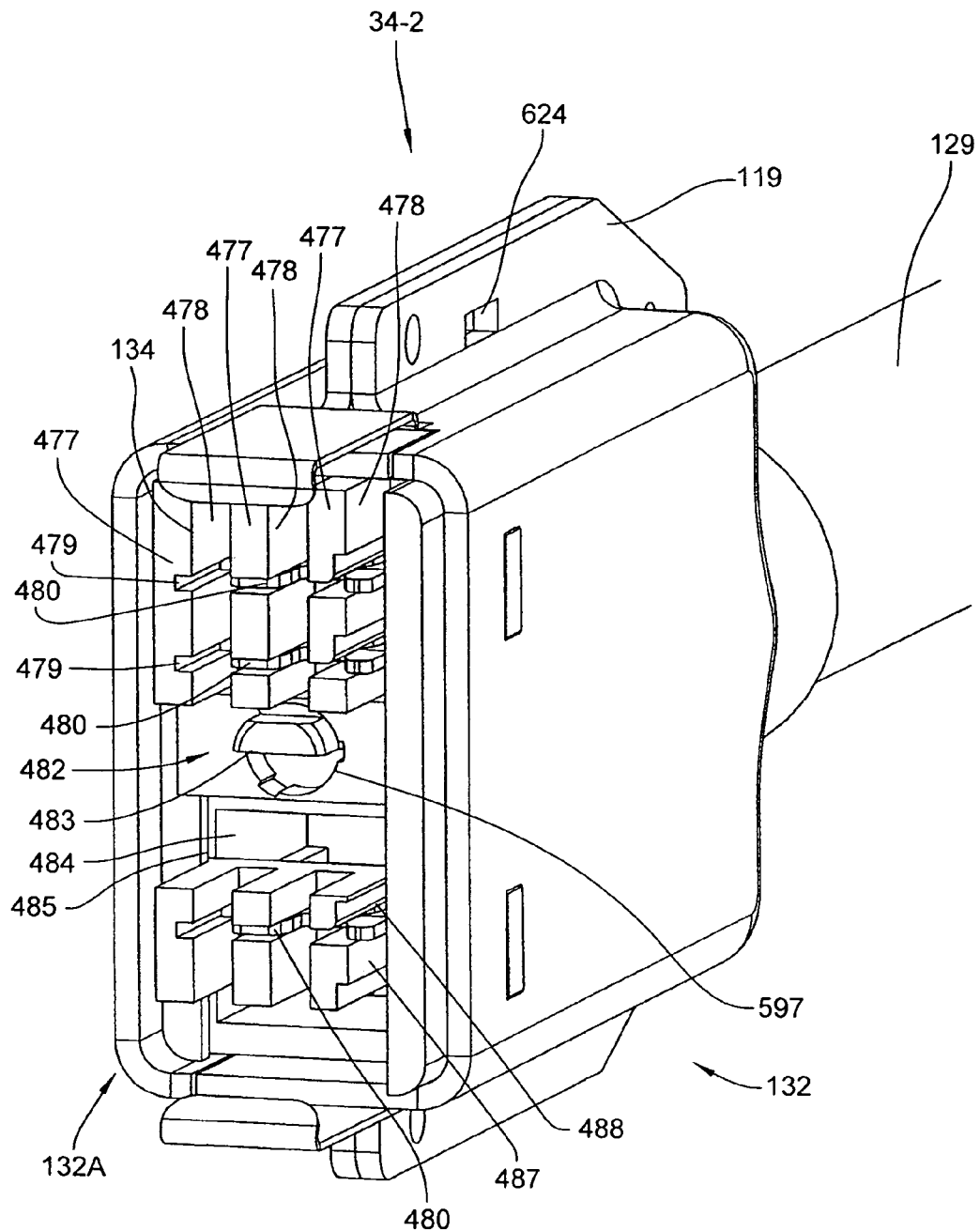
FIG. 67A illustrates a single connector end with a circuit selection feature.
Figure 67B:
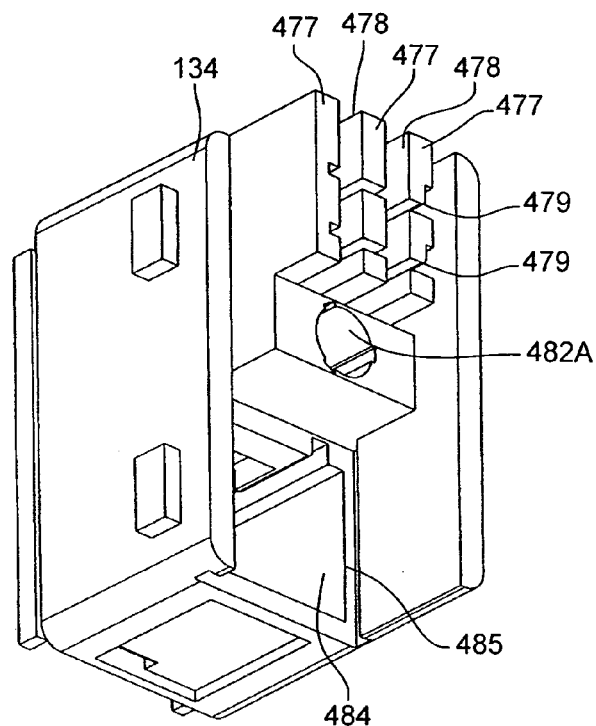
FIG. 67B illustrates a circuit selectable contact block.
Figure 67C:
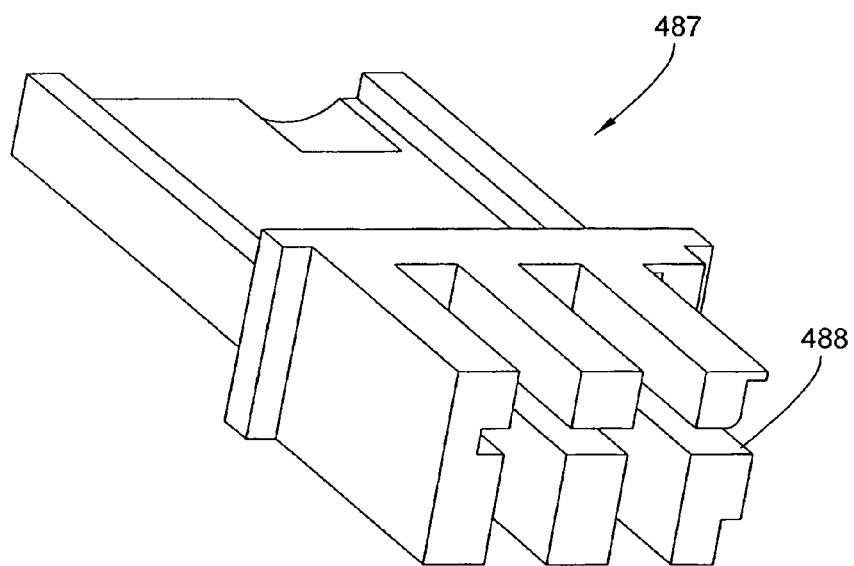
FIG. 67C illustrates a slidable contact shroud.
Figure 67D:
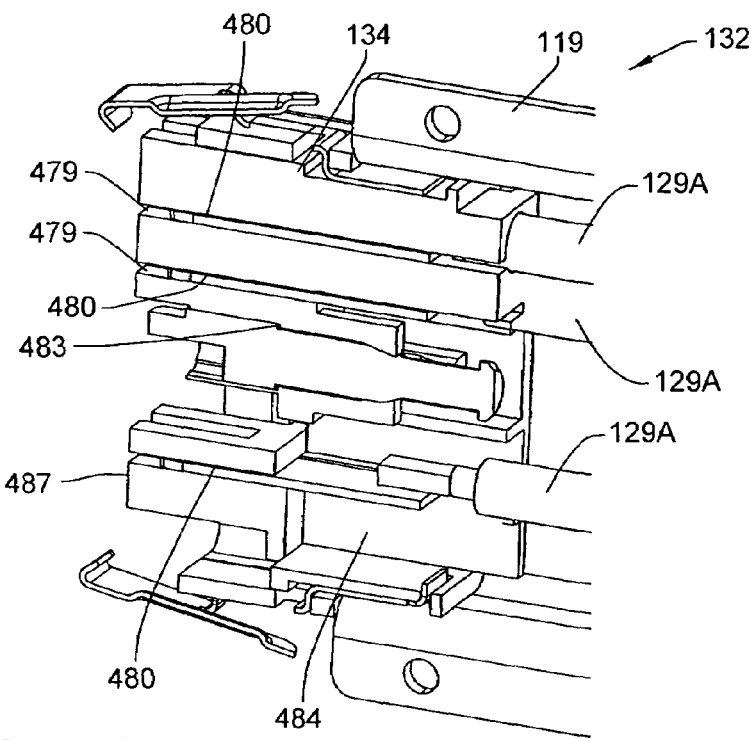
FIG. 67D is an isometric cross-sectional view of the single connector end.
Figure 67E:
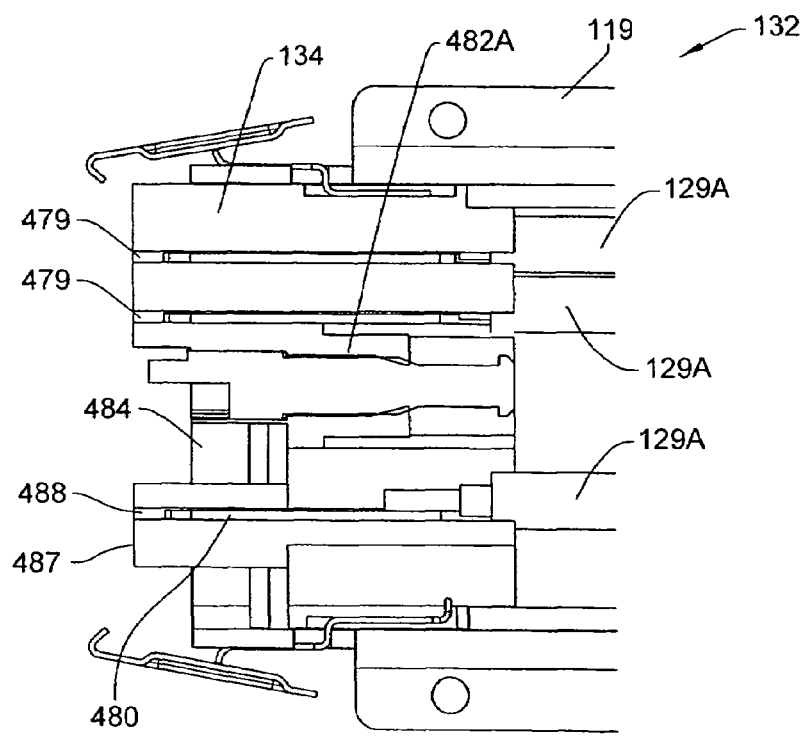
FIG. 67E is an elevational cross-sectional view thereof.

With the above-described system components, the various electrical needs of the building can be readily accommodated by assembling the components in the desired configuration. Referring to FIG. 38, an exemplary arrangement is illustrated for the wall panel configuration of FIG. 4. In particular, the leftmost conduit unit 34 connects at its upstream single plug 42 to another system component supplying power thereto and connects at its downstream double plug 41 to the two adjacent A connectors 73A of a PDA 73 to supply power thereto. The downstream A connectors 73A of this PDA 73 in turn connect to the single plugs 117 of two different single-ended conduit units 34-3 (FIG. 66). It will be understood this conduit unit 34-3 could also be replaced with a flex connector 75. The front conduit unit 34-3 extends linearly and passes directly to a downstream wall panel 68 which is shown in FIG. 4 but is omitted from FIG. 38 for clarity. This downstream wall panel 68 has its own PDA 73 therein wherein the single end connector 117 has the B connector 117B thereof connected to one of the PDA A connectors 73A. This supplies power to the two PDA receptacles 49 mounted thereto.

As to the other or second conduit unit 34-3 connected to the upstream PDA 73, this conduit unit 34-3 makes a right angle bend into a wall panel oriented perpendicular to the above-described wall panels in which the PDA 73 are linearly arranged. This right-angle wall panel 68 as seen in FIG. 4 has its own PDA 73 mounted therein wherein one of the upstream A connectors 73A connects to the downstream B connector 117B of the conduit unit 34-3. This combination of conduit units 34-3 (or flex connectors 75), PDA 73, receptacles 49, and any other system components supplying power thereto may be readily adapted for mounting in raceways located in wall panels 68 as well as raceways located in other furniture components such as floor-to-ceiling walls or desking.

Figure 39:
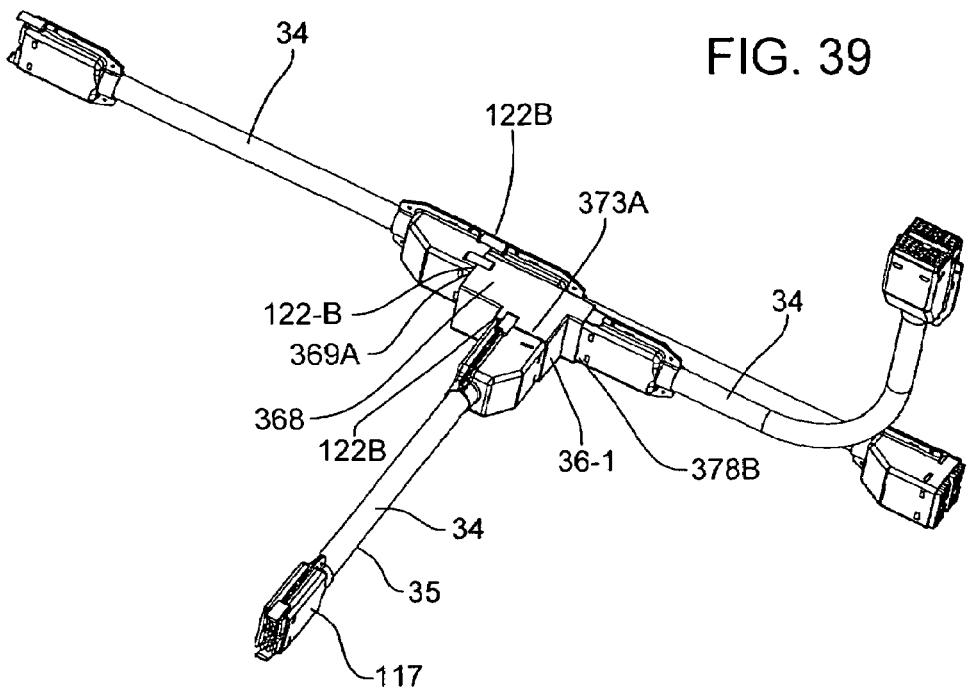
FIG. 39 illustrates a second exemplary assembly of system components including a switch junction for use in building cavities such as ceiling or floor raceways.
Figure 40:
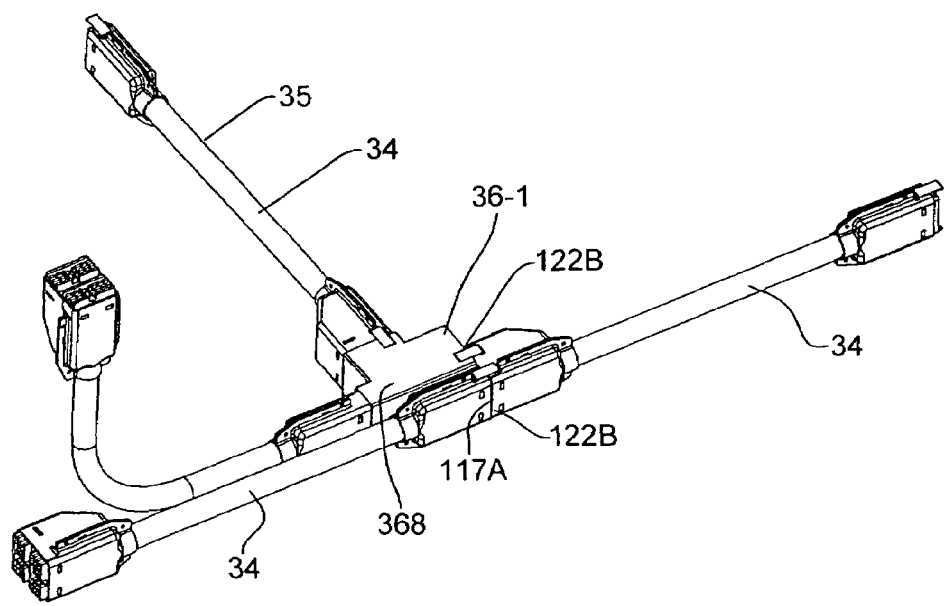
FIG. 40 is a rear view of the assembly of FIG. 39.

Referring to FIGS. 39 and 40, an additional circuit connection is illustrated using the switch junction 36-1 (FIG. 35). In this configuration, a first conduit unit 34 has one of its two B connectors 122B connected to the A connector 369A to supply power to the switch junction 36-1. This power is then provided through A connector 373A to a corresponding one of the B connectors 122B of a conduit unit 34 that defines a switch leg 35 of the electrical circuit. The downstream single end connector 117 is adapted for connection to an electrical box 48 and an appropriate switch described above that has a B connector adapted to connect to the end connector 117. In turn, a further conduit unit 34 is plugged into the B connector 378B so as to be downstream connected to a lighting fixture 30 (FIG. 1A).

Referring to the first conduit unit 34, this is connected in an offset position so that its second end connector 122B is spaced sidewardly of the junction housing 368 which therefore allows an additional conduit unit 34 to have its upstream end connector 117A plugged therein to supply all of the circuits downstream with power and to thereby supply power to other lighting or receptacle circuits such as in FIG. 1A.

Following FIGS. 41-50 are provided to diagrammatically illustrate other wiring configurations.

Figure 41:
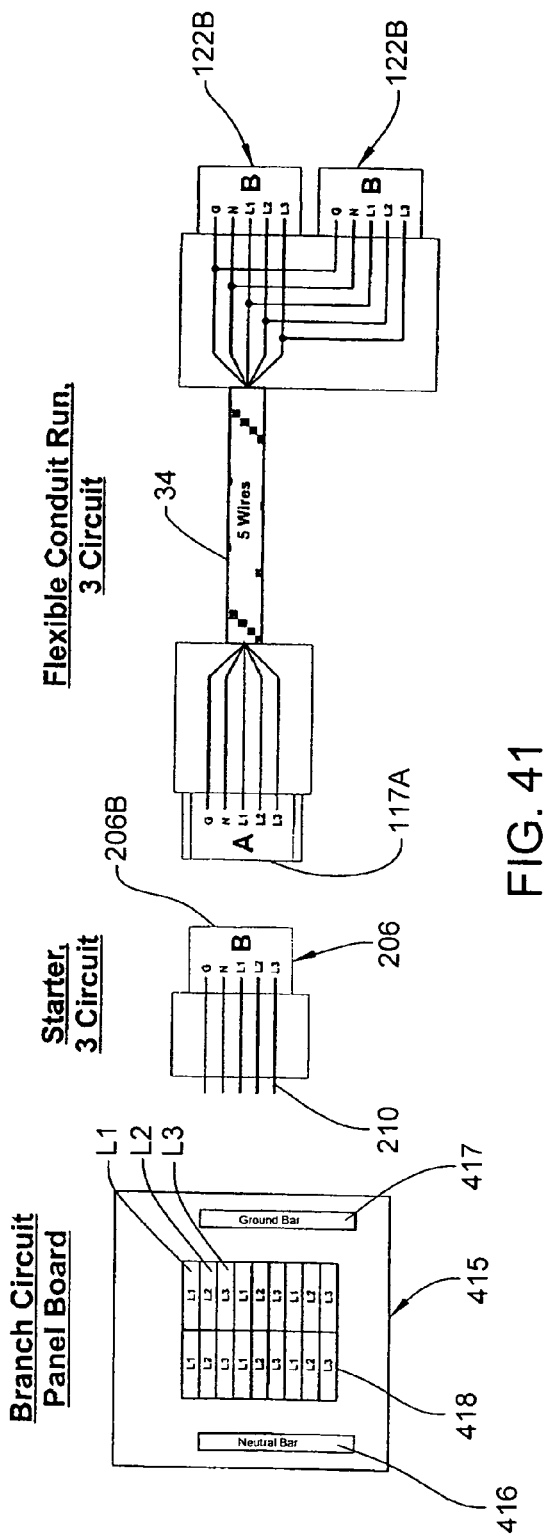
FIG. 41 illustrates a first portion of an exemplary system configuration.
Figure 42:
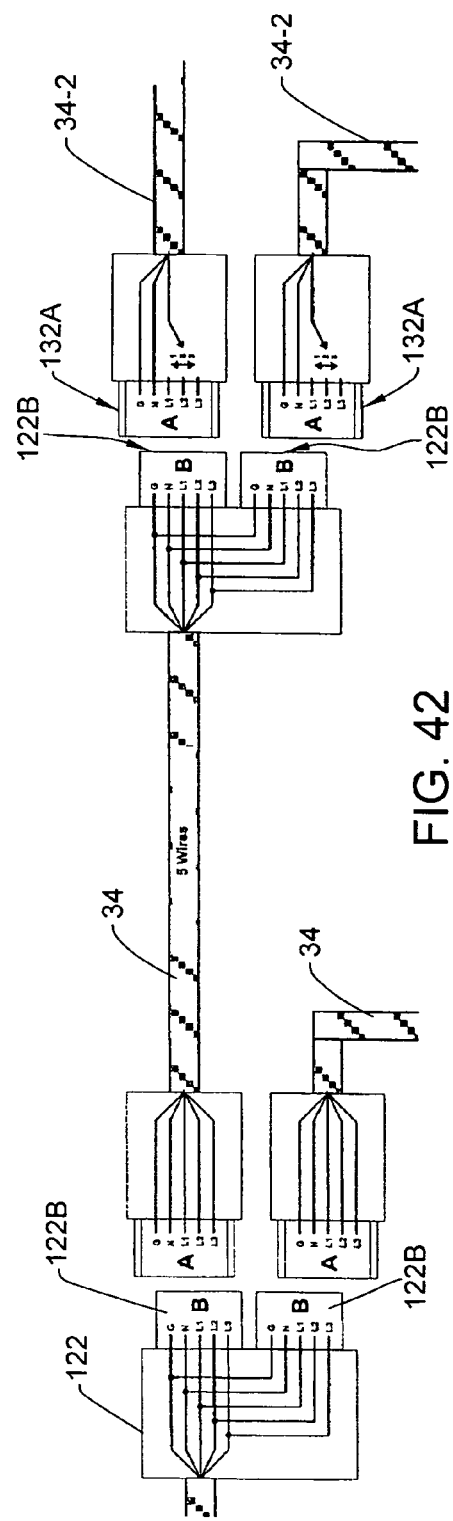
FIG. 42 illustrates a second portion thereof.
Figure 43:
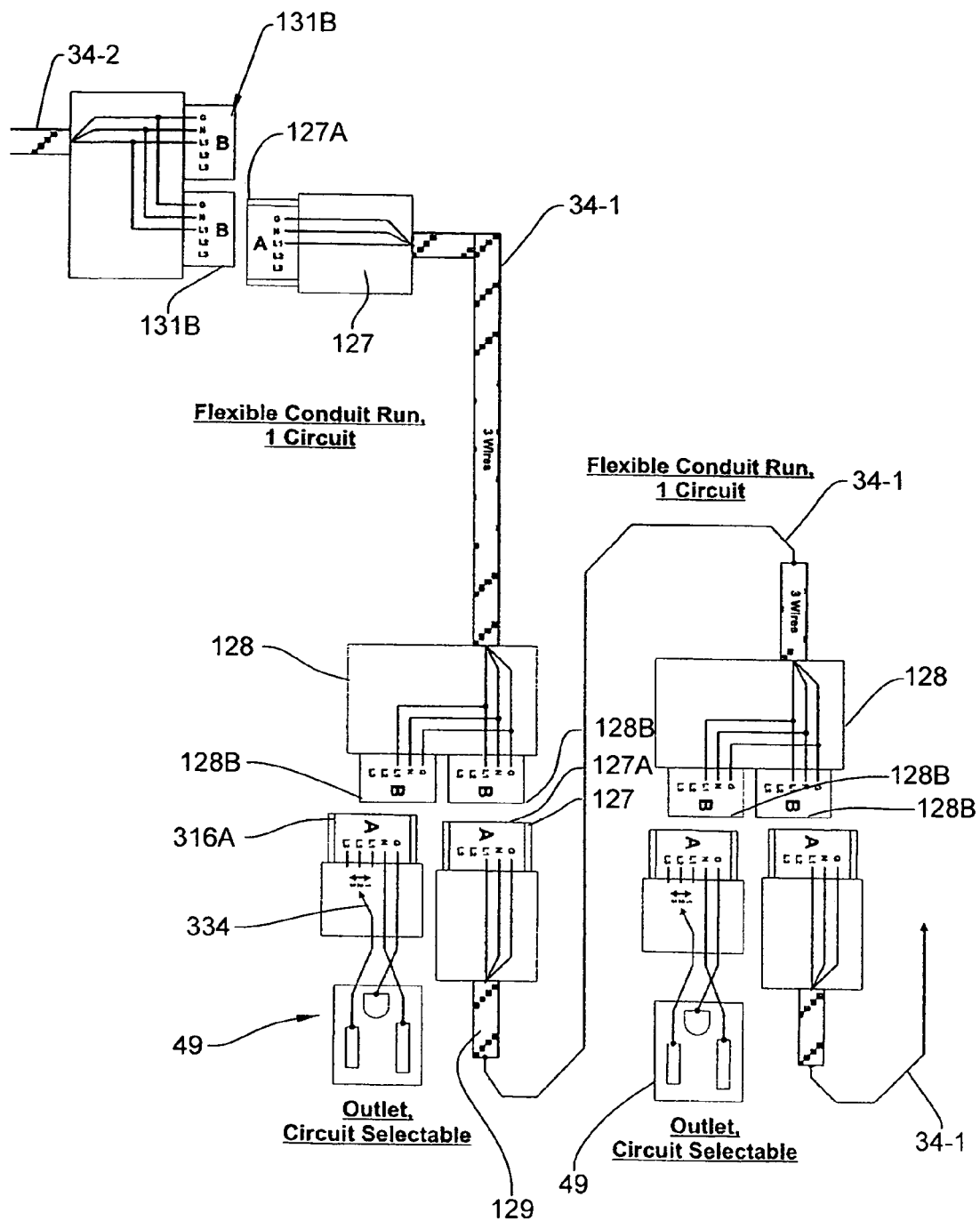
FIG. 43 illustrates a third portion thereof.

FIG. 41 illustrates the interconnection of a first conduit unit 34 to a branch circuit panel board 415 which power panel includes a neutral bar 416, a ground bar 417 and an array of connection slots 418 arranged in groups of three slots dedicated to Line 1, Line 2 and Line 3 to which a circuit starter will be connected. In this regard, a five-wire, three-circuit starter 206 (FIG. 13) is shown which is interconnected with its ground and neutral contacts G and N respectively connected to the ground bar 417 and neutral bar 416 and the line L1, L2 and L3 contacts connected through wires 210 to a selected group of line connection slots L1, L2 and L3 in the panel board 415. The B connector 206B of the starter 206 thereby is accessible from the panel board for connection to downstream components. In this regard, a three-circuit flexible conduit run 34 (FIG. 8) is connected with its upstream A connector 117A plugged into the B connector 206B. This supplies continuous power and electrical contact between the respective contacts G, N, L1, L2 and L3. It will be understood that the other diagrams of FIGS. 41-50 also diagrammatically illustrate the plugging interconnection and electrical contact between respective A and B connectors even though spaces are shown therebetween for diagrammatic purposes. Once the conduit unit 34 is plugged into the starter 206, the downstream B connectors 122B are available for downstream connection of additional components. Referring to FIG. 42, this double end connector 122 has its B connectors 122B each plugged into respective five-wire, three-circuit flexible conduits 334 which are routed through the various building cavities whether in ceiling, wall or floor cavities.

To the right in FIG. 42, the B connectors 122B are each connected to a circuit selectable, one-circuit conduit unit 34-2 which may be used to route power to only one of the three circuits downstream to additional components that need only be operated on such single circuit. For example, in FIG. 43, the one upper conduit unit 34-2 has its respective B connectors 131B positioned with one B connector 131B being open for connection to other components, and the other B connector 131B being pluggingly engaged with a dedicated single circuit flexible conduit unit 34-1 and in particular, the end connector 127A thereof. The downstream B connectors 128B then supply power to additional circuit components.

While not illustrated, the downstream double end connector 128 would be fixedly engaged to a wall-mounted box 48 as generally illustrated in FIG. 21. A receptacle 49 (FIG. 26) is then plugged therein by interconnection of the A connector 316A to the B connector 128B. The receptacle 49 as discussed above relative to FIG. 26 has a movable circuit selection contact shroud 334 that allows selection of one of circuits L1, L2 and L3. However, since only circuit L1 is supplied with power from the single circuit flexible conduit 34-1, the circuit selector 334 would need to be in position 1 corresponding to line L1 to power the receptacle 49.

Within the same electrical box, an additional single circuit flexible conduit 34-1 has its single end connector 127 and the A connector 127A plugged into the upstream B connector 128B. The cable portion 129 thereof passes out of the wall box 48 through the bottom knock-out 289 (see also FIG. 96) so that the conduit unit 34-1 can continue to extend through the wall cavities 16 described above relative to FIG. 1A.

The downstream end of this connector 34-1 has its double end connector 128 again affixed to another wall-mounted box 48 wherein one of its B connectors 128B connects to another receptacle 49 and the other B connector 128B connects to a further downstream extending conduit unit 34-1. In this manner, the power can continue to be distributed serially through a series of interconnected receptacle boxes 48 located at spaced locations in either in the wall 13 and possibly even feeding a floor box 61 such as box 61 or even ceiling-mounted system devices such as ceiling-mounted receptacles 49.

Figure 44:
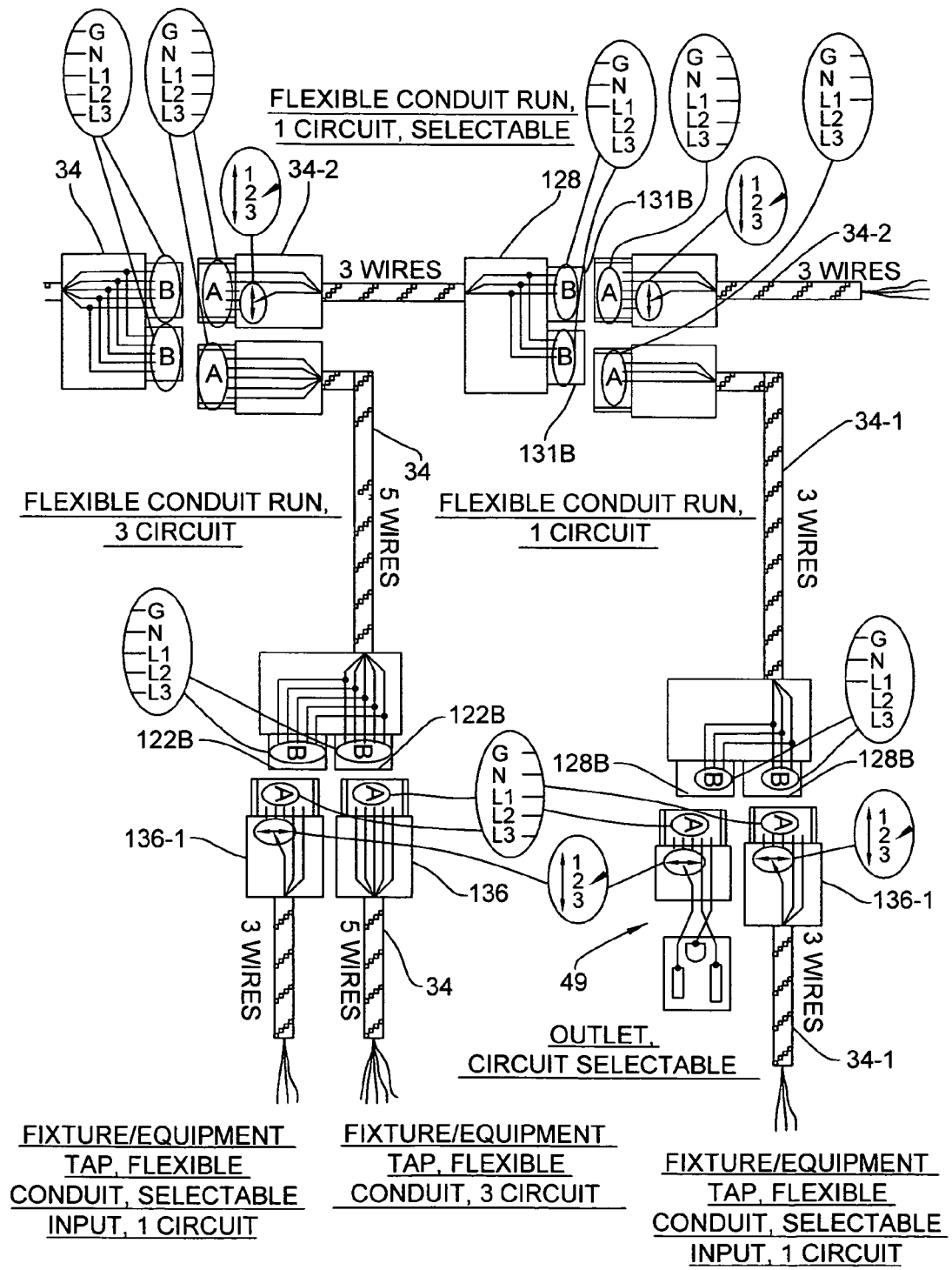
FIG. 44 illustrates an alternate third portion of an alternate system configuration.

Turning next to FIG. 44, an upstream flexible conduit unit 34 may be connected to two different types of such conduit units such as one conduit unit 34 which continues all three circuits L1, L2 and L3 downstream and a second circuit selectable, single-circuit conduit unit 34-2 (FIG. 8). The three-circuit conduit unit 34 in turn has its downstream B connectors 122B connected to different types of system components. First on the left side thereof, the left B connector 122B is connected to a circuit selectable single circuit, three-wire fixture tap 136-1 (FIG. 10) for supplying power to a fixture or equipment. The right B connector 122B in turn is connected to a five-wire fixture tap 136 for connection to its own equipment or possibly even hard wiring to other electrical components.

As to the single circuit conduit unit 34-2, the downstream double plug end 128 has one of its B connectors 128B connected to a circuit selectable, three-wire conduit unit 34-2 and the other of its B connectors 128B connected to a single circuit, three-wire conduit unit 34-1. This single circuit carried thereby extends to the B connectors 128B which are supported in a wall-mounted electrical box for connection first to a receptacle 49 and secondly to another circuit selectable, three-wire, single circuit equipment tap 136-1.

Figure 45:
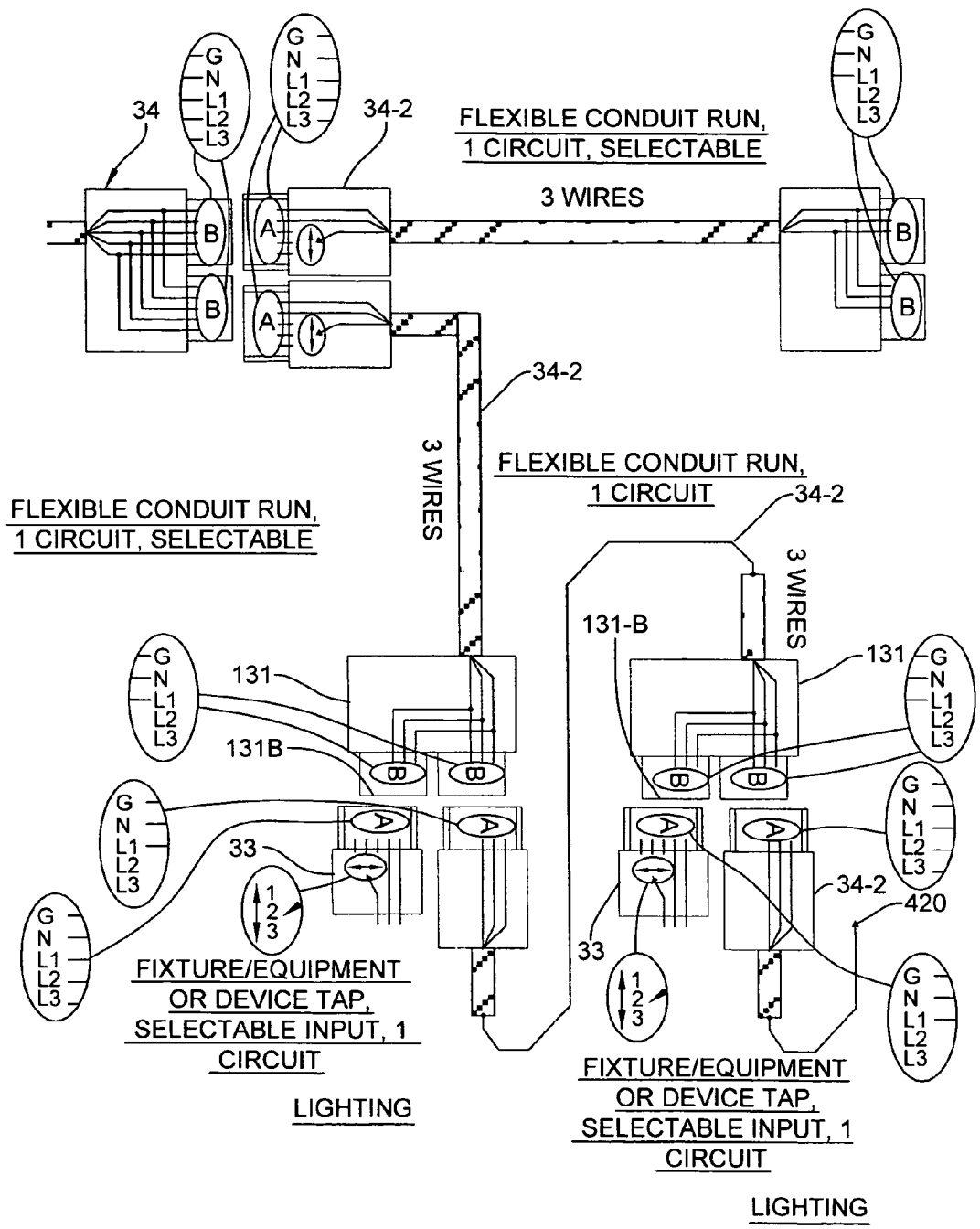
FIG. 45 illustrates a second portion of a further system configuration.

Referring to FIG. 45, the conduit unit 34 also may be connected to two separate circuit selectable single circuit conduit units 34-2 which allow for selective routing of one of the three circuits L1, L2 or L3 downstream therefrom wherein each of the conduit units 34-2 can be selected to a different one of the circuits. For the bottom conduit unit 34-2, the double end connector 131 thereof may be connected to a box 48 in which another single circuit conduit unit 34-2 is connected and extended downstream to another box which in turn is connected to another conduit unit 34-2. The other B connectors 131B of each of these conduit units 34-2 may then be connected to a device tap such as a circuit selectable single-circuit device tap 33 (FIG. 1A and FIG. 15), which fixture tap 33 can be connected to a light fixture 30. While the device tap 33 is circuit-selectable, it would need to have its circuit selector in the first position since the upstream conduit conductor 34-2 only has three wires accessible through the double end connectors 131. The last downstream conduit unit 34-2 may continue from location 420 (FIG. 45) to power additional light fixtures.

Figure 46A:
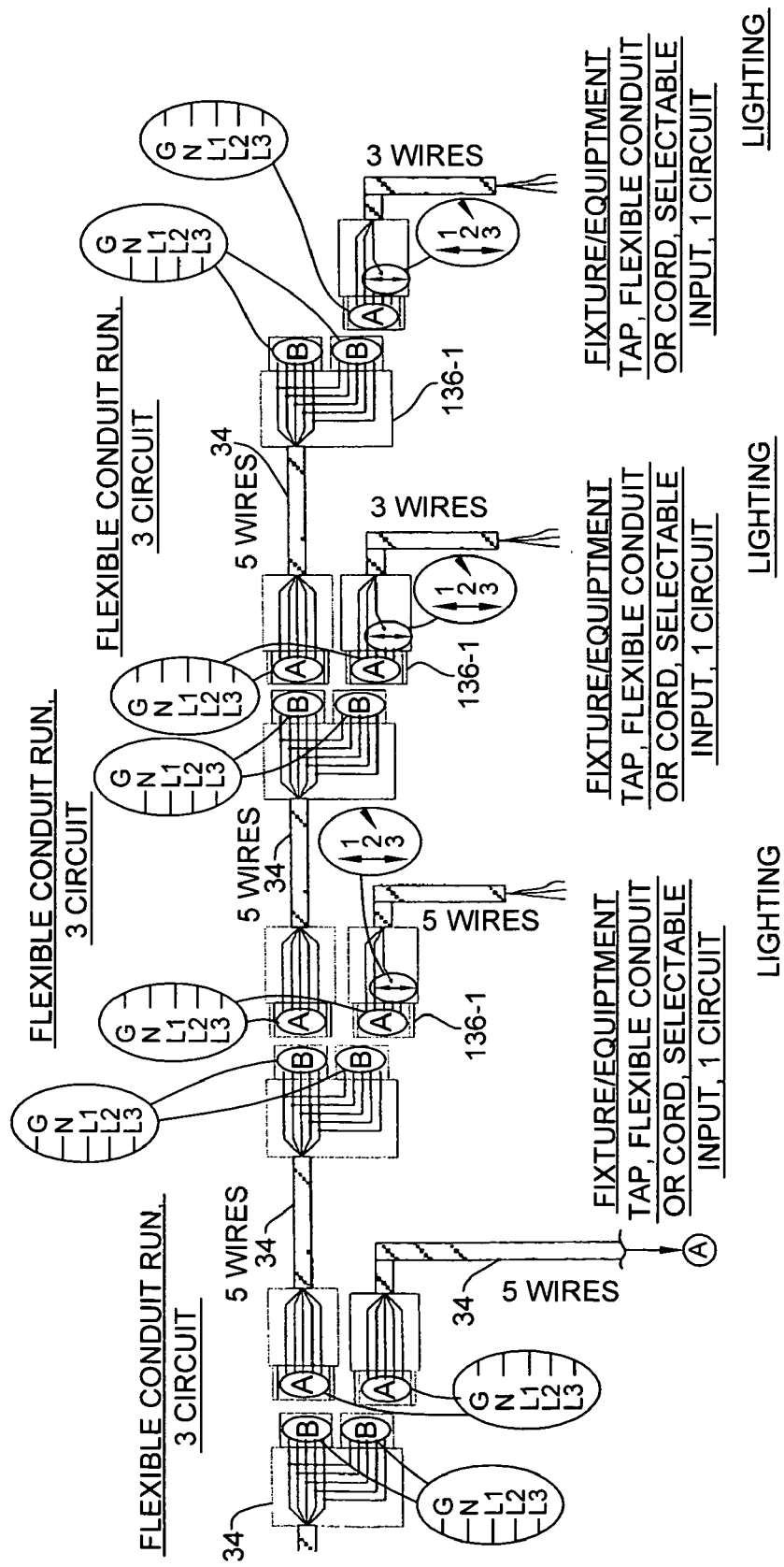
FIG. 46A illustrates a first section of a still further system configuration.
Figure 46B:
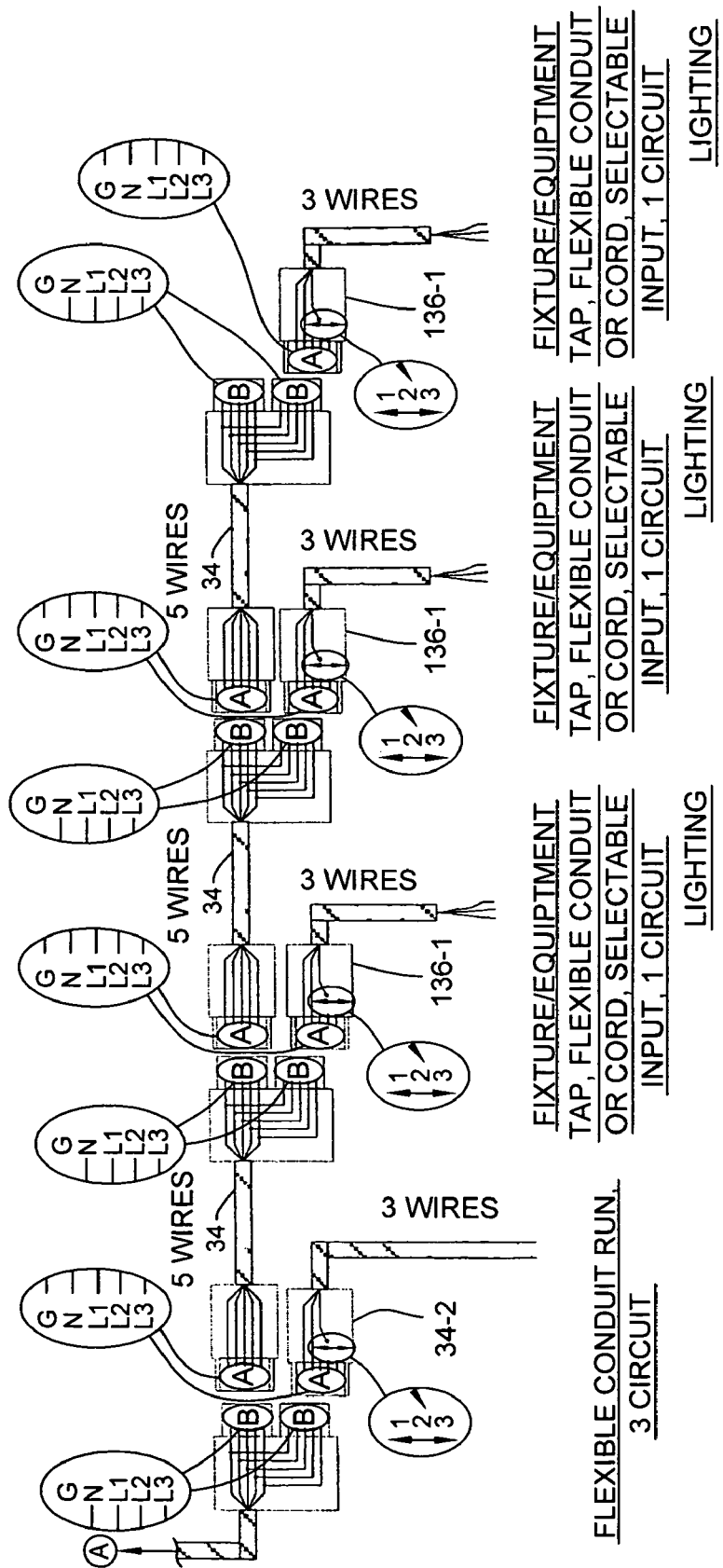
FIG. 46B illustrates a second section of a still further system configuration.

FIG. 46 illustrates an arrangement where all three circuits are carried throughout the electrical circuit through the serial interconnection of the five-wire conduit units 34 through the building cavities. At the upstream end of the illustrated circuit, two of these conduit units 34 are provided in a Y configuration to define two different circuit runs. The upper circuit runs have a plurality of single-circuit fixture taps 136-1 or if desired, 136-2 (FIG. 10). As to the other circuit leg at the bottom of FIG. 46, similar fixture taps 136-1 or even possibly 136-2 are provided where desired to supply fixtures or equipment. Also, it is possible to provide a three-wire circuit selectable conduit unit 34-1 to continue the circuit to additional equipment locations.

Figure 47A:
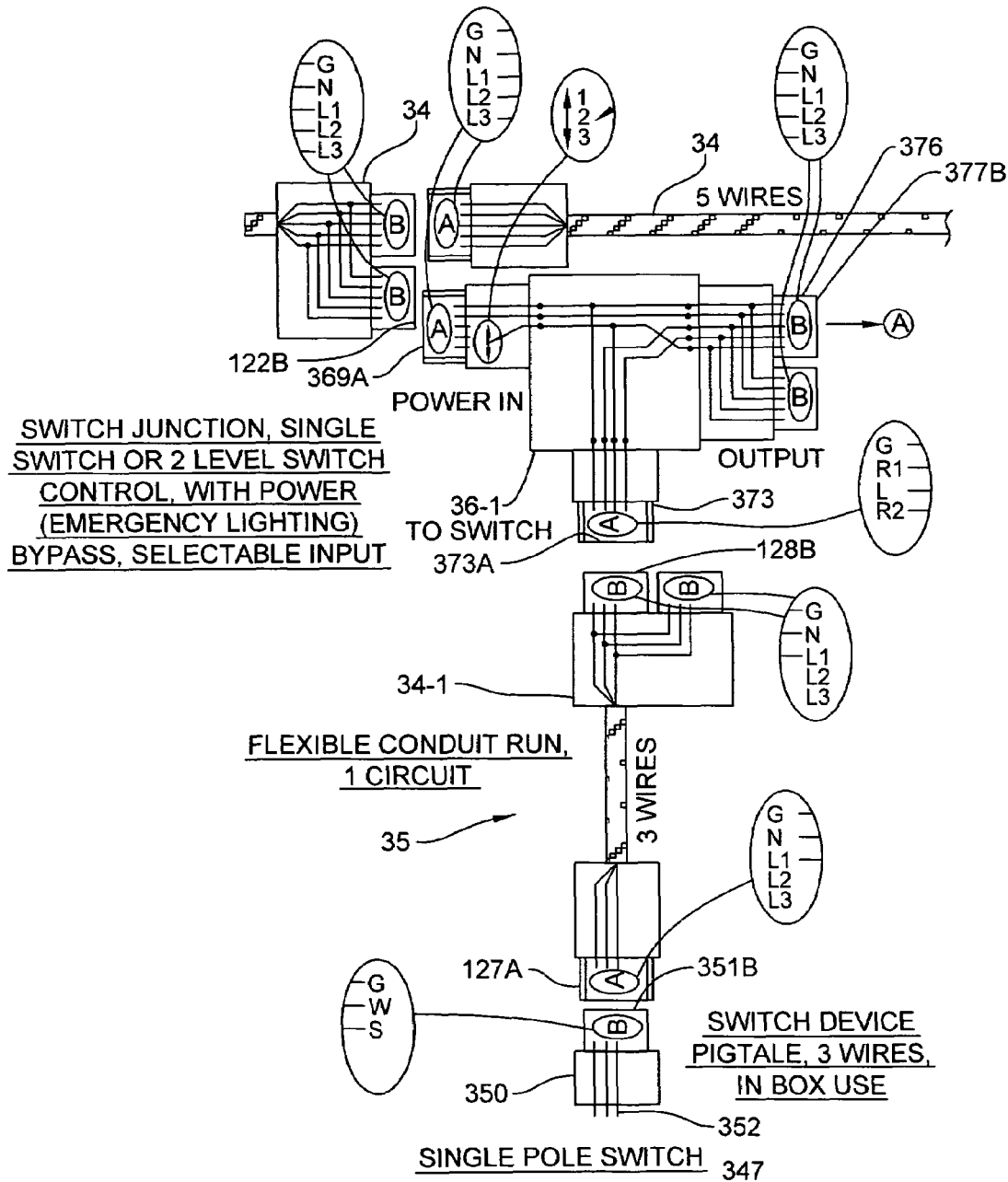
FIG. 47A illustrates a first section of another system configuration with a switch leg defined therein.
Figure 47B:
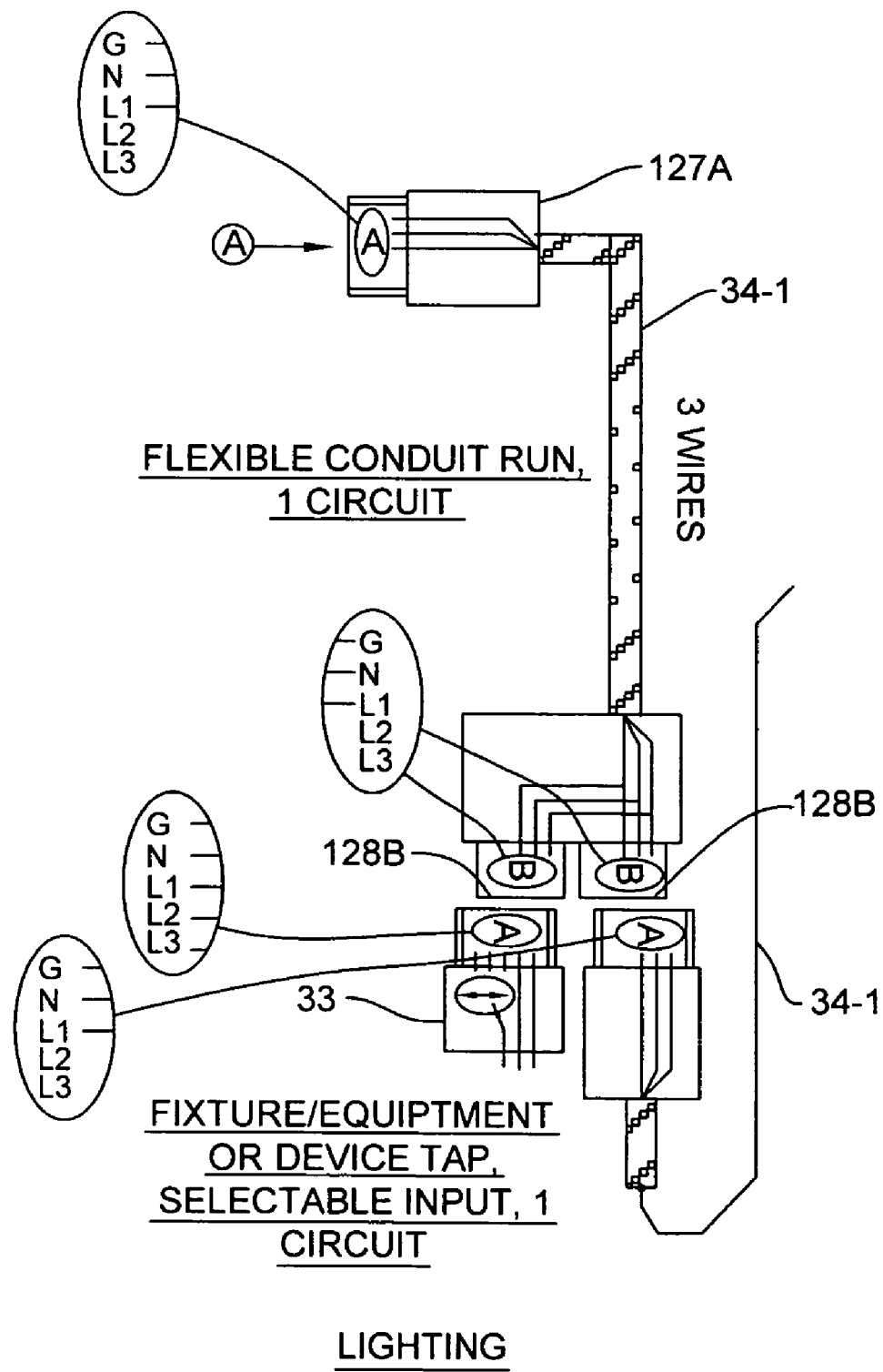
FIG. 47B illustrates a second section of another system configuration with a switch leg defined therein.

In FIG. 47, two conduit units 34 are interconnected together wherein the upstream conduit unit 34 also connects to the switch junction 36-1 (FIG. 35). This switch junction 36-1 has its' A connector 369A connected to the B connector 122B so that power is supplied to the switch junction 36-1. This switch junction 36-1 is circuit selectable so that one of the three circuits L1, L2 or L3 are accessed and used to supply the downstream components. On the output side of the switch junction, the output port 376 has its B connector 377B pluggingly connected to a three-wire, dedicated conduit unit 34-1 which extends downstream and has its B connectors 128B interconnected to additional components. In this regard, one of the B connectors 128B is connected to an additional downstream extending conduit unit 34-1 to supply power to additional lighting on this switch circuit. The other B connector 128B is interconnected to the circuit selectable, single-circuit fixture tap 33 which in turn is connected to a light fixture 30.

On the switch port 373 of the switch junction 36-1, the A connector 373A thereof connects to a dedicated three-wire, single-circuit conduit unit 34-1 serving as a switch leg 35 which has its upstream B connector 128B connected to A connector 373A, and its downstream A connector 127A fixedly attached to a wall-mounted box 48. In the wall-mounted box 48, a switch is plugged therein. For example, FIG. 47 illustrates a three-wire, single-circuit switch pigtail 350 connected by a B connector 351B to the A connector 127A. In turn, the pigtail wires 352 would be connected to the single switch 347 to define the switch assembly 346 (FIGS. 28 and 30). With the single switch 347, all of the light fixtures located downstream of the switch junction 361 would be controlled thereby.

Figure 48A:
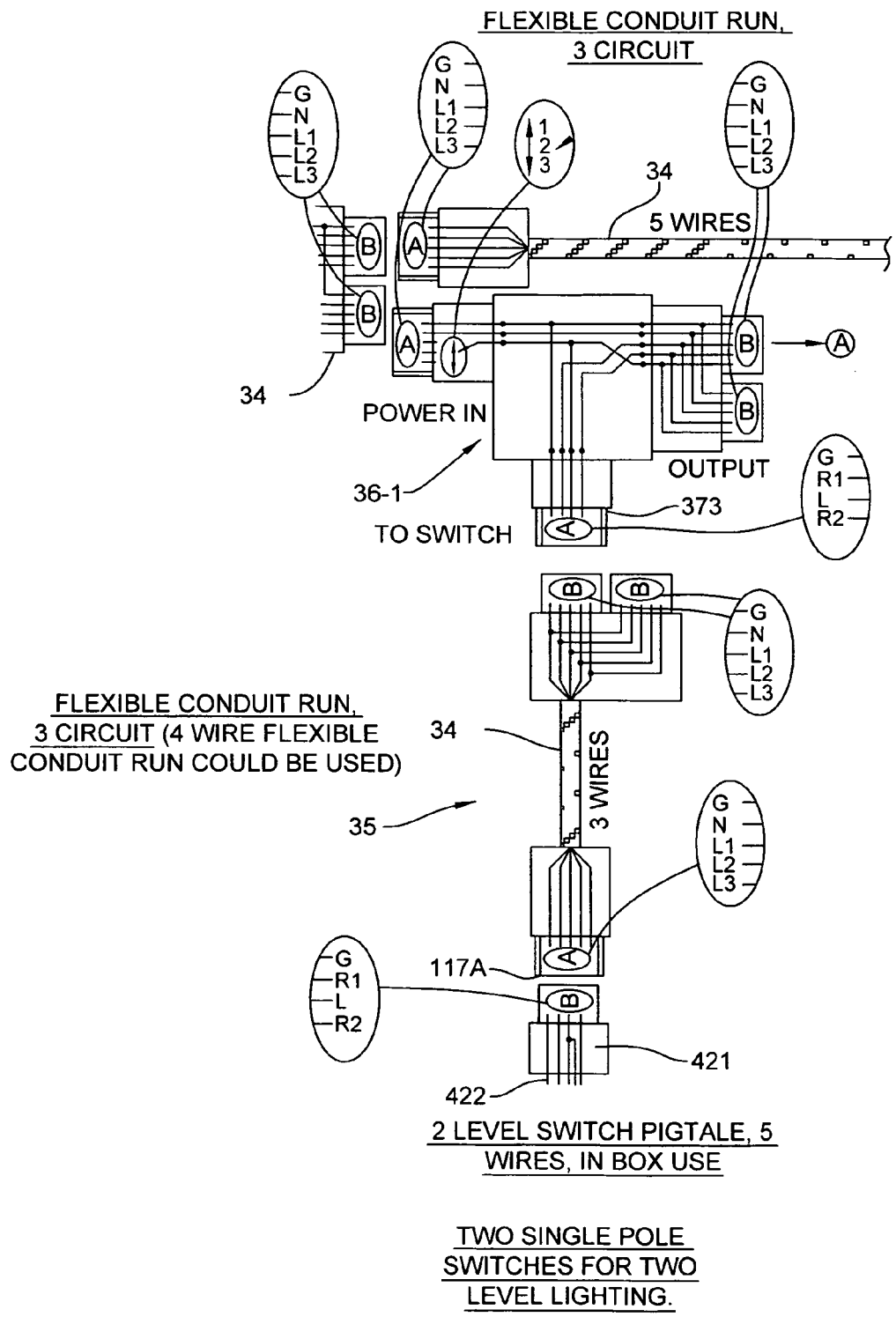
FIG. 48A illustrates one section of a first portion of a three circuit system configuration with a switch leg.
Figure 48B:
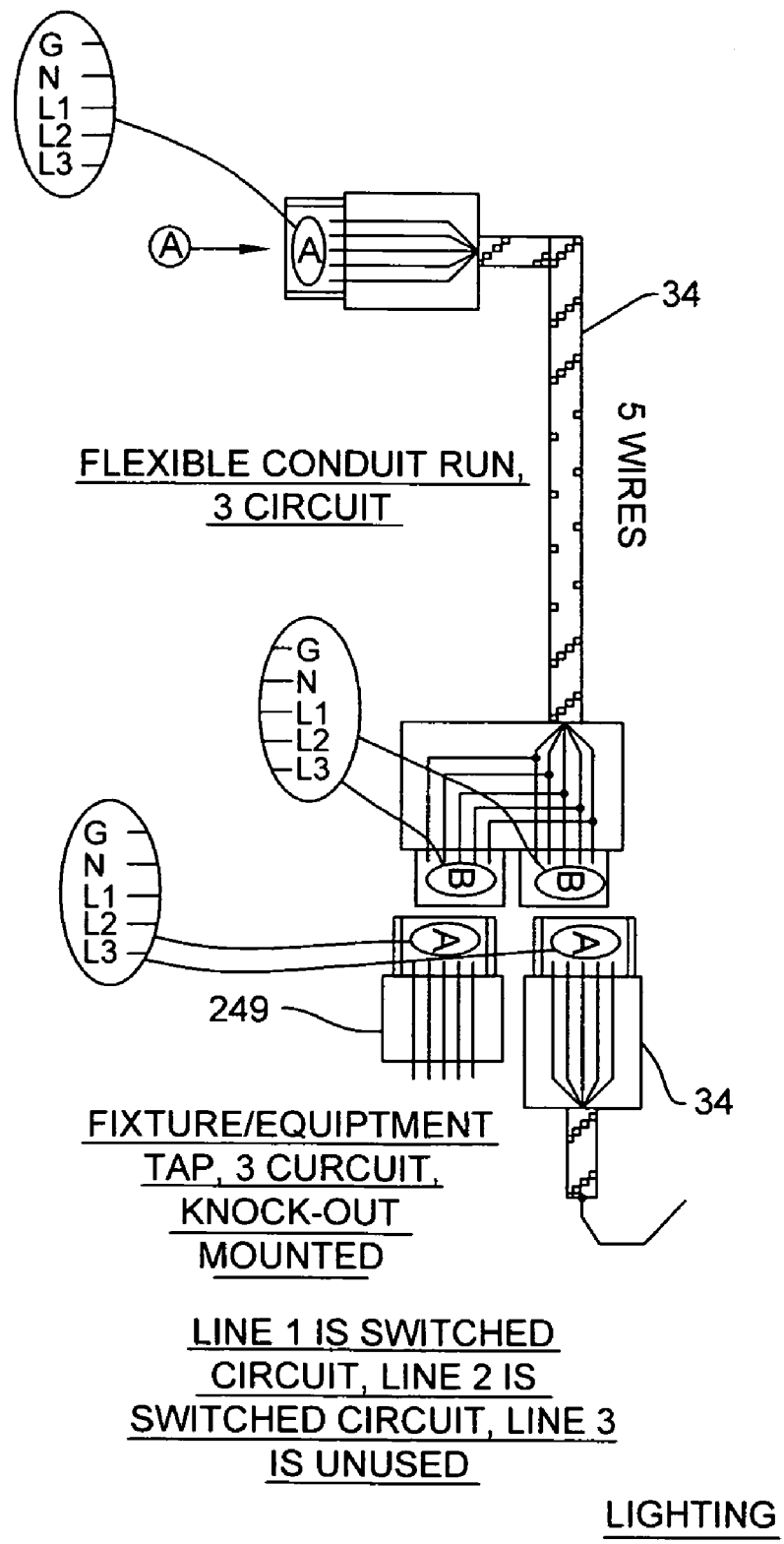
FIG. 48B illustrates another section of a first portion of a three circuit system configuration with a switch leg.

Referring to FIG. 48, the same switch junction 36-1 is shown being plugged into an upstream conduit unit 34, which conduit unit 34 also connects to a bypass conduit unit 34 for continuing all of the power circuits downstream and separate from the switch junction 36-1. The arrangement of FIG. 48 is designed for controlling a two-level light fixture having a first and second lines being output from the switch junction 36-1 which are switched and supplied to a light fixture to provide two-level lighting. As to the output from the switch junction 36-1, a five-wire conduit unit 34 is connected therethrough which extends downstream and in turn connects to an additional five-wire conduit unit for continuing the switch lighting leg 35 downstream to supply additional light fixtures. However, at the end of the first conduit unit 34, a three-circuit knock-out mounted fixture tap 249 (FIG. 15) is interconnected thereto to supply power to the light fixture.

As to the switch leg 35, a conduit unit 34 is used having five wires, although it is possible to use a conduit unit which only has four wires therein since only four wires are required to connect to the ground, R1, L and R2 contacts located in the switch port 373. At the A connector 117A, a two-level switch pigtail 421 having five wires extending outwardly therefrom that connect to four contact slots would be used. This switch pigtail 421 has five wires 422 exiting therefrom which would be dedicated for ground G, return R1, return R2, and input line L which is split into two live wires. This would allow for connection to two single pole switches in the wall box for selectively powering one or both of lines R1 and R2 to provide the two-level lighting provided to the light fixture 30 through fixture tap 249 located downstream of the switch junction 36-1.

Figure 49A:
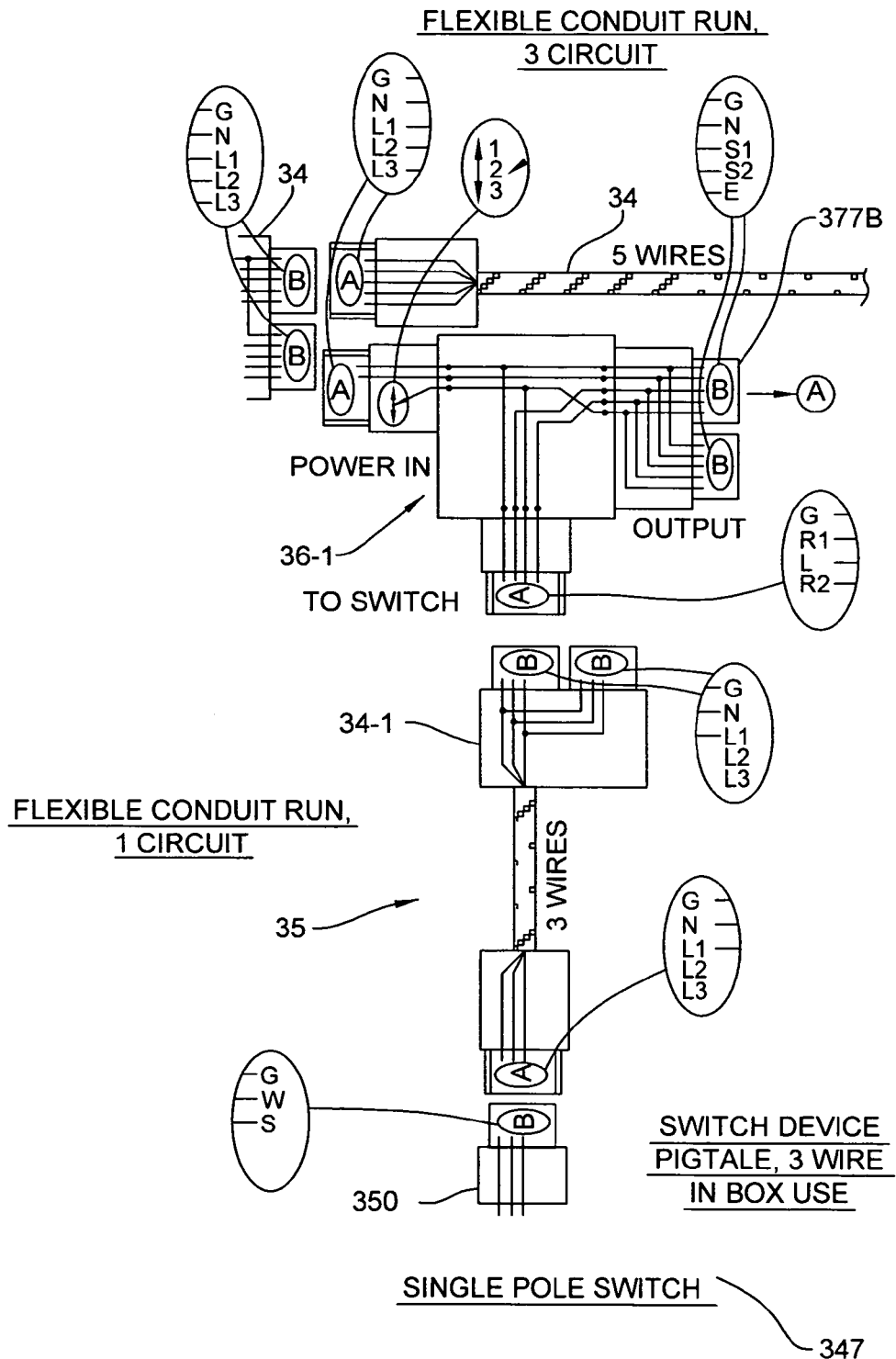
FIG. 49A illustrates a first section of an alternate system configuration with a switch leg.
Figure 49B:
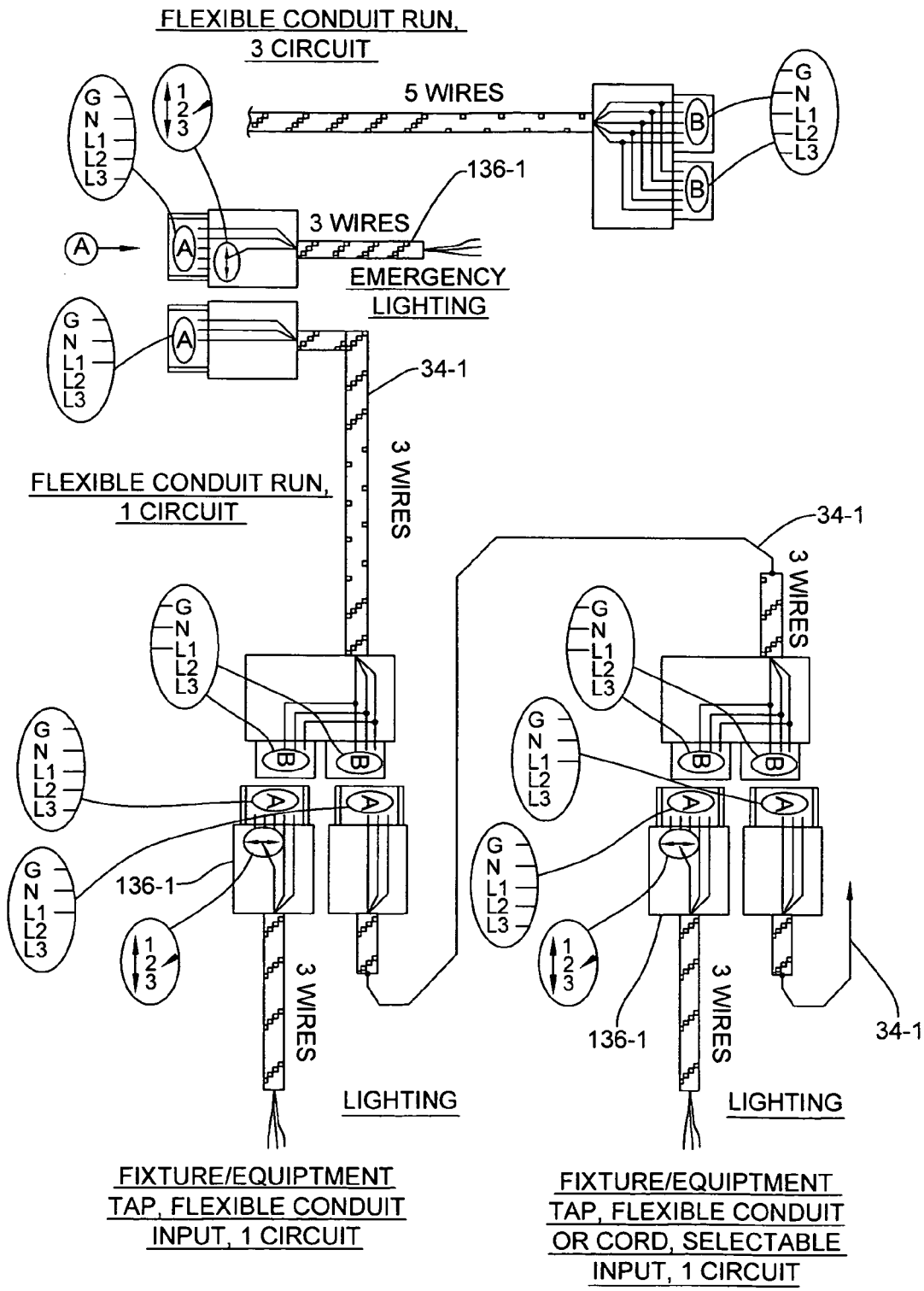
FIG. 49B illustrates a second section of an alternate system configuration with a switch leg.

Referring to FIG. 49, a more conventional lighting configuration is illustrated which provides a connection for emergency lighting. In particular, the circuit has an upstream conduit unit 34 which supplies a bypass connection with connector 34 and the switch junction 36-1. The switch junction 36-1 is connected to a switch leg 35 comprising a single circuit, fixed conduit unit 34-1 that in turn is connected to a switch device pigtail 350 (FIG. 30) which would be connected to a single pole switch 347 for controlling the output ports of the switch junction 36-1. The switch junction 36-1 has an additional series of single-circuit conduit units 34-1 extending one after the other to supply power to all of the light fixtures through the use of the circuit selectable fixture taps 136-1 or 136-2.

As to the emergency lighting, this lighting is supplied by connecting a three-wire fixture tap 136-1 which would have its circuit selector in the L3 position for connection to the emergency lighting contact E in B connector 377B. As such, continuous power is supplied to the conduit unit 136-1 which would be connected to emergency lighting, which lighting would remain off when electrical power is supplied thereto, but would automatically switch on and be lit based on battery power when power is lost. Also, such lighting need not be "emergency" lighting but could be other lights which require continuous power separated from the switched part of the circuit supplying power to the switch-controlled lights. For example, exit sign lights might be powered continuously, and other lights might be powered continuously such as lights run after darkness in key areas.

Figure 50A:
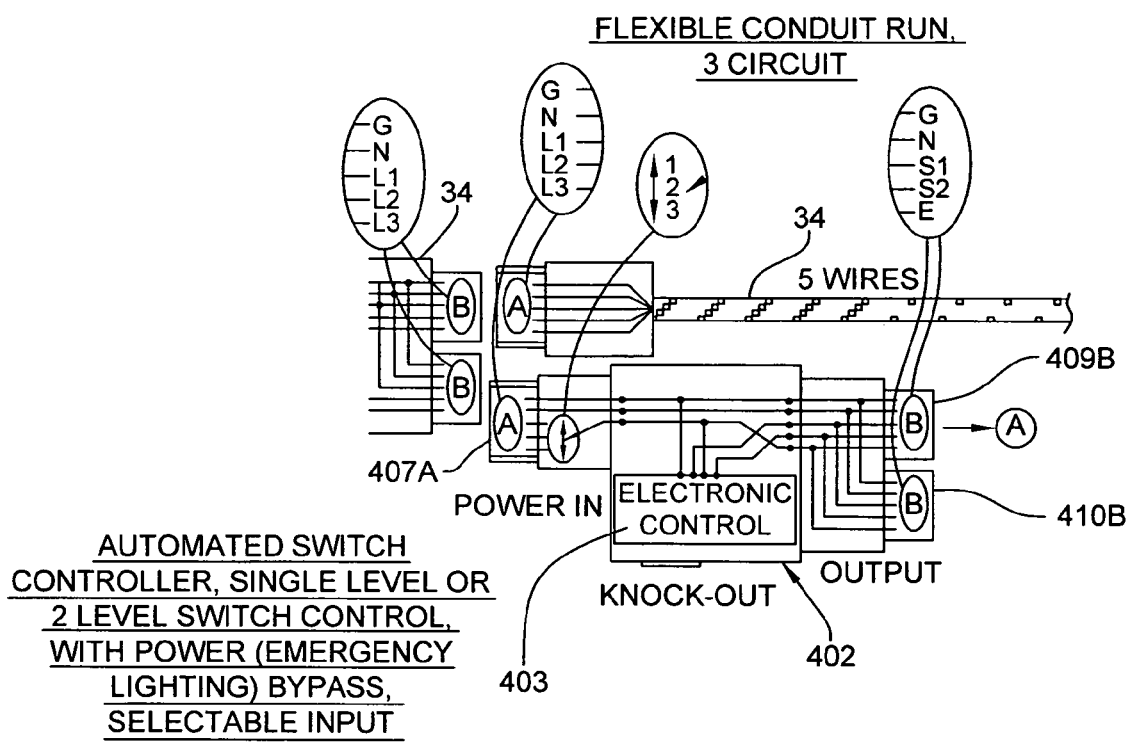
FIG. 50A illustrates a first section of still another system configuration with an electronic control switch junction.
Figure 50B:
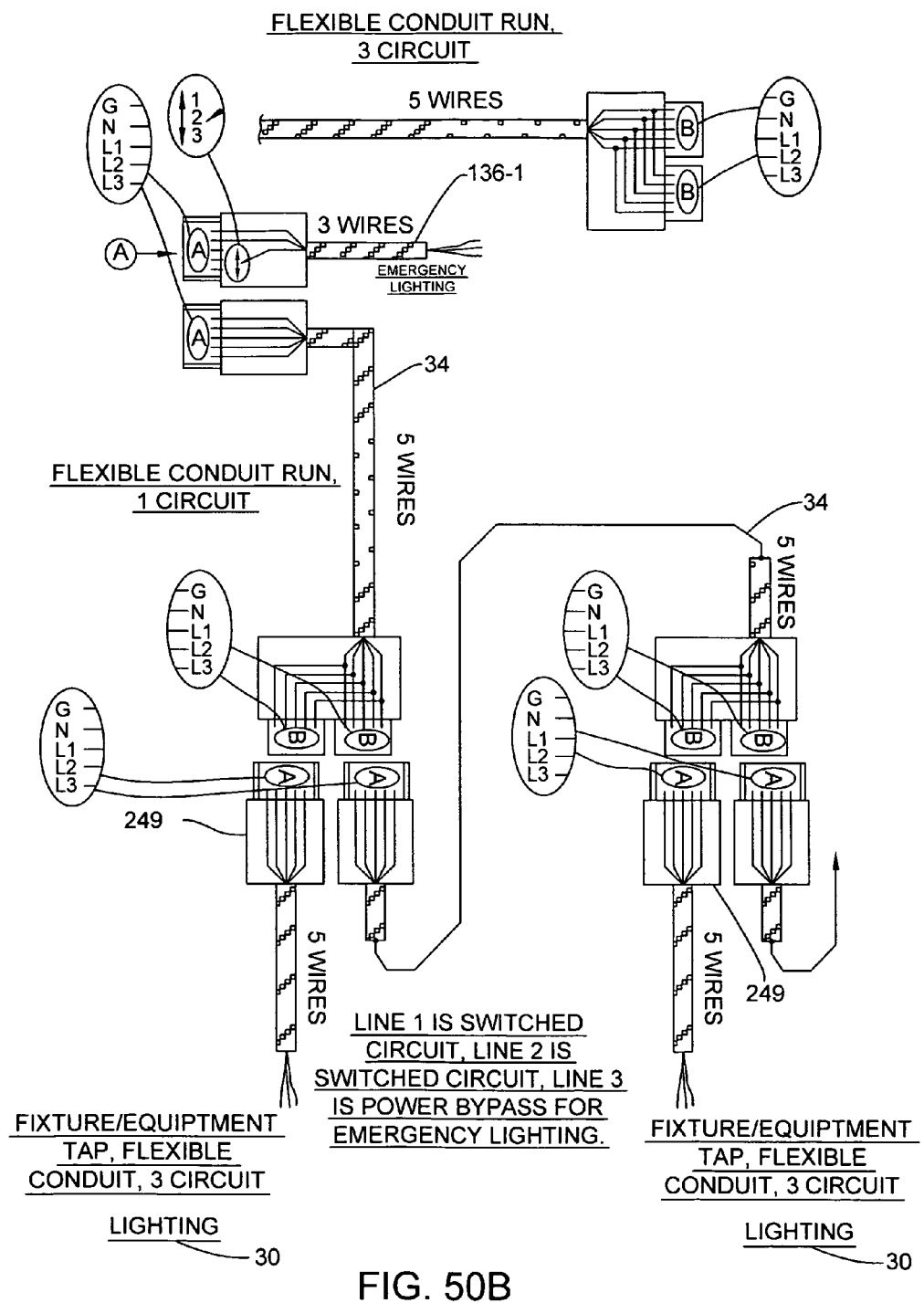
FIG. 50B illustrates a second section of still another system configuration with an electronic control switch junction.

Referring to FIG. 50, a substantially similar configuration to FIG. 49 is illustrated except, significantly, the switch junction 36-1 is replaced with an electronic switch controller 402. This switch controller 402 has its input A connector 407A connected to the upstream conduit unit 34, while output port 409A supplies continuous power to an emergency lighting conduit unit 136-1. Further, the B connector 410B plugs into the downstream series of five-wire flexible conduit units 34. Since it is only necessary to connect to four of the contacts G, N, S1 and S2 of the B connector 410B, the five-wire conduit units 34 actually could be converted to a four-wire conduit unit so long as the contacts thereof were connected to the above contacts G, N, S1 and S2. Downstream thereof, a three-circuit fixture tap 249 is provided for connection to an appropriate light fixture 30. In this manner, the lighting fixture 30 can be electronically controlled through the electronic controller 403 such as through wireless switching.

The foregoing circuit diagrams are representative diagrams illustrating various circuit configurations. It should be appreciated that it is possible to construct a variety of circuit configurations using the various components using conventional wiring conventions.

IV. System Components

The following discussion refers to the individual system components and the specific construction of select components. Therefore, in addition to the unique inventive arrangement of the entire system and the cooperation of the components, the individual system components further include additional inventive features incorporated therein.

Figures 51, 52:
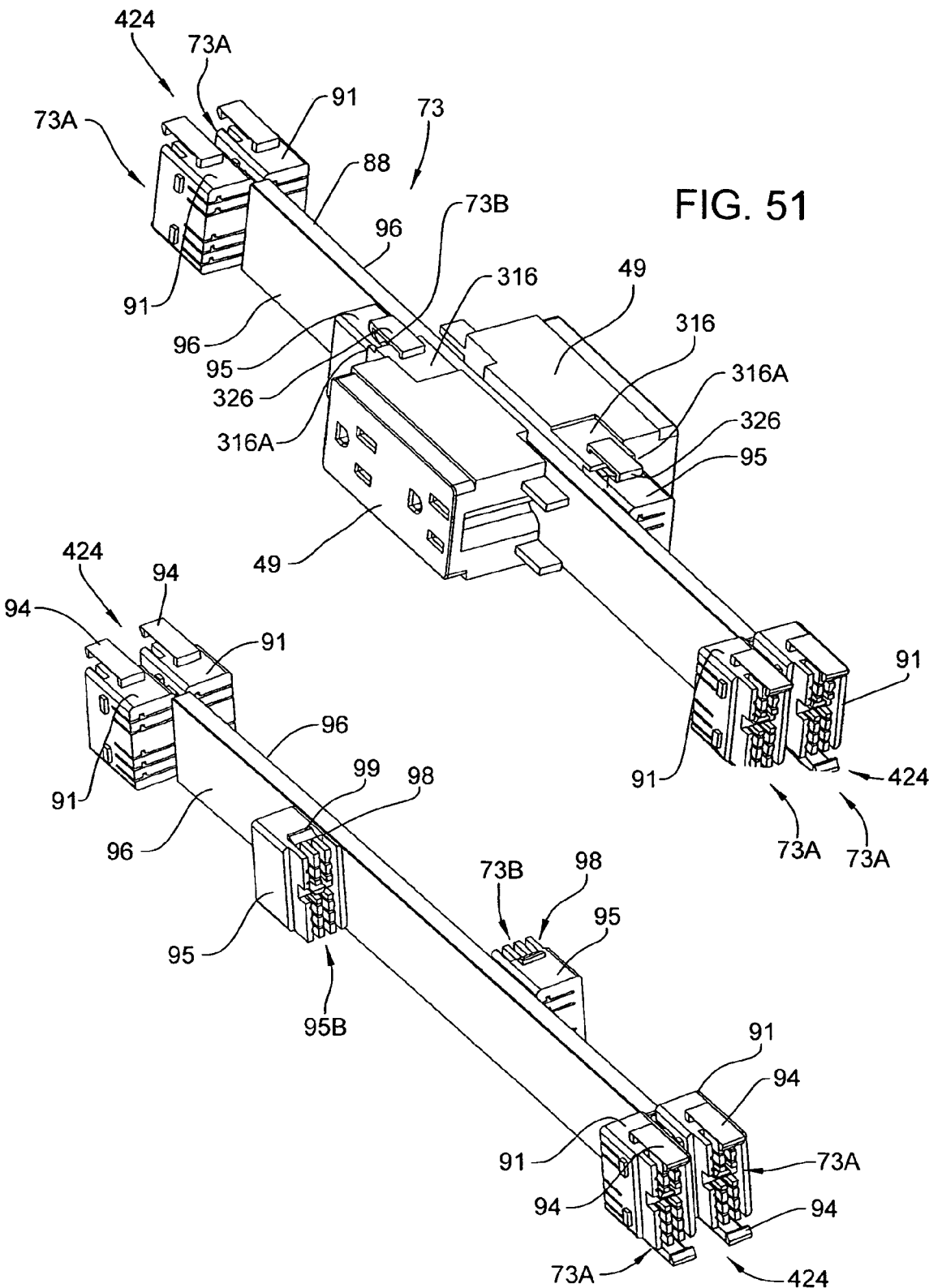
FIG. 51 illustrates a power distribution assembly (PDA) for a furniture component having plug-in receptacles mounted thereto.
FIG. 52 illustrates the power distribution assembly without the receptacles.

First referring to FIGS. 51-63, the PDA 73 is illustrated herein. Referring to FIGS. 51 and 52, the PDA 73 is provided in various modular lengths which generally correspond to the length of the raceways of the individual wall panels 68 in which the PDA's 73 are to be mounted.

The main PDA body 88 extends generally longitudinally and has a pair of receptacle contact blocks 95 which project sidewardly from the opposite casing faces 96 for mounting of the receptacles 49 thereon. In this regard, the PDA contact blocks 95 have the plug end 98 which is configured as a B connector 73B that is engagable with the A connector 316A defined by the receptacle contact blocks 316. As described above, these receptacle contact blocks 316 support the locking fingers 326 thereon which lockingly engage the catches 99 formed at the top and bottom of the contact blocks 95. Notably, the receptacles 49 are removable from the contact blocks 95 as generally illustrated in FIG. 52 yet are engaged by positioning the receptacle 49 on the casing face 96 and then sliding the receptacle 49 longitudinally into plugging engagement with the A connector 73B. In this manner, the receptacle 49 may selectively tap off one of the three circuits being carried through the PDA 73. While the PDA 73 is illustrated with only a single block 95 on each side thereof, the PDA's 73 have a variety of lengths and thus, longer length PDA's 73 may have a plurality of the blocks 95 on each side at longitudinally spaced locations.

The opposite ends of the main body 88 includes the end contact blocks 91 which have the locking fingers 94 projecting longitudinally so that the contact blocks 91 define A connectors 73A. Hence, it can be said that the PDA 73 has double end connectors 424 and 425 at both ends. As described previously, the various A connectors 73A may either be connected to a single B connector of the other components either supplying power to the PDA 73 or being supplied with power downstream from the PDA 73. Also, for each pair of A connectors 73A, it is possible that only one of such connectors is connected to a B connector.

As further illustrated in FIG. 53, the contact blocks 91 have their slotted end portions 92 facing longitudinally towards the casing 89 for engagement with internal conductors of the casing 89. Similarly, the contact blocks 95 also have slotted ends 97 again for connection to the internal conductors.

In FIG. 54, a single conductor 427 is illustrated which has a central bar-like longitudinal conductor strap 428 which extends along the length of the PDA 73, and defines upper and lower surfaces 429 and 430. This conductor strap 428 is confined and enclosed within the casing 89 as will be discussed hereinafter and is configured to carry current therethrough. The conductor 427 is one of a plurality of conductors which are vertically stacked in electrically isolated, spaced relation to define individual conductors extending through the casing 89. The conductor 427 further includes a double contact terminal 431 at each opposite end which in turn defines two sidewardly separated contacts 432 which are joined by an electrically conductive web 433. The web 433 is fixedly mounted to the strap 428, such as by soldering or welding so as to define an electrically conductive connection therebetween.

These contact terminals 431 are received and enclosed within the contact blocks 91 and have the terminals 432 accessible through the A connector 73A.

To provide for electrical contact with the receptacles 49 through the receptacle contact blocks 95, two additional contact terminals 435 are provided at intermediate locations along the length of the strap 428 in the illustrated embodiment. It will be understood that additional contact terminals 435 may be provided at longitudinally spaced locations to accommodate additional receptacles. These contact terminals 435 have a single contact 436 and a sidewardly projecting mounting tab 437 which is mechanically and electrically connected to the top surface 429 of the strap 428. These contact terminals 435 project into the contact blocks 95 with the contacts 436 being electrically accessible through the B connector 73B.

Figure 55:
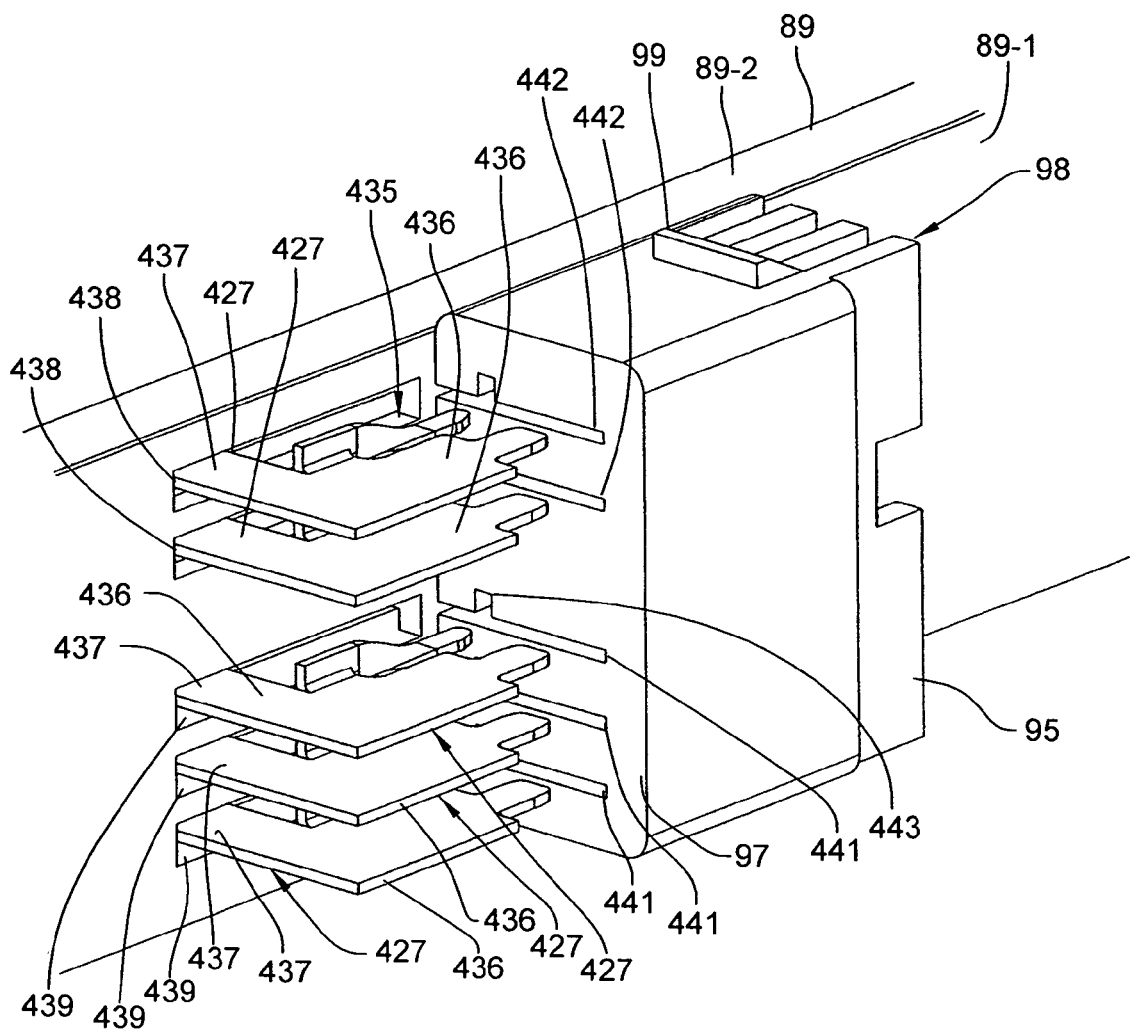
FIG. 55 is an enlarged isometric view illustrating a receptacle contact block in a partially disassembled position.

In FIG. 55, an enlarged view of the interconnection of the contact block 95 to the casing 89 is illustrated. Generally, the casing 89 comprises two interfitted casing halves 89-1 and 89-2 which will be described in further detail hereinafter. Suffice it to say, that each of the casing halves 89-1 and 89-2 includes a pair of upper windows 438 which generally associate with ground and neutral conductors 427, and three lower windows 439 which are generally associated with three line conductors corresponding to lines L1, L2 and L3. The confinement of the conductors 427 within the casing 89 will be discussed in further detail herein relative to FIGS. 57-61, but for purposes of FIG. 55, it will be understood that the mounting tabs 437 for the receptacle terminals 435 project through the respective windows 438 and 439 so that the respective contacts 436 are oriented sidewardly adjacent and extend towards the contact block 95.

As to the contact block 95, same is formed of an insulative plastic material wherein the slotted end 97 has a plurality of vertically spaced slots 441 and 442. These slots are horizontally flat and extend entirely through the contact block 95 as will be discussed further herein. Each slot 441 and 442, however, also includes an upward extension 443 to cooperate and receive the shaped electric contact 436. With the contacts 436 being disposed outwardly of the casing during assembly, the contact block 95 is then slid leftwardly so that the contacts 436 are slid into the vertically spaced slots 441 and 442 to the fully seated condition of FIG. 53 wherein the ends of the contacts 436 are then accessible through the B connector 73B thereof.

Figure 56:
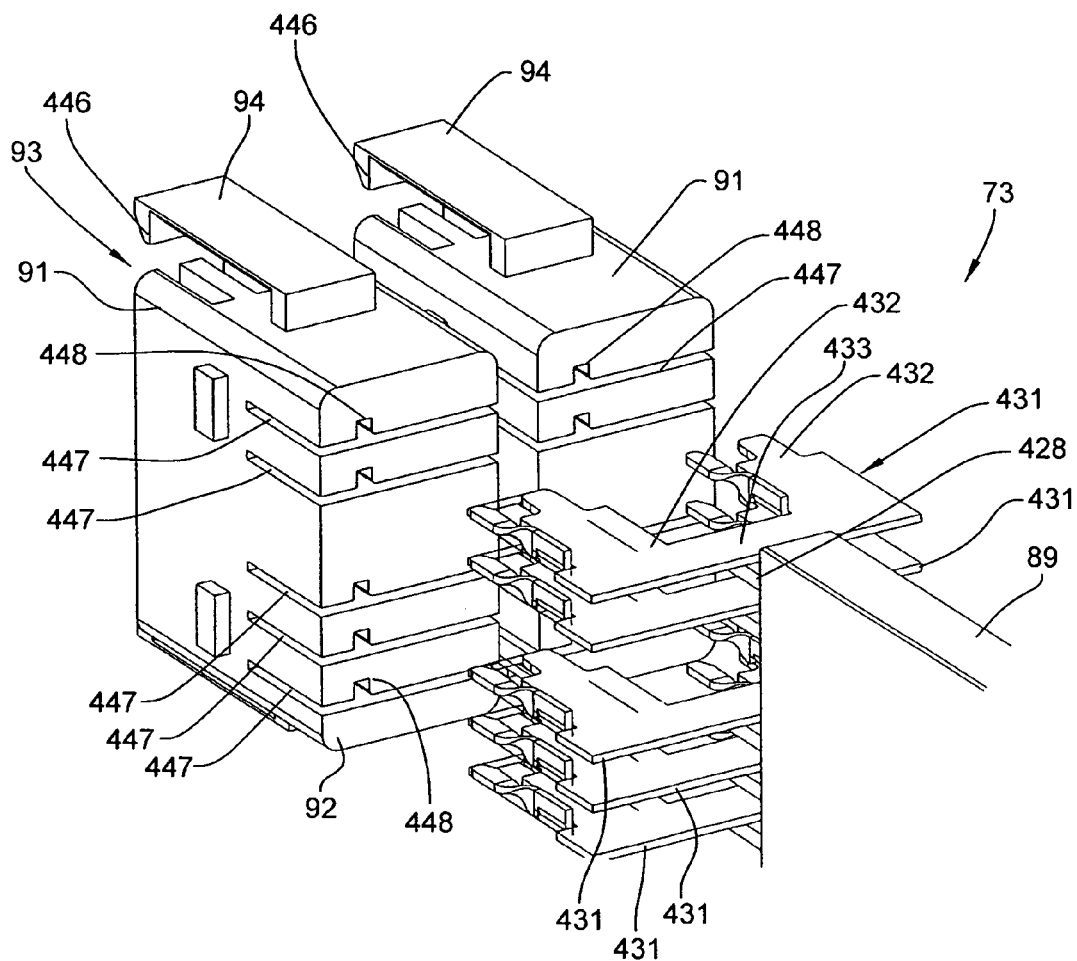
FIG. 56 illustrates an enlarged isometric view of one end of a PDA having end contact blocks in a partially disassembled position.

Referring to FIG. 56, the contact blocks 91 also receive their respective contacts 431 in a similar manner. In particular, the terminal ends of the conductor strap 428 project outwardly a small distance from the insulative casing 89 so that the connector web 433 of each respective terminal 431 is disposed directly adjacent the free end of the casing 89 and perpendicular to the casing 89. The terminals 431 are disposed one above the other with the two uppermost terminals 431 being located closest together and corresponding to ground and neutral positions, while the lower three terminals 431 are disposed closer together and define the three positions corresponding to the three circuits L1, L2 and L3. As such, the respective terminals 431 are generally disposed in vertically stacked, but spaced relation and project longitudinally from the end of the casing 89.

One end of the PDA 73 is illustrated in FIG. 56 with the opposite end having the same appearance so that the following discussion is equally applicable thereto. As to each of the contact blocks 91, these contact blocks 91 are formed identical to each other so as to have a main body 445 with the locking fingers 94 projecting forwardly therefrom. These locking fingers 94 each include an upstanding rib 446 for latching engagement with a catch on an associated system component.

As to these contact blocks 91, each has a slotted end 92 and the opposite plug end 93. As to the slotted end 92, a plurality of contact-receiving slots 447 are provided with the two upper slots being disposed closer together than the three lower slots and generally conforming to the ground, neutral and L1, L2 and L3 positions. These slots 447 extend entirely sidewardly through the contact block 91 to the opposite side faces, and also have center portions which extend longitudinally through from the slot end 92 to the open plug end 93. The slots 447 each include an upward extension 448 corresponding to the shape of the respective contact 432. With the slots 447 extending entirely through the contact block 91, the pair of contacts 432 on each terminal 431 may be positioned within their own respective contact block 91 in side-by-side relation with the connector web 433 being able to extend laterally between the blocks. It may be desirable to provide an outer housing that encloses the slotted portions and the webs 433 but such is not required when enclosed in an office furniture raceway.

Figure 57:
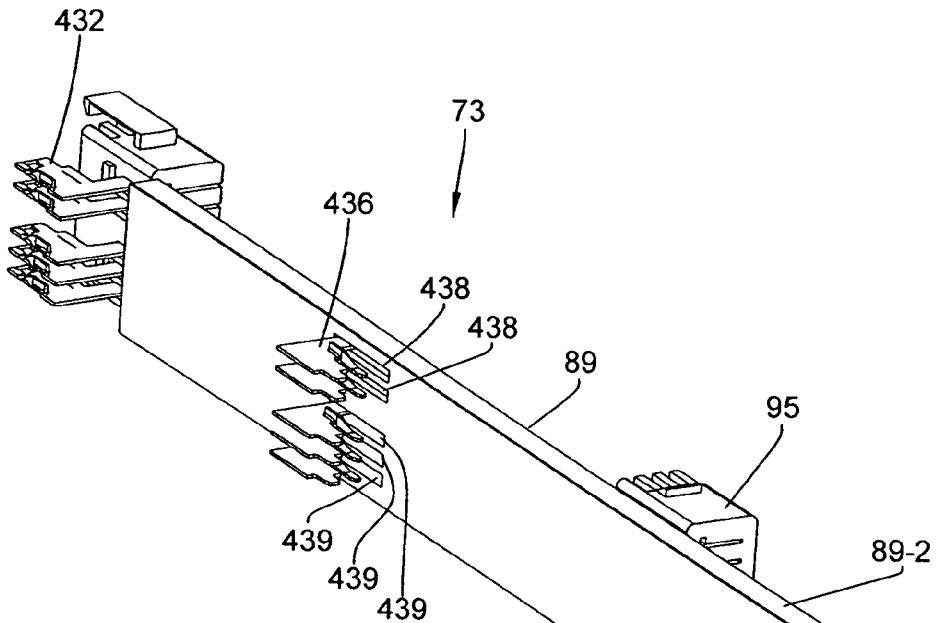
FIG. 57 is an isometric view illustrating a PDA with one each of the end contact blocks and receptacle contact blocks removed therefrom.

Referring to FIG. 57, the PDA 73 is illustrated with one of the contact blocks 91 and one of the contact blocks 95 removed so that the exposed contacts 432 and 436 are seen in their relative positions. The partially assembled PDA 73 therefore is completed by sliding an additional contact block 91 onto the ends of the vertically-stacked terminals 432 and then sliding the electrical contact block 95 onto the other vertically-stacked contacts 436.

Figure 58:
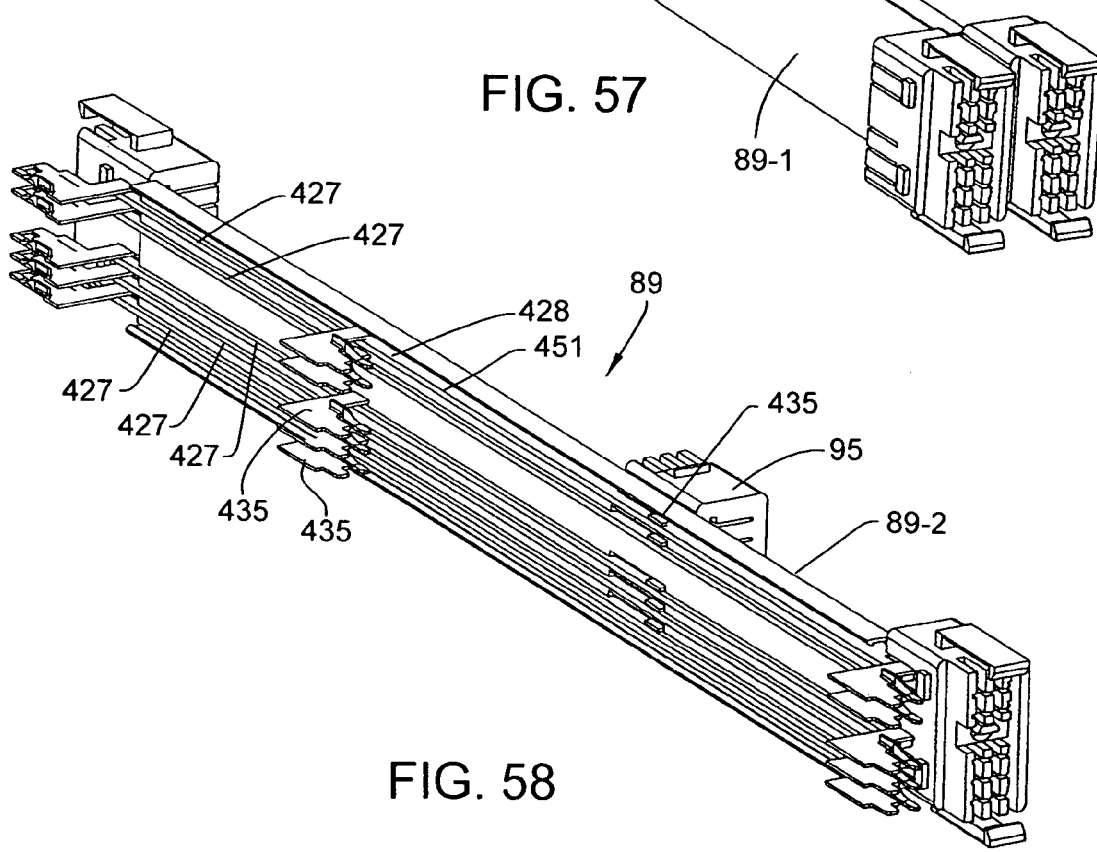
FIG. 58 illustrates one side cover of a conductor casing removed from the PDA.

Referring more particularly to FIGS. 58-61, the casing 89 is illustrated with the casing half 89-2 being formed with a side wall 450 that projects upwardly and has elongate slots 451 formed therein. Each of the slots 451 is adapted to receive the respective strap 428 of a conductor 427. When the straps 428 are positioned in their respective slot 451 as seen in FIG. 58, the receptacle contacts 435 project sidewardly through the windows 438 and 439 that are formed through the casing side wall 450 in a vertical row. This allows the receptacle contacts 436 to project through the windows 438 for connection to the appropriate contact block 95.

Figure 60:
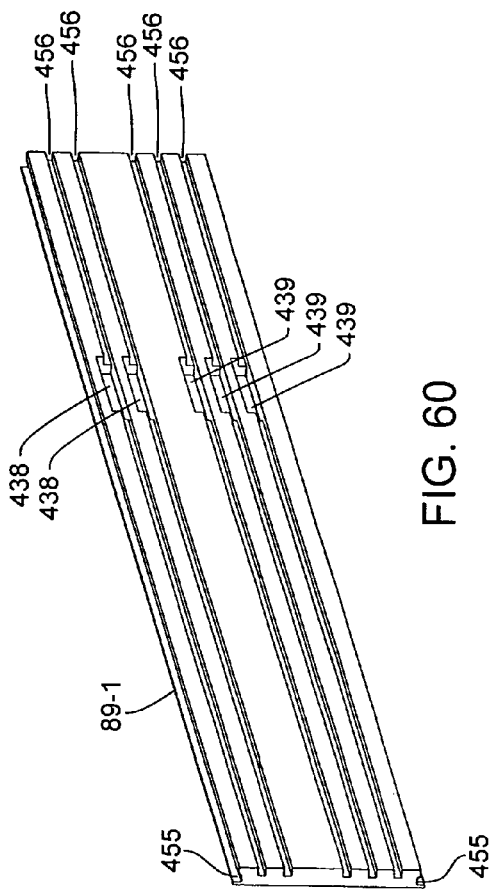
FIG. 60 illustrates a casing section.
Figure 61:
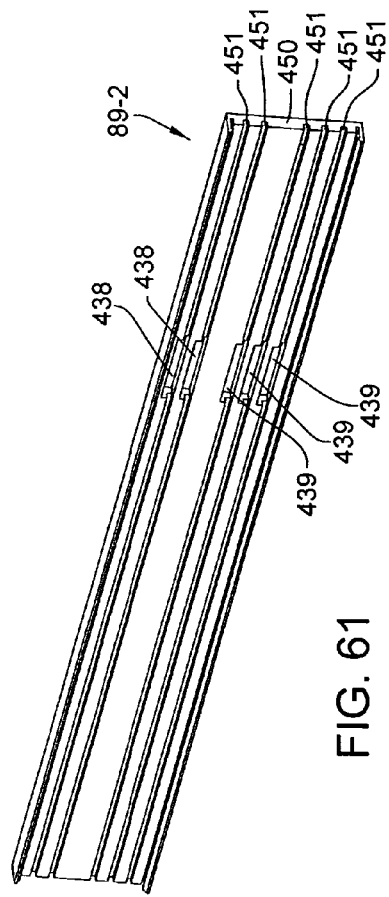
FIG. 61 illustrates an opposite casing section adapted to be snap-connected to the first casing section of FIG. 60.
Figure 59:
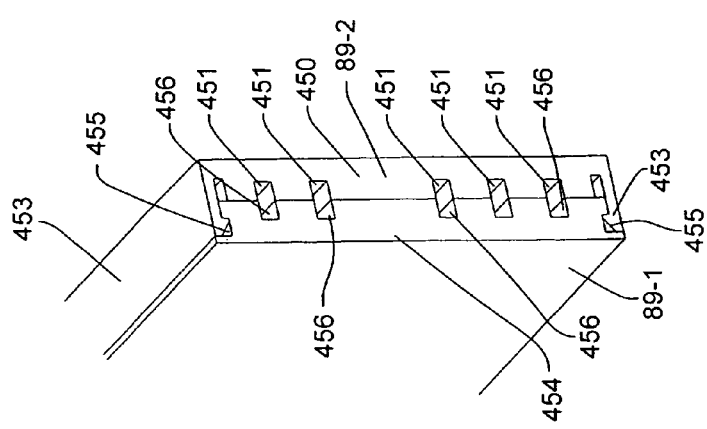
FIG. 59 is a partial view illustrating an end of the conductor casing.

Additionally, when the conductors 427 are seated in the casing half 89-2, the end contact terminals 431 are disposed longitudinally outwardly of the casing half 89-2 as seen in FIG. 58. In addition to the foregoing, the casing wall 450 also includes sidewardly projecting snap flanges 453 configured to snap lockingly engage the opposed casing half 89-1. Referring to FIGS. 59 and 60, the casing half 89-1 also includes a flat casing wall 454 which includes grooves 455 on the upper and lower edges thereof for said snap locking engagement with the snap flanges 453. The casing half 89-1 also includes horizontally parallel slots 456 which receive the other half of the conductor strap 428 therein. The casing half 89-1 also includes the aforementioned windows 438 and 439 through which the contact terminals 435 project outwardly as seen in FIG. 57 when the casing half 89-1 is snapped onto the other casing half 89-2. This snap engagement confines the conductor straps 428 within the opposed grooves 451 and 456 and allows the terminals 435 to project through their respective windows 438 and 439 on the opposite sides of the assembled casing 89.

Figure 62A:
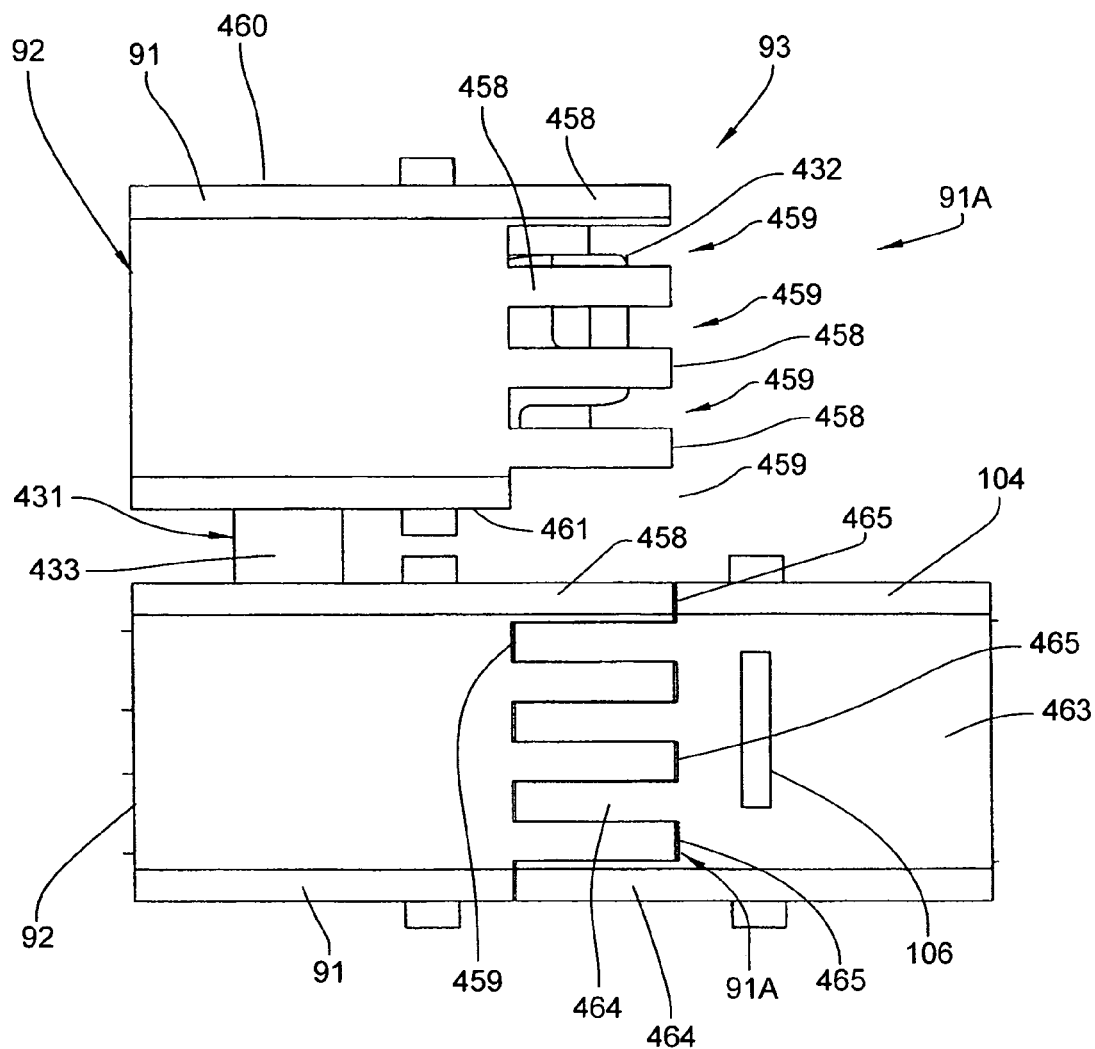
FIG. 62A is a top view of double contact blocks of a PDA being connected to a single contact block of a flex connector with the remaining component parts being removed therefrom for illustrative purposes.

FIG. 62A is a plan view which illustrates the contact blocks 91 of the PDA 73 being interconnected with a respective contact block 104 of a flex connector 75, while FIGS. 62B-62E further illustrate the contact blocks 91 and 95. These figures illustrate the common configuration of the contact blocks 91 and 95, the respective contacts 432 and 436, and also the mating engagement thereof.

Figure 62C:
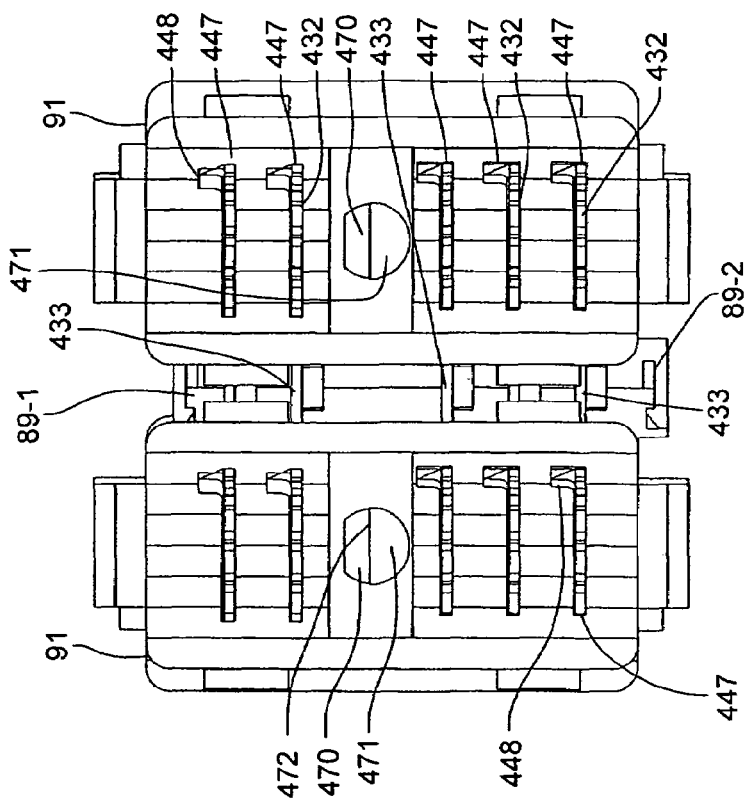
FIG. 62C is an end view of the PDA.
Figure 62B:
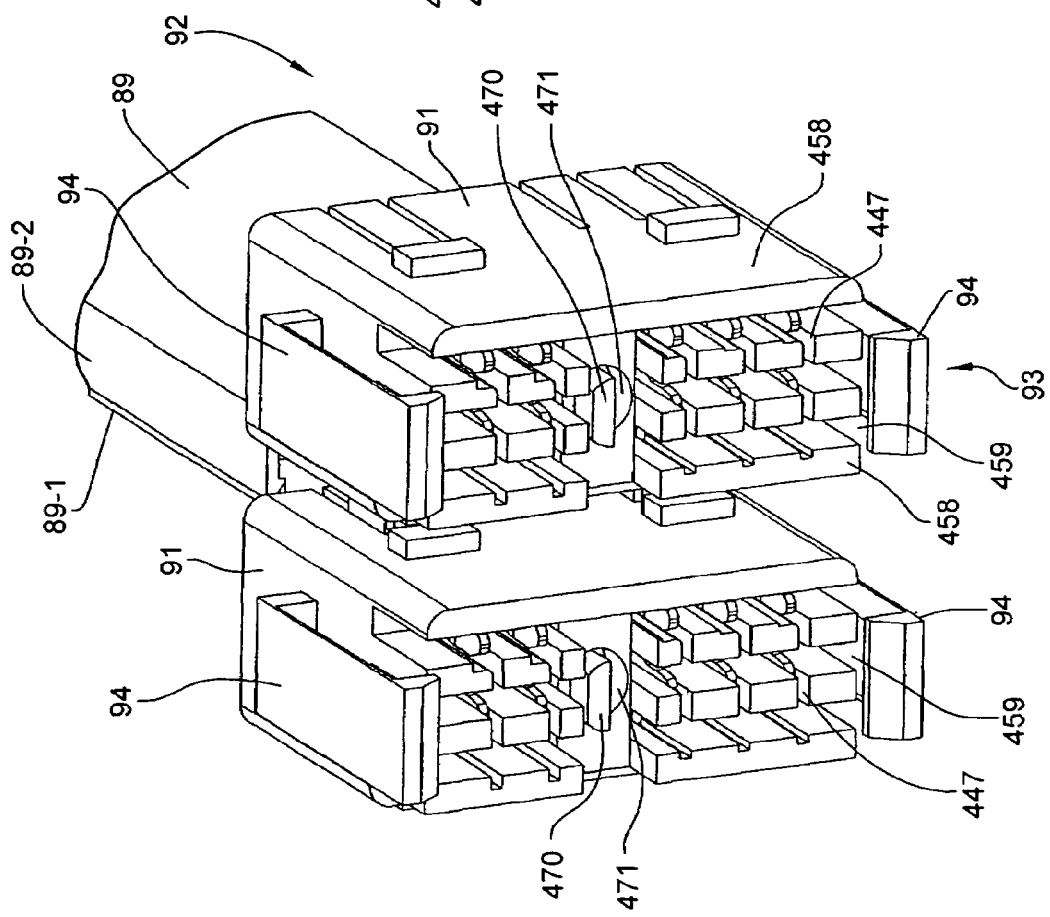
FIG. 62B is a partial isometric view of the PDA.

The contact blocks 91 include the slotted end 92 and an end plug section 93. The slotted end sections 92 as illustrated in FIGS. 56 and 62B-62C receive the contacts 431 therein wherein the contact web 433 spans the intermediate space between the two spaced blocks 91. Since the PDA 73 is used in a wall panel arrangement and enclosed within a raceway, current office furniture codes do not require any additional covering over the contact blocks 91. Rather, these plastic blocks 91 preferably are fixedly attached to the casing 89, such as by ultrasonic welding or other similar attachment techniques.

As to the plug end 432 illustrated in FIGS. 62B and 62C, the end plug section 93 has the block material projecting forwardly therefrom to define laterally spaced, parallel projections 458 that define vertical slots 459 therebetween. As seen in FIG. 62A, the electrical contact 432 has portions thereof projecting into two of the slots 459 for mating engagement with the contacts of the contact block 104 as will become apparent from the discussion provided below. As seen in FIG. 62B, the projections 458 along the vertical height thereof are slotted by the contact slots 447 which extend through the material of the projections 458 and allow the contacts 432 as received in such slots 447 to project into the slots 459. As seen in the top of FIG. 62A, the projections 458 and slots 459 are offset relative to the longitudinal centerline of the block 91 such that projection 458 defines one block face 460 while the slot 459 opens through the opposite block face 461. This configuration of the projections 458 and slots 459 defines a hermaphroditic construction that is engagable with a similarly constructed contact block 104 regardless of whether the contact blocks 91 are on one end of the PDA 73 or on the opposite end of the PDA 73.

As further illustrated in FIG. 62A, the contact block 104 of the flex connector 75 has essentially the same construction except that it also includes the catch 106 on the top block surface 463 and a similar catch on the bottom block surface. This block 104 also includes the same configuration of projections 464 and slots 465. The flex connector 75 as illustrated in FIG. 6 has single contacts disposed therein which are essentially the same as the contacts 432 and are more similar to the contacts illustrated in FIG. 77 and are joinable to the contacts 431 in substantially the same manner as that illustrated in FIG. 79 relative to the conduit units 34. Hence, a detailed disclosure of the contacts of the flex connector 75 is not required since such flex connector 75 is designed in conformance with the constructions used in the other system components. Suffice it to say that the contacts disposed in the contact block 104 project into the slots 465 in the same manner as the contacts 431 projecting into the slots 459 so that when the two blocks 91 and 104 are plugged together, the respective projections 458 and 464 slidably fit into the slots 465 and 459 respectively, with the respective contacts of these blocks 104 and 91 being mechanically in contact with each other and completing an electrical circuit therebetween.

Referring to FIGS. 62D and 62E, it can be seen that this contact block 95 includes a similar combination of projections 467 and slots 468 which define the B connector 73B and have the respective contacts 436 projecting through the projection 467 and at least partially into the slots 468 for subsequent connection to a similar configuration formed in the electrical receptacles 49.

It will be noted that the slots in both the contacts 91 and 95 are thin and snugly fit the respective contacts therein to vertically restrain the thin contacts.

Referring further to FIGS. 62B and 62C, as well as FIG. 53, the PDA 73 as well as the flex connector 75 are restricted in usage to a 120 volt capacity since such is restricted in conventional office furniture configurations. To prevent supply of power to the PDA 73 or flex connector 75 at a higher, unacceptable voltage, the PDA 73 and flex connector 75 also include a keying feature as part of the contact blocks 91, 95 and 104 thereof.

As to the keying feature of the PDA 73, this is accomplished by providing the plastic molded contact block 91 with a forwardly projecting keying pin 470 which projects outwardly directly adjacent to a keying recess 471. The keying pin 470 has a generally cylindrical outer surface having a semi-circular cross-sectional shape as viewed from the end. This semi-circular shape corresponds to the semi-circular shape of the recess 471. In the A connector configuration of the PDA 73, the keying pin 470 is said to be downwardly notched with the recess 471 disposed below the pin 470 as seen in FIG. 62C.

In the keying pin 473 as provided in the receptacle contact block 95 (FIGS. 53 and 62E), the pin 473 is said to be upwardly notched so as to be located below a keying recess 474. These pins 470 and 473 and recesses 471 and 474 are molded fixedly into the blocks 91 and 95 and thus are non-adjustable. The respective keying pins 470 and 471 include respective flat keying faces 472 and 475 that respectively face downwardly and upwardly and are oriented in a horizontal position. This horizontal orientation of the keying faces 472 and 475 corresponds to a 120 volt circuit. The subsequent description also refers to additional keying pins, such as pins 593 (FIGS. 85 and 86) which are adjustable and have respective faces that also are orientable in a horizontal orientation corresponding to a 120 volt circuit, but also may be positioned in two different angled orientations corresponding to different voltage configurations such as 277 volts or 347 volts.

As to the keying pin 473 of the receptacle block 95, the upwardly notched configuration of this pin 473 corresponds to its use in the B connector 73B or in any other B configuration having a fixed pin molded therein. Thus, when an A connector and a B connector are joined together, the respective keying pins are disposed in opposite orientations and allowed to mate with each other which would then result in the pin of one contact block being inserted and received into the recess of the other block which allows for complete axial seating or plugging engagement of one contact block into another. This insures that the two components that are keyed for 120 volt service can only be connected to each other and could not be connected to another component that has the keying feature thereof, and specifically the pin thereof, oriented for different voltage service.

Hence, as to the receptacle 49 (FIG. 99), it can be seen that this receptacle 49 has its own fixed, non-adjustable keying pin 632 configured so as to be downwardly notched and only being engagable with an oppositely oriented key such keying pin 473 in the receptacle contact block 95. This ensures that the receptacle 49 is only plugged into another system component that is rated for 120 volt service. If a receptacle 49 is not designed for accommodating a higher voltage service such as a receptacle used for a 240/277 volt appliance or manufacturing equipment, a higher voltage receptacle might be provided with a respective keying pin that restricts use of the receptacle to the higher voltage service and also would not be matable with a low voltage service like the 120 volt position of the keying pins 470 and 473. Thus, all of the system components have A and B connectors which are matable with each other due to their respective formations of projections and slots, but their usage is restricted based upon the orientation of its respective keying feature.

Figure 63A:
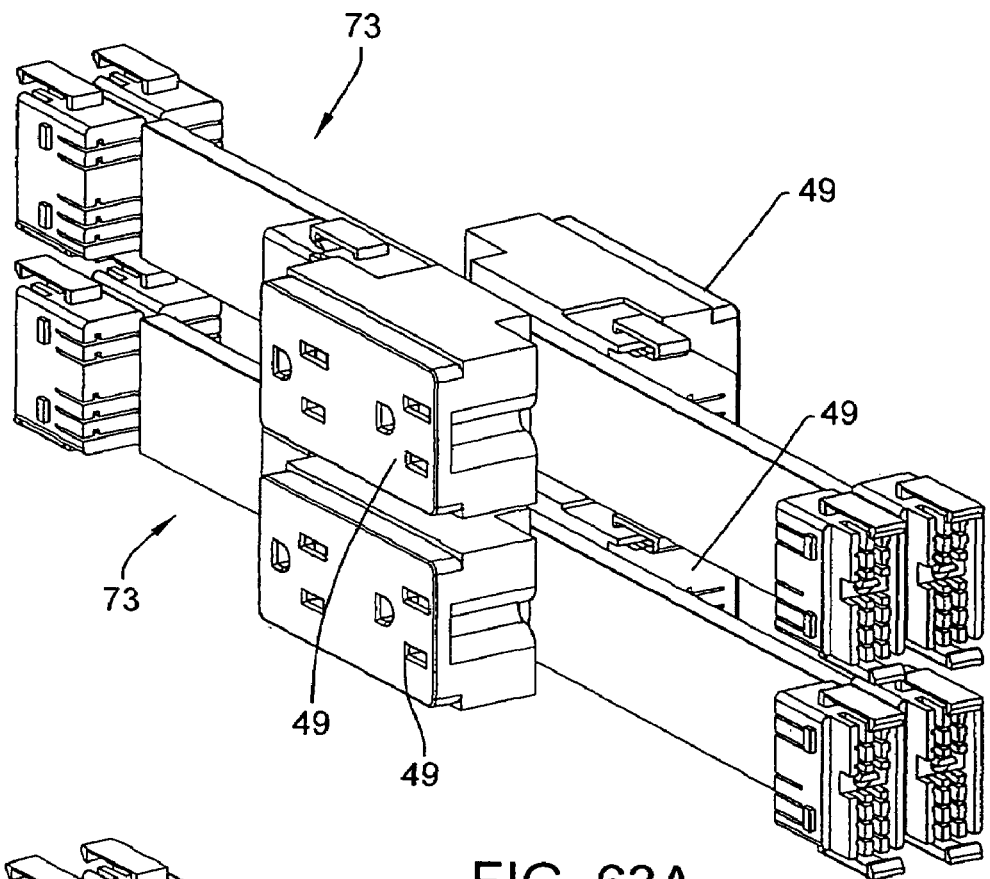
FIG. 63A illustrates a vertically stacked configuration of PDA's with receptacles mounted thereto.
Figure 63B:
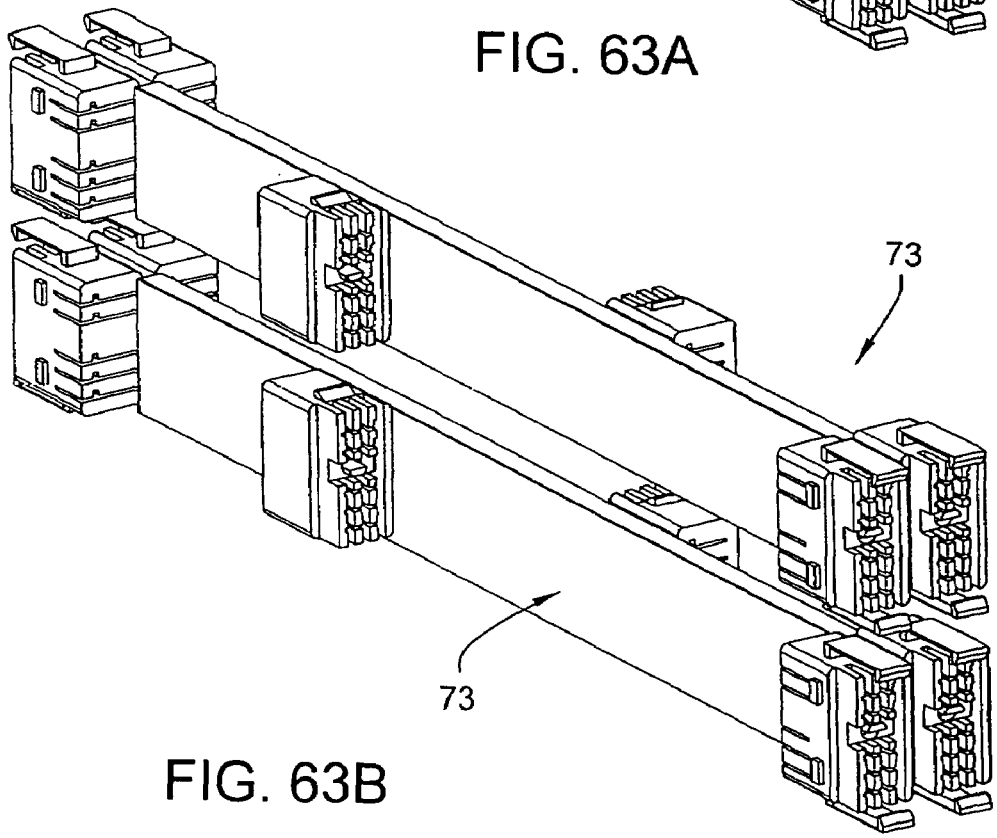
FIG. 63B illustrates the vertically stacked PDA's with the receptacles removed therefrom.

Referring to FIGS. 63A and 63B, the PDA 73 also may be mounted in a panel raceway 70 in a vertically stacked position as generally depicted therein and also illustrated in FIG. 3. As such, the receptacles 49 are disposed one above the other and accessible through a raceway cover 71.

With the above-described components, the PDA 73 and flex connector 75 may be positioned in a raceway and routed through an office area in general accord with FIGS. 3, 4 and 38.

Additionally, these components may be supplied with power at their upstream end, for example, by the wall feed connector unit 81. This wall feed connector unit has a double plug 85 at the downstream end thereof which is readily engagable with the contact blocks 91 and as such, is configured with a contact block that has the same configuration of the plug end so as to matingly engage with the contact blocks 91.

Figure 64:
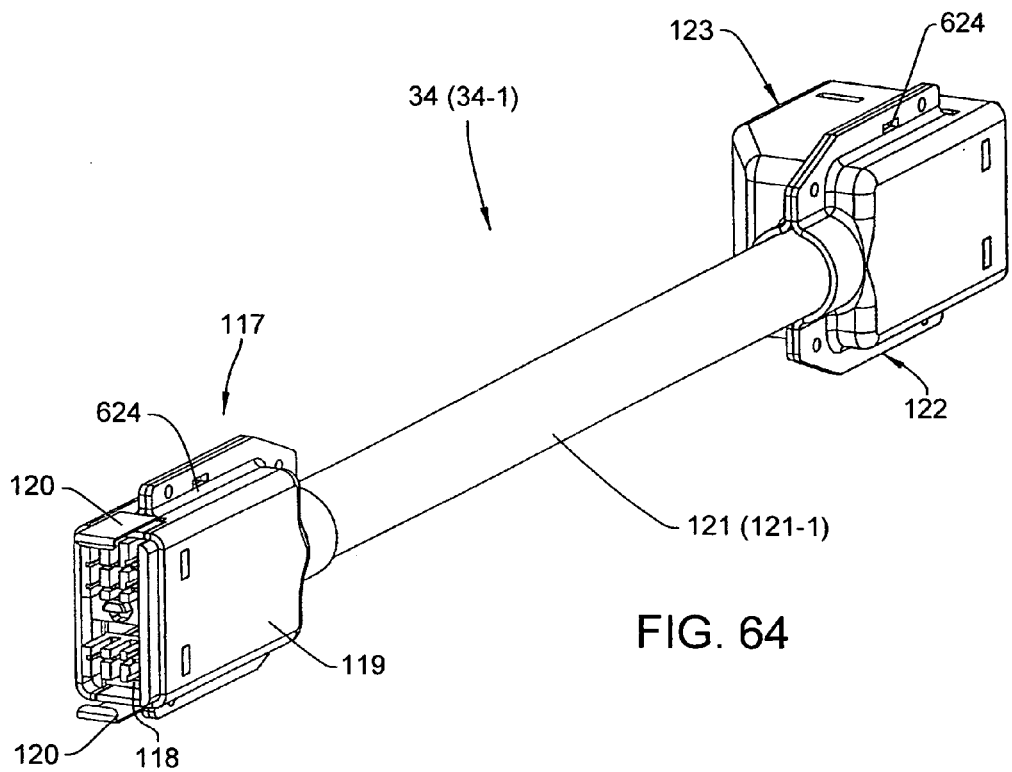
FIG. 64 is an isometric view illustrating a flexible conduit connector or conduit unit having single and double connector ends.
Figure 65:
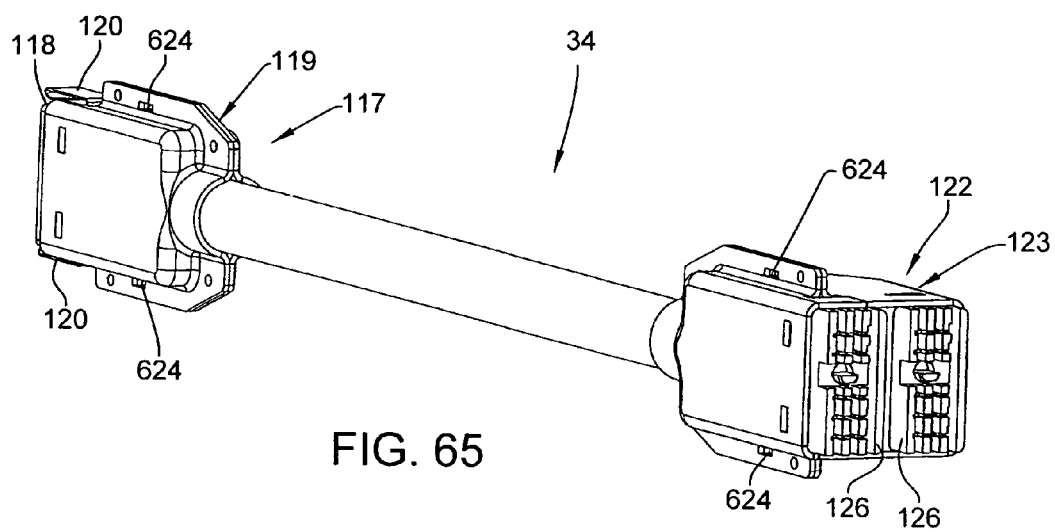
FIG. 65 illustrates the conduit unit from the double end thereof.

Referring to FIGS. 64 and 65, the conduit unit 34 is constructed with similar structural components that define the single end connector 117 having a contact block 118 therein. This contact block 118 is enclosed by the outer housing 119 and has a pair of resilient locking fingers 120 projecting longitudinally therefrom. An intermediate conduit 121 is provided which has five wires, defining three circuits, but also could have three wires defining one circuit to define the conduit unit 34-1. This conduit 121 extends downstream and defines the double end connector 122 having a housing 123 which encloses a pair of contact blocks 126.

Referring to FIG. 66, a further conduit unit 34-3 may be constructed using the same conduit 121 with single end connectors 117 on the opposite ends thereof that enclose contact blocks 118 and have single outer housings 119. The construction of the single connectors 117 are formed the same as each other and the various conduit units 34, 34-1 and 34-2, while the opposite double end connector 122 has a very similar construction with a double housing 123.

Referring to FIGS. 67A-67E, one of the single end conductors 117 may instead be replaced with a circuit selectable end connector 132 on a three-wire conductor 129 to form the conduit unit 34-2 (FIG. 8). This circuit selectable end connector 132 has the same single housing 119 which encloses a contact block assembly 134 disposed therein to define the A connector 132A described above. In particular, this contact block 134 is formed similar to the above-described contact blocks in that it is molded from plastic so as to define projections 477 and slots 478 through which contact-receiving slots 479 are provided in two locations on the upper portion of the contact block 134. These slots 479 receive single contacts 480 which are accessible therefrom in substantially the same manner as the above-described contacts 432 or 436 from their respective contact blocks. These contacts 480 are in the stationary positions associated with the neutral and ground conductors being carried through the conduit unit 34-2.

Below such stationary contacts 480, there is an additional keying feature 482 formed as an outwardly projecting pin 483 that will be described in further detail hereinafter. The pin 483 is rotatably received in bore 482A. Notably, however, the pin 483 is in a downwardly notched 120 volt position, although this pin 483 is rotatable to define angled orientations corresponding to two-additional voltage positions, such as 277 and 347 volt positions.

This contact block 134 also has a circuit selection feature built therein wherein the lower portion of the block 134 has an interior cavity 484 with a rectangular opening 485 that defines three positions corresponding to the three circuits that might be defined by a bottom three contacts of an opposed contact block that has five wires connected thereto. This chamber 484 and window 485 receives a slidable contact shroud 487 (FIGS. 8, 67A and 67C) which is vertically movable within the window 485. This contact shroud 487 has a contact-receiving slot 488 in which a single contact 480 is slidably received and fixed in position. The conduit 129 has three wires 129A connected to the three contacts 480, wherein the contact 480 in the shroud 487 connects to one of the flexible conductor wires 129A being carried through the conduit 129 which flexible wire permits relative movement of the contact 480 with the shroud 487. In particular, the contact 480 and the shroud 487 are connected to the free end of the flexible conductor 129A carried in the conduit 129 so that vertical movement of the shroud 487 is permitted by flexing of the electrical conductor.

Figure 99:
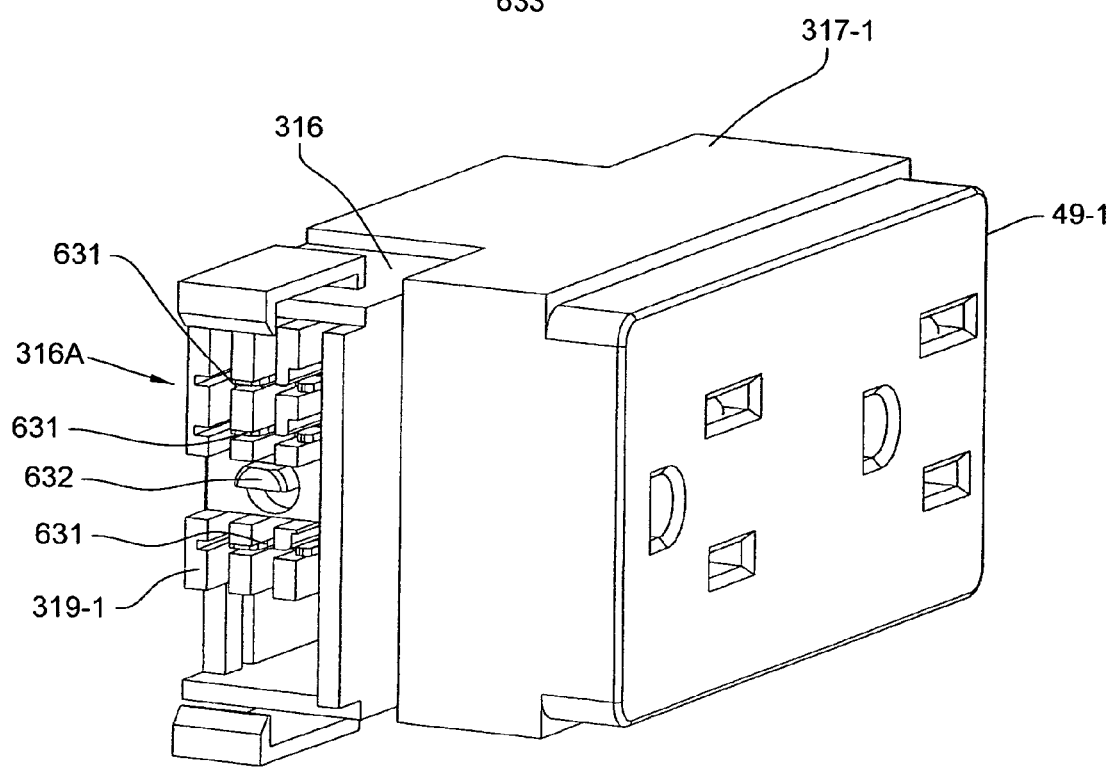

By positioning the movable contact shroud 487 vertically between first, second and third positions, the contact 480 therein may be connected to any of the upstream contacts that is disposed in an upstream contact block which three contacts correspond to the L1, L2 and L3 positions. Depending upon the vertical position of the contact shroud 487, the contact 480 therein would be connected to either of the L1, L2 or L3 circuits. FIGS. 99-101 illustrate the circuit selection feature of the receptacles 49 and the three L1, L2 and L3 positions, which circuit selection feature is essentially the same as that provided in contact block 134.

The configuration of the contact block and the slidable contact shroud 487 is also used in other system components such as the aforementioned receptacle 49, and it will be understood that discussion of such features herein is applicable to these other components without the need for providing specific illustrations thereof.

Figure 68:
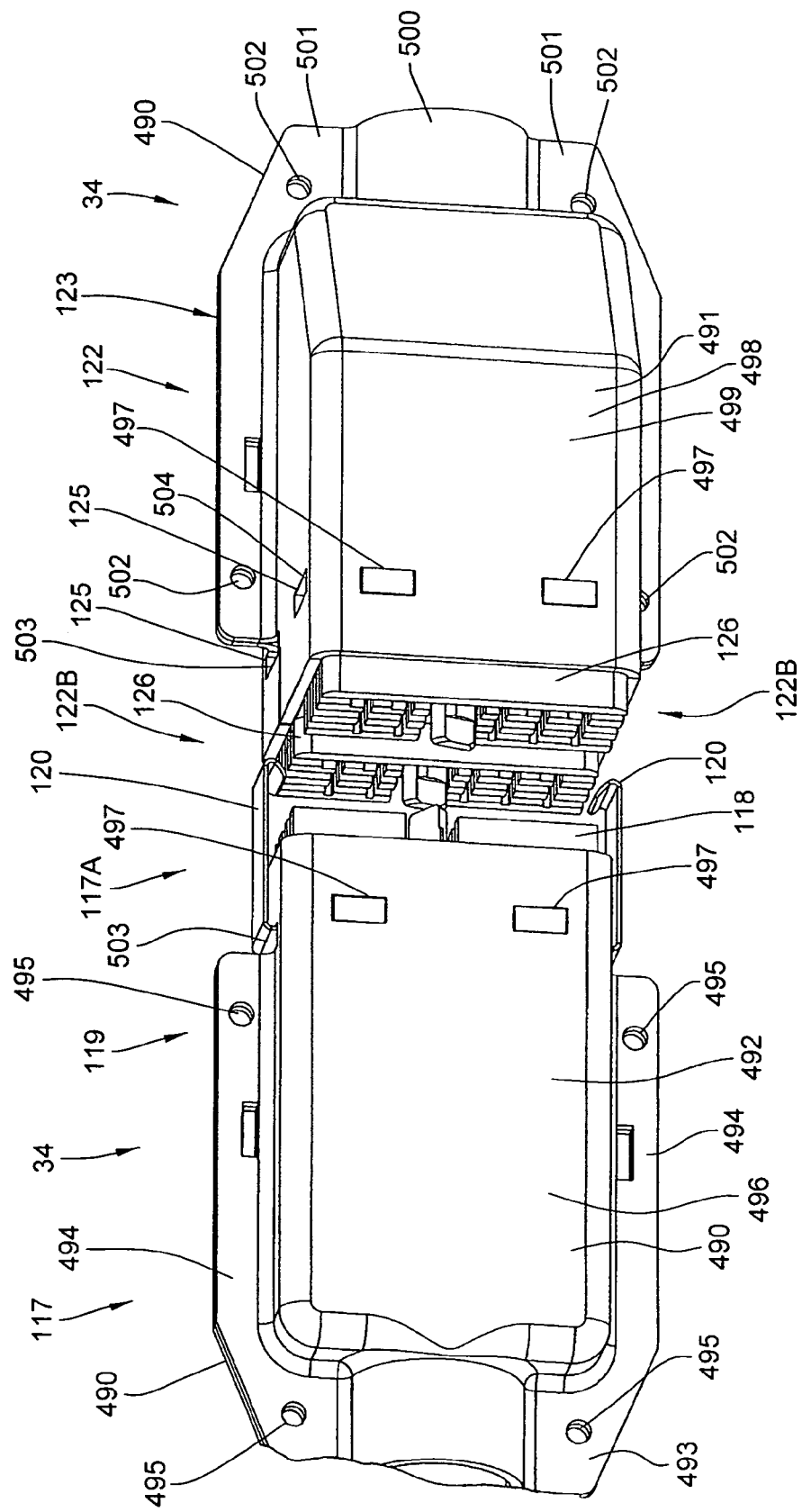
FIG. 68 illustrates the interconnection between a single A connector and a double B connector end of an adjacent conduit unit.

Referring to FIG. 68, the upstream conduit unit 34 therefore defines two B connectors 122B to which an A connector 117A of the downstream connector 34 may be connected.

As to the single and double housings 119 and 124, these comprise namely a single cover 490 and a double cover 491. The single cover 490 of the single end connector 117 is mated with another cover 490 in opposed relation as seen in FIG. 68. The double housing 123, however, is formed of one single cover 490 mated in opposing relation with the double cover 491. These covers 490 and 491 preferably are formed of shaped metal to form a metal enclosure for the contact block, and clampingly engage a suitable conduit 121 at the opposite ends thereof so as to satisfy conventional building codes associated with ceiling and wall cavities.

As to the specific cover constructions, the single cover 490 has a main body 492 that forms a rectangular chamber that opens forwardly at one end and at the opposite end includes an arcuate conduit clamp 493. This conduit clamp 493 continues into a peripheral flange 494 that is formed with fastener holes 495 to secure the two covers 490 together in said opposing relation and has bracket slots 624 for securing to a wall box 48 as will be described herein. The facing wall 496 of the main body 492 includes two rectangular apertures 497 that are configured to lockingly engage with projections on the contact blocks 118 or 126 depending upon where the single cover 490 is used.

As to the double cover 491, this double cover is formed substantially the same except that the main body 498 thereof is substantially taller than the single main body 492. The main body 498 has apertures 497 in the facing wall 499. The main body 498 also has a conduit clamp 500 at one end thereof which continues into peripheral flanges 501 having fastener holes 502 for screwing the covers 490 and 491 together.

As to the single cover, the single cover also has slot portions 503 near the mouth of the main body 492 which allow for passage of the locking fingers 120 therethrough in the single end connector 117. In the double end connector 122, the slot portion 503 serves as one of the catches 125 while the double cover 491 also includes its own respective slot 504 which defines a second catch 125. These slots 503 and 504 in the double housing 123 serve as catches for engagement with the latching fingers 120 to lockingly engage the two conduit units 34 together.

As to the double cover 491, the depth of such double cover 491 is adapted to completely receive one of the contact blocks 126 therein as well as approximately half of the second contact block 126 which is disposed in side-by-side relation. These contact blocks are disclosed in more specific detail hereinafter, but it is noted that these receive their own respective contacts therein and have internal conductor wires 505 projecting rearwardly therefrom. When wired in a conventional manner, these conductors 505 have the upper two conductors 505 associated with the ground and neutral positions, with the three lower conductors 505 associated with the three lower line positions L1, L2 and L3.

Figure 69:
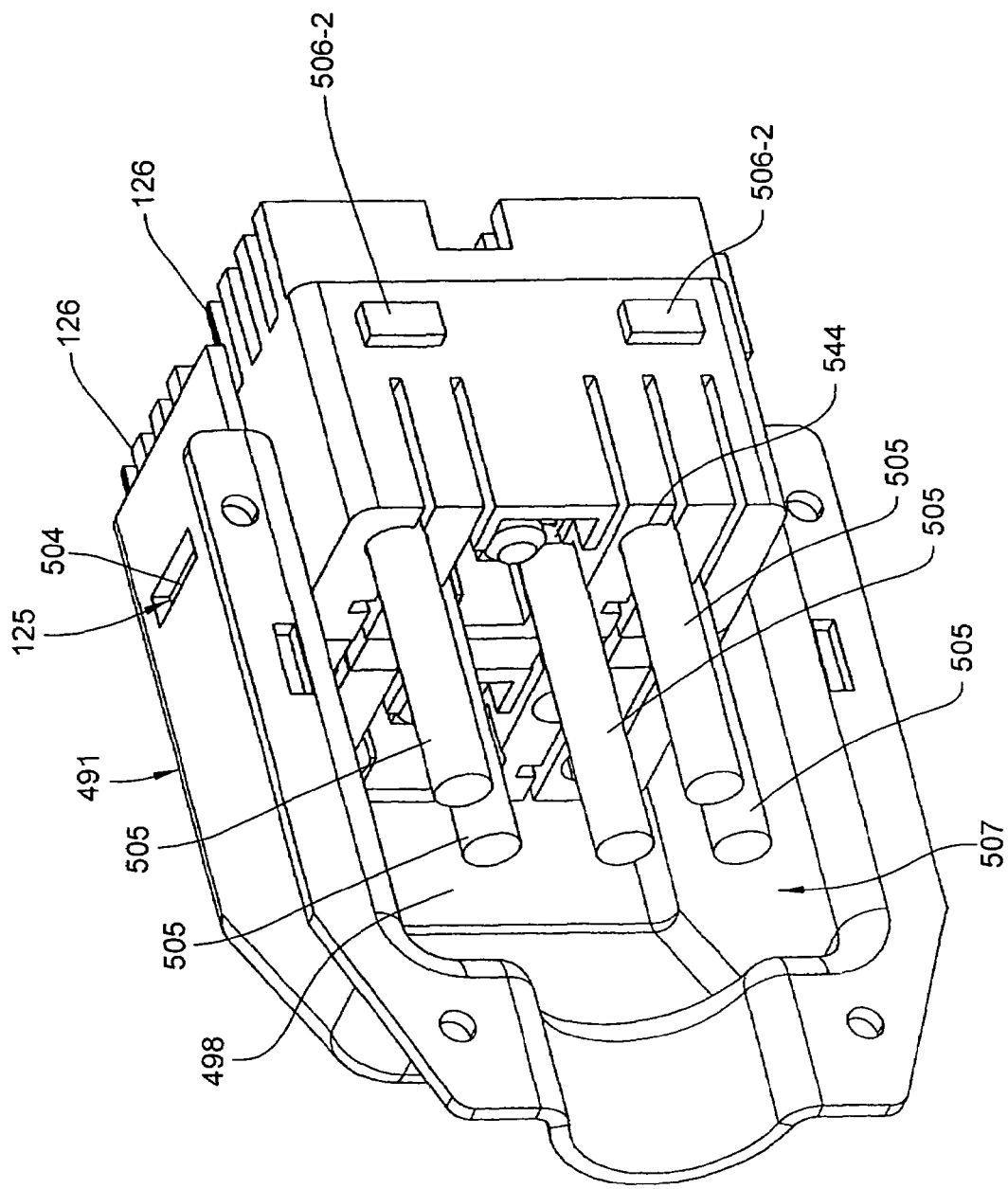
FIG. 69 illustrates a double connector end with a section of housing and a cable manager removed therefrom.

These conductors 505 are shown broken off in FIG. 69, but it is understood that same extend rearwardly from the contact blocks 126 and then enter into the flexible conduit 121 so as to pass therethrough and connect to the contact block 118 at the opposite end of the conduit unit 34. Notably, the contact blocks 126 as well as the single contact block 119 all include outwardly projecting locator blocks 506 which project through the corresponding cover apertures 497 to fixedly secure the contact blocks 126 or 118 in position within their respective covers 490 and 491.

Figure 70:
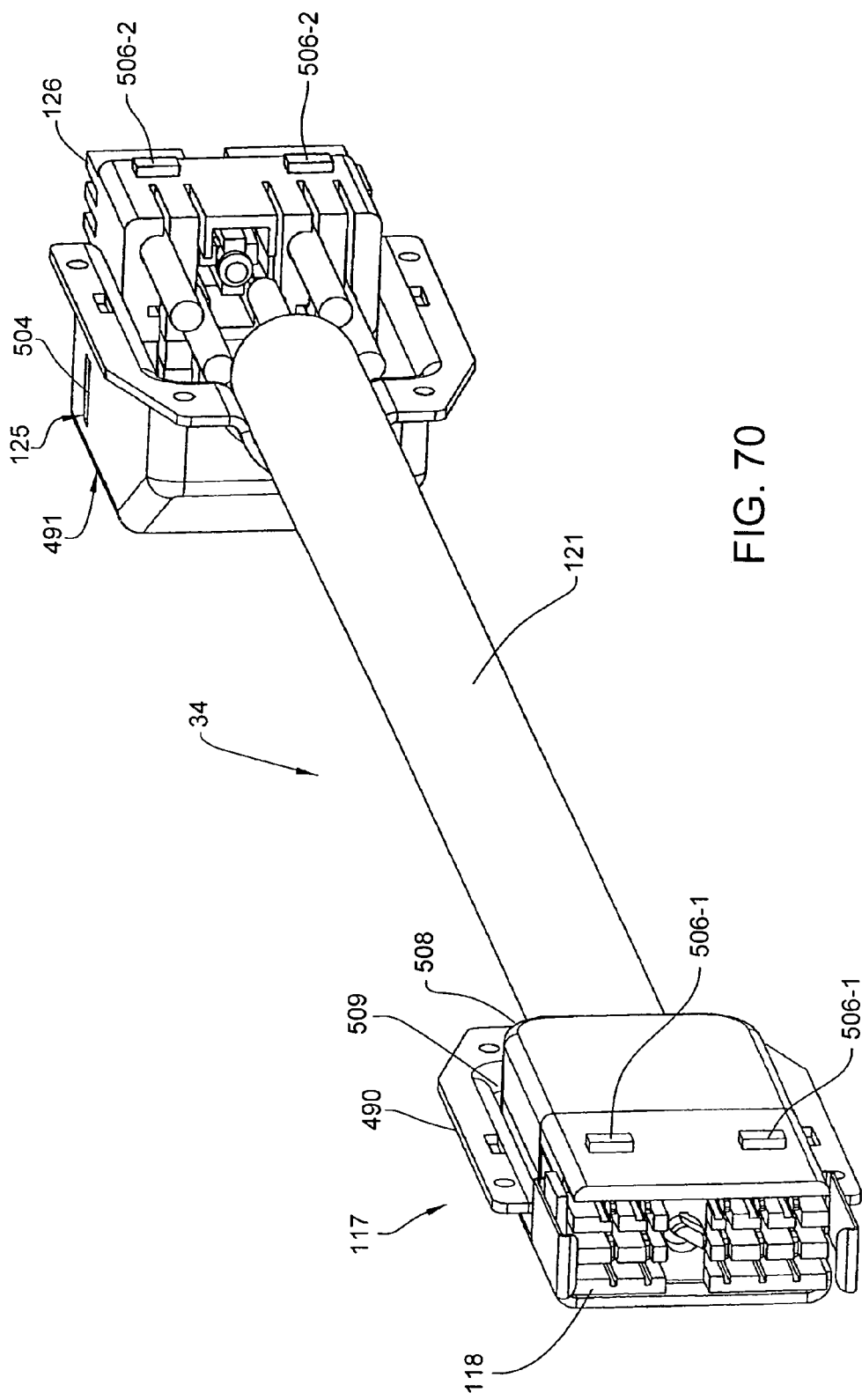
FIG. 70 illustrates the flexible conduit unit with the partially-exposed double end of FIG. 69.

It is noted that the main body 498 defines a cavity through which the conductors 505 pass. The appropriate cable manager is disclosed in this compartment which in the illustrated embodiment of FIG. 70 is designated as wire manager 508. This is single wire manager 508 is also provided in the double housing 123 since the conduit wires are only connected to one of the two contact blocks 126 with the other contact block 126 being electrically connected thereto by the contact webs extending between the blocks 126.

Figure 71:
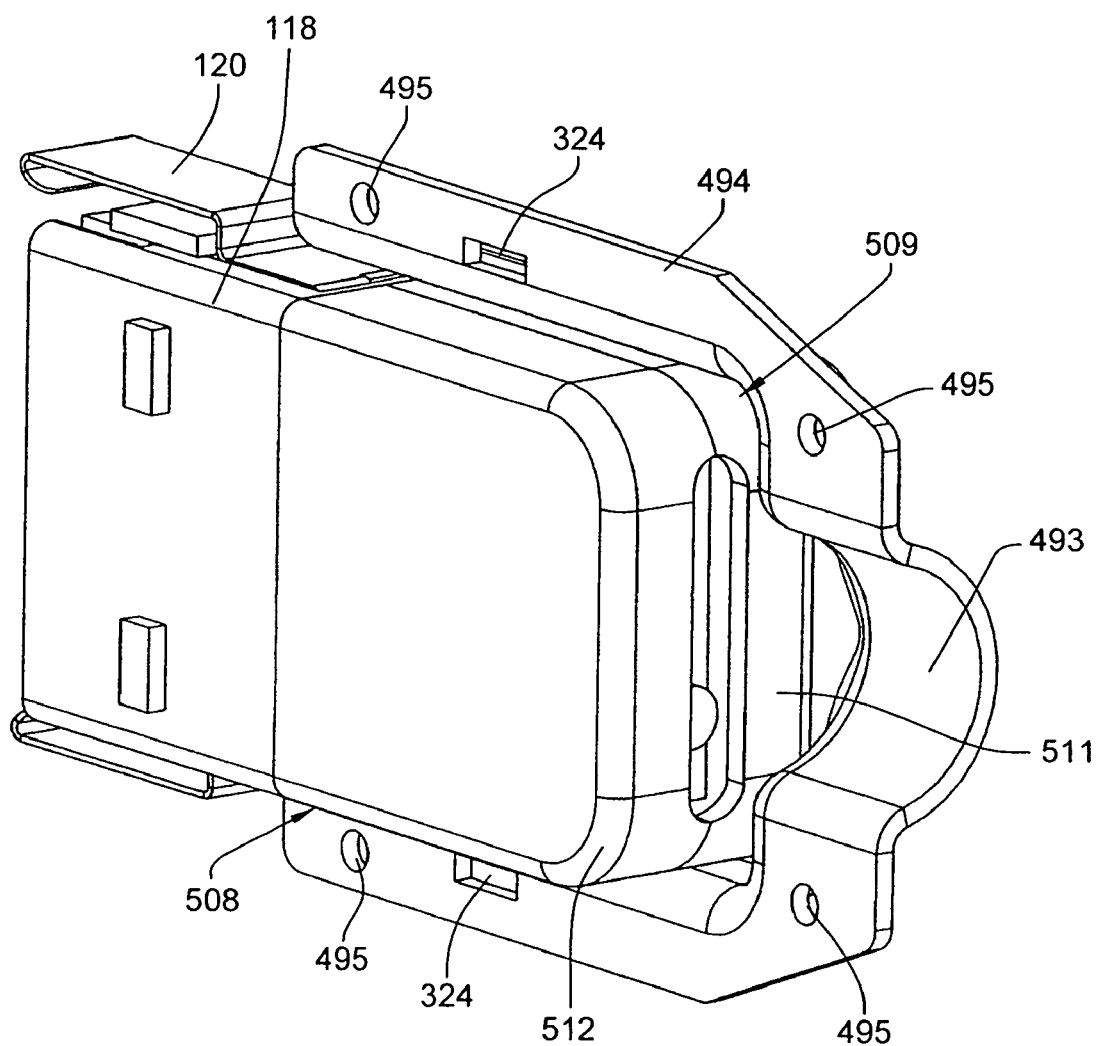
FIG. 71 illustrates the single connector end with one housing cover removed and a wire management assembly positioned in place.
Figure 72:
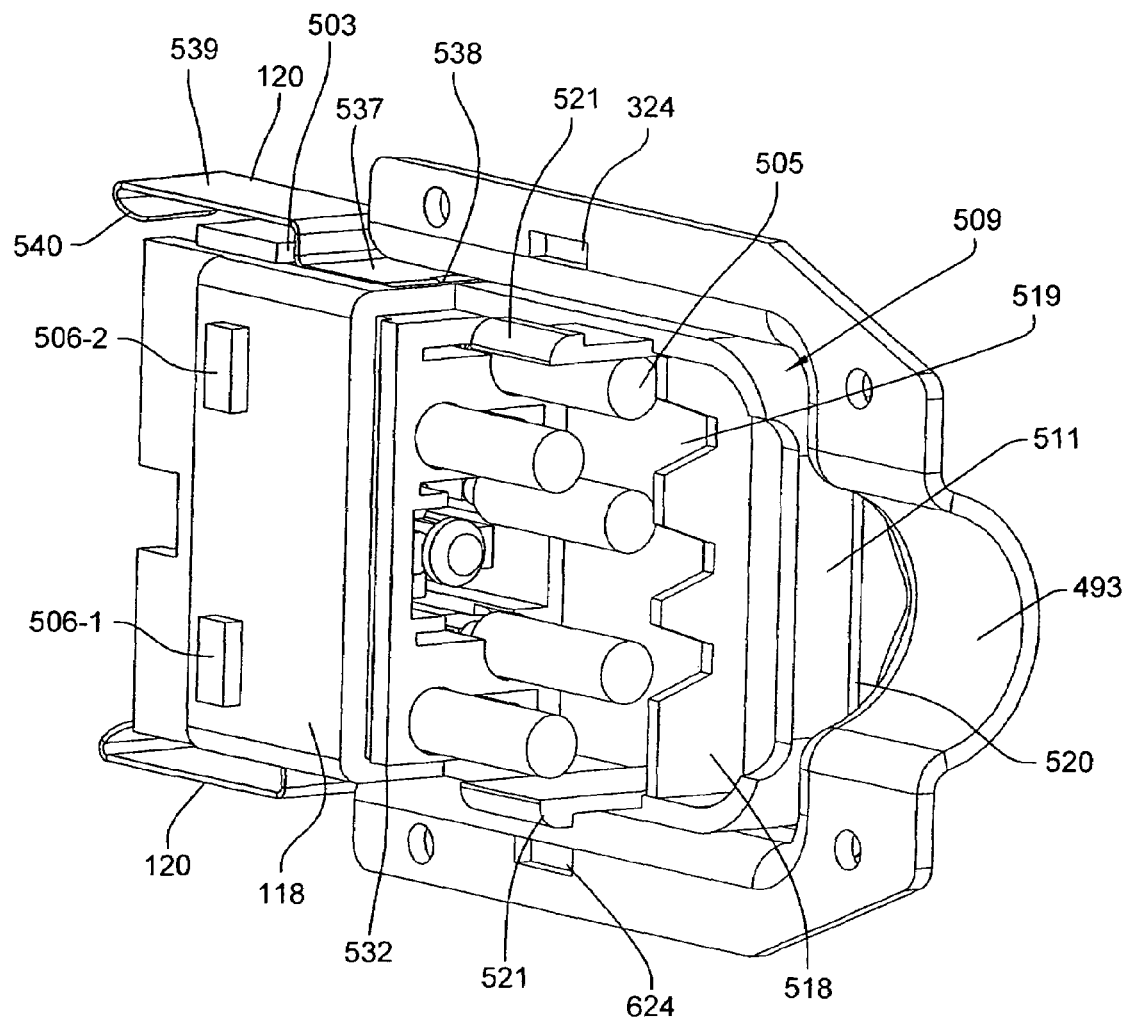
FIG. 72 illustrates the single end of FIG. 71 with one wire management cover removed.
Figure 73:
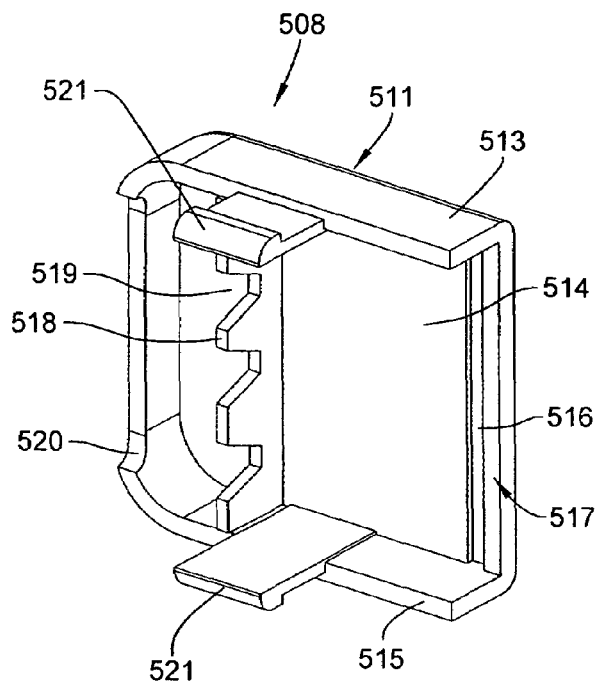
FIG. 73 illustrates a first wire management cover.
Figure 74:
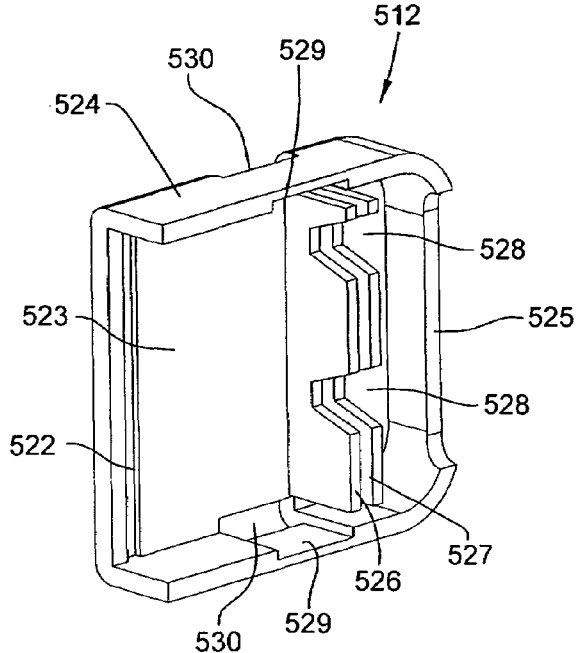
FIG. 74 illustrates a second wire management cover.

Referring to FIGS. 71-74, the wire manager 508 comprises two snapped-together covers 511 and 512 which fit within the compartment 509. The first cover 511 includes a main body 513 which is a side wall 514 which turns into a peripheral side wall 515. The forward end of the main body 513 includes a slot 516 which slides onto a corresponding portion of the contact block 118 for secure engagement therewith and is open to allow entry of the conductors 505 therein as seen in FIG. 72.

Rearwardly of the front opening 517, an upstanding alignment wall 518 is provided with recesses 519 into which the conductors 505 may be pushed to control the relative position thereof within the wire manager 508. The rear of the side wall 515 also includes an elongate notch 520 through which the conductors 505 may exit and pass into the mouth of the conduit 121 that would be clamped in the conductor clamp 493 (FIG. 71). The side wall 515 also includes snap locking flanges 521 which are resiliently deflectable since the covers 511 and 512 are formed of a molded plastic.

As to the cover 512 (FIG. 74), this cover 512 also includes a slot 522 formed at the mouth of the main body 523. The side wall 524 extends thereabout and also defines a conduit-receiving notch 525 through which the conductors 505 pass into the conduit 521. A double alignment wall is provided having a slot 527 in which is received the single alignment wall 518 described above. The alignment wall 526 includes its own respective recesses 528 which align with recesses 519 and allow for the passage of the conductors 505 through the cooperating walls 518 and 526 while the recesses 519 and 528 thereof maintain the conductors 505 in a fixed position.

The side wall 524 also includes grooves 529 on the side wall which extend downwardly to windows 530, which windows 530 and grooves 529 snap-lockingly engage with the locking flanges 521 when the two covers 511 and 512 are pressed together. As such, the cover 511 would be first positioned within, for example, the single cover 490 and then the contact block 118 would be positioned therein with the conductors 505 being routed through the alignment walls as they extend rearwardly to the conduit 521. The other cover 512 would then be snapped over the conductors 505. In that the slots 522 and 516 of the two covers 511 and 512 capture a rear connector portion 532 of the contact body 118, the wire manager 508 would be positively secured to the back of the contact block 118. This connector portion 532 is further illustrated in FIG. 75A as projecting rearwardly from a face 533 of the contact block 126. The connector portion 532 is generally rectangular and has two side slots 534 that define two outwardly projecting ribs 535 which are fixedly received in the corresponding cover slots 516 and 522.

Also as to FIG. 72, the latching fingers 121 in this embodiment preferably are formed of a resilient spring steel having a mounting section 537 which seats within a corresponding rectangular cavity 538 on the contact block 118. The finger 120 then turns outwardly and passes through a corresponding slot portion 503 and then turns into a cantilevered locking arm 539 wherein the terminal, free end thereof is bent downwardly to define a hook 540 that engages a corresponding slot or catch on a serially-adjacent end connector. By engaging the hook 540 with a corresponding catch, two end connectors of two system components may be releasably joined together.

While the wire manager 508 is shown as two separable components, it is possible to also form the wire manager 508 unitarily with the contact blocks which also are molded from an insulative material.

Referring to FIG. 75A-75F, the contact blocks 118 and 126 are illustrated as having very similar constructions.

Figure 75A:
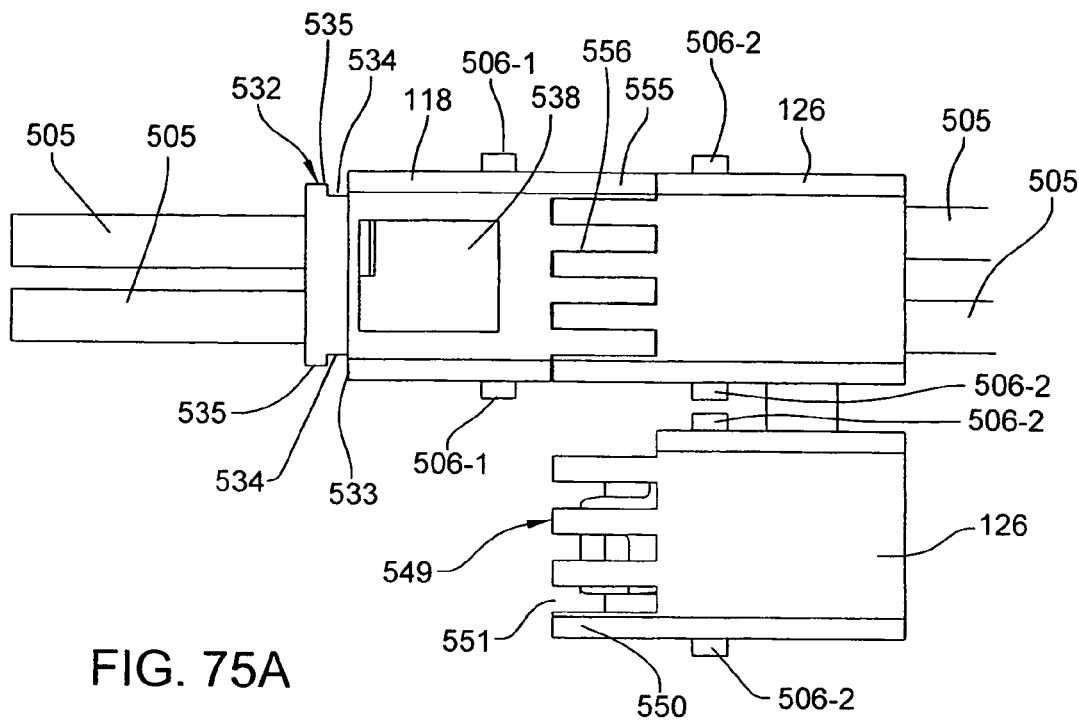
FIG. 75A illustrates the interior end contact blocks of single and double end connector mated together.
Figure 75B:
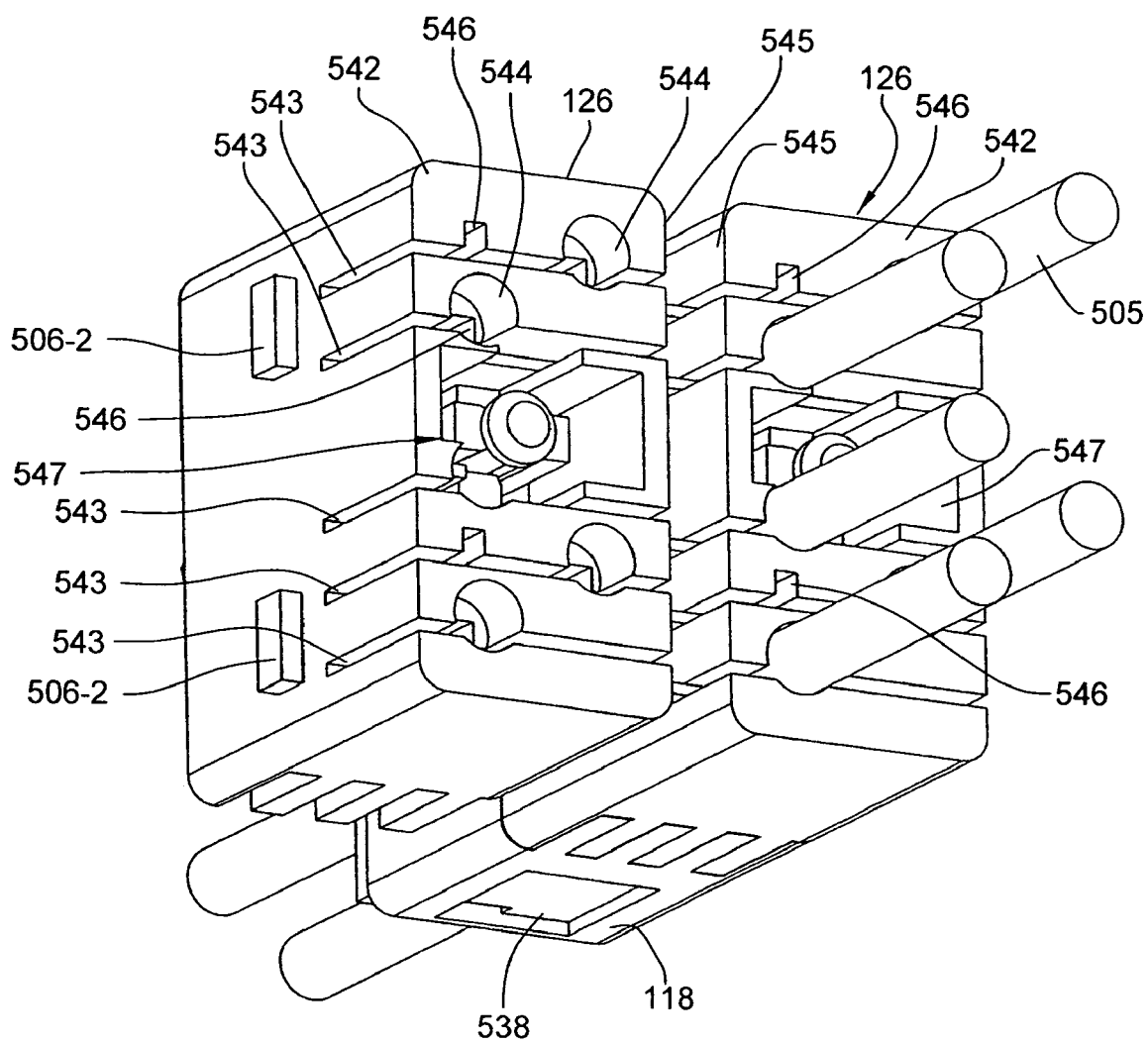
FIG. 75B is an isometric view of the interconnected contact blocks of FIG. 75A with a keying pin in a fully seated, non-rotatable locked position.

In particular, FIG. 75B illustrates the contact blocks 126 as having a slotted end face 542 formed with a plurality of vertically spaced contact-receiving slots 543 having conductor bores 544 in communication therewith through which the conductors 505 may exit from the slots 543. These slots pass through the lateral width of the blocks 126 so as to open through the interior side block faces 545. Further, the slots 543 are generally flat but have an upward extension 546.

In the middle of the block, a keying unit 547 is provided to key the blocks 126 for a specific voltage being carried therethrough. It is noted that the conduit units 34 are configured for carrying any of the voltages 120, 277 and 347, unlike the wall panel-based components which are pre-dedicated to 120 volt service.

The front plug face 549 has the same shape as the above-described contact blocks of the PDA 73 so as to permit mating engagement with other similar blocks. In particular, the front plug face 549 is formed with projections 550 and slots 551 which are offset but define a hermaphroditic plug configuration for plugging into the same configuration provided in the contact block 118 as seen in FIG. 75A. As seen in FIG. 75F, the keying unit 547 also is accessible through the front of the contact block 126 as will be described in further detail hereinafter.

Figure 75D:
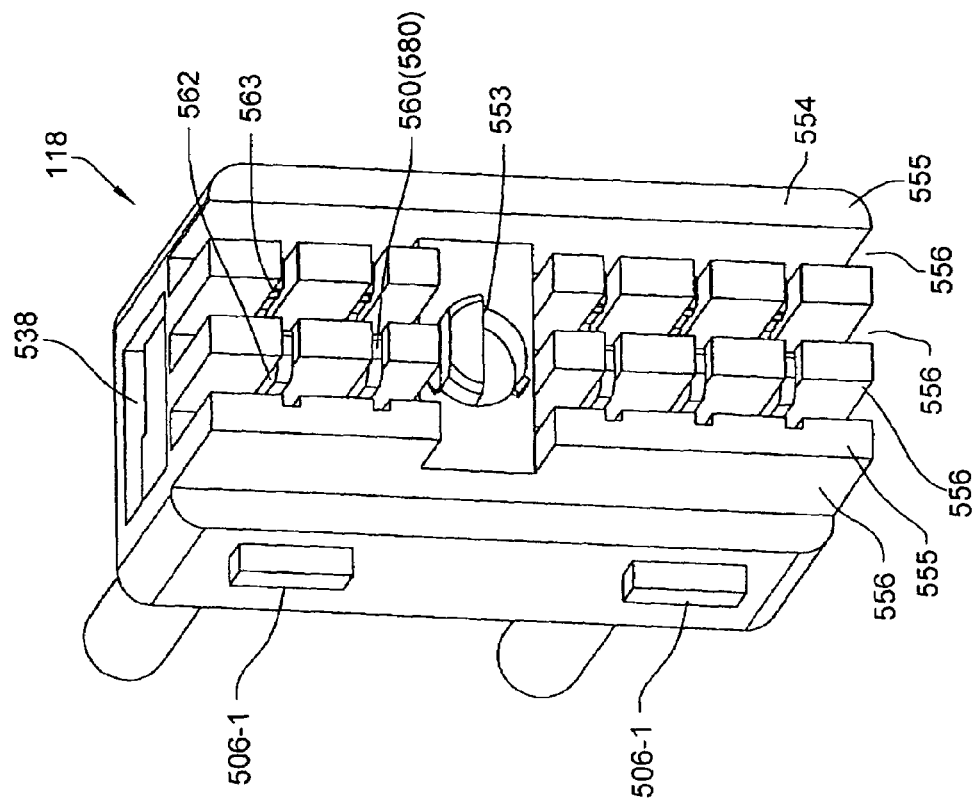
FIG. 75D is an isometric view of the front plug end of the contact block of FIG. 75C.
Figure 75C:
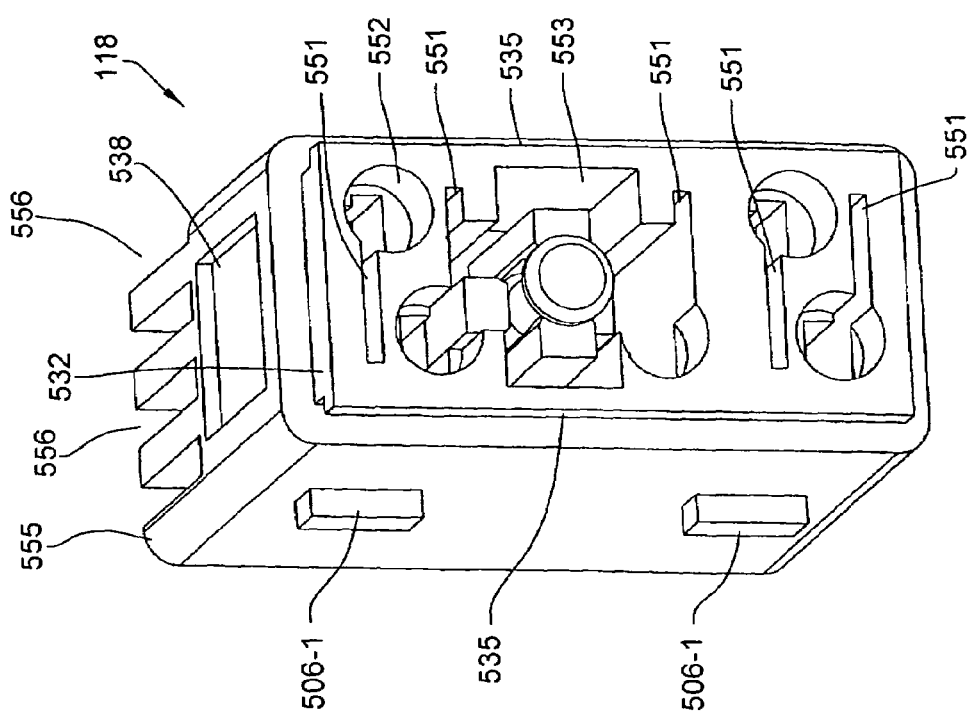
FIG. 75C is an end view of a slotted end of a contact block.
Figure 75F:
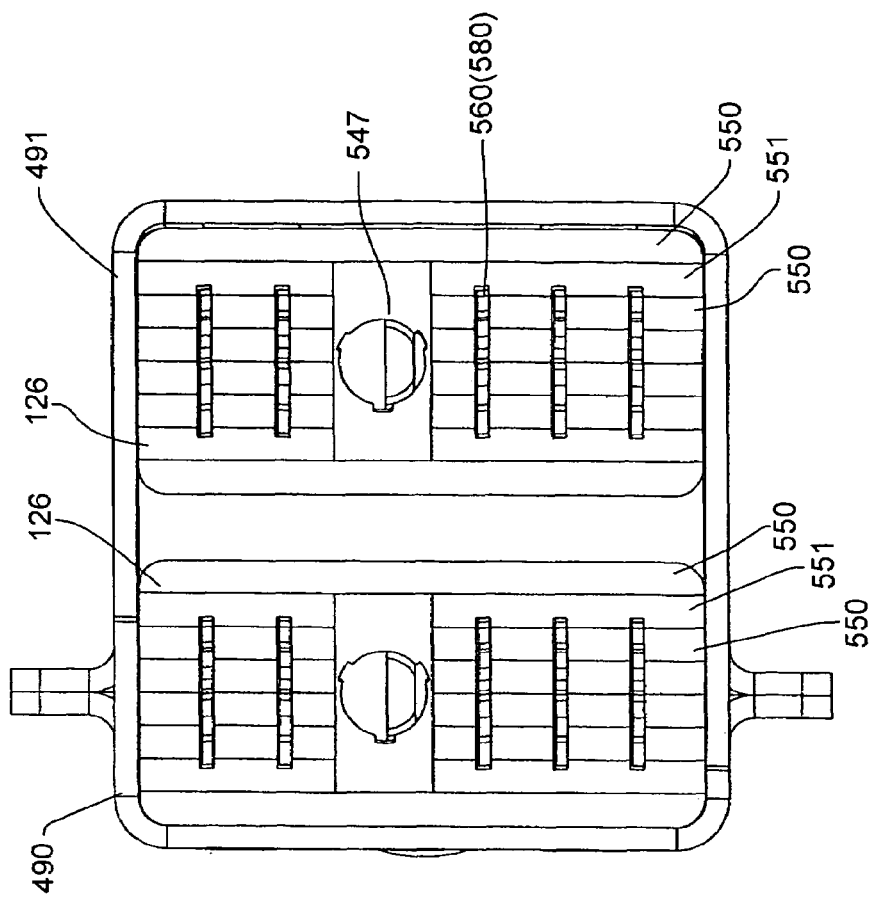
FIG. 75F illustrates the contact blocks in a double end connector.
Figure 75E:
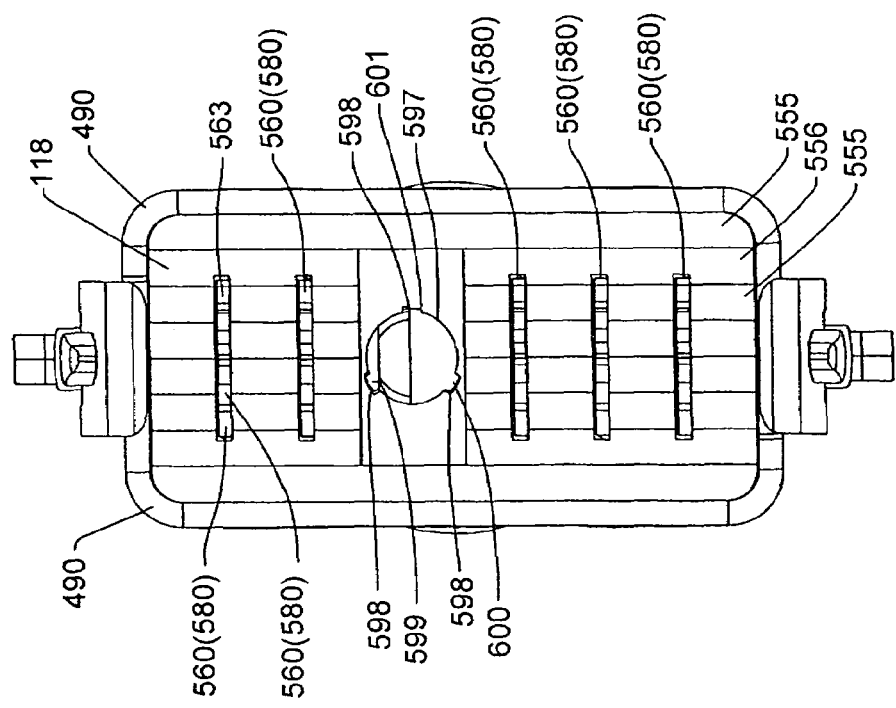
FIG. 75E illustrates the contact block in a single end connector.

Referring to FIGS. 75C-75E, the contact block 118 also has a similar configuration with a plurality of contact-receiving slots 551 having rearwardly opening conductor bores 552 and a keying unit 553. On the front block face 554, a similar pattern of projections 555 and vertical slots 556 are illustrated in alternating relation to define the hermaphroditic plug profile that corresponds to the other contact blocks.

The block 118 as illustrated in FIGS. 75C-75F also is modified in that the contact slots 551 have the vertical extensions omitted therefrom which would be necessary to accommodate the contact strengthening rib 566 described below, wherein the block 118 as illustrated specifically accommodates the flat contact 580 described below.

Figure 76:
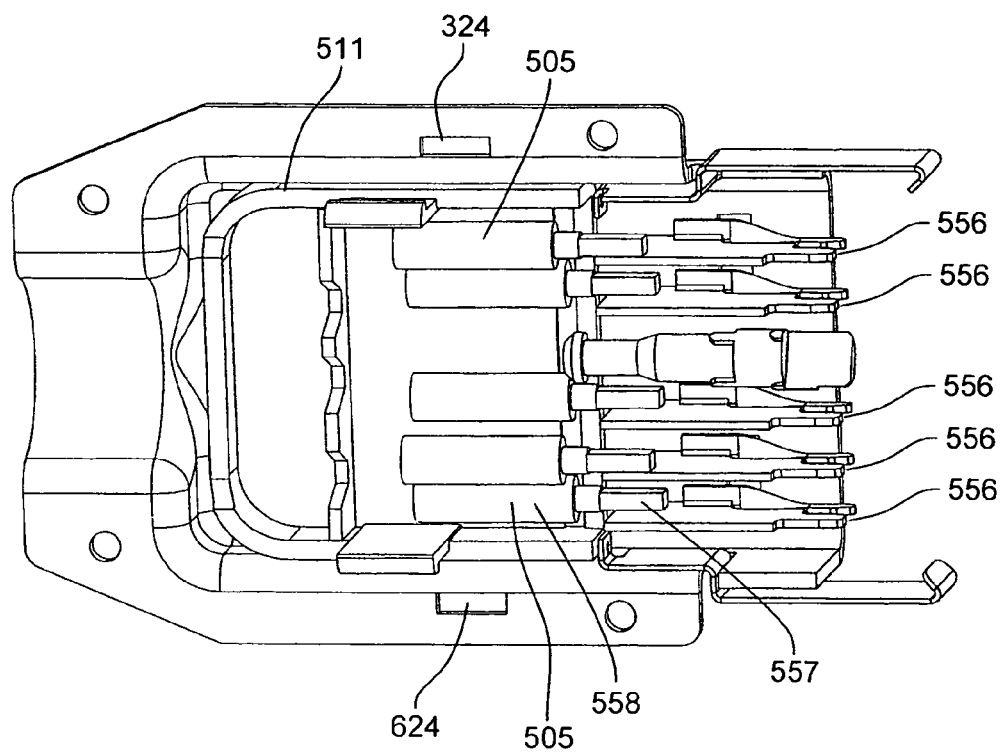
FIG. 76 illustrates the interior contact components of a single end connector.

As will be described hereinafter, it is noted that the contact receiving slots 551 and 543 all continue through the entire front to back thickness of the contact blocks 118 and 126. Referring to FIG. 76, these slots thereby are able to receive a plurality of contact terminals 556 in vertically spaced relation. In FIG. 76, the contact block 118 is removed therefrom for illustrative purposes. The rear ends of the terminals 556 are connected to the stripped conductive end 557 of a conductor 505 wherein the insulation 558 thereof projects out of the respective conductor bores 552.

Figure 77:
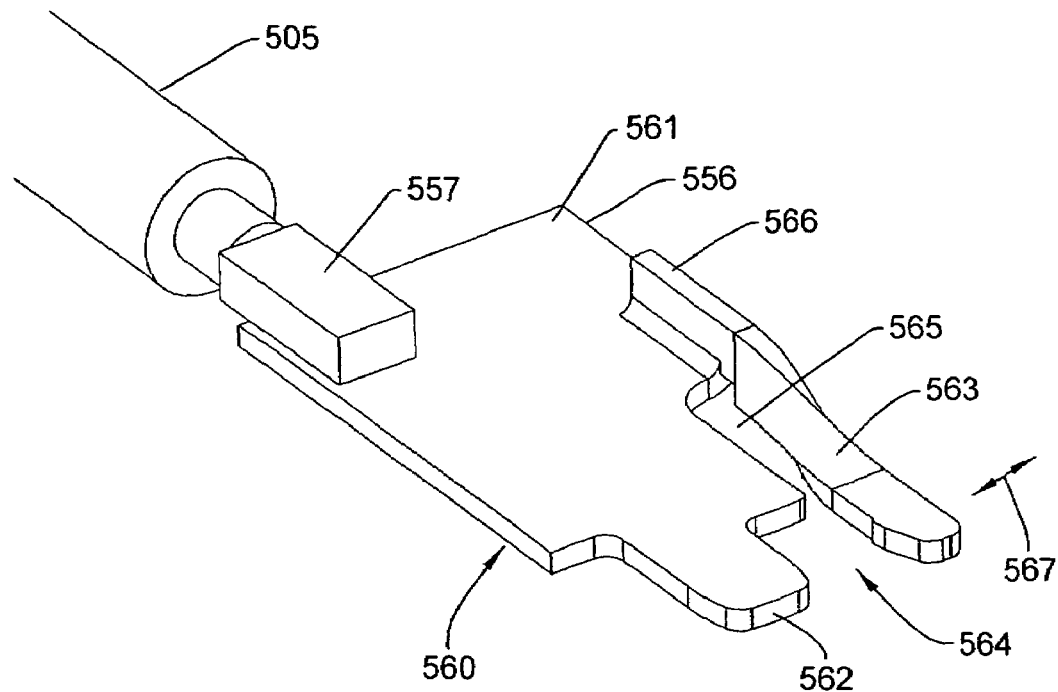
FIG. 77 illustrates an electrical contact in a single configuration.
Figure 79:
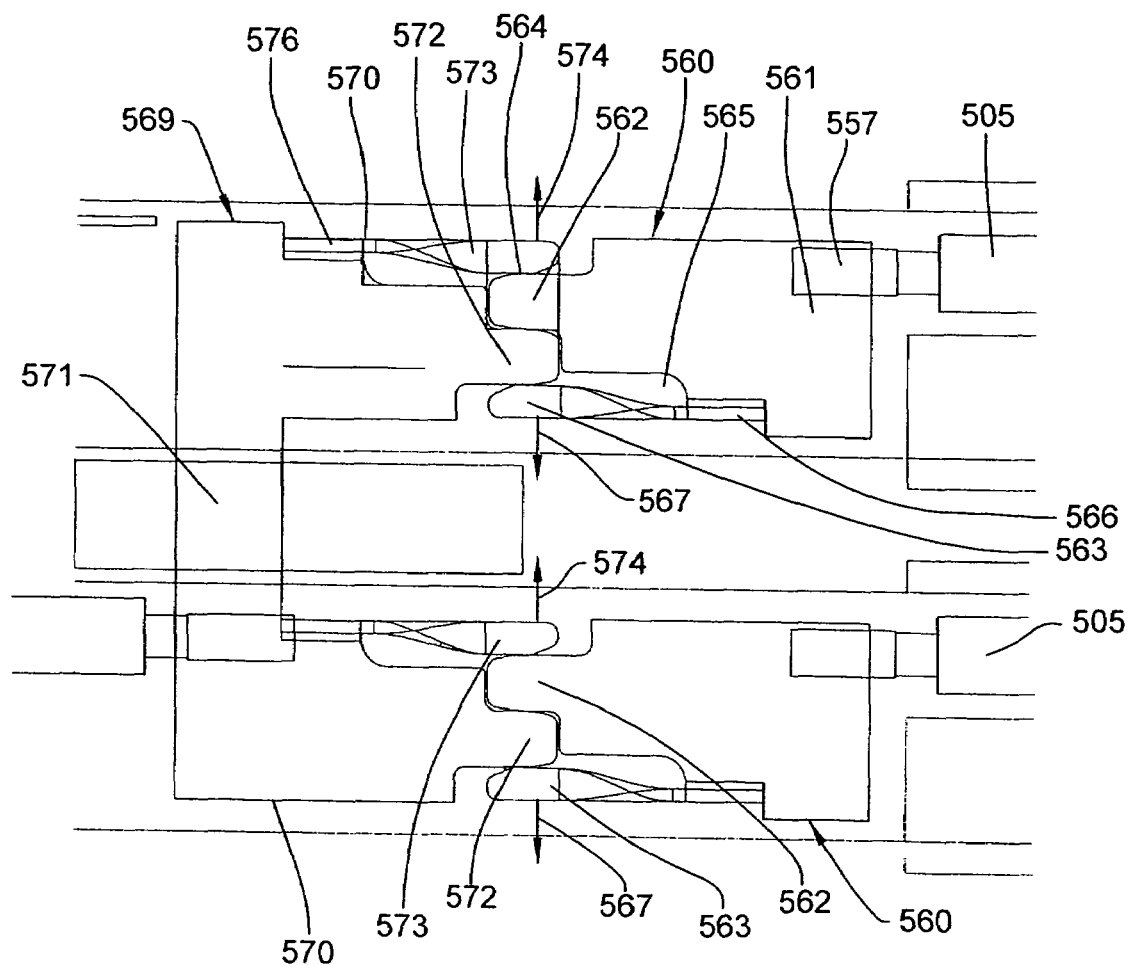
FIG. 79 is a plan view of the interconnected contacts of FIG. 78.

Referring to FIGS. 77 and 79, the terminals 556 define contacts 560 at the front thereof and have a back plate 561 to which the conductor 557 is soldered or welded for completing an electrical connection. The contact 560 is formed from a stamped or formed piece of conductive metal such as brass and is defined by a fixed contact flange 562 having a generally rectangular shape, and a resilient contact finger 563 which is spaced sidewardly from the contact plate 562 and separated therefrom by a gap 564. This gap 564 continues rearwardly and opens into a narrow separation slot 565. A rearward portion of the contact finger 563 is bent upwardly to define a strengthening rib 566 for rigidity and to also permit lateral flexing of the contact finger generally in the direction of arrow 567.

These individual single contacts 560 are slid into the contact block 118 through the respective slots 551. The perpendicular slot extension 546 is provided to accommodate the upstanding support rib 566 during sliding therein. In this manner, the contact 560 is non-removably seated in the corresponding slot 551 so that the contact blade 562 and the contact finger 563 are accessible through the front ends of the slots 551 which open through the slots 556 and projections 555 on the front of the block 118. In this manner, the contacts 560 in the upper two slots in a three-circuit configuration would be associated with ground and neutral, and the three bottom contacts 560 would be associated with the three lines L1, L2 and L3. It is understood that this could be varied depending upon the initial wiring of this system so that possibly one of the contacts 560 serves as a ground and the four remaining contacts 560 are associated with two neutrals and two contacts so that a five-wire, two-circuit configuration is designed.

Figure 78:
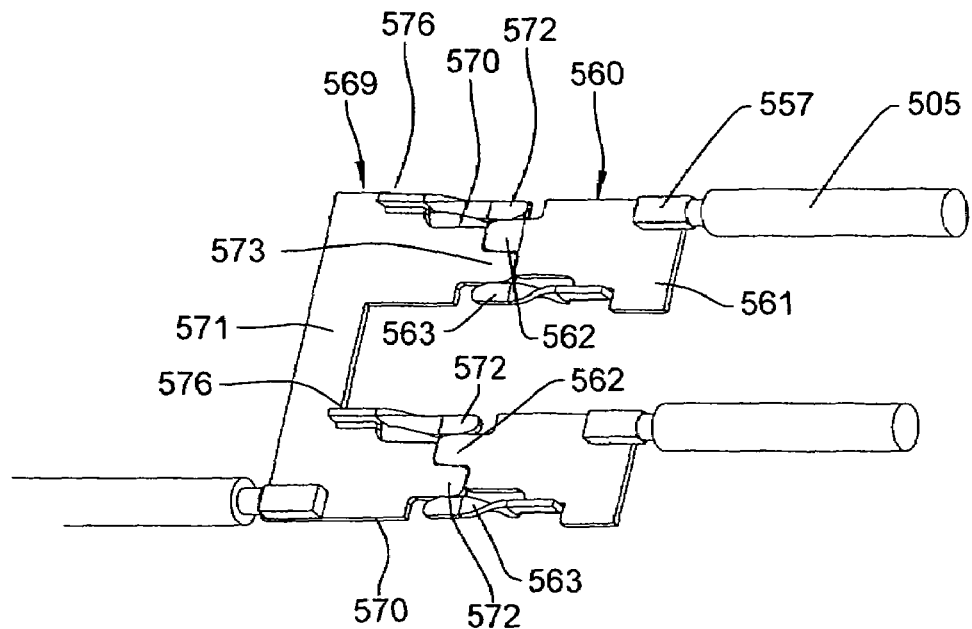
FIG. 78 illustrates an electrical contact in a double configuration being mated with two single electrical contacts.

As to the pair of contact blocks 126, these contact blocks 126 as seen in FIG. 75A, FIGS. 78 and 79 have a double contact terminal 569 (FIGS. 78 and 79) which comprises two contacts 570 joined together by intermediate web 571. The two contacts 570 are essentially identical to the contacts 560 except for the addition of the web 571 which joins the two contacts 570 together in laterally spaced relation. Each of these contacts 570 therefore comprises a contact blade 572 and a contact finger 573 which are disposed in laterally spaced relation to thereby define a gap therebetween. The resilient fingers 573 are thereby displaceable outwardly generally in the direction of reference arrows 574 (FIG. 79) such that when the opposed contacts 560 and 569 move towards each other into plugging engagement, the contact blades 562 and 572 abut sidewardly against each other and are compressed sidewardly by the contact fingers 563 and 573 which respectively move in the direction of reference arrows 567 and 574 yet resiliently press back towards the opposing contact blade 562 or 572. It is noted, as seen in FIG. 78, that the blades 562, 572 and contact fingers 563, 573 lie in the same plane so as to have a height defined only by the thickness of the contact material. This allows for close vertical spacing of the contact terminals described in this application which allows for condensing of the size of the contact blocks and reducing the dimensional requirements thereof. Further, the thinness of the contact-receiving slots restrains the contacts vertically and prevents buckling or spread apart so that the contacts can have a thickness which essentially is the thickness of one material layer. Still further, only one layer or wall of block material is provided between each pair of slots which further reduces the block height. The only significant height added to the contacts 560 and 569 are the upstanding support ribs 566 and 576 providing support to the contact fingers 563, 573, and even then this is accommodated in the material wall between the contact slots.

The above contact geometry allows for a system of power distribution components which have a minimum vertical dimension that readily fits within most all conventionally sized building cavities. Additionally, this spacing allows for the use of conventionally sized electrical wall mount boxes 48, 291 and 299 (FIG. 19). It will be understood that this discussion of the contacts is also applicable to the other contacts discussed herein, wherein the same contact geometry is used throughout the system components.

More particularly, conventional shrouded terminal designs have minimum spacing requirements required by UL specification requirements. For voltages above 300 volts, the insulation barrier thickness between conductors must be at least $1/16^{th}$ inch and space through air between bare conductors must be at least $1/8^{th}$ inch. For conventional male/female terminals which are shrouded, this requires a minimum spacing between conductors of $3/16^{th}$ inch between the shrouds to provide space for a third $1/16^{th}$ barrier shroud of the connector being joined thereto.

The use of vertical projections and slots in combination with the low-profile contact or tine arrangement disclosed herein greatly reduces the overall stack height of a stack of contacts, particularly as here, where the contacts are vertically aligned and are not offset or staggered as may be found in prior contact arrangements. The projections and slots are oriented as barrier walls perpendicular to the wide plane of the contacts which allows the terminals to be spaced at $1/8^{th}$ inch and thereby eliminates the conventional third barrier wall that would be required between terminals in shrouded arrangements. Further, since the contacts of the invention contact each other sidewardly in the same plane and the same vertical space defined by the contact metal thickness, vertically adjacent contact-receiving slots can be spaced closer together since only one common wall is needed to separate the vertically adjacent contacts and satisfy the insulation barrier thickness requirement.

While the contact configuration provides significant advantages, it also will be understood that more conventional contacts, such as male/female contacts whether staggered or not, might be used in association with the various system components. While such prior contact construction do not provide the same size advantages, the concepts of the system, such as the A connectors and B connectors and the keying arrangements could still provided advantages and of themselves are inventive features that are not dependent upon the use of the inventive flat contacts.

Figure 80:
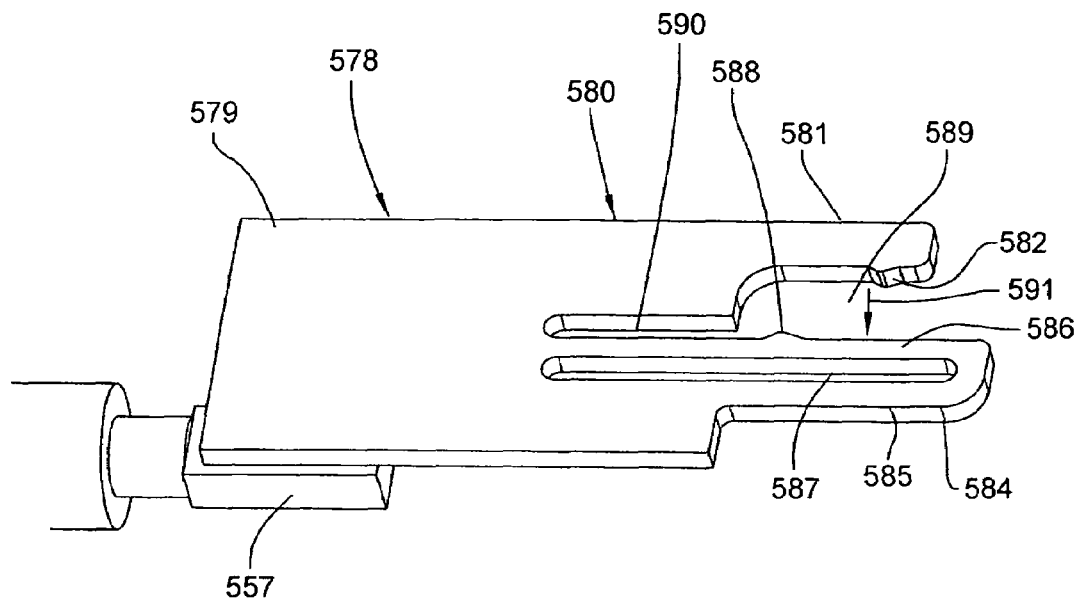
FIG. 80 illustrates an alternate contact configuration in a single contact configuration.
Figure 81A:
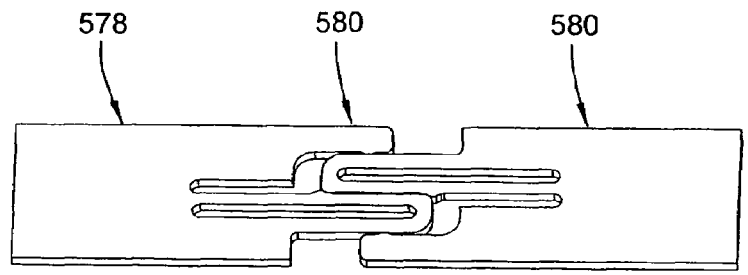
FIG. 81A illustrates two alternate single contacts partially joined together.
Figure 81B:
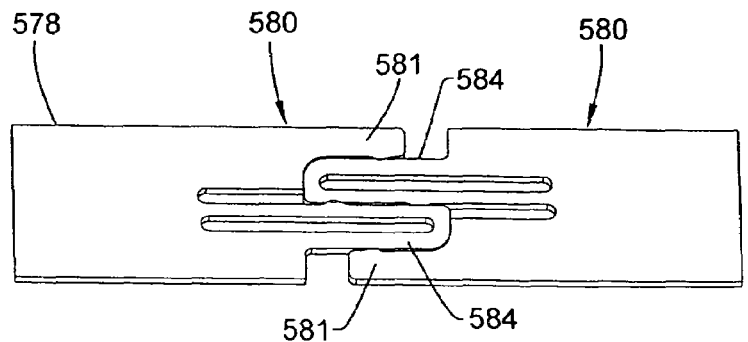
FIG. 81B illustrates the single contacts in a fully connected condition.

FIGS. 80, 81A and 81B illustrate an alternate contact design comprising a terminal 578 that has a fully planar configuration defined height-wise solely by the thickness of the terminal material. In particular, the terminal 578 has the back plate 579 provided for connection to the conductor wire 557 with the forward end of the terminal 578 defining the contact 580. The contact 580 comprises a fixed stationary arm or plate 581 having a contact projection 582 thereon. An additional resilient arm 584 is provided which comprises an outer leg 585 separated from a deflectable leg 586 by a center slot 587. The flexible leg 586 has a deflection projection 588 projecting inwardly therefrom towards a gap 589 defined between the two arms 581 and 584. To facilitate resilient flexing of the leg 586, a separation slot 590 extends from the gap 589 along an additional length of the leg 586. This allows for inward deflection of the flexible leg 586 in the direction of reference arrow 591 (FIG. 80).

FIG. 81A illustrates the contact arms 581 and 584 of two opposing contacts 580 being brought into sliding engagement with each other while FIG. 81B illustrates the two contacts 580 in a fully seated position due to the resilient inward flexing of the leg 586 of both of the contacts 580 which is particularly facilitated by the projections 582 and 588, both of the arms 584 are squeezed between the opposite arms 584 and 581 of the other contact 580. This provides for a positive engagement to maintain secure mechanical and electrical contact between the contacts 580. As seen in FIGS. 81A and 81B, both of the contacts 580 lie in the same common plane and have an even further reduced vertical height.

Figure 82A:
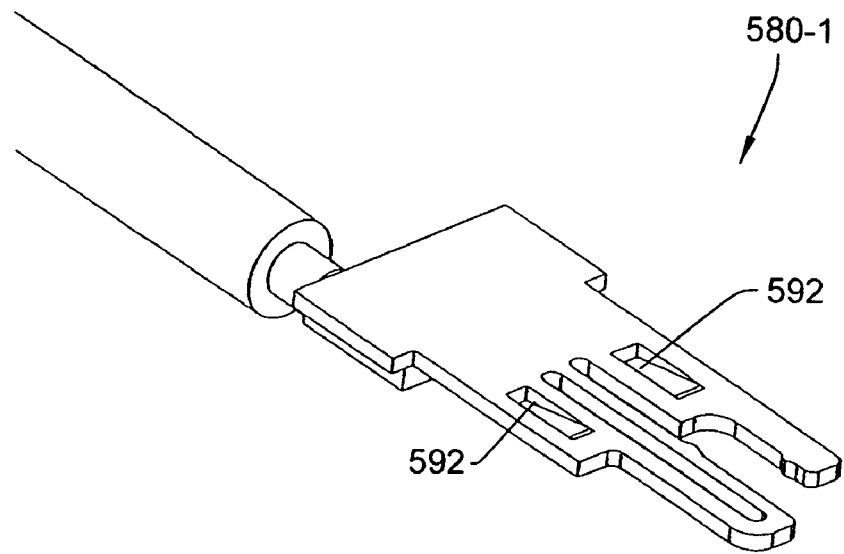
FIG. 82A illustrates a modified terminal with a single contact having resilient barbs thereon.
Figure 82B:
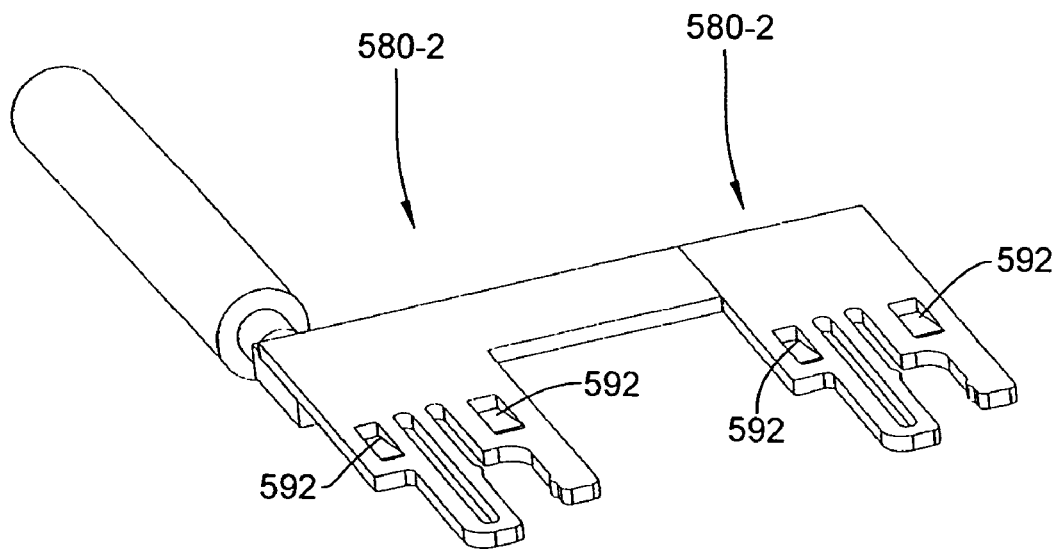
FIG. 82B illustrates a double terminal with barbed contacts.

FIGS. 82A and 82B illustrate substantially the same contact design with additional securing formations therein to positively hold the contacts in their respective contact blocks. In particular, FIG. 82A illustrates the contact 580-1 in single configuration while FIG. 82B illustrates the contacts 580-2 in a double configuration joined by a conductive web therebetween. The contacts 580-1 and 580-2 include securing barbs 592 which positively secure the contacts 580-1 and 580-2 in their respective contact blocks. The barbs 592 are cantilevered and define sharp projections on the bottom of the contacts for engagement with the contact blocks illustrated in FIGS. 82C-82E.

Figure 82D:
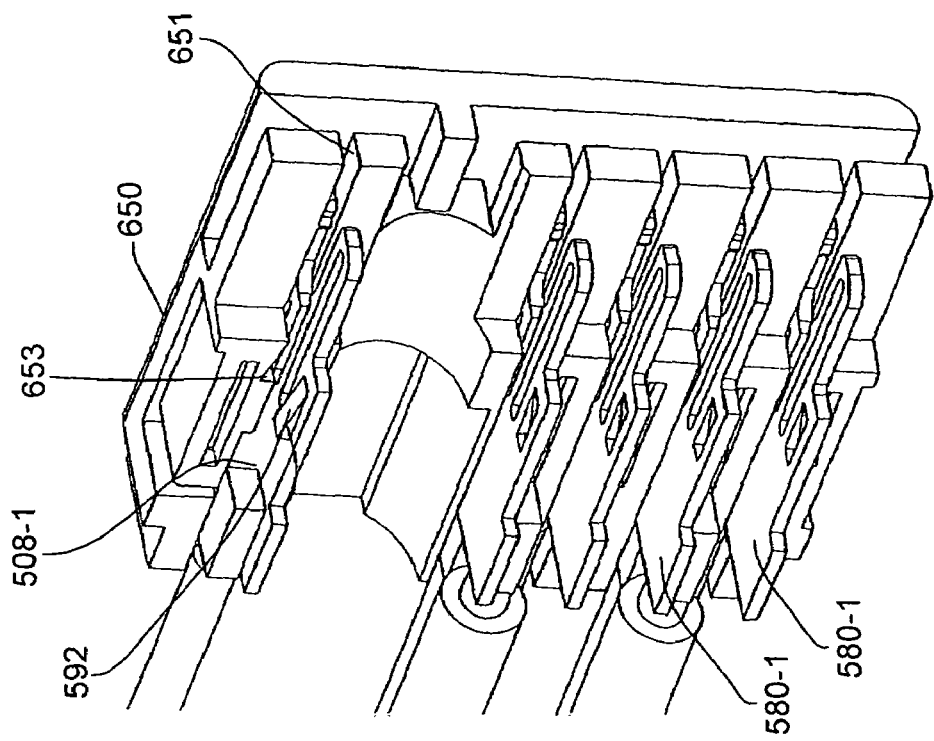
FIG. 82D is a cross-sectional view of the contact block of FIG. 82C.
Figure 82C:
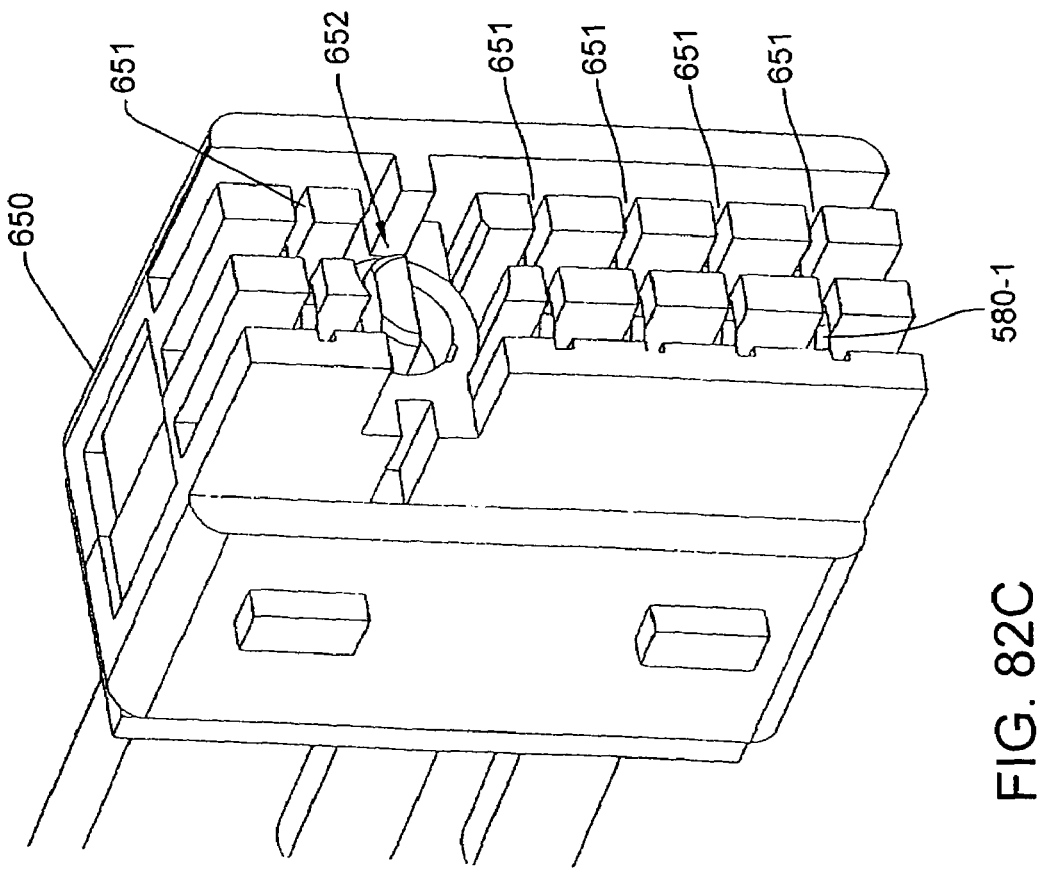
FIG. 82C illustrates the modified terminal of FIG. 82A in an alternate contact block having a modified grouping of contact slots.
Figure 82E:
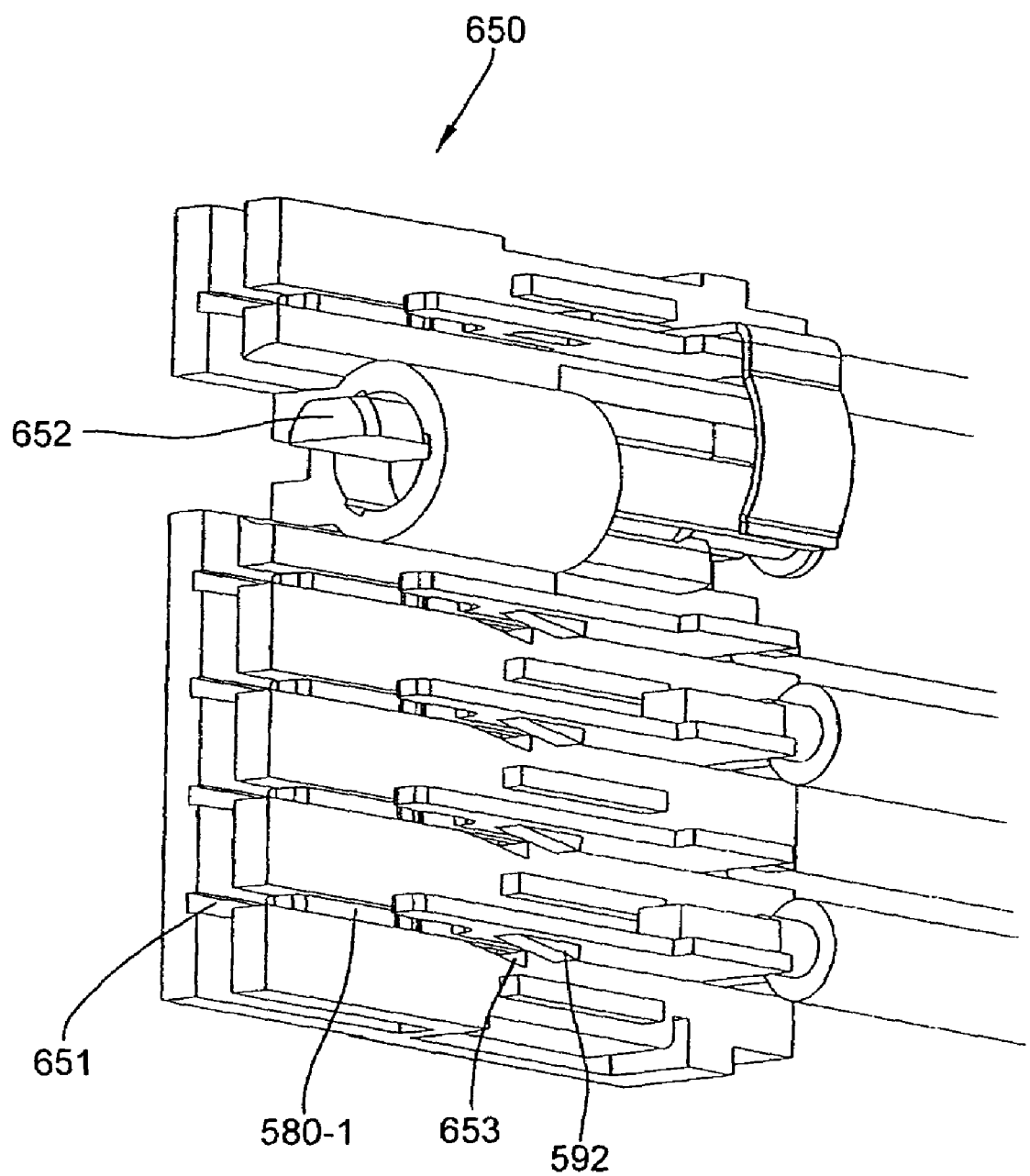
FIG. 82E is a further cross-sectional view thereof.

The modified contact blocks 650 of FIGS. 82C-82E are substantially the same as contact blocks 118 described above and the other similar blocks as is apparent from the figures such that a detailed discussion of features is not necessary. Rather, the following addresses the primary differences of this alternate contact block 650 wherein it will be appreciated that all of the contact blocks of the various system components could also have this same design.

In more detail, the contact block 650 first differs in that the contact-receiving slots 651 grouped with only one slot 651 above the keying feature 652 and four slots 651 below such keying feature 652. The slots receive the contacts 580-1 therein. This arrangement is like the 2 above/3 below grouping described herein and is readily usable in any of the circuit combinations such as a five-wire, three circuit configuration, or a three-wire, single circuit configuration. This ¼ grouping could be connected such that the top contact 580-1 is the ground contact, the second contact 580-1 is neutral, and the bottom three contacts 580-1 are in the L1, L2 and L3 positions. In another example, the bottom four contacts 580-1 could define two circuits with two neutrals and two hot.

As seen in FIG. 82E, the slots 651 also include notches 653 on the bottom thereof that define a sharp stop surface that engages the contact barbs 592. Hence, upon insertion of the contacts 580-1, the barbs 592 prevent withdrawal of the contacts 580-1. As seen in FIG. 82D, the top slot 651 has the notch 653 on the top of the slot 651 with the contact 580-1 being inverted.

As described above, many of the components including the contacts illustrated in FIGS. 77-82 are readily capable of accommodating various voltages including 120 volts, 277 and 347 volts. However, once a voltage level is selected for a particular circuit in a building, it is necessary to dedicate the components to such voltage level to avoid dangerous interconnection of components operating at different voltage levels. Hence, the aforementioned keying features are provided in the system components. While the PDA 73 and flex connector 75 have a fixed 120 volt selection built into the components, the other components such as the conduit units may be and preferably are designed so that the voltage level is field selectable by an installer.

Referring to FIGS. 83-86, the system connectors that have the variable keying feature use a rotatable keying pin 593 that forms part of the keying unit 547. The pin 593 has recessed end portion 594 that is semi-circular and has a recessed notch 595 adjacent the head of the pin. This defines a flat face 596 extending across the diameter of the end key 594. This keying pin 593 is rotatably received within a bore 597 (FIGS. 83 and 84) and is rotatable therein as well as actually slidable.

Figure 83:
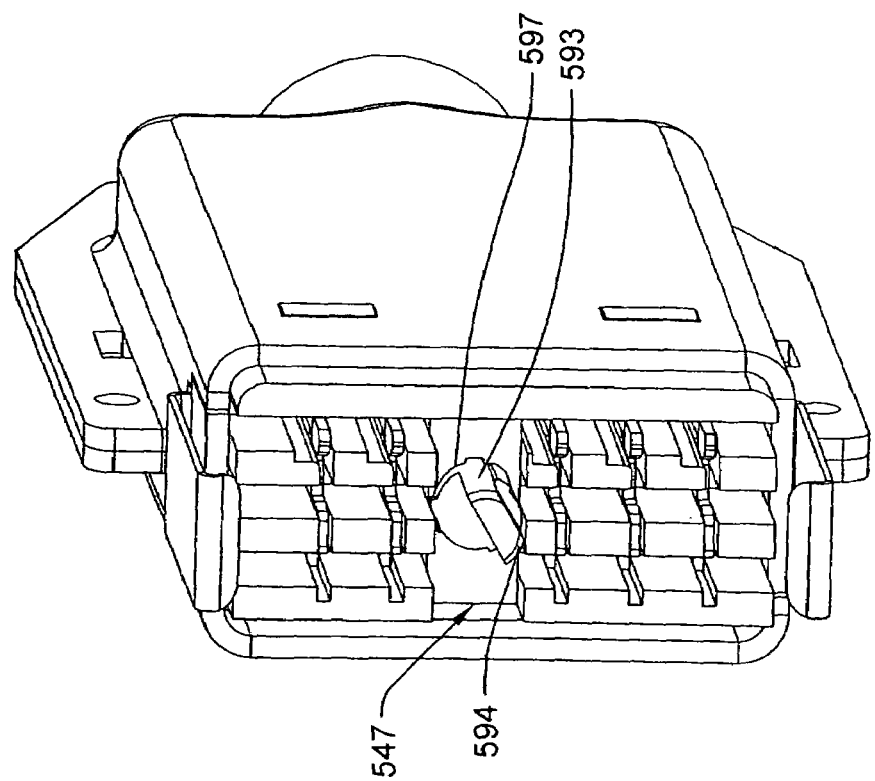
FIG. 83 illustrates a single connector end with a voltage key in an unlocked, rotatable condition.
Figure 85:
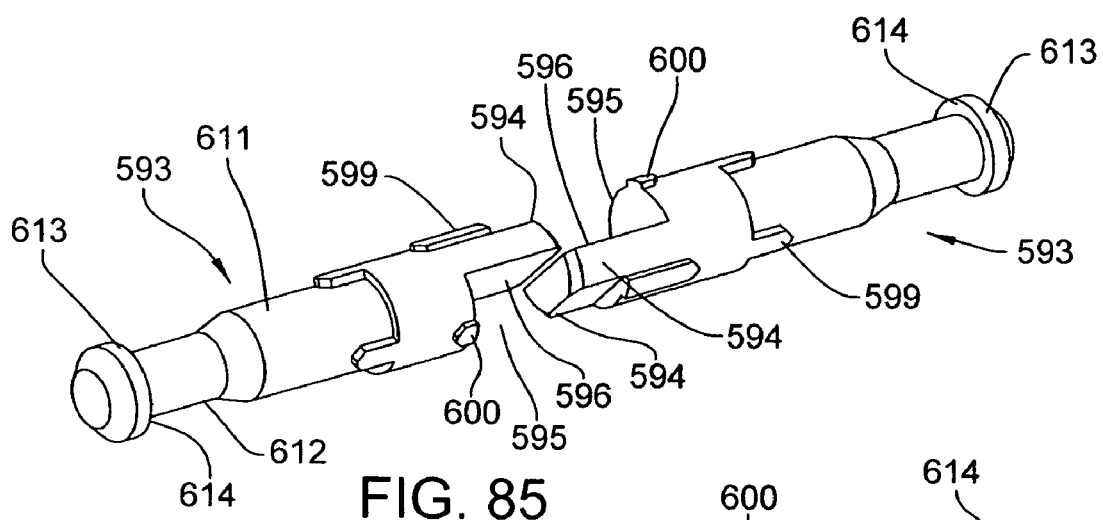
FIG. 85 illustrates two voltage keying pins prior to engagement with each other.
Figure 86:
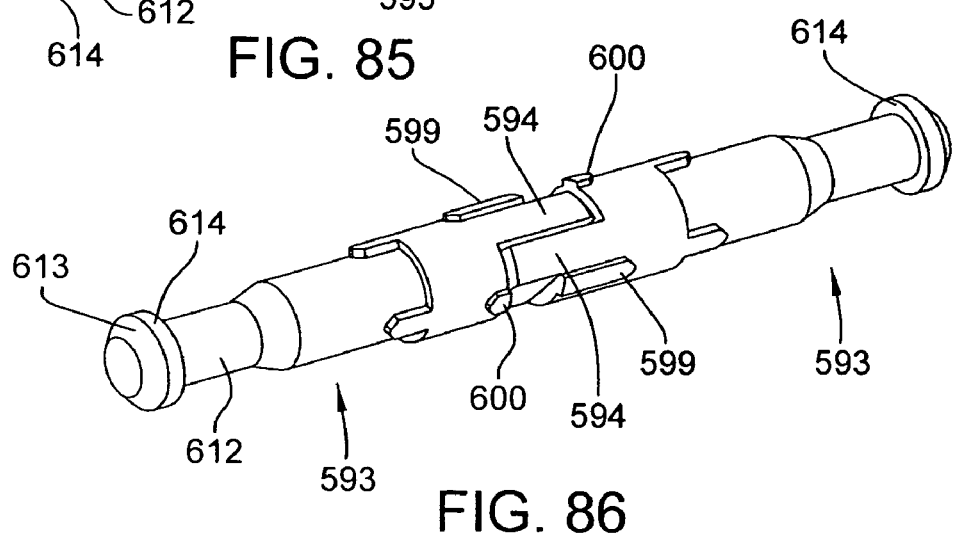
FIG. 86 illustrates the keying pins interfitted in mating engagement.
Figure 87B:
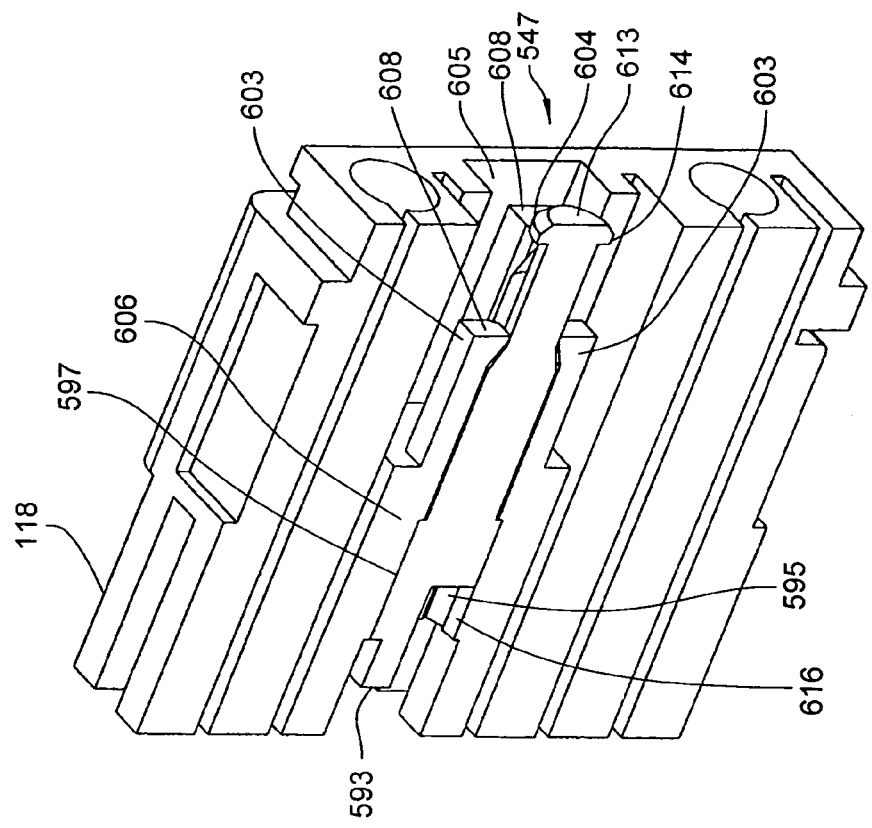
FIG. 87B illustrates the keying pin in a non-rotatable, locked position.
Figure 87A:
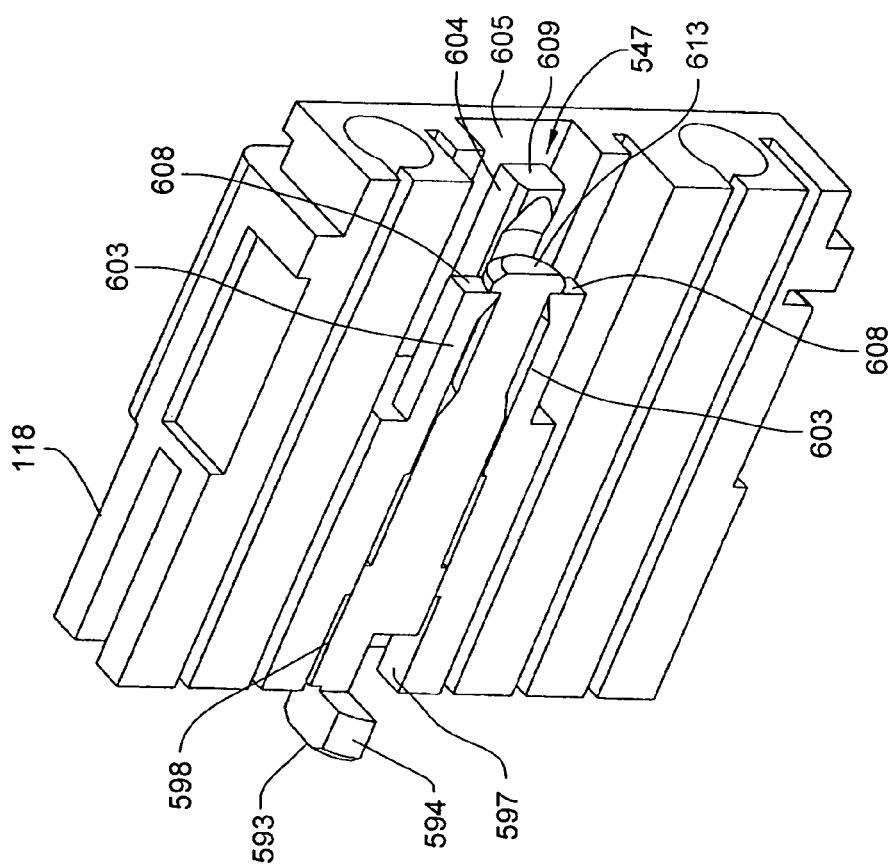
FIG. 87A is a cross-sectional view of the contact block showing a keying pin in a rotatable, adjustable position.

As seen in FIG. 75E, the bore 597 has three circumferentially-spaced outer grooves 598 which are disposed at equal angular distances from each other. The keying pin 593 as seen in FIGS. 85 and 86 includes corresponding locator ribs 599, 600 and 601 which are adapted to be slidably received within the slots 598 so as to permit axial sliding of the keying pin 593. Hence, the keying pin 593 may be rotated when the keying ribs 599, 600 and 601 are disposed axially outwardly of the slots 598 as generally indicated in FIGS. 83 and 87A, which would be the condition of the keying pin 593 after manufacture and before installation.

Figure 84:
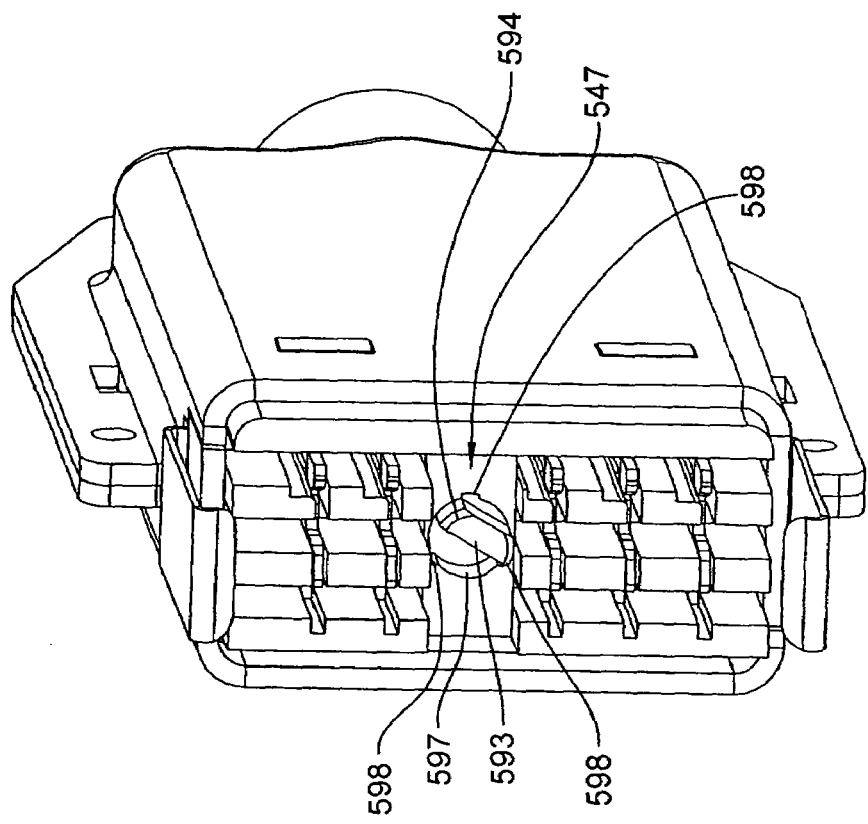
FIG. 84 illustrates the voltage key in a locked configuration.
Figure 89:
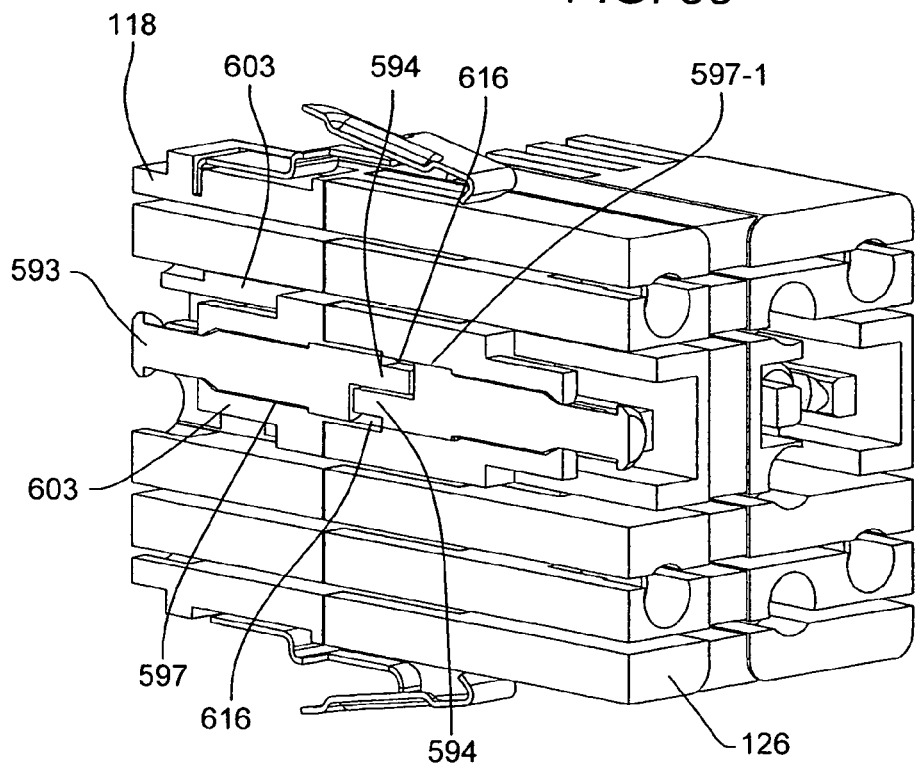
FIG. 89 is an isometric cross-sectional view of the double end connector of FIG. 88 connected to a single end connector.

In this manner, the pin 593 may be rotated to any one of three angular positions such as the angular position of FIG. 84 or the horizontally flat condition of FIG. 75E where the third position is defined by the remaining guide slot 598. These three angular positions each correspond to a voltage convention wherein the horizontally flat condition corresponds to 120 volt service, and the two other angular positions correspond to 277 volt and 347 volt service. The voltage convention may be varied as desired depending on how the system is configured but needs to be consistently utilized throughout a building structure to avoid interconnection of unmatched voltage levels. In that two connectors of two different system components would be keyed and hence, two keying pins 593 would be disposed in opposing relation as indicated in FIGS. 58 and 89, the system components can only be plugged together when the keying pins 593 are in corresponding, oppositely oriented voltage positions such as that illustrated in FIGS. 85 and 86. As such, as the connectors are plugged together, the pins 593 would move axially together with the end keys 594 and the opposed faces 596 mating one into the other in a fully seated condition as indicated in FIG. 86. Thus, all of the system components can be selectively joined together with a common voltage level.

It is desirable, however, to also make the keying feature usable only a single time to avoid re-keying of a system component by an unknowledgeable or unskilled individual and thereby prevent such individual from mistakenly interconnecting mismatched voltages which could result in a dangerous condition. Hence, the keying pins 593 and their cooperation with the respective contact block such as block 118 of FIGS. 87A and 87B are designed so that the pin 593 is rotatable when shipped from the factory but is not adjustable once the pin 593 is pushed axially into the fully seated position such as that seen in FIGS. 84 and 87B.

More particularly, the keying unit 547 further comprises two pairs of locking arms 603 and 604 which are disposed internally within a rectangular block chamber 605 and project rearwardly from a front body section 606. These locking arms 603 and 604 in each pair are disposed diametrically opposite to each other wherein the locking arms 603 are vertically disposed one above the other and the locking arms 604 are oriented 90° away therefrom in sidewardly opposite relation.

The arm 603 and 604 are formed of the molded block material and as such, are resiliently deflectable in cantilevered relation with the front block section 606. These arms 603 and 604 terminate at respective stop faces 608 and 609.

As to the locking pin 593 of FIGS. 85 and 86, this locking pin 593 includes a cylindrical rear body 611 which extends rearwardly and narrows to a reduced diameter clearance section 612 that then terminates at a radially outwardly projecting head 613. This head 613 defines a stop rim 614 with a forward-facing circumferential surface adapted to abut against either pair of stop faces 608 or stop faces 609.

As seen in FIG. 87A, the stop 593 during manufacture is initially inserted into the bore 597 wherein the head 613 presses the locking arms 603 radially outwardly until the head 613 passes axially therebeyond the stop faces 608, after which the stop rim 614 abuts axially against the opposed stop faces 608. Hence, while the stop pin 593 is rotatable as described above, the pin 593 also cannot be axially pulled out of the contact block 118 so that the pin 593 is adjustable by rotation but still permanently affixed to the block 118.

Once the pin 593 is rotated to one of the predefined angular positions corresponding to the different voltage levels, the pin 593 would be pushed inwardly by an installer until the head 613 presses the longer locking arms 604 radially outwardly and then moves past the respective stop faces 609 so that the stop rim 614 now abuts axially against these rear stop faces 609. This hence prevents forward axial displacement of the pin 593 and prevents any further rotatable adjustment of the pin 593 since the pin 593 is now locked in the fully seated position illustrated in FIG. 87B. In this fully seated position, the notch 595 (FIG. 87B) is now disposed partially within the bore 597 to define a forward opening, semi-circular recess 616 into which the end key 594 of a corresponding pin could be received.

Figure 88:
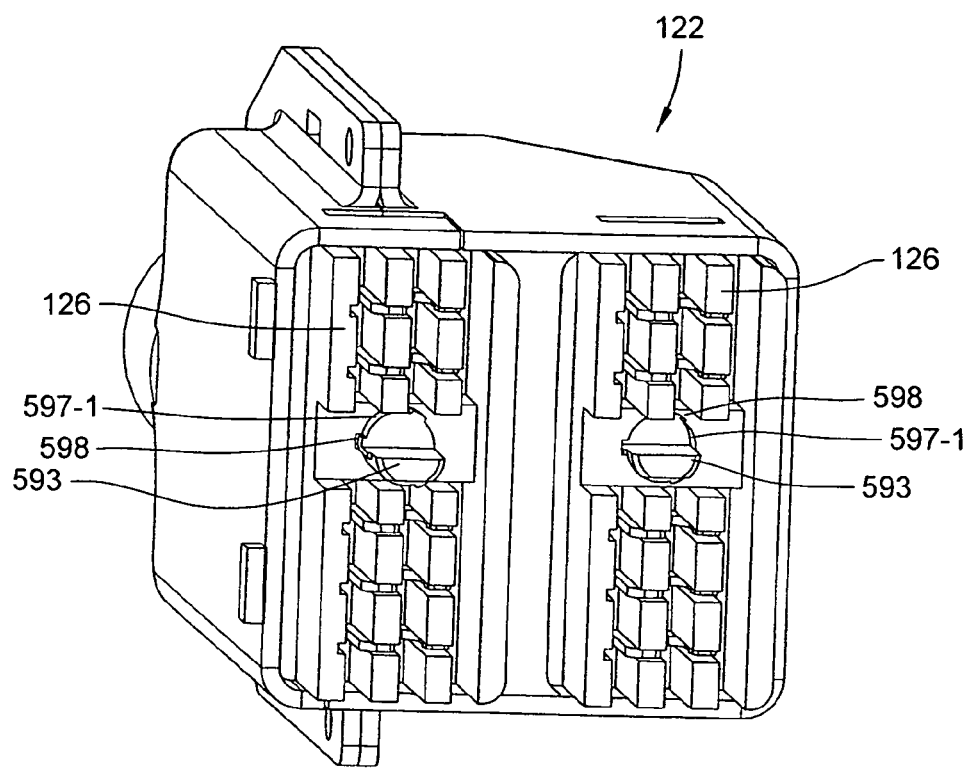
FIG. 88 is an isometric view illustrating a keying pin in a double end connector with a left keying pin in a rotatable adjustable position and a second right keying pin in a locked position.

In this regard, FIG. 88 illustrates a double end connector 122 having the contact blocks 126 thereof provided with the identical arrangement of rotatably adjustable keying pins 593. These pins 593 are disposed in an upwardly notched position corresponding to the 120 volt level wherein the left pin 593 in FIG. 88 is still in the rotatable position while the rightward pin 593 has been pushed into the bore 597 to the fully locked condition. Hence, the end connector 122 is now dedicated for 120 volt service, and as seen in FIG. 89, can be connected to a contact block 119 having its respective pin 593 also locked into the 120 volt position. Notably, the angular positions of the guide slots 598 are offset 180° relative to the guide slots 598 of the contact block 118 (FIG. 83) so that the 120 volt position of the contact block 118 has the pin in the downwardly notched orientation and the contact block 126 has the pin 593 disposed in the upwardly notched opposite orientation to allow for mating engagement therebetween as seen in FIG. 89. One of the orientations would be used consistently with B connectors and the inverted orientation is used consistently with A connectors.

With this keying feature, the system components that serve multiple voltage levels can be provided with an adjustable keying feature. The other components that are dedicated to a single voltage level may have a comparable key fixed in a non-adjustable position that restricts service to a specific voltage level.

Figure 87C:
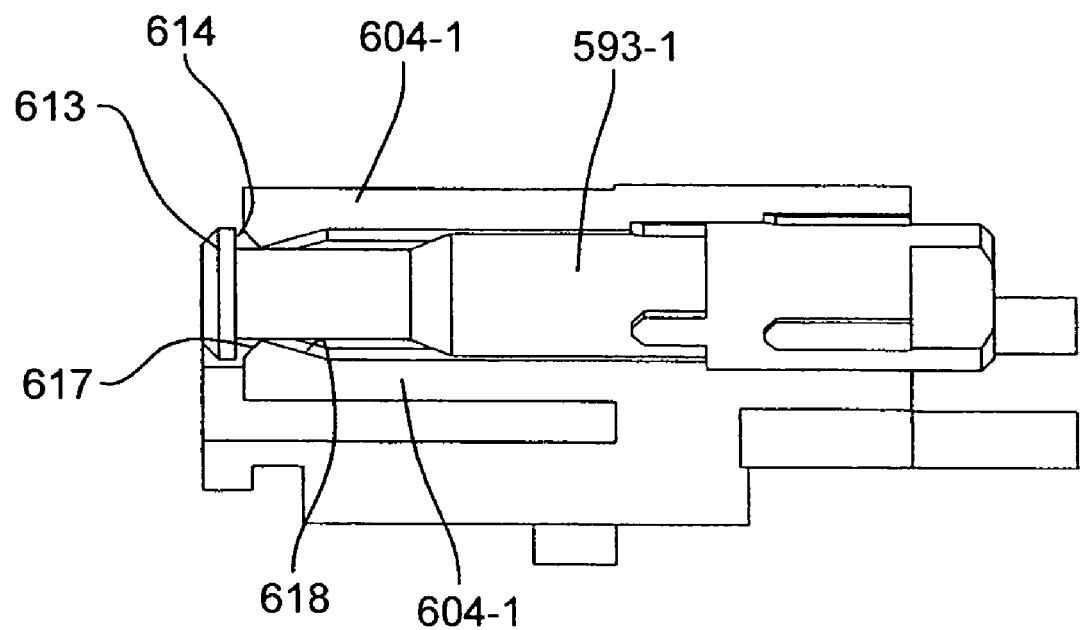
FIG. 87C is a top cross-sectional view of a resettable keying pin.

While having a non-resettable key is preferred, FIG. 87C illustrates a resettable keying arrangement which is substantially the same as that described above. The primary difference is that the keying pin 593 sits in a modified contact block wherein the same locking arms 603 are provided that engage the head 613 to prevent removal of pin 593 but permit rotation thereof. However, the longer locking arms 604-1 also have a chamfered camming face 617 adjacent the camming face 618. The face 618 contacts the chamfered edge of the head 613 to effect spreading of the arms 604-1 upon locking insertion of the pin 593. The camming face 617 also contacts the rim 614 of the head 613 to also deflect the arms 604-1 outwardly for passage of the head 613 there past upon outward displacement of the pin 593. This allows return of the pin 593 to the rotatable position for resetting of the pin 593 to an alternate voltage position.

Figure 90:
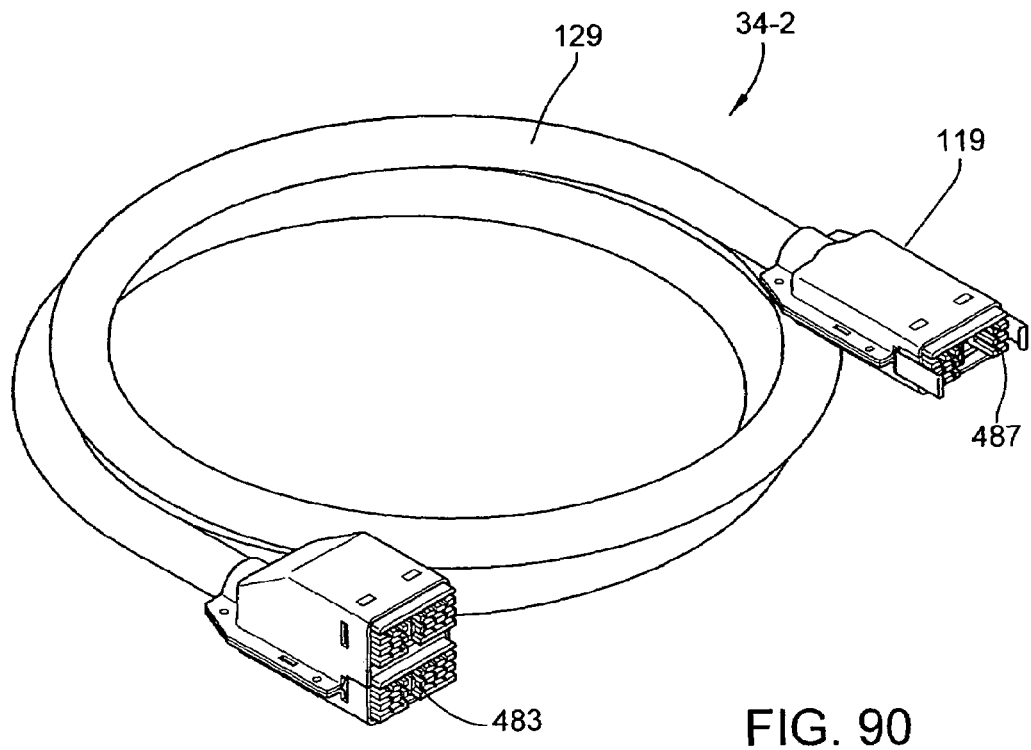
FIG. 90 illustrates a circuit-selectable flexible conduit unit.
Figure 91:
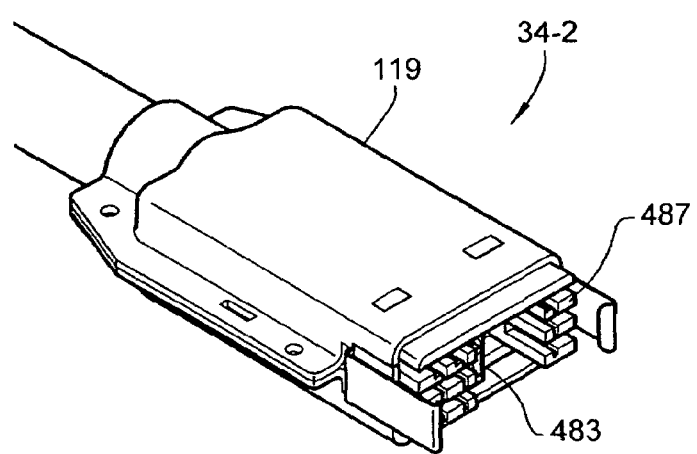
FIG. 91 is an enlarged view illustrating the single connector end with the circuit selection option.

Referring to FIGS. 90 and 91, the additional conduit conductor 34-2 is further illustrated. Referring to FIG. 67, the keying pin 483 as described above is identical to that just described such that the disclosure thereof is equally applicable to pin 483 which has the identical structure and function. Hence, the conduit unit 34-2 may be keyed to a specific voltage level and as previously described, has the movable contact shroud 487 which is displaceable between the L1, L2 and L3 positions. Here again, it is noted that the contacts 480 disclosed therein are of the identical structure and function as the contacts 560 described above. Still further, the additional components of the connector 34-2 are also the same as other components described above such that a detailed discussion thereof is not required.

With the foregoing construction principles, all of the individual components may be constructed with similar contact blocks and low-profile contacts that may be keyed where appropriate for appropriate voltage levels.

V. Exemplary Application

The following discussion provides some additional detail as to the interconnection of the components which were generally described above and are now described with some additional detail for a more complete understanding of the component structures.

Figure 92:
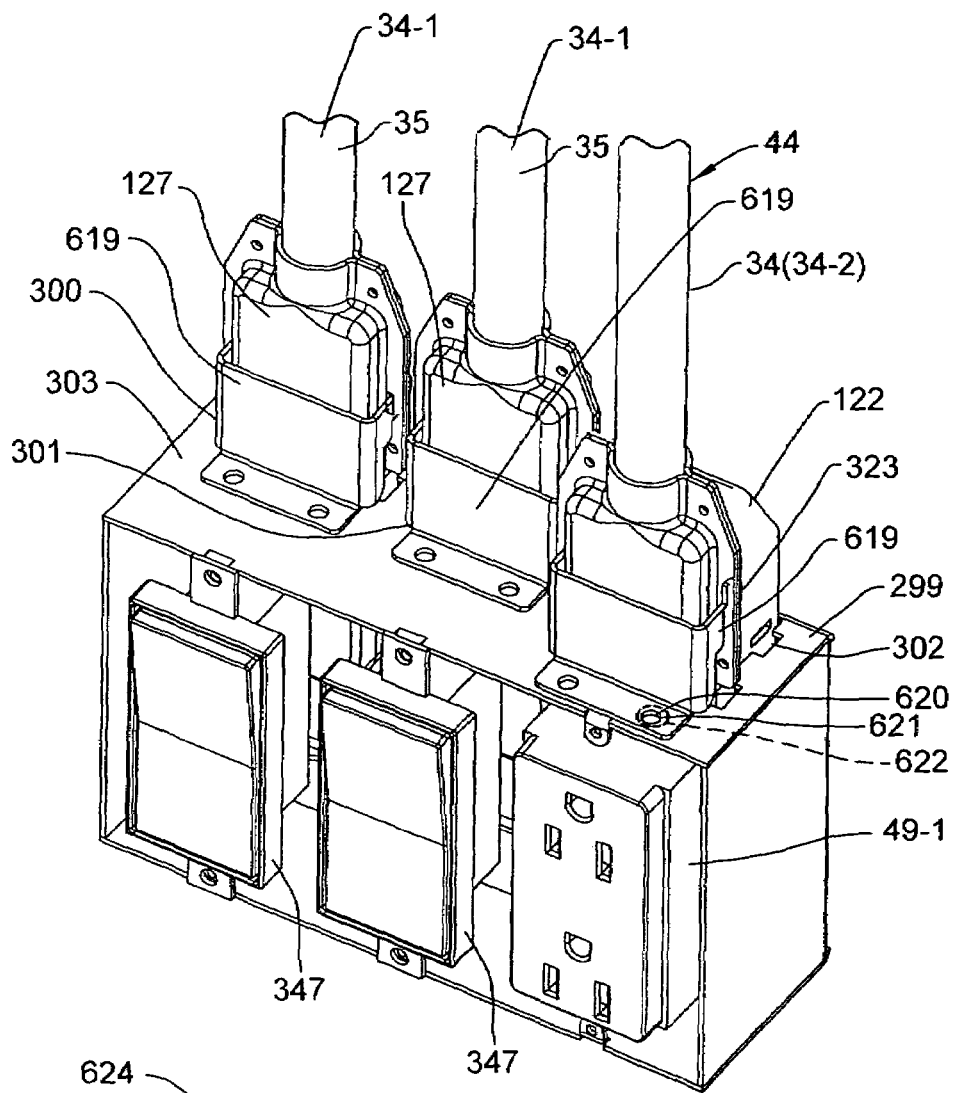
FIG. 92 illustrates a wall box assembly having a single receptacle and two switches mounted thereto.

FIG. 92 illustrates a triple gang electrical box 299 which is configured for supporting a single receptacle 49 as well as two off-the-shelf, pigtail-connected switches 347 to supply power to the receptacle 49-1. The box 299 supports a conduit unit such as five-wire, three-circuit conduit unit 34 which is positioned with its double end connector 122 inserted into the top wall knock-out 302. As a result, as seen in the free end of the housing 123, the end connector 122 extends into the box interior with the contact blocks 126 being accessible therein. In particular, the open ends of the contact blocks allow for access to the B connectors 122B defined thereby.

Figure 93:
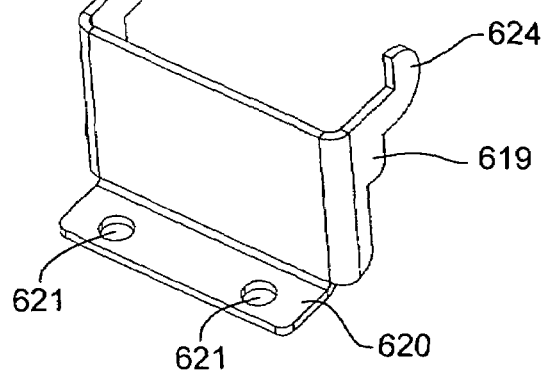
Figure 94:
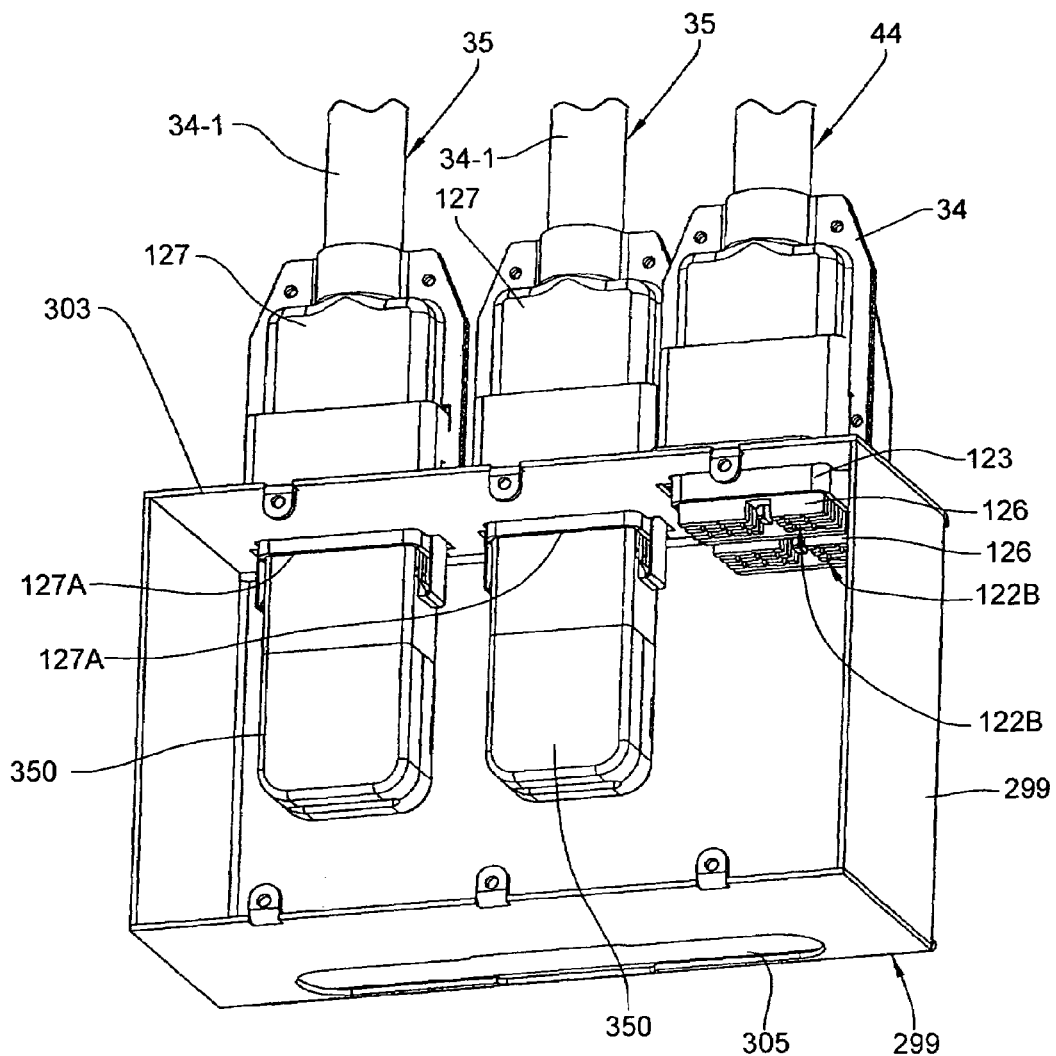

To fixedly secure the end connector 122 mechanically to the top box wall 303, a hold down bracket 619 (FIGS. 92 and 93) is provided. The bracket 619 has a bottom fastener flange 620 having holes 621 by which a bracket 619 is screwed onto the top box wall 303 by fasteners 622. The upper end of the bracket 619 includes two rearwardly and upwardly projecting hooks 323 which hook through the slots 324 formed in the edge flanges of the end connector housings. The bracket 619 is installed by inserting the hooks 624 rearwardly through the housing flanges and then swinging the brackets 619 downwardly so that the flange 620 lies on the top box surface 303 and can then be screwed thereto. As seen in FIG. 94, this leaves two B connectors 122B available for connection. The front most B connector 122B is interconnected to the receptacle 49-1 as will be described further herein, while the rearmost B connector 122B (FIG. 94) is available for a bypass connection of an additional conduit unit that can exit the box 299 through the bottom knock-out 305. This bypass connection of a conduit unit such as unit 34-1 and simultaneous connection of a receptacle 49 is diagrammatically represented, for example, in FIGS. 43 and 44.

As to the other two open locations of the box 299, the switch leg of FIG. 47 may be constructed by connecting the single end connector 127 to the box 299 by additional brackets 619. This provides the two A connectors 127 so as to be accessible within the box and to which a three-wire switch device pigtail 315 may be connected. For illustrative purposes, the pigtail wires 352 are omitted from FIG. 94 but it is understood that such pigtail wires would be enclosed within the box 299 and hard wired connected to the receptacles 347 of FIG. 92.

Figure 95:
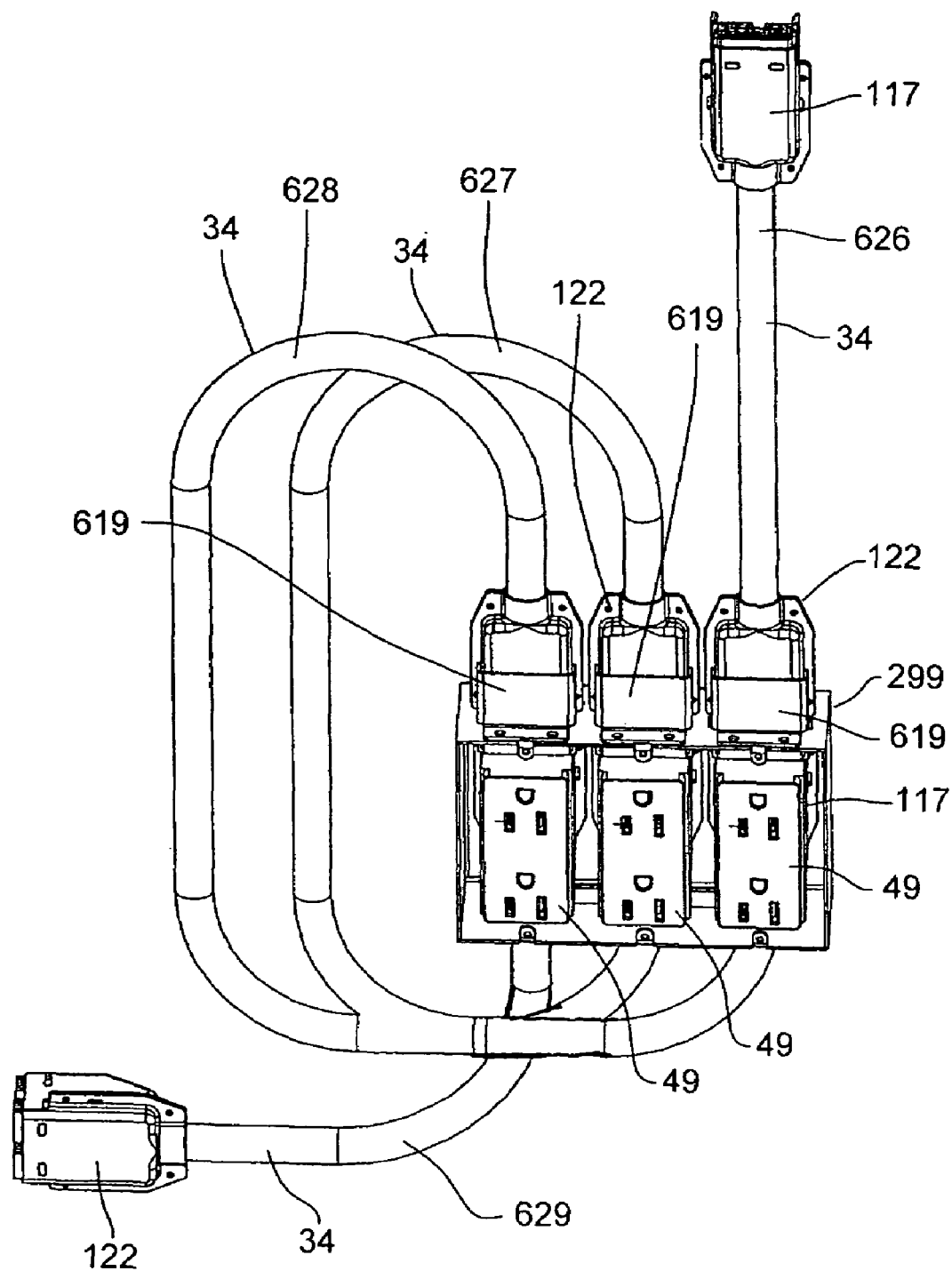

As illustrated in FIG. 95, it also is possible to use the triple gang box 299 so as to interconnect three side-by-side receptacles 49 therein all on the same circuit using a daisy chain configuration. In this regard, a first conduit unit 34 has its double end connector 122 mounted to the box 299 the same as seen in FIG. 92. This first conduit unit is identified by reference numeral 626 for differentiation from the additional conduit units 34 also illustrated in FIG. 95. To construct the triple daisy chain configuration, a second conduit unit 34 is designated by reference numeral 627 wherein the upstream single end connector 117 is connected within the box 299 to the double end connector 122. This conduit unit 627 bypasses the receptacle 49 and exits through the bottom knock-out and is looped around so that its double end connector 122 connects in the second knockout position and then second receptacle 49 is connected thereto. A third conduit unit 34 is designated as 628 and has its single end connector 117 connected to connector 627 and then looped back to the third knockout position for connection of a third receptacle 49. The last downstream conduit unit 34 designated as 629 is then connected downstream to bypass the third receptacle 49 and leaves the box with the double end connector 122 thereof free for further connection to continue the circuit downstream therefrom.

It is understood that these conduit units 34 may be five wire components used to carry all of the multiple circuits through the box 299 and downstream thereof wherein the receptacles 49 are set to a specific circuit either the same or different from each other. Any of these conduit units 34 may also be made circuit-selectable so as to carry only a single circuit therethrough or at any point any of these conduit units 626 through 629 could be made a circuit selectable version to then limit downstream carrying of the single circuit. Hence, the system 10 of the invention is highly flexible in constructing different circuit configurations.

FIGS. 96 and 97 also illustrate how the single gang box 48 may be formed in a bypass configuration. In this regard, the double end connector 122 may be connected to the box 48 which allows for a single end connector of a downstream conduit unit 34 to be connected thereto as seen in FIG. 97. This leaves open one of the B connectors 122B for subsequent connection of the receptacle 49 in the box 48, while the downstream conduit unit 34 then continues so that the double end connector 122 thereof remains free for connection of subsequent downstream components.

While the above configurations may be made circuit selectable to limit the receptacles to a single circuit by the use of circuit selectable conduit units, such circuit selection also may be accomplished solely through the use of the receptacle 49 as described in further detail herein relative to FIGS. 98-101. The receptacle 49 as described previously as to FIG. 26 may be formed as a 15 amp duplex outlet 49-1 having a housing 317-1 which supports a contact block 316. This contact block 316 is formed substantially the same as the above-described contact block 134 (FIG. 67) in that it has the movable contact shroud 319-1 which is shiftable vertically between first, second and third L1, L2 and L3 positions.

A detailed discussion of contact block 316 is not provided since it functions substantially the same as contact block 134. Generally, the contact block 316 includes two stationary electrical contacts 631 which are formed the same as above-described contacts 560 and a further contact 631 which is movably supported within the contact shroud 319-1.

FIG. 99 illustrates the contact shroud 319-1 in the L1 position for tapping off the first circuit. FIG. 100 illustrates the contact shroud 319-1 in the third, L3 position, while FIG. 101 illustrates same in the second or middle L2 position. As can be seen, each individual receptacle 49-1 may selectively tap off one of the three circuits L1, L2 or L3. It is understood that different numbers of circuits may be defined through the system such that it is possible to construct receptacles 49 with only two circuit selection positions, or if made larger, more than three circuit selection positions. Such may be accomplished without departing from the scope of the current invention.

Figure 98:
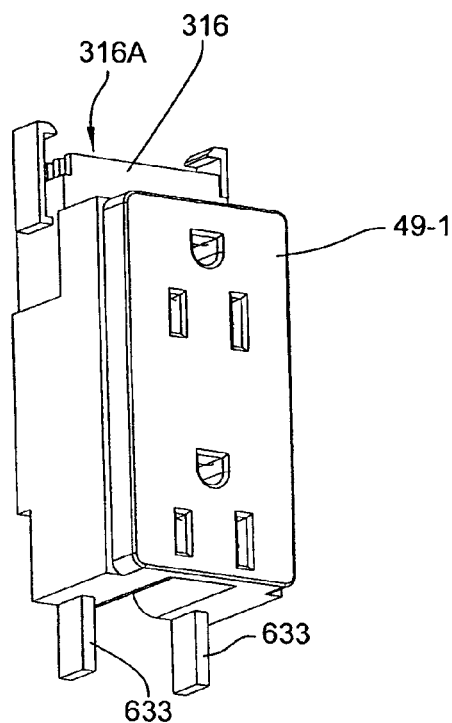

Referring to FIG. 98, the receptacle also includes two arm-like locator bars 633 which project downwardly and are adapted to cooperate with the electrical boxes. For example, referring to FIG. 102, the electrical box 299 described above may have a pair of locator windows 634 that are adapted to receive the locator bars 633 vertically therethrough as seen in FIG. 102. Since the receptacle 439 is plugged at its top into an appropriate conduit end connector such as in connector 122, the top of the receptacle 49 is not movable outwardly. The locator bar 633 on the bottom then cooperates with the windows 634 to hence restrain the bottom of the receptacle 49 to prevent outward displacement thereof.

The installation process for a receptacle 49 is illustrated in further step-wise detail in FIGS. 103A-103C. In this regard, the receptacle in FIG. 103A is first tilted so as to allow the locator 633 to project downwardly through the window 634 which then allows the upper end of the receptacle 49 to then be swung inwardly into the box 299 as indicated in FIG. 103B. In this downwardly placed position, the receptacle 49 is then aligned with the B connector 122B of the double end connector 122 that is mounted to the top of the box 299. In the final step illustrated in FIG. 103C, the receptacle 49 is then shifted upwardly as indicated by reference arrow 635 to engage the A connector 316A thereof with the B connector 122B wherein the bottom end of the bar 633 is still received a small distance through the window 634.

Figure 104A:
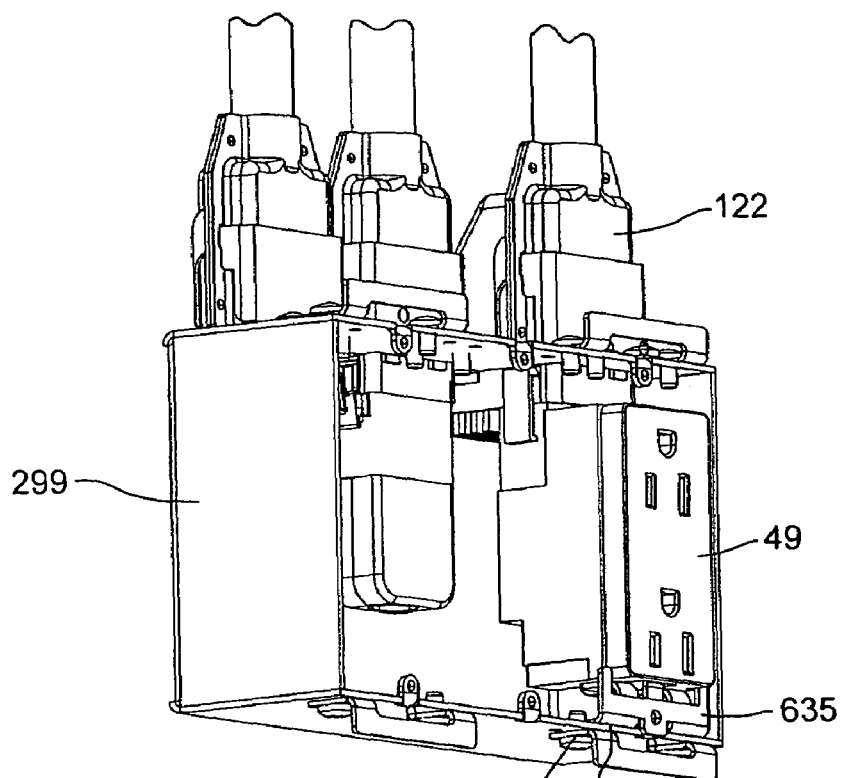
Figure 104B:
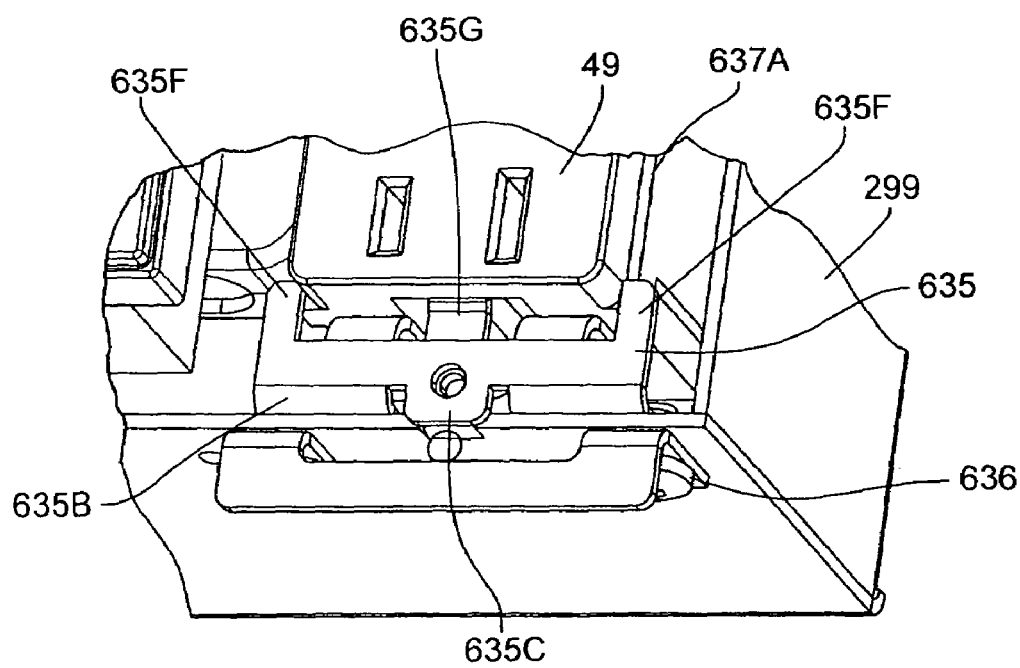

FIGS. 104A and 104B illustrate an alternate, preferred arrangement for securing the bottom end of the receptacle 49. The receptacle 49 mounts to the box 299 in the same manner as that described above by plugging engagement of the receptacle 49 with the end connector 122. However, as seen in FIGS. 104A and 104B, a restraining clip 635 is fastened to the box 299 by fasteners 636.

Figure 105A:
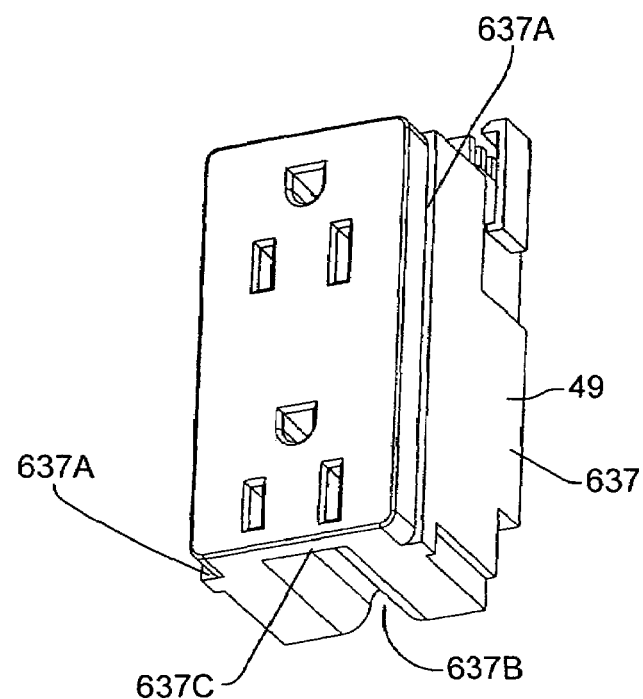

More particularly as FIG. 105A, the receptacle 49 has the receptacle body 637 shaped to define side ledges 637A and a bottom slot 637B which forms a rear facing wall 637C.

Figure 105B:
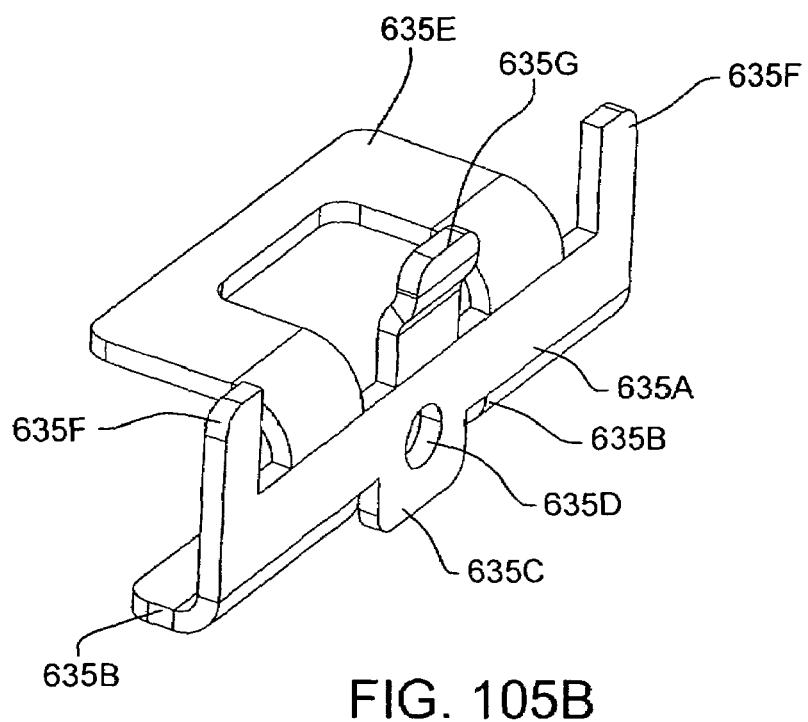

As seen in FIG. 105B, the clip 635 is formed of a shaped metal to define a main body 635A which turns inwardly to define feet 635B that sit on the bottom box wall (as seen in FIG. 104B). The main body 635A has a downwardly depending fastener flange 635C with a fastener bore 635D that aligns with the bore in the box tabs.

The main body 635A then turns inwardly to define a first locator flange 635E that sits below the receptacle 49 and prevents downward displacement thereof. To limit front and back receptacle movement, second stop flanges 635F project upwardly and lie close against the opposing receptacle ledges 637A to prevent forward rocking of the receptacle 49. Also, a third stop flange 635G projects upwardly into the receptacle slot 637B and contacts the stop wall 637C from the rear to prevent backward or inward rocking of the receptacle 49 into the box 299. In this manner, the receptacle 49 is securely locked in place, yet is removable by removing the clip 635.

Referring to FIGS. 106 and 107, the switch assembly may also be readily mounted to a single gang box 48. This is accomplished by mounting the single end connector 127 by the bracket 619 into the rearmost knock-out portion 288 formed through the top box wall 283. Interiorly of the box 48, the pigtail connector 50 is then connected which would then have its respective pigtail wires 351 projecting outwardly therefrom for hard wiring to the switch 347. This switch assembly also could be replaced with any of the other available switches disclosed herein.

Referring to FIG. 108, the system components also may be connected to the light fixture 30 by fishing the wires 242 downwardly through the knock-out 32 in the light 30. The A connector 33A thereof is then connected to the downstream B connector 122B of a conduit unit 34. This leaves open the upper B connector 122B for a bypass connection with the A connector 117A of a downstream conduit unit 34. If desired, it is possible to also have the component circuit selectable depending on the particular wiring requirements.

Rather than using a switch leg to control the light fixture 30 (FIGS. 109-113), the wireless electronic switch controller 402-1 may be provided similar to the switch controller 402-1. In particular, this switch controller 402-1 includes a circuit selectable A connector 407A-1 which connects to an upstream double end connector of a conduit unit 34. While a cap 408-1 is provided adjacent the input A conductor 407A, the double end connector 122 may be offset as seen in FIGS. 110 and 111 for connection to a single end connector and specifically the A connector 117A thereof. This allows for downstream passage of unswitched electrical power to the end connector 122 thereof. Through the switch controller 402-1, this includes a conduit collar 640 that inserts into the knock-out of the light fixture 30 and is hard wired thereto manually. An antenna 641 is provided for receiving of wireless signals in a wireless electronic control interconnected generally as seen in FIG. 37 as seen relative to switch controller 402. A single outlet B connector 409B-1 is provided which connects to the single end connector 117 of a downstream conduit unit 34.

Referring to FIG. 112, the upstream feed connector 34 also may have its double end connector 122 shifted downwardly in a non-bypass position so that the upper B connector 122B is connected to the switch controller A connector 407A-1 and has its second B connector 122B closed by the cap 408-1.

FIG. 113 illustrates the housing 404 having molded in sockets such as socket 404A which receives a contact block 407 therein and has a pocket 404B for engaging the projecting square 407A on the side of the contact block 407. This leaves the plug section of A connector 407A-1 accessible for engagement with the contact blocks 126 on the end connector 122. Only one such contact block 122 engages with the A connector 407A-1 while the second contact block 122 seats in the cap 408-1 and is enclosed therein in a non-use position.

In another application for the system 10, FIG. 114 is a pictorial view of a big-box store application. This building 655 can be any large scale building and while illustrated as a retail establishment, the system design techniques could also be used in a manufacturing, industrial or warehouse facility. Generally, the building 655 has concrete block walls 656, a roof 657 supported by girders 658, and interior shelving 659 with checkout location 660 also provided.

FIG. 115 illustrates installation of system components in the concrete block wall 656 which is formed in a conventional manner by courses of concrete blocks 661 wherein the block cavities 662 define internal wall cavities through which wiring may extend. During laying of the blocks 661, a receptacle box 48 may be pre-installed with a vertical conduit 663 being connected thereto and extending vertically through the block cavities 662 so as to project from the top of the wall. The upper end of the conduit 663 may then have the pigtail wires 265 of a conduit tap 263 (FIG. 17) fished therethrough to the box 48 for wiring of a receptacle thereto. The collar 264 is then secured to the conduit 663 leaving the A connector 263A available for connection to system components. Hence, the double end connector 122 of an upstream conduit connector 34 supplies power thereto and also to another downstream conduit connector 34 connected in a bypass connection as seen in illustration 665 of FIG. 115.

FIG. 116 also illustrates a junction box 667 for the system which is formed like an octagon box and usable in wall-mount and ceiling-mount locations according to wiring convention, and FIG. 117 illustrates the junction box connected with conduit connectors 34.

The box 667 includes knockouts 668 and 669 for connection to the double end connector 122 of an upstream conduit connector 34 supplying power thereto, and a single end connector 122 of a downstream conduit connector 34 receiving power therefrom to supply downstream components. The end connector 122 is held in place by the bracket 619 that is fastened to the box 667 by screws 671.

In the junction box 667, a pigtail fixture tap 672 that has an A connector 672A engagable with the B connector 122B of the power feed 34. The tap 672 has a housing 673 formed like the wire manager above and having an opening 674 through which the pigtail wires 675 (FIGS. 119-121) exit. The tap 672 thereby connects in place as seen in FIGS. 116 and 177, and is secured in position by a clamping bracket 677. The clamping bracket 677 has a U-shape and is fastened to the box 667 by fasteners 678.

In one configuration, FIG. 118 illustrates a lighting connection with the conduit connectors 34 in a bypass configuration. A fixture tap 245 is connected thereto and has the wires thereof enclosed by flexible conduit 679 which in turn connects to a conventional lamp 680. A number of the lamps 680 are shown connected to the girders 658 in FIG. 114.

Alternatively, FIG. 119 illustrates the junction box 667 supporting a conventional receptacle 681. The receptacle 681 is hand wired to the pigtail wires 675 by wire nuts and then is fastened to the box 667 and enclosed by an octagonal face plate 682.

Besides the mounting of receptacles, FIG. 120 illustrates an exit light 684 supported by the junction box 667 which typically is powered continuously. If this light 684 is being connected to a light circuit wherein some lights are being switched such as seen in FIG. 49, power would be powered continuously by connection to the emergency lighting leg.

Further, FIG. 121 illustrates a wall-mounted light unit 685 supported by the junction box 667 so as to continuously receive power thereto in a manner similar to light 684 above. This light 685 has spotlights 686 which may operate continuously and may have internal battery power to operate the lights 686 if the power supply is cut to the light 685 such as during a power outage.

In the various embodiments, the end connectors on the system components are made "handed" which may be important for safety considerations, such that the end connectors have been described as having an A or B configuration. This represents the preferred invention. It will be understood that the end connectors could be made non-handed such as through the design or elimination of the keying and/or the locking finger arrangement. Similarly the other system components can also be made non-handed such that, for example, any connector on any system component might be connected to any other suitable system component connector.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A building power distribution system defined by a plurality of system components which are selectively connectable to define a comprehensive power supply system within partitions of a building, said system components comprising;
    a plurality of distribution cables having a first connector end and a second connector end with respective connector plugs thereon wherein said first connector end can mate with said second connector end but said first connector end cannot mate with a first connector end and a second connector end cannot mate with a second connector end of another identical first cable;
    one or more junction boxes configured to have said connector plugs connect thereto, said junction boxes having interior spaces in which component connections are made;
    an outlet receptacle having a receptacle plug connector for providing power to said receptacle;
    a switch device having a switch connector end with a connector plug that can plug-connect to said first connector end of any said cable, but said connector plug of said switch device can not mate or plug-connect to said second connector end of said cable wherein said switch device effects controlled switching of power supplied to said switch device;
said system being configured such that:
    one or more said junction boxes mounted to a respective building partition;
    a first one of said cables has said second connector end fixedly attached to a respective one of said junction boxes so that contact points of said second connector end are accessed from within the interior space of said respective junction box, and said receptacle being plug-connected to said second connector of said first cable so that power is supplied from said first cable to said receptacle and said outlets are accessible from said respective junction box;
    a second one of said cables has said first and second connector ends, wherein said second cable has said first connector end fixedly attached to a respective one of said junction boxes, such that the contact points of said first connector end of said second cable are accessed from within the interior space of said junction box; and
    said switch device having said connector end plug-connected to said first connector end of said second cable within said junction box to receive power therefrom, said switch device being accessible from said junction box.

2. A system as in claim 1, wherein said second cable has identical connector ends as said first cable except said second cable has been attached to said junction box in a reverse orientation.

3. A system as in claim 1, wherein said second connector end of said first cable has a multi-plug configuration of at least two of said connector plugs in side-by-side relation which are accessible from within the interior space of said junction box.

4. A system as in claim 3, wherein one of the connector plugs of said second connector end is plug-connected to said receptacle and the other connector plug is plug-connected to the first connector end of a third one of said cables.

5. A system as in claim 4, wherein said third cable has identical connector ends as said first cable with said third cable has been attached in the same orientation.

6. A system as in claim 1, wherein said cables carry a plurality of electrical circuits therethrough and comprises line, neutral and ground conductors, and the system components further comprise a remote switch box including a first connector end input port configured to receive power from only one of said circuits when plug-connected to the second connector end of one of said cables and including at least one second connector end output port for providing switched power to a downstream light fixture or other device where each said output port has one or more switched output lines and one unswitched output line.

7. A system as in claim 6, wherein said second connector end of said cables has a multi-plug configuration of at least two of said connector plugs in side-by-side relation which are accessible from within the interior space of said junction box, and wherein an upstream one of said cables is connected to the input port of the remote switch box to define a connected upstream power input cable, said switch box including provision for one other of the multi-plug connector plugs of the upstream power input cable to be exposed for connection to said first connector end of another one of said cables for bypassing power downstream of the switch box.

8. A system as in claim 7, wherein the remote switch box includes provisions for one of the multi-plug connector plugs of the upstream power input cable to be connected to said input port and the other of the multi-plug connector plugs of the upstream power input cable to be covered by the switch box structure to prevent the other multi-plug connector plug from being exposed.

9. A system as in claim 6, wherein said switch box includes a first connector end switch port for connection of a said cable having a said switch device through which the switched lines pass.

10. A system as in claim 6, wherein said second cable is connected to said switch port.

11. A system as in claim 10, wherein said switch device comprises a standard switch and a switch pigtail device having a pigtail connector end with said connector plug that can plug-connect to said first connector end of any said cable, and further having wires with free ends for attachment to said standard switch, said switch pigtail device having said connector end plug-connected to said first connector end of said second cable within said respective junction box and having said wires attached to said standard switch.

12. A system as in claim 11, wherein said remote switch box includes an integral switch device such as a relay(s) through which the switched line(s) passes and can be respectively interrupted by selective activation of the relay(s).

13. A system as in claim 12, wherein said remote switch box includes low voltage wires attached to the relay switch device on which a signal passes that causes the relay(s) to connect or interrupt the path of the switched line(s).

14. A system as in claim 13, wherein said remote switch box includes a wireless receiver that can receive signals that with cause the relay(s) to respectively connect or interrupt the path of the switched line(s).

15. A system as in claim 10, wherein said remote switch box includes additional ones of said first connector end switch ports for connection of additional ones of said cables for connection to a switch device or switches through which the switched lines pass wherein the additional switch ports are daisy chain connected within said switch box so that each switched line must pass through each attached switch device.

16. A system as in claim 6, wherein the remote switch box includes a said cable connected to one of the second connector end output ports to provide unswitched power to emergency or always-on lighting.

17. A system as in claim 10, wherein the remote switch box includes one said input port that is labeled for power-in, at least one said output port that is labeled for switched power-out and at least one said switch port that is labeled for connection to a manual switch.

18. A system as in claim 1, wherein said switch device comprises a standard switch and a switch pigtail device having a pigtail connector end with said connector plug that can plug-connect to said first connector end of any said cable, and further having wires with free ends for attachment to said standard switch, said switch pigtail device having said connector end plug-connected to said first connector end of said second cable within said respective junction box and having said wires attached to said standard switch.

19. A system as in claim 1, wherein said cables carry one or more electrical circuits therethrough and comprise line, neutral and ground conductors, and the system components further comprise a remote switch box including a first connector end input port configured to receive power from only one of said circuits when plug-connected to the second connector end of one of said cables and including at least one second connector end output port for providing switched power to a downstream light fixture or other device where each said output port has one or more switched output lines, said switch box includes at least two first connector end switch ports for connection of respective ones of said cables each having a said switch device through which the switched lines pass to define a three-way switch configuration.

20. A system according to claim 1, wherein said cables carry one or more electrical circuits therethrough and comprise line, neutral and ground conductors, and the system components further comprise a remote switch box including a first connector end input port configured to receive power from only one of said circuits when plug-connected to the second connector end of one of said cables and including at least one second connector end output port for providing switched power to a downstream light fixture or other device where each said output port has one or more switched output lines, said switch box includes at least three first connector end switch ports for connection of respective ones of said cables each having a said switch device through which the switched lines pass, said switch box including a jumper cap for one of said switch ports, and being internally wired such that plug-connection of two said cables and said jumper cap to said switch ports defines a three-way switch configuration and plug-connection of three said cables to said switch ports without use of said jumper cap defines a four-way switch configuration.

21. A system according to claim 1, wherein said first and second cables are connected to one said junction box such that said switch device and said receptacle are located side-by-side therein.

* * * * *